US011093544B2

(12) United States Patent
Roswell et al.

(10) Patent No.: US 11,093,544 B2
(45) **Date of Patent: *Aug. 17, 2021**

(54) ANALYZING CAPTURED SOUND AND SEEKING A MATCH FOR TEMPORAL AND GEOGRAPHIC PRESENTATION AND NAVIGATION OF LINKED CULTURAL, ARTISTIC, AND HISTORIC CONTENT

(71) Applicant: TunesMap Inc., Pacific Palisades, CA (US)

(72) Inventors: Gilbert Marquard Roswell, Pacific Palisades, CA (US); Dale T. Roberts, San Anselmo, CA (US); Erik Christopher Loyer, Santa Clarita, CA (US)

(73) Assignee: TUNESMAP INC., Pacific Palisades, CA (US)

( * ) Notice: Subject to any disclaimer, the term of this patent is extended or adjusted under 35 U.S.C. 154(b) by 39 days.

This patent is subject to a terminal disclaimer.

(21) Appl. No.: 16/582,947

(22) Filed: Sep. 25, 2019

(65) Prior Publication Data

US 2020/0089705 A1 Mar. 19, 2020

Related U.S. Application Data

(63) Continuation-in-part of application No. 15/675,589, filed on Aug. 11, 2017, now Pat. No. 10,885,110, (Continued)

(51) Int. Cl.
*G06F 16/683* (2019.01)
*G06F 3/0481* (2013.01)
(Continued)

(52) U.S. Cl.
CPC .......... *G06F 16/683* (2019.01); *G06F 3/0481* (2013.01); *G06F 3/04842* (2013.01); (Continued)

(58) Field of Classification Search
CPC .... G06F 16/683; G06F 16/958; G06F 3/0481; G06F 3/04842; G06Q 30/0631; G06Q 30/0641; H04L 12/1813
See application file for complete search history.

(56) References Cited

U.S. PATENT DOCUMENTS 7,444,353 B1 * 10/2008 Chen .................... G06F 16/683
8,116,516 B2 2/2012 Rhoads
(Continued)

OTHER PUBLICATIONS

"Acoustic fingerprint", Wikipedia, retrieved online from url http://en.wikipedia.org/wiki/Asoustic_finterprint; last modified on Aug. 15, 2013, 4 pages.
(Continued)

*Primary Examiner* — Mohsen Almani
(74) *Attorney, Agent, or Firm* — Perkins Coie LLP

(57) ABSTRACT

The system and method described here relate to the effective organization of a media database. The media database can include music and can bring together time, place, genre, and artist with curator and community commentary and recommendations, cultural events and elements, media content, and a facility for procurement of related materials. The consistent focus of these fundamental elements of music and principles of organization provides a unique user experience that is a key aspect of the current invention. The user can interact with the media database using voice commands.

8 Claims, 107 Drawing Sheets

Related U.S. Application Data which is a continuation of application No. 14/536,104, filed on Nov. 7, 2014, now Pat. No. 9,754,025, and a continuation-in-part of application No. 13/975,176, filed on Aug. 23, 2013, now abandoned, which is a continuation of application No. 12/855,612, filed on Aug. 12, 2010, now Pat. No. 8,533,175.

(60) Provisional application No. 62/736,580, filed on Sep. 26, 2018, provisional application No. 62/736,587, filed on Sep. 26, 2018, provisional application No. 61/902,127, filed on Nov. 8, 2013, provisional application No. 61/233,639, filed on Aug. 13, 2009.

(51) Int. Cl.

| | |
|---|---|
| ***G06F 3/0484*** | (2013.01) |
| ***G06Q 30/06*** | (2012.01) |
| ***G06F 16/958*** | (2019.01) |
| ***H04L 12/18*** | (2006.01) |

(52) U.S. Cl.
CPC ....... *G06F 16/958* (2019.01); *G06Q 30/0631* (2013.01); *G06Q 30/0641* (2013.01); *H04L 12/1813* (2013.01)

(56) References Cited

U.S. PATENT DOCUMENTS

| | | | | |
|---|---|---|---|---|
| 8,116,746 | B2 | 2/2012 | Lu et al. | |
| 8,117,193 | B2 | 2/2012 | Svendsen et al. | |
| 8,121,342 | B2 | 2/2012 | Davis et al. | |
| 8,121,830 | B2 | 2/2012 | Srinivasan et al. | |
| 8,121,843 | B2 | 2/2012 | Rhoads et al. | |
| 8,122,257 | B2 | 2/2012 | Rhoads et al. | |
| 8,126,200 | B2 | 2/2012 | Rhoads | |
| 8,131,749 | B2 | 3/2012 | Sayfan | |
| 8,150,096 | B2 | 4/2012 | Alattar | |
| 8,151,113 | B2 | 4/2012 | Rhoads | |
| 8,155,582 | B2 | 4/2012 | Rhoads et al. | |
| 8,161,071 | B2 | 4/2012 | Lajoie et al. | |
| 8,165,341 | B2 | 4/2012 | Rhoads | |
| 8,170,273 | B2 | 5/2012 | Sharma et al. | |
| 8,175,730 | B2 | 5/2012 | Dittmar et al. | |
| 8,180,844 | B1 | 5/2012 | Rhoads et al. | |
| 8,185,507 | B1 | 5/2012 | Kaminski | |
| 8,185,579 | B2 | 5/2012 | Svendsen | |
| 8,200,602 | B2 | 6/2012 | Farrelly | |
| 8,200,976 | B2 | 6/2012 | Rhoads et al. | |
| 8,205,237 | B2 | 6/2012 | Cox | |
| 8,224,022 | B2 | 7/2012 | Levy et al. | |
| 8,255,693 | B2 | 8/2012 | Rhoads | |
| 8,285,595 | B2 | 10/2012 | Svendsen | |
| 8,285,776 | B2 | 10/2012 | Svendsen | |
| 8,290,423 | B2 | 10/2012 | Wang | |
| 8,307,092 | B2 | 11/2012 | Svendsen | |
| 8,312,168 | B2 | 11/2012 | Rhoads et al. | |
| 8,315,554 | B2 | 11/2012 | Levy et al. | |
| 8,327,266 | B2 | 12/2012 | Svendsen | |
| 8,332,478 | B2 | 12/2012 | Levy et al. | |
| 8,355,667 | B2 | 1/2013 | Witzman | |
| 8,359,205 | B2 | 1/2013 | Srinivasan et al. | |
| 8,370,952 | B1 | 2/2013 | Wieder | |
| 8,379,908 | B2 | 2/2013 | Davis et al. | |
| 8,396,800 | B1 | 3/2013 | Wieder | |
| 8,396,951 | B2 | 3/2013 | Svendsen et al. | |
| 8,407,287 | B2 | 3/2013 | Wiener et al. | |
| 8,422,490 | B2 | 4/2013 | Svendsen et al. | |
| 8,429,205 | B2 | 4/2013 | Rhoads | |
| 8,434,024 | B2 | 4/2013 | Curtis | |
| 8,442,264 | B2 | 5/2013 | Rhoads et al. | |
| 8,458,184 | B2 | 6/2013 | Dorogusker et al. | |
| 8,468,357 | B2 | 6/2013 | Roberts et al. | |
| 8,484,227 | B2 | 7/2013 | Svendsen | |
| 8,484,311 | B2 | 7/2013 | Svendsen et al. | |
| 8,488,836 | B2 | 7/2013 | Brunk et al. | |
| 8,489,598 | B2 | 7/2013 | Rhoads et al. | |
| 8,508,357 | B2 | 8/2013 | Srinivasan et al. | |
| 8,509,397 | B2 | 8/2013 | Chen et al. | |
| 2002/0112237 | A1 | 8/2002 | Kelts | |
| 2002/0120395 | A1 | 8/2002 | Smith | |
| 2004/0093236 | A1 | 5/2004 | Chacker | |
| 2005/0252362 | A1 | 11/2005 | McHale et al. | |
| 2006/0195516 | A1* | 8/2006 | Beaupre | H04L 67/22 709/203 |
| 2006/0238379 | A1 | 10/2006 | Kimchi et al. | |
| 2007/0061363 | A1 | 3/2007 | Ramer et al. | |
| 2008/0046406 | A1* | 2/2008 | Seide | G06F 16/68 |
| 2008/0294663 | A1 | 11/2008 | Heinley et al. | |
| 2009/0083281 | A1 | 3/2009 | Sarig et al. | |
| 2010/0005104 | A1* | 1/2010 | DiMaria | G06F 16/637 707/E17.009 |
| 2010/0223223 | A1* | 9/2010 | Sandler | G06F 16/683 706/50 |
| 2011/0043652 | A1* | 2/2011 | King | G06F 40/194 348/222.1 |

OTHER PUBLICATIONS

"Memory Lane", retrieved online Apr. 1, 2011 from url: http://www.classmates.com/?, 4 pages.
Casey , et al., "Content-Based Music Information Retrieval: Current Directions and Future Challenges", Proceedings of the IEEE; vol. 96, No. 4, Apr. 2008, pp. 668-696.
Govaerts , et al., "A Web-based Approach to Determin the Origin of an Artist", 10th Int'l Society for Music Information Retrieval Conference (ISMIR), Oct. 2009, pp. 261-266.
Jankun-Kelly, T.J. , et al., "MoireGraphs: Radial Focus + Context Visualization and Interaction for Graphs With Visual Nodes", Information Visualization. INFOVIS 2003. IEEE Symposium On. IEEE., 2003, 8 pages.
Sheng, Yixing , "A Recorder and Analyzer of Users' Behaviour on a Web Community Site", The University of Bath, May 2007, 122 pages.
Wang, Avery , "An Industrial Strength Audio Search Algorithm", ISMIR, 2003, 7 pages.

* cited by examiner

100

Core Elements:
- Time
- Location
- Genre
- Artist

101

Primary Elements:
- Curator
- Community
- Culture
- Content
- Shopping

102

Supporting Elements:
- Tagging (Weight/relevance, appear in all)
- Music Ontology (categories for drill down filtering)
- Random Selection for unspecified categories
- Content Category web interface (per supported source web site)
- TunesMural
- Musical Earth (Mapping Module)
- MediaPlayer Integration
- User Account Management
- Personal TunesMap
- Home Page
- Network View (Mapping Module)
- Curator Page
- PlayList Publishing
- Ranking Facility
- City Page
- Location Page
- Artist Page
- Culture Page
- Tour
- Content Search
- User Profile
- iTunes Integration (general external media)
- iPhone Integration (general mobile device)
- Game Consol Integration
- Album
- Song
- Art
- Film & TV
- Fashion
- Literature
- Landmark
- News
- Comedy
- Content Registration
- Search Phrase Category Analysis
- User State (Categorical Context)
- PlayList
- World Event
- Cover Flow Carousel
- Recommendation
- Blog
- Search
- User Profile
- Feed (external site sharing)
- Widget/Plug-in (external site sharing)
- Interview

FIG. 3

*Easter egg: Clicking the Tunesmap logo randomizes the contents of the four primary categories*

*Arrow buttons allow for navigation to prior states of the filter bar*

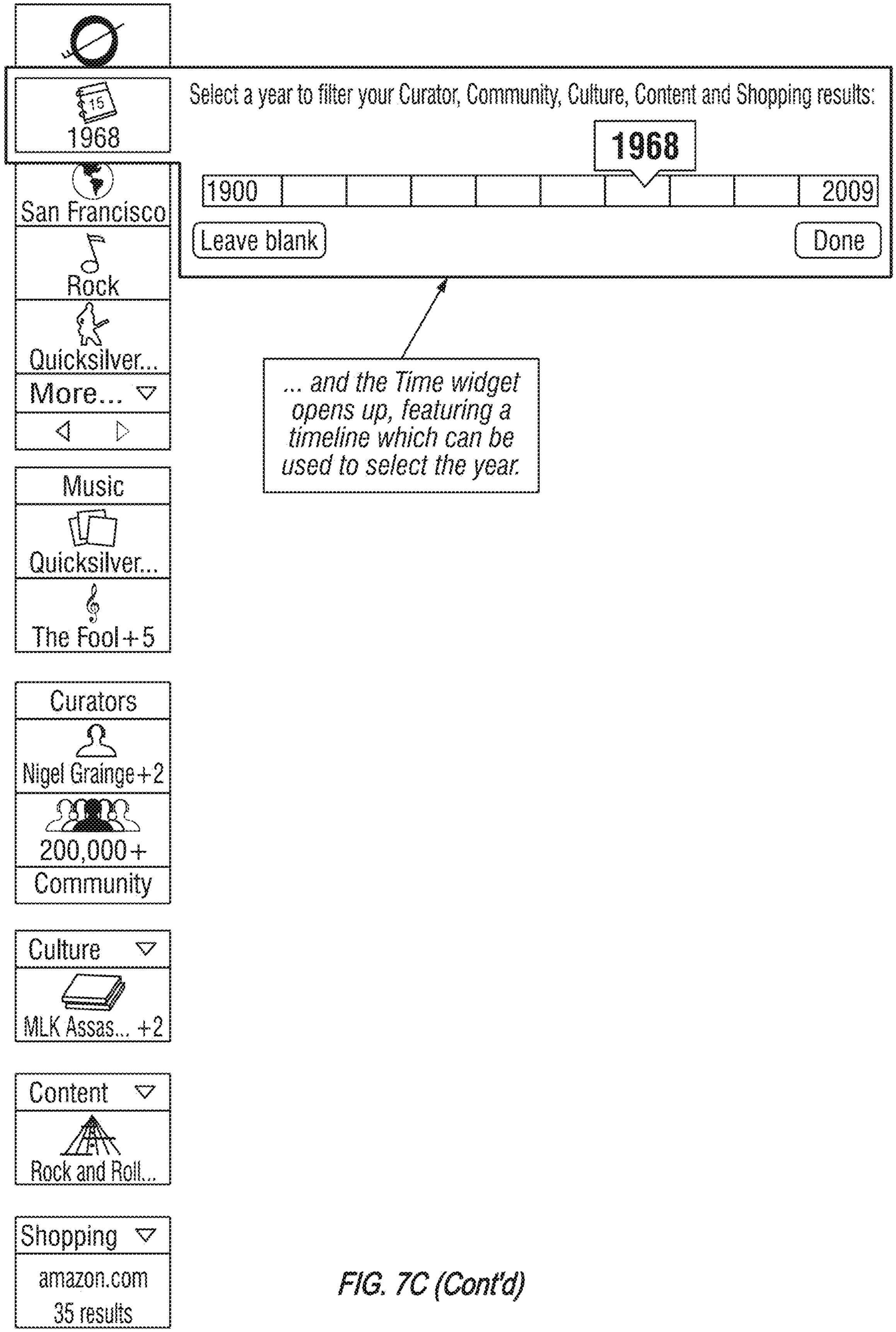

FIG. 7C (Cont'd)

Select a year to filter your Curator, Community, Culture, Content and Shopping results:

1968

| 1900 | | | | | | | | | 2009 |
|---|---|---|---|---|---|---|---|---|---|

[Leave blank]  [Done]

*... and the Time widget opens up, featuring a timeline which can be used to select the year.*

1968

San Francisco

Rock

Quicksilver...

More... ▽

◁  ▷

Music

Quicksilver...

The Fool +5

Curators

Nigel Grainge +2

200,000+ Community

Culture ▽

MLK Assas... +2

Content ▽

Rock and Roll...

Shopping ▽ amazon.com
35 results

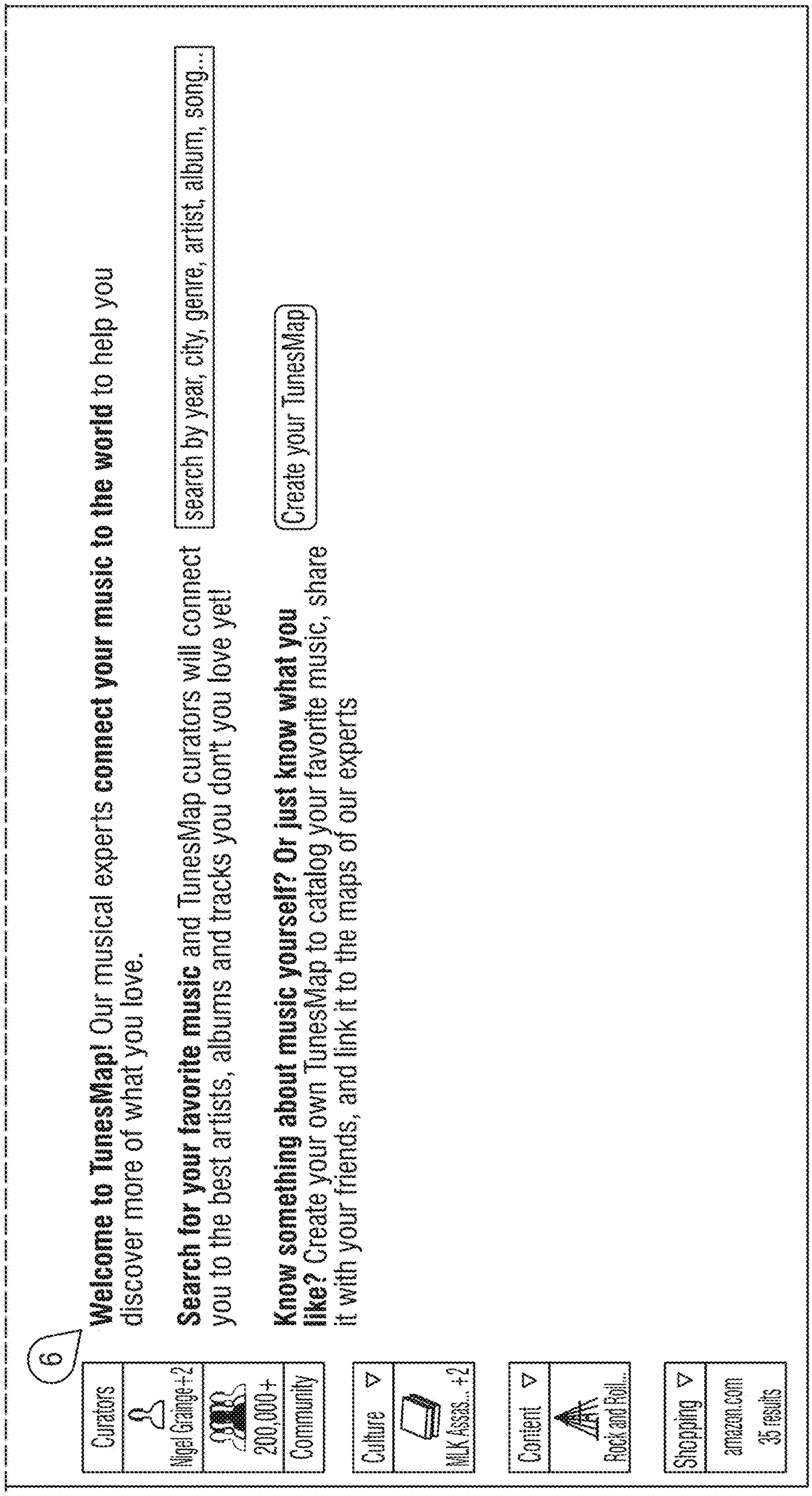

FIG. 8B (Cont'd)

Welcome to TunesMap! Our musical experts connect your music to the world to help you discover more of what you love.

Search for your favorite music and TunesMap curators will connect you to the best artists, albums and tracks you don't you love yet!

Know something about music yourself? Or just know what you like? Create your own TunesMap to catalog your favorite music, share it with your friends, and link it to the maps of our experts search by year, city, genre, artist, album, song...

Create your TunesMap

Curators — Nigel Grange +2 — 200,000+ Community

Culture ▽ — MLK Asses.. +2

Content ▽ — Rock and Roll..

Shopping ▽ — amazon.com — 35 results

Welcome to TunesMap! Our musical experts connect your music to the world to help you discover more of what you love.

Search for your favorite music and TunesMap curators will connect you to the best artists, albums and tracks you don't you love yet!

Know something about music yourself? Or just know what you like? Create your own TunesMap to catalog your favorite music, share it with your friends, and link it to the maps of our experts.

search by year, city, genre, artist, album, song...

Create your TunesMap

Curators
Nigel Grange +2
200,000+
Community

Culture ▽
MLK Asses.. +2

Content ▽
Rock and Roll

Shopping ▽
amazon.com
35 results

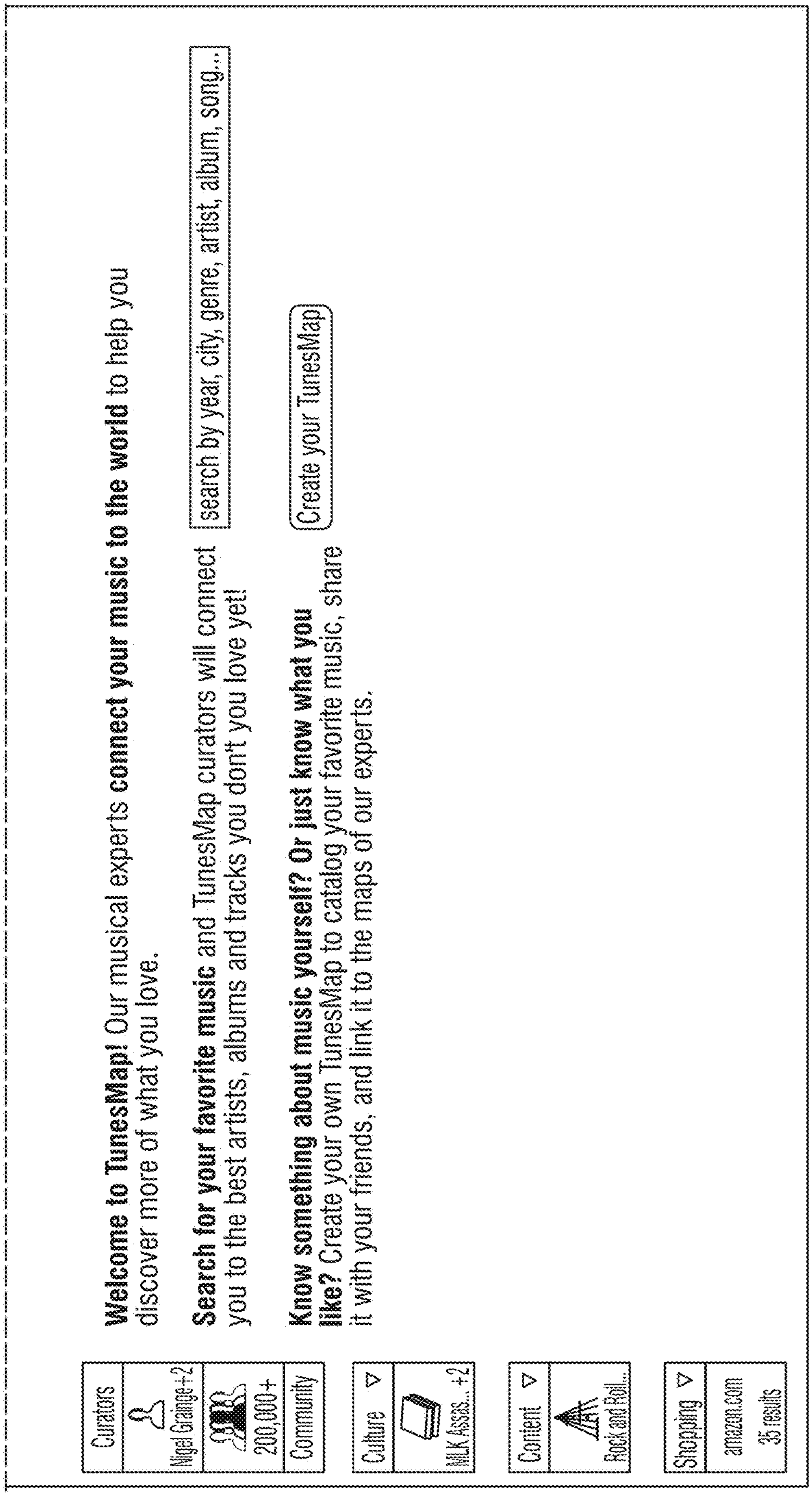

*FIG. 8E (Cont'd)*

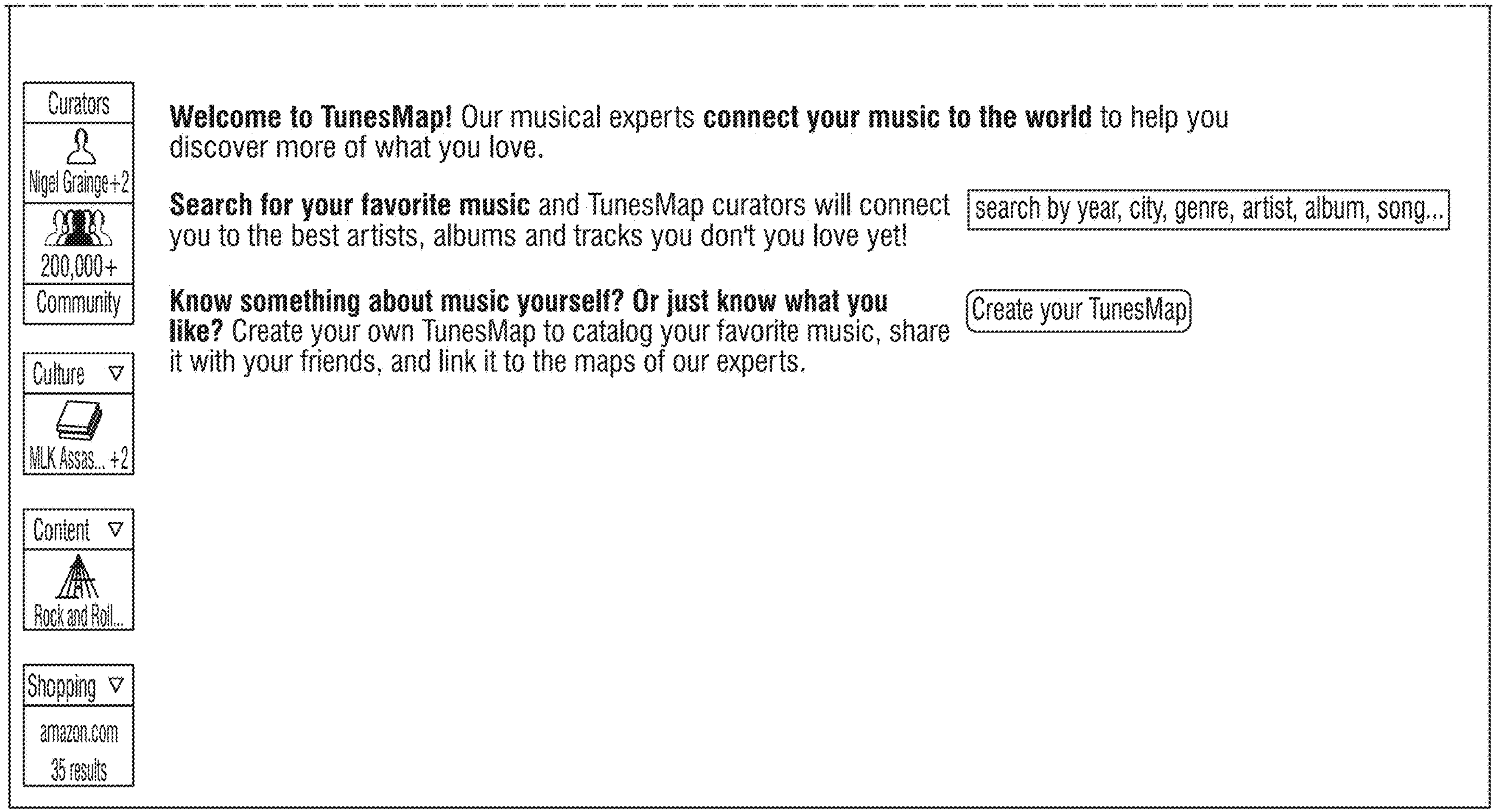

FIG. 8F (Cont'd)

Welcome to TunesMap! Our musical experts connect your music to the world to help you discover more of what you love.

Search for your favorite music and TunesMap curators will connect you to the best artists, albums and tracks you don't you love yet!

Know something about music yourself? Or just know what you like? Create your own TunesMap to catalog your favorite music, share it with your friends, and link it to the maps of our experts.

search by year, city, genre, artist, album, song...

Create your TunesMap

Curators — Nigel Grange +2 — 200,000+ Community

Culture ▽ — MLK Asses... +2

Content ▽ — Rock and Roll

Shopping ▽ — amazon.com — 35 results

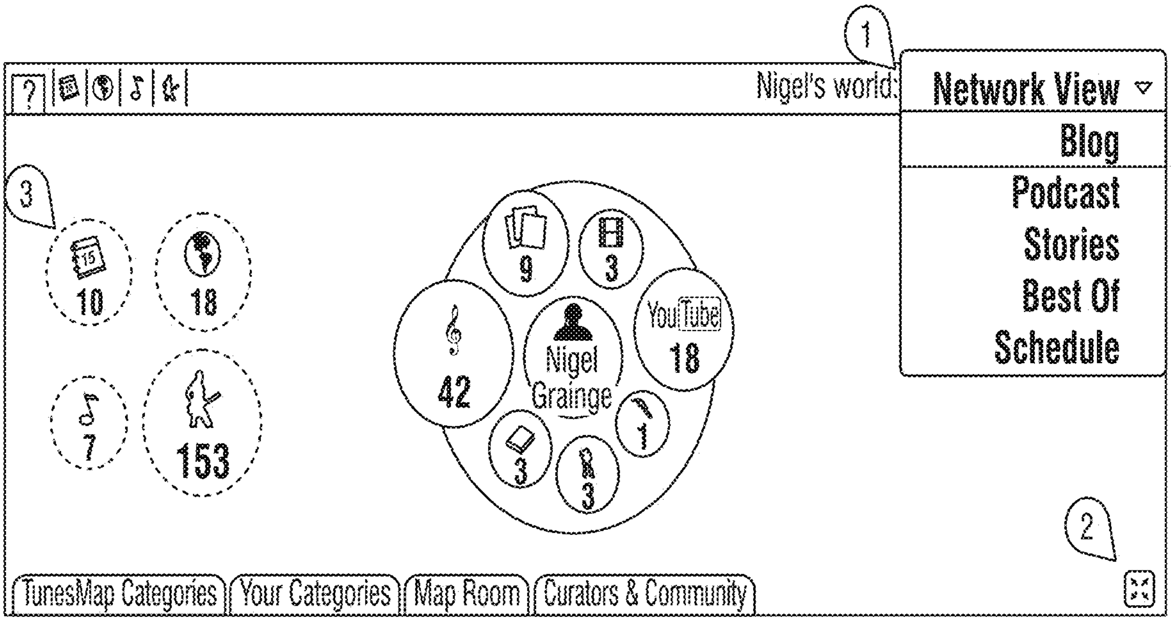
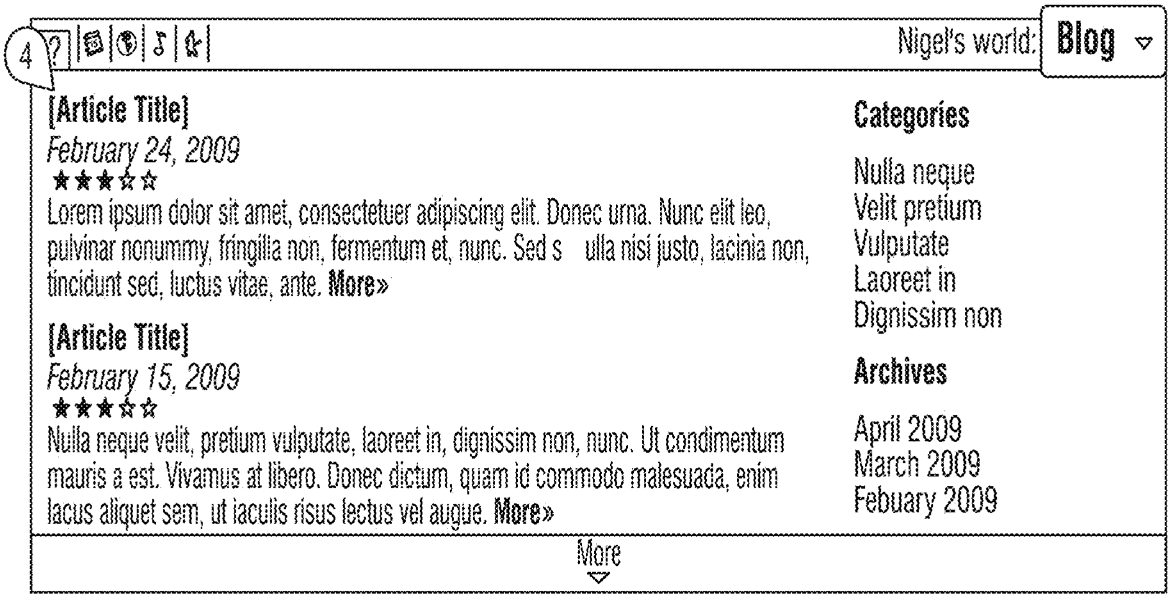
*FIG. 10D*

① ? 📖 🌐 ♪ ⚐   Nigel's world: Podcast ▽

Lorem ipsum dolor sit amet, consectetuer adipiscing elit. Donec urna. Nunc elit leo, pulvinar nonummy, fringilla non, fermentum et, nunc. Sed sit amet leo. Proin nisi nisi, interdum congue, fringilla ut, sagittis vel, lorem.

Subscribe to Nigel's podcast in iTunes»

🔊 2/3/09   Episode 5 - Lorem Ipsum Dolor
🔊 1/10/09   Episode 4 - Sit Amet
🔊 12/15/08   Episode 3 - Nulla Neque
🔊 11/17/08   Episode 2 - Fermentum Ni
🔊 10/28/08   Episode 1 - Curabitur Elementum

---

② ? 📖 🌐 ♪ ⚐   Nigel's world: Best Of ▽

Nulla neque velit, pretium vulputate, laoreet in, dignissim non, nunc. Ut condimentum mauris a est. Vivamus at libero.

[Article Title]
*February 24, 2009*
★★★★★
Lorem ipsum dolor sit amet, consectetuer adipiscing elit. Sed sit amet leo. Proin nisl nisi, interdum congue, fringilla ut, sagittis vel, lorem. More»

[Article Title]
*February 21, 2009*
★★★★★
Aenean sodales fermentum mi. Nullam sed mi. Sed lacina hendrerit nulla. Nulla nisi More
▽

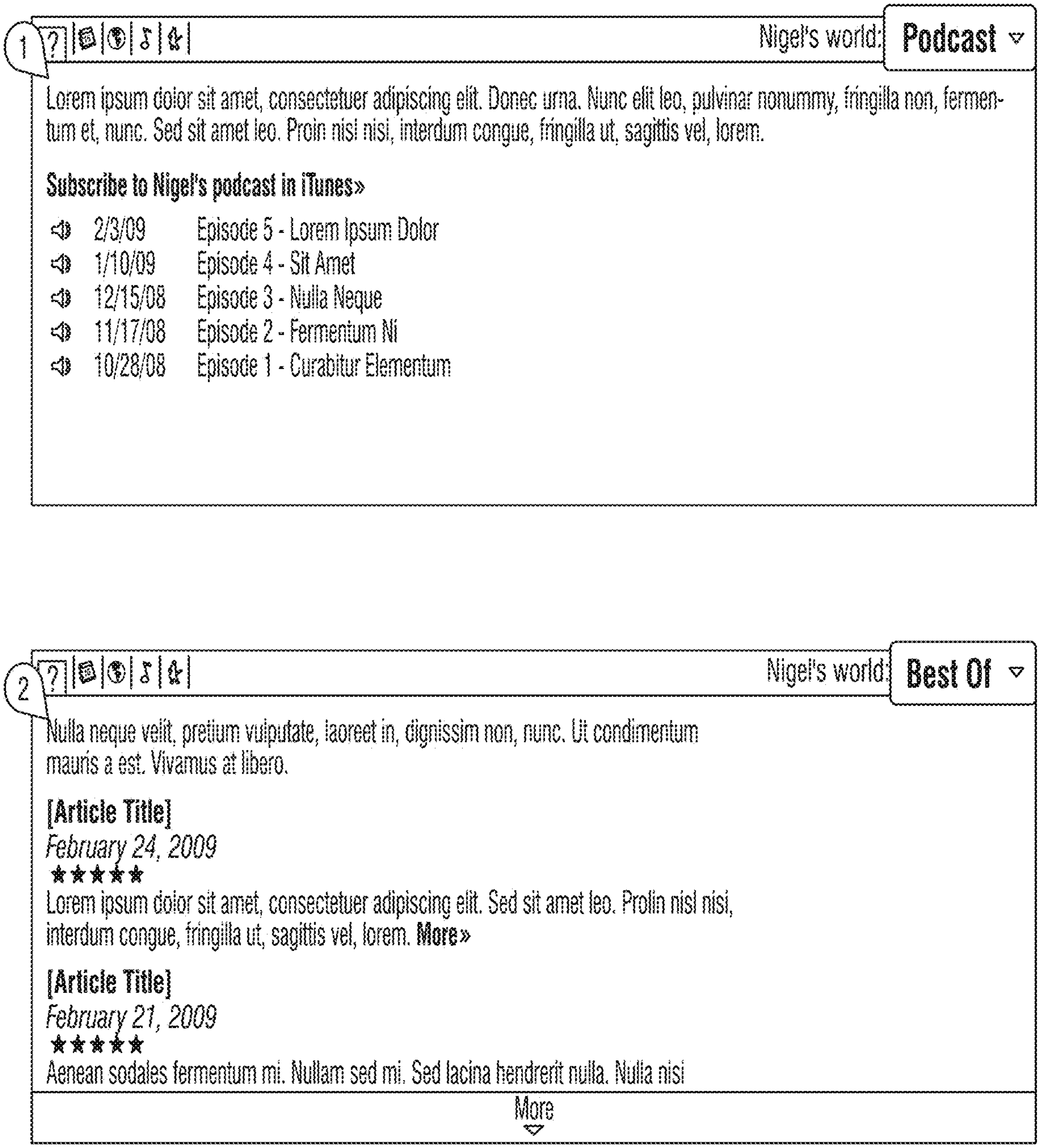

*FIG. 10E*

| 1 | ? | 🖼 | 🌐 | ♪ | & | | | Nigel's world | Schedule ▽ |

Lorem ipsum dolor sit amet, consectetuer adipiscing elit. Donec urna. Nunc elit leo, pulvinar non-ummy, fringilla non, fermentum et, nunc. Sed sit amet leo. Proin nisl nisi, interdum congue, fring-illa ut, sagittis vel, lorem.

2/25/09    Lorem Ipsum Dolor
Santa Monica, CA
Nunc elit leo, pulvinar nonummy, fringilla non, fermentum et, nunc.

3/2/09    Lorem Ipsum Dolor
Santa Monica, CA
Nunc elit leo, pulvinar nonummy, fringilla non, fermentum et, nunc.

More ▽

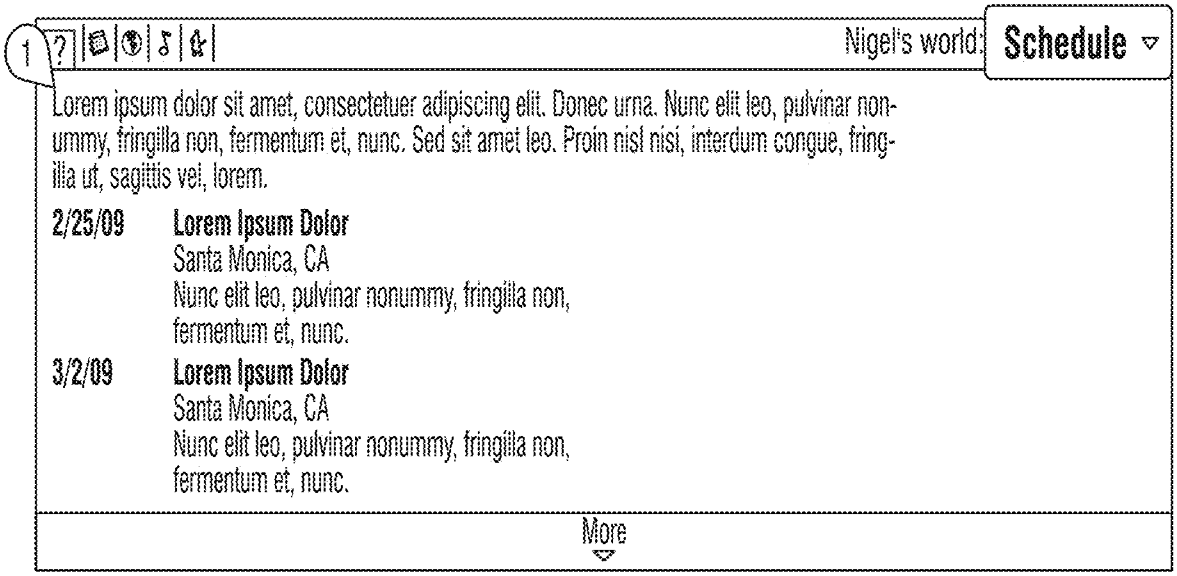

*FIG. 10F*

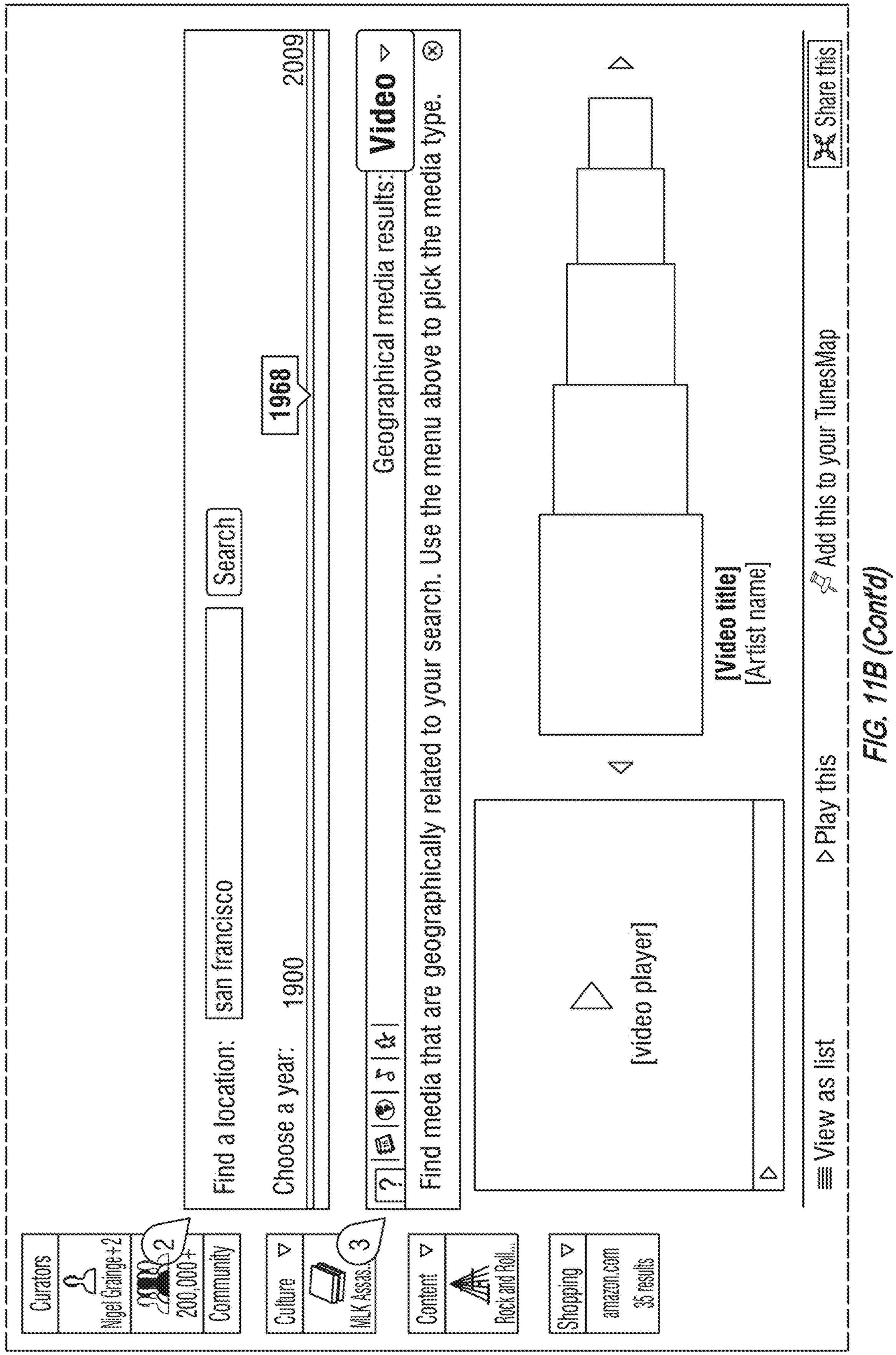

FIG. 11B (Cont'd)

Find a location: san francisco [Search]

Choose a year: 1900 — 1968 — 2009

[? 🖼 ♪ ✦]

Geographical media results: Video ▽   ⊗

Find media that are geographically related to your search. Use the menu above to pick the media type.

[video player]

△  △

[Video title]
[Artist name]

Curators
Nigel Grainge +2
200,000+
Community

Culture ▽
MLK Assas... 3

Content ▽
Rock and Roll...

Shopping ▽
amazon.com
35 results

≡ View as list     ▷ Play this     ⚲ Add this to your TunesMap     ✖ Share this

1600

| Example VOICE Commands | |
|---|---|
| Find/Search | *Name Entity: Core elements, Primary elements, Supporting elements, comments, details, curator media type* |
| Describe | |
| Tell Me More | |
| Show Me | |
| Tour | |
| Context | Tells you current context |
| Photo Zoom | In/Out/Face 1/Face 2 |
| Play/Stop/Pause | |
| Back | |
| Skip | |

1610 (Find/Search – Tour); 1620 (Context); 1630 (Photo Zoom); 1640 (Play/Stop/Pause – Skip)

| Context | |
|---|---|
| Time | *January 14, 1967* |
| Place | *Golden Gate Park Polo Fields* |
| Location | *San Francisco* |
| Artist | *Jefferson Airplane* |
| Song | *White Rabbit* |
| Album | *Surrealistic Pillow* |
| Cluster | *Cluster_ID* |
| User | *User_ID* |

*FIG. 17*

ANALYZING CAPTURED SOUND AND SEEKING A MATCH FOR TEMPORAL AND GEOGRAPHIC PRESENTATION AND NAVIGATION OF LINKED CULTURAL, ARTISTIC, AND HISTORIC CONTENT

CROSS REFERENCE TO RELATED APPLICATIONS

This application claims priority to U.S. provisional patent application Ser. No. 62/736,580 filed Sep. 26, 2018, U.S. provisional patent application Ser. No. 62/736,587 filed Sep. 26, 2018, and is a continuation-in-part of U.S. patent application Ser. No. 15/675,589, filed Aug. 11, 2017. Application Ser. No. 15/675,589, filed Aug. 11, 2017 is a continuation of U.S. patent application Ser. No. 14/536,104, filed Nov. 7, 2014, issued on Sep. 5, 2017 as U.S. Pat. No. 9,754,025, which claims priority to U.S. provisional patent application 61/902,127, filed Nov. 8, 2013. Application Ser. No. 15/675,589, filed Aug. 11, 2017 is also a continuation-in-part of U.S. patent application Ser. No. 13/975,176, filed Aug. 23, 2013, which is a continuation of U.S. patent application Ser. No. 12/855,612, filed Aug. 12, 2010, issued on Sep. 10, 2013 as U.S. Pat. No. 8,533,175, which claims priority to U.S. provisional patent application Ser. No. 61/233,639, filed Aug. 13, 2009. Each of the above referenced applications is incorporated herein in their entirety by this reference thereto.

FIELD

The invention relates to information search and retrieval using the World Wide Web. More specifically, the invention relates to analyzing captured sound and seeking a match based on an acoustic fingerprint for temporal and geographic presentation and navigation of linked cultural, artistic, and historic content.

BACKGROUND

Developments in technology over the last twenty years have had a profound impact on music, particularly popular music, and how it is produced, marketed, distributed, and consumed. The trend is towards Web-based digital formats, such as MPEG-3 acquired from such Web sites as Apple iTunes, Rhapsody, Napster, etc., and away from traditional brick and mortar record stores. In the process, the human element of the music store staff, knowledgeable guides to help locate and recommend music, has been lost. A further effect of the move to digital, Web-based downloads is that the packaging of a work of music, with cover art, liner notes, lyric sheets, etc. has also been largely lost. The individual components (songs) of a given collection might even be obscured.

Social networking Web sites, such as MySpace, Facebook, and Twitter and the phenomenon of Web logging (blogs) further set the stage for network-based communities related by common interests. However, no such site exists which brings together the elements of music culture required to preserve and navigate its rich history and diverse character effectively.

There is great value for learning and for growing communities by connecting those individuals having specific interests to experts in the field, as well as to each other. This principle is evidenced by traditional museums and by social networking sites for the expression of subjective tastes and opinions and by group collaboration sites, such as Wikipedia, producing significant bodies of objective knowledge. It has not however been applied to the general navigation, discovery, and sharing of music and music history and culture through communities of common interests seeded and led by expert curatorship.

Rather than contribute to the dissipation and loss of music culture, technology should be used to preserve and enrich it. A large body of recorded music exists since the invention of the phonograph. Collections of music recordings, photographs, videos, personal accounts, artifacts, memorable, etc. exist in private, public, and commercial hands. While many music download sites exist, and manufactures of portable music storage and playback devices, such as the iPod, provide various services to describe, search, recommend, and catalog music, there is no such service or methodology that provides a comprehensive facility to capture, preserve, and navigate the rich body of materials which exist. To do so requires that the fundamental nature of music phenomenon be understood and its essential underlying relationships be employed to create an intuitive user interface for its navigation with optimized data system architecture for its storage and retrieval.

The commercial music industry has been adversely affected by the World Wide Web. Challenges to conventional sales and marketing of recorded music exist in the areas of copyright protection and distribution that the industry is still coping with. An apparatus to make the substantial catalogs of music and related materials, such as interviews, artifacts, video clips, etc. possessed by various institutions available for general discovery and potential sale by an integrated, guided musical navigation system which address licensing concerns provides a much needed outlet for both the music materials and the persons and institutions owning them.

There is a fundamental relationship between works of music and the artists that create them, and the time, location, genre, and cultural climate in which they are conceived and produced. These elements provide the best possible classification and search criteria for creating a comprehensive apparatus for the cataloging, search, and discovery of music, its history, and the culture that inspired it. No such facility, service, or apparatus today exists which applies this principle of organization.

SUMMARY

Collections of music and other items, related by time, location, genre, and artist, and that are registered in a data model to provide a foundation for their curatorship, discovery, and procurement are accessed by analyzing captured sound and seeking a match based on an acoustic fingerprint. As a result of said match, a map through the history and culture of music is created for display. The map is created in an embodiment by a series of choices, where a choice is a combination of any of time, place, genre, and artist. Both expert and regular individual curators can define the maps; or the maps can be defined algorithmically. Based upon said matches, one or more animated murals depicting a fundamental combination of any of time, place, genre, and artist are provided to a user via a user interface for the navigation of music, its history, and culture. Integration with hand held GPS enabled devices provides users with knowledge of music events and history relative to their present location.

An embodiment of the invention relates to the effective organization of music by bringing together time, place, genre, and artist with curator and community commentary and recommendations, cultural events and elements, media content, and a facility for procurement of related materials. The consistent focus of these fundamental elements of music and principles of organization provides a unique user experience that is a key aspect of the current invention.

Collections of music and music related items, such as podcasts, photos, news articles clips, stories, memorabilia, etc. are registered and made available through the system by the persons or institutions which own them. The materials are related fundamentally by classification of time, location, genre, and artist. A unique and novel data model based on this fundamental relationship provides the foundation for the curatorship, discovery and potential procurement of the music related materials registered by the system. This enables not only the preservation of the culture and histories inherent in these collections, but also a long tail market for the sale of items that are available for procurement.

Individual tastes, preferences, and interests lead to different choices in navigation. A series of choices, where a choice is a combination of time, place, genre, and artist, represents a map or guided tour through the history and culture of music in a presently preferred embodiment of the invention. These maps contribute to the body of related materials for a given combination and are published as links on external Web sites. Both expert and regular individual curators define them. They are the subject of sharing and group evaluation and ranking as are the curators themselves. These maps through music, its history, and culture are a reflection of the curators who create them, and are a distinct and novel feature of the invention.

Animated murals depicting a fundamental combination of time, place, genre, and artist provides a unique visual experience and user interface for the navigation of music, its history, and culture. These murals are made available as embedded objects on external sites such as MySpace, Facebook, Twitter, etc. and provide a distinctive expression of music to those external Web pages. Thus, an embodiment of the invention includes a social networking aspect as it relates to the user and their ability to share their music culture through Facebook, Twitter, or any other social networking sites.

Integration with handheld GPS-enabled devices, such as Apple's iPhone, provides users of the system with knowledge of music events and history relative to their present location. This enables a first hand discovery of music history points of interest in not only the virtual world of media content displayed on a computer, but also in the physical world where the user is guided to the actual places of interest.

The invention is not limited to music and other embodiments of the invention apply the herein disclosed teachings to, for example but not by way of limitation, fashion, film, art, news, comedy, books, healthcare, environmental issue, and the like.

Other embodiments of the invention allow a user's voice to trigger the creation of a map, as described above. For example, the user can trigger the creation of a map by saying "What song is playing?"; Take me to that scene."; or "Take me to New York in 1977."

DRAWINGS

FIG. 3 is a schema that lists the elements of the invention in three categories, used consistently in the preferred embodiments, shown as top level data model classifications;

FIGS. 10A-10H illustrate a curator function according to the invention;

FIG. 16 shows example voice commands that can be used in the system;

FIG. 17 shows an example of the context;

DESCRIPTION

Collections of music and other items, related by time, location, genre, and artist, and that are registered in a data model to provide a foundation for their curatorship, discovery, and procurement are accessed by analyzing captured sound and seeking a match based on an acoustic fingerprint.

As a result of said match, a map through the history and culture of music is created for display. The map is created in an embodiment by a series of choices, where a choice is a combination of any of time, place, genre, and artist. Both expert and regular individual curators can define the maps; or the maps can be defined algorithmically. Based upon said matches, one or more animated murals depicting a fundamental combination of any of time, place, genre, and artist are provided to a user via a user interface for the navigation of music, its history, and culture. Integration with hand held GPS enabled devices provides users with knowledge of music events and history relative to their present location.

Other embodiments of the invention allow a user's voice to trigger the creation of a map, as described above. For example, the user can trigger the creation of a map by saying "What song is playing?"; Take me to that scene."; or "Take me to New York in 1977."

Figure 1:
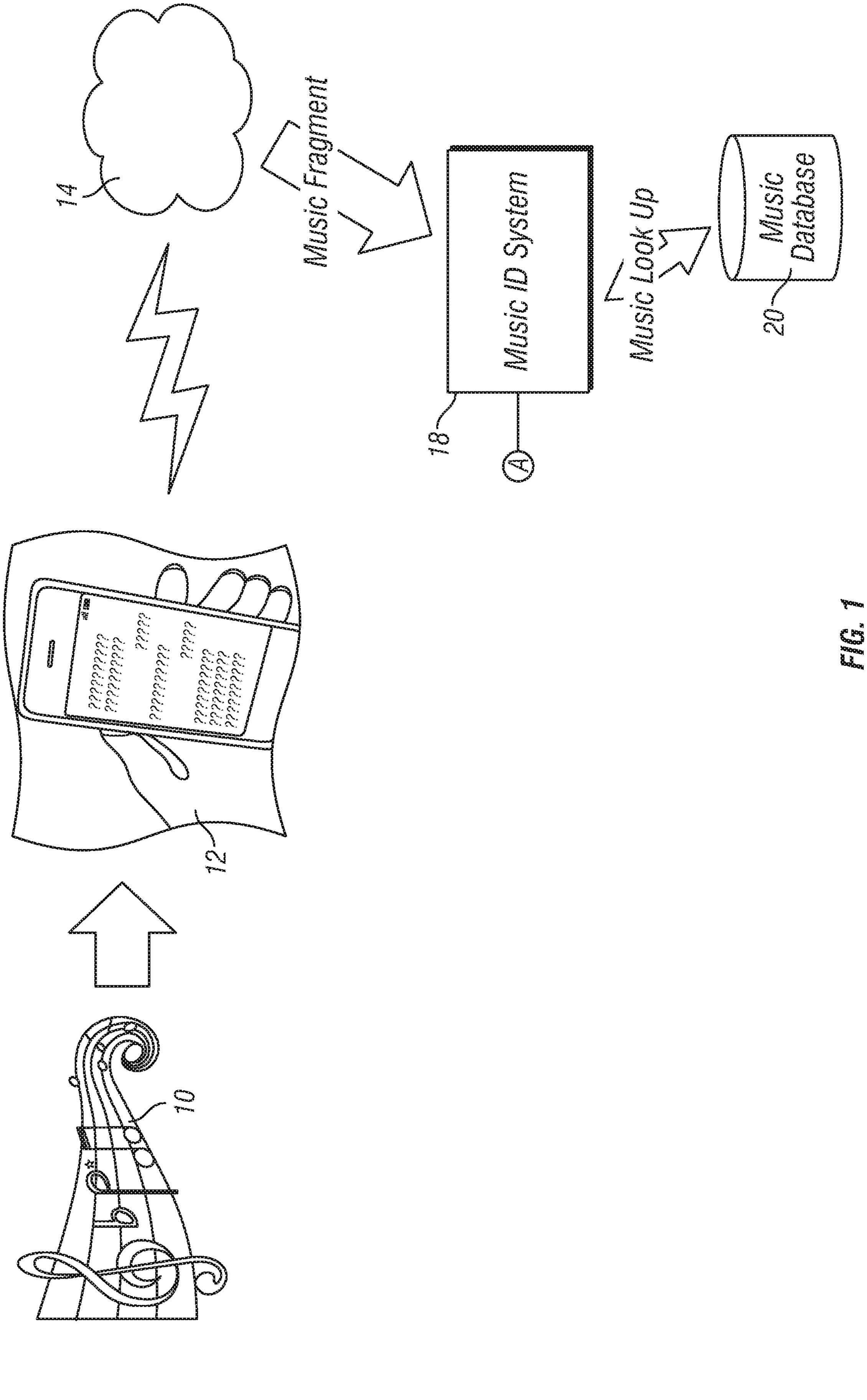
FIG. 1 is a block schematic diagram showing an architecture for analyzing captured sound and seeking a match based on an acoustic fingerprint for temporal and geographic presentation and navigation of linked cultural, artistic, and historic content according to the invention.
Figure 1:
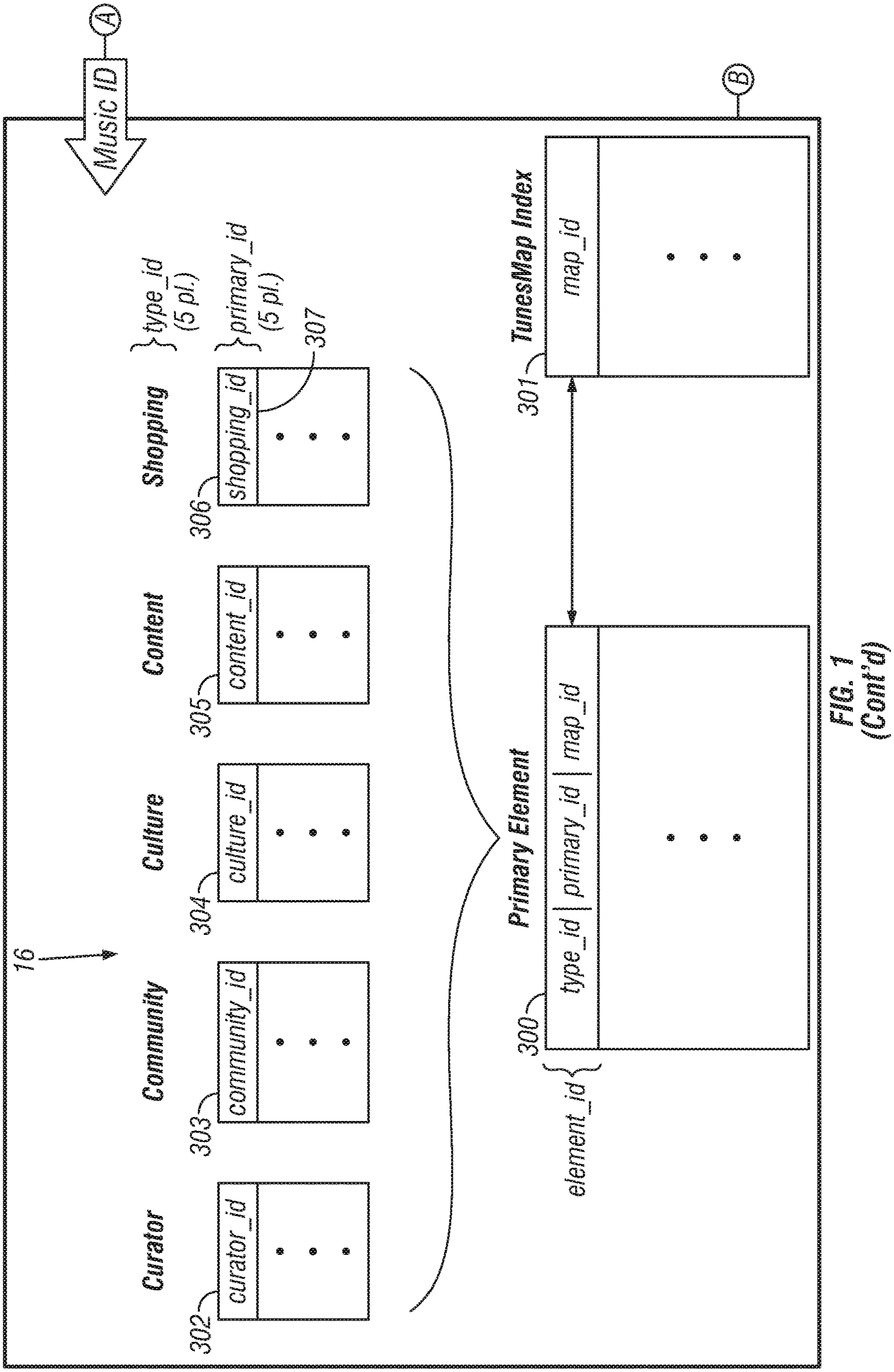
Figure 1:
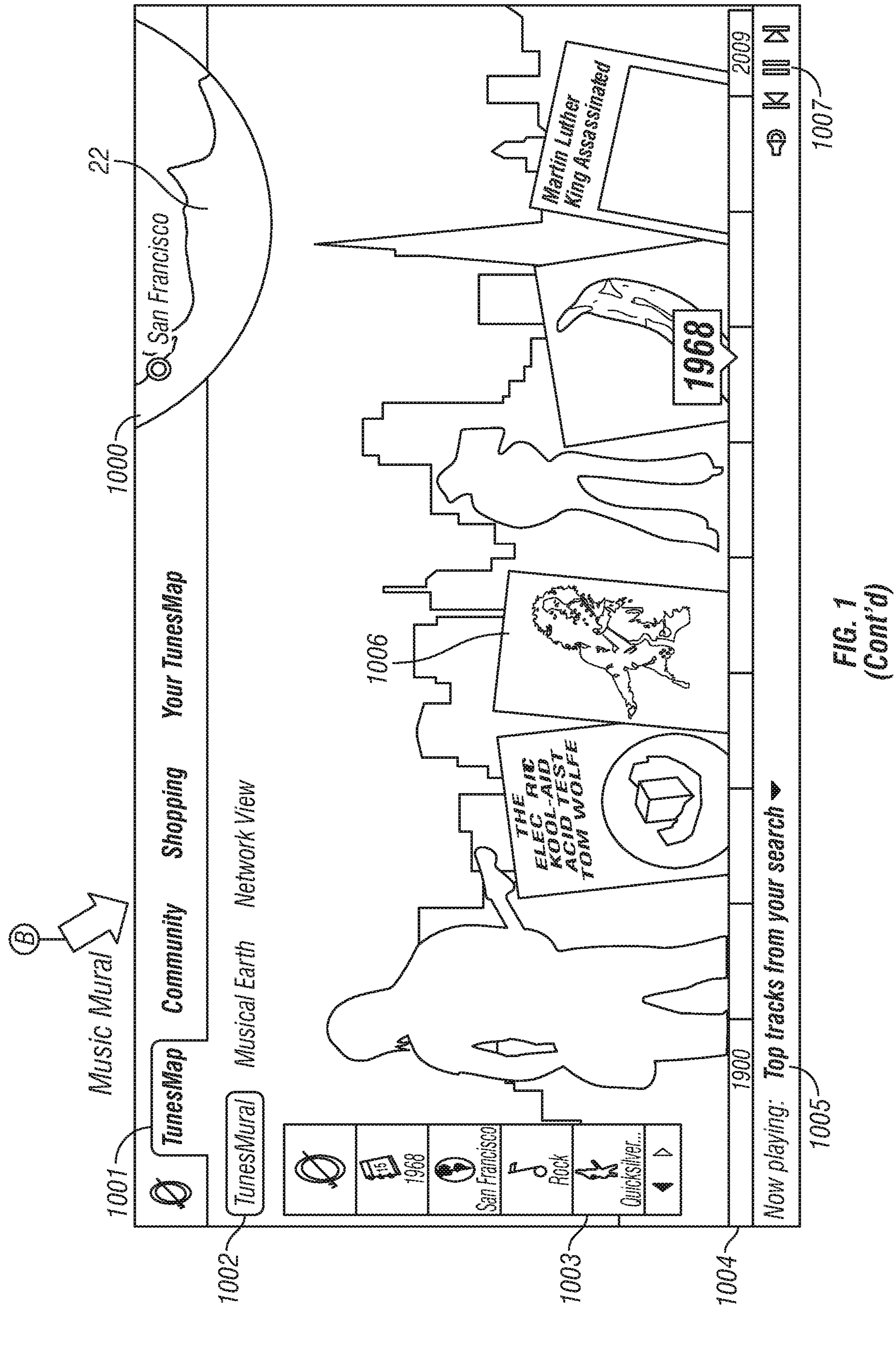

FIG. 1 is a block schematic diagram showing an architecture for analyzing captured sound and seeking a match based on an acoustic fingerprint for temporal and geographic presentation and navigation of linked cultural, artistic, and historic content according to the invention. In FIG. 1, a fragment of a song or other musical composition 10 is captured by a device 12, such as a smart phone, i.e. an iPhone.

For purposes of the discussion herein, the capture of a music fragment is considered to a be a search. That is, the music fragment comprises a query and takes the place of, or is used in conjunction with, a conventional text-based query when performing a search in accordance with the invention.

The captured music fragment is communicated to a music ID system 18 for analyzing captured sound and determining an acoustic fingerprint, for example via the Internet 14. The music ID system accesses a media database 20 to identify the song from the captured fragment. Music identification information, i.e. the search query, such as artist or song title, is provided to a map generation system 16 that applies the music identification information to create primary data model abstractions that relate items of interest such as knowledge, media, articles for purchase, or other music related materials to a map index based upon the recognized music fragment. A map mural 22 is then generated depicting the fundamental relationship of music in an interactive animated user interface.

Acoustic Fingerprint

A key aspect of the invention is the generation of an acoustic fingerprint of a song fragment. An acoustic fingerprint is a condensed digital summary, deterministically generated from an audio signal, that can be used to identify an audio sample or quickly locate similar items in an audio database.

A robust acoustic fingerprint algorithm must take into account the perceptual characteristics of the audio. If two files sound alike to the human ear, their acoustic fingerprints should match, even if their binary representations are quite different. Acoustic fingerprints are not bitwise fingerprints, which must be sensitive to any small changes in the data. Acoustic fingerprints are more analogous to human fingerprints where small variations that are insignificant to the features the fingerprint uses are tolerated. One can imagine the case of a smeared human fingerprint impression which can accurately be matched to another fingerprint sample in a reference database: acoustic fingerprints work in a similar way.

Perceptual characteristics often exploited by audio fingerprints include average zero crossing rate, estimated tempo, average spectrum, spectral flatness, prominent tones across a set of bands, and bandwidth.

Most audio compression techniques (AAC, MP3, YVMA, Vorbis) make radical changes to the binary encoding of an audio file, without radically affecting the way it is perceived by the human ear. A robust acoustic fingerprint allows a recording to be identified after it has gone through such compression, even if the audio quality bas been reduced significantly.

There are many techniques for generating acoustic fingerprints which may be used in connection with various embodiments of the invention herein. The following is a list of some acoustic fingerprinting products.

Proprietary

All Media Guide's LASSO is a commercial service that uses acoustic fingerprinting, and other techniques, to recognize music. (U.S. Pat. No. 7,277,766).

Audible Magic Corporation is a commercial venture that provides electronic media identification and copyright management solutions using proprietary acoustic fingerprinting technology (U.S. Pat. No. 5,918,223).

AudioiD is a commercial technology for automatically identifying audio material using acoustic fingerprints. It was developed by the German Fraunhofer institute.

Axwave's Gsound uses acoustic fingerprinting to identify music, film, and TV from cell phones or from computers. It works by sending simple wave files to the servers.

BMAT Vericast is a global music identification service that monitors millions of songs over 2000 radios and televisions across more than 50 countries worldwide. The solution provides real time recognition and auditable reporting based on an audio fingerprint that is resistant to signal alterations, such as voice over, broadcast mastering, or noisy channel degradation.

YouTube's Content ID is able to identify an audio/visual part of copyrighted content.

Gracenote's MusicID is a commercial product that uses acoustic fingerprinting along with other methods to identify music.

Midomi is a commercial service that can match music clips, as well as identifying a song that is sung or hummed.

Moodagent is a commercial service from Syntonetic that combines digital signal processing and AI techniques to create music profiles that incorporate characteristics such as mood, emotion, genre, style, instrument vocals, orchestration, production, and beat/tempo.

SoundHound is an acoustic fingerprint-based service for Web and mobile platforms (Android, iOS, Windows Phone) that allows songs or hummed tunes to be identified using the Midomi service. Shazam, an acoustic fingerprint-based service that allows songs to be identified via a cell phone.

Tunatic by Wildbits is an application that allows identifying music while being played, analyzing the songs, and comparing the song with information on a server.

Open Source

MusicBrainz, a free and open content project for a media database that uses AcoustID's free database of audio fingerprints, which aims to map its fingerprints to the MusicBrainz database. MusicBrainz also used MusicIP's Open Fingerprint architecture for fingerprinting and the AmpliFIND (formerly MusicDNS) service for identifying audio files since 2006, but is phasing out AmpliFIND in favor of the open source AcoustiD, after AmpliFIND was acquired by Gracenote in 2011.

Last.fm's acoustic fingerprinting application was released in 2007. The technology is now included in the Last.fm client software.

AcoustID is an open source project that aims to create a free database of audio fingerprints with mapping to the MusicBrainz metadata database and provides a Web service for audio file identification using this database.

Echoprint is an open source music fingerprint and resolving framework powered by the Echo Nest.

Figure 2:
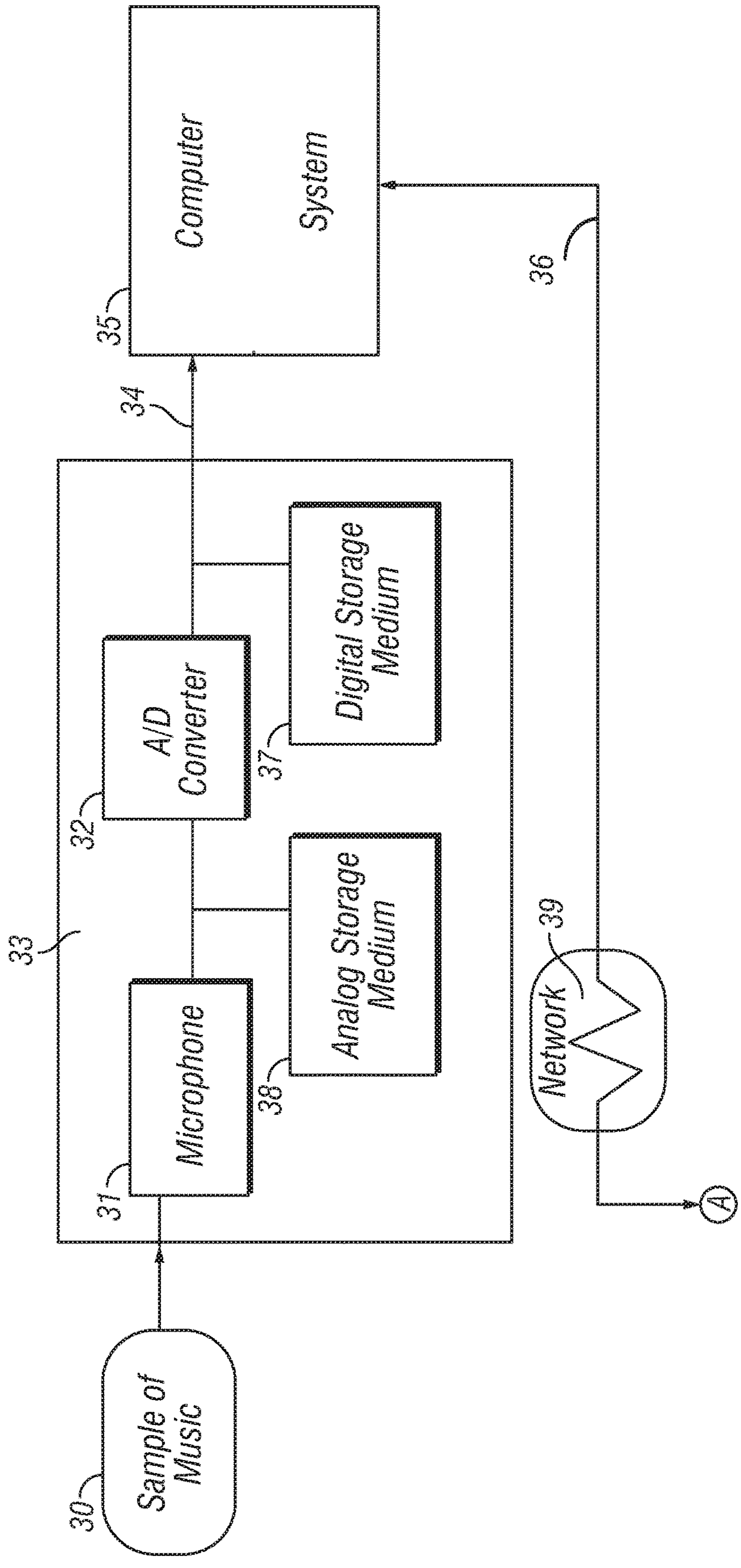
FIG. 2 is a block schematic diagram showing a mechanism for analyzing captured sound and determining an acoustic fingerprint according to the invention.
Figure 2:
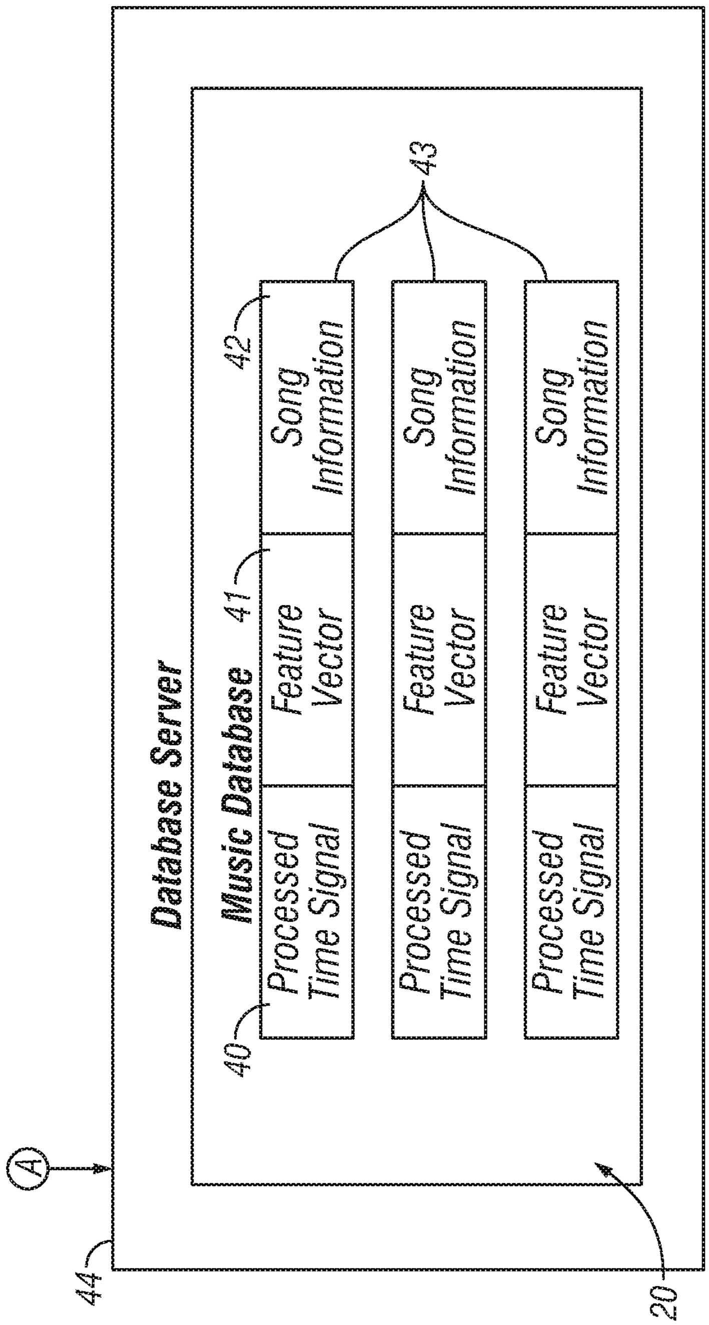

FIG. 2 is a block schematic diagram showing a mechanism 18 for analyzing captured sound and determining an acoustic fingerprint according to an embodiment of the invention. Those skilled in the art will appreciate that other techniques may be used to identify a song fragment to generate an acoustic fingerprint for identification of the song fragment for use in generating a map or mural as described herein.

In FIG. 2, a capture device 33 is used to record a sample of music, or audio data, 30 from various devices capable of receiving and transmitting audio signals, including, for example, radios, televisions, multimedia computers, and handheld devices, such as an iPhone. The capture device may include a microphone 31 and an A/D converter 32. Additionally, the capture device may include an optional analog storage medium 38 and an optional digital storage medium 37. The capture device may be a custom made device. Alternatively, some or all components of the capture device may be implemented through the use of audio tape recorders, laptop or handheld computers, cell phones, watches, cameras, and MP3 players equipped with microphones.

The sample of music is recorded by the capture device in the form of an audio signal using the microphone. The ND converter unit converts the audio signal of the recorded sample to a sample time signal 34. Alternatively, the audio signal of the recorded sample may be stored in the optional analog storage medium. The capture device transmits the sample time signal to a digital processing system, such as a computer system 35. Alternatively, the sample time signal may be stored in the optional digital storage medium for uploading to the computer system at a later time. The computer system is capable of processing the sample time signal into a compressed form to produce a processed sample time signal 36. Alternatively, the sample time signal may be processed by a separate processor unit before being transmitted to the computer system. The computer system is also capable of accessing a remote database server 44 that includes a media database 20. The computer system may communicate with the database server through a network 39, such as for example, the Internet, by conventional land-line or wireless means. Additionally, the database server may communicate with the computer system. Alternatively, the database server may reside in a local storage device of computer system.

The media database includes a plurality of songs, where each song may be represented by a database entry 43. The database entry for each song is comprised of a processed time signal 40, a feature vector 41, and song information 42. The processed time signal for each song can represent the entire song. The song information may include, for example, song title, artist, and performance. Additionally, the song information may also include price information and other related commercial information.

The feature vector for a song in the media database is determined by generating a spectrogram of the processed time signal for the song and then extracting features from the spectrogram. Various techniques related to discrete-time signal processing are well known in the art for generating the spectrogram. Alternatively, the feature vector for a song may be extracted from the original, unprocessed time signal for the song. The features are represented by numeric values, and loosely represent specific perceptual musical characteristics, such as, for example, pitch, tempo, and purity. In one embodiment of the invention, the feature vector for each song in the database includes five feature components derived from the projection of a spectrogram in the time (X) and frequency (Y) axes. The first feature is the Michelson contrast in the X direction, which represents the level of beat contained in a song sample. The second feature represents the amount of noise in the Y direction, or the purity of the spectrum. The third feature is the entropy in the Y direction, which is calculated by first normalizing the Y projection of the spectrogram to be a probability distribution and then computing the Shannon entropy. The fourth and fifth features are the center of mass and the moment of inertia, respectively, of the highest three spectral peaks in the Y projected spectrogram. The fourth and fifth features roughly represent the tonal properties of a song sample. Features representing other musical characteristics may also be used in the feature vectors.

The sample of music is converted into the sample time signal and transmitted to the computer system. The computer system processes the sample time signal to produce a processed sample time signal. The computer system applies a signal matching technique with respect to the processed sample time signal and the processed time signals of the media database to select a song corresponding to the best match. The song information corresponding to the selected song is input as a query to a map generation module.

Map

Upon receiving song information corresponding to the selected song as an input query, the map generation module creates a map. A map is the implementation of a set of user interface features and abstractions and physical design organization principles exposing the fundamental relationship of music as defined herein; time, location, genre, and artist. The song information received from the music recognition is received by the user interface as a navigation query. The user interface abstractions include an animated mural, filter bar, network relationships view, music annotated maps, and a music GPS. In addition to this broad and general definition, specific user interface elements will be presented as a preferred embodiment whose representation is taken to be representative but not limiting to the general definition.

The discussion herein relates to embodiments of the invention that concern music. The invention is not limited to music and other embodiments of the invention apply the herein disclosed teachings to, for example but not by way of limitation, fashion, film, art, news, comedy, books, healthcare, environmental issue, and the like. However, fundamental to the invention is the initial determination of an acoustic fingerprint from an audio fragment which, in the presently preferred embodiment of the invention, is a sample of a piece of music, such as a popular song. Other embodiments of the invention may develop an acoustic fingerprint from other audio sources. For example, a famous speech, e.g. Martin Luther King's I Have A Dream speech; film dialog, e.g. Humphrey Bogart's lines from the film Casablanca; or sounds, e.g. the sound of a space shuttle taking off or the song of a sparrow, may be recognized and used as an input query to generate a map or mural. As such, the invention is not limited to music fragments, but can encompass any audio information.

The fundamental relationship of music provides not only the basis for navigation at the conceptual level but also the physical design of the implementation for optimization of the delivery apparatus. The delivery apparatus constitutes a transformation of the input fundamental relationship values to a unique and novel corresponding presentation of music, its history, and culture.

A unique and novel feature of the invention is that all content is registered with the system though an act of curatorship. The human element of storytelling, and deliberate association of music and music related materials and items, enables a high standard of quality and consistency in the resulting experience. The map curators have a rank and include professional expert curators employed by the map organization, as well as ordinary users. Groups of curators with common interests form communities.

Elements

FIG. 3 is a schema that names the physical components of a presently preferred embodiment of the invention, i.e. the core elements 100, primary elements 101, and supporting elements 102, as implemented by an Object/Relational Model Data Base Management System (ORM/DBMS) under an application execution environment with persistence and presentation layers. The named elements represent not only physical design structures for the definition of a relational database storage and retrieval system, but also the user-facing business logic and Graphical User Interface (GUI) components that implement the functionality described herein. The general implementation of the underlying architecture upon which the invention may be built is described in the prior art as a Model View Controller (MVC) design. A realization of the physical design structures and functionality required to implement the invention is possible with standard Web application frameworks, such as Ruby on Rails for example, with supporting standard SQL relational database applications, such as Oracle for example, with embedded user interface technologies, such as Adobe Flash for example. A number of frameworks exist in the prior art which can provide the foundation. Specific examples are provided only to clarify how one reasonably skilled in the art can realize the invention and do not limit the scope of the invention to any particular embodiment.

Core Element Relation

Figure 4:
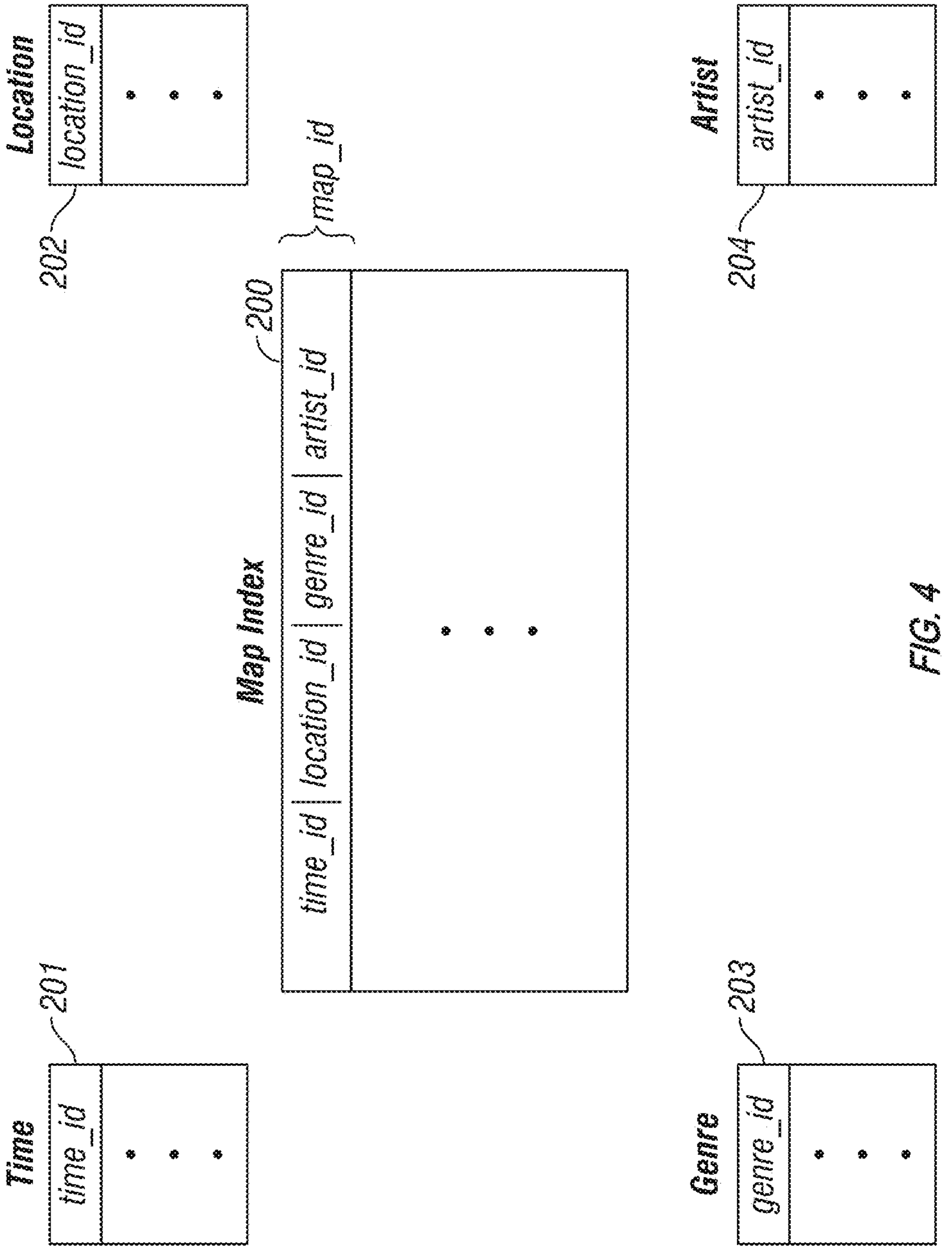
FIG. 4 illustrates a map index defining the fundamental relationship of music, its history, and culture according to the invention.

FIG. 4 shows the fundamental relationship of music as defined in a presently preferred embodiment of the invention, and provides the basis for the conceptual, navigational, and physical organization of music-related materials. This fundamental relationship between the four core elements is referred to herein as the Map Index 200. All descriptions of music, its history, and culture are registered in the system, along with a time 201, location 202, genre 203, and artist 204. Each of the core elements has a unique numeric id, maintained by the underlying relational database management system. The unique numeric id is used as the foreign key in referencing the Map Index 200 and relating the corresponding core elements. Hence, each combination of one numeric id from each of the core elements 201-204 corresponds to a unique map_id of the Map Index 200. The assignment of a single unique numeric id to each combination of core elements optimizes the mapping of higher level abstractions to the subject relationship with reduction of four-to-one the number of required index operations. At the same time, the partition of the Map Index into the four core elements provides four core filters for data object search and retrieval. For example, optimized responses to user interactions include selecting all higher level abstractions with the same map_id, or all map_id with the same time_id. In all, in the presently preferred embodiment there are fifteen possible filter options available from the four core elements of the Map Index, excluding the empty set; all four, any one, any two, or any three core elements specified with the remaining core elements of the map_id allowed to take on any value. For example, select all map_id with time_id=4.

Primary Element Relation

Figure 5:
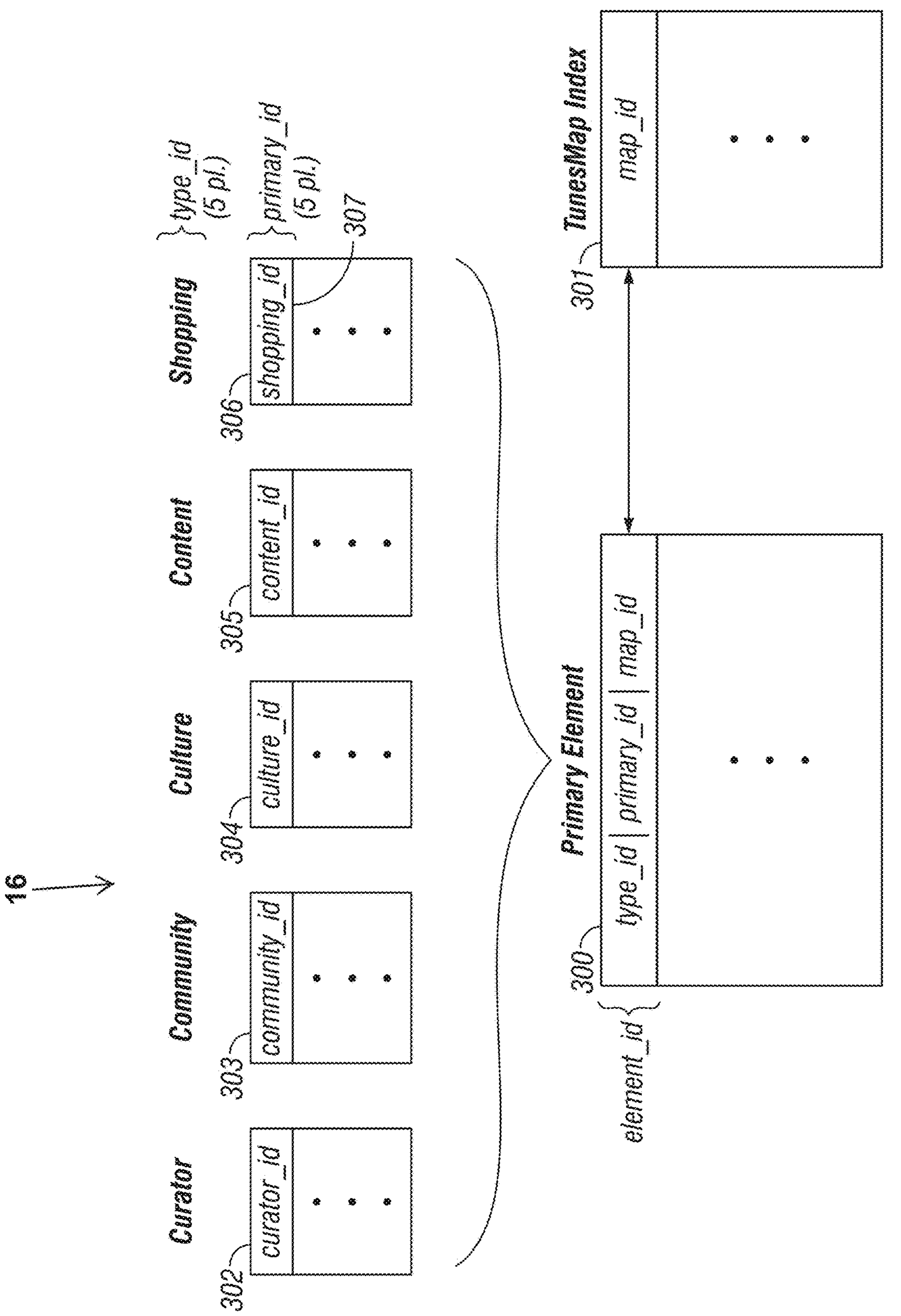
FIG. 5 illustrates primary data model abstractions designed to relate items of interest such as knowledge, media, articles for purchase, or other music related materials to a map index according to the invention.

While the fundamental relationship of music is implemented by the core elements, 201-204 of the Map index 200, a set of primary elements 302-306 shown in FIG. 5 establish the next higher level of abstraction for the classification and organization of music, its history and culture. In this embodiment, each data object is related to one of the five primary category types, i.e. curator 302, community 303, culture 304, content 35, and shopping 306. The combination of a primary type id 307 with a map_id 301 establishes a primary element 300. The primary element defines a collection of music related data objects as associated with a specific time, location, genre, and artist by way of the map_id. The primary element enables selection of all the primary types available for a given map_id, or all the map_id available for a given primary type. It further enables the selection of all the map_id for a specific instance of any one of the primary categories. For example, the cultural events for a given year, are selected from the primary elements with a map_id with the given year and primary type_id for culture, all data objects with community relationships are selected from the set of map_id which belong to an element_id having a primary type_id for community, and all data objects with relationships to a specific curator are selected from map_id which belong to an element_id with a primary_id for the specific curator. The type_id of the primary categories 302-306 is an enumerated constant of the implementing class. It behaves as a foreign key for the category type in the primary element id 300, however it is used as a software switch or polymorphic selector, not as a join key in the supporting relational database; there is no stored value in the corresponding category model. This design provides a natural partition for load distribution of both the data storage and data processing required to implement the invention.

Supporting Element Relation

Figure 6:
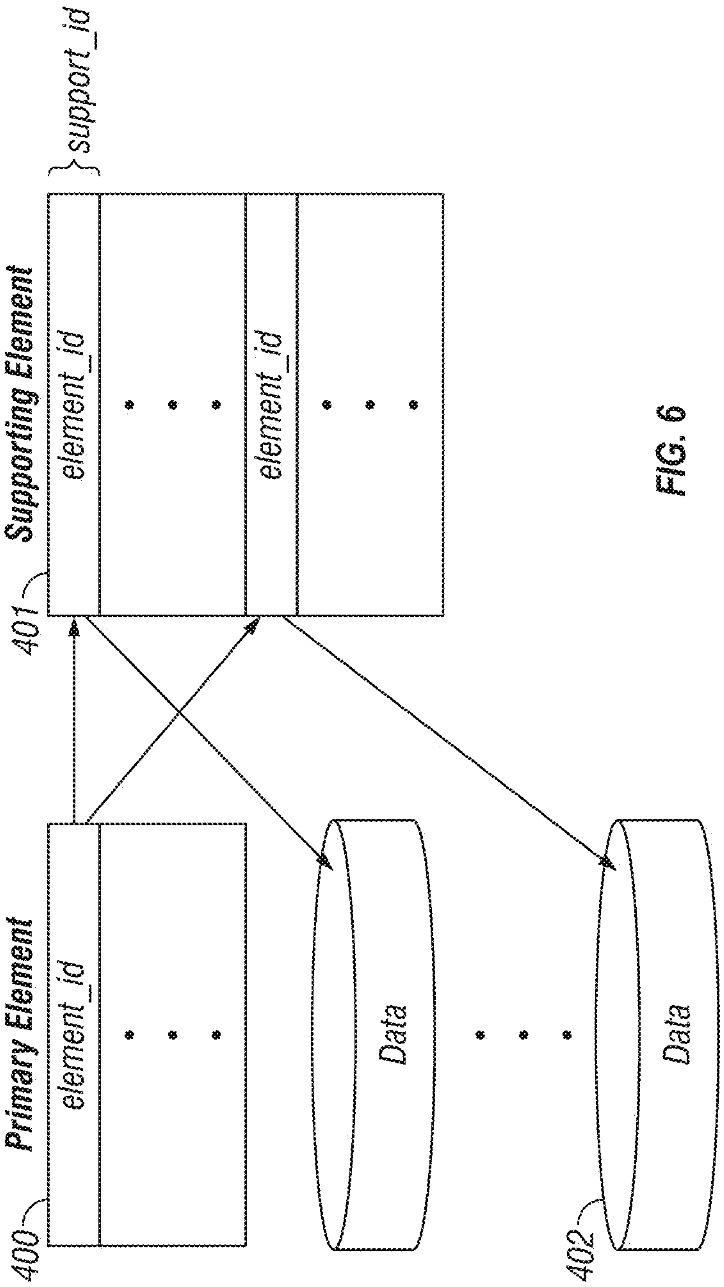
FIG. 6 illustrates a data model for physical access to the items of interest associated with a map index and instantiating one of the primary data model abstractions according to the invention.

FIG. 6 shows the physical storage of data objects 402 representing music, its history, and culture. The data object representations are implemented by supporting elements 401 related to primary elements 400 many-to-one. Each primary element, relates any number of supporting elements to the fundamental relationship of music 200 through association with a primary element 400. For example, all of the supporting elements for a specific curator with respect to a given time, location, genre, and artist are selected by the element_id with the indicated primary_id and map_id combination in the element_id.

Filter Bar Abstraction

As discussed above, the preferred embodiment incorporates the collective knowledge inherent in thousands of expert and community recommendations, major museum resources, and several lifetimes' worth of music collecting and appreciation. The map provides a filter bar abstraction that presents the same knowledge, unfolded in ways that encourage users to discover new connections to the music they love. For example, a user may perform a search for producers, engineers, and musicians that played on particular recording sessions. The invention provides a cross reference through the herein disclosed indexing system. Thus, the user may interact with the filter bar to bring up all the albums an individual produced, engineered, or played on, along with surrounding cultural references.

Figure 7A:
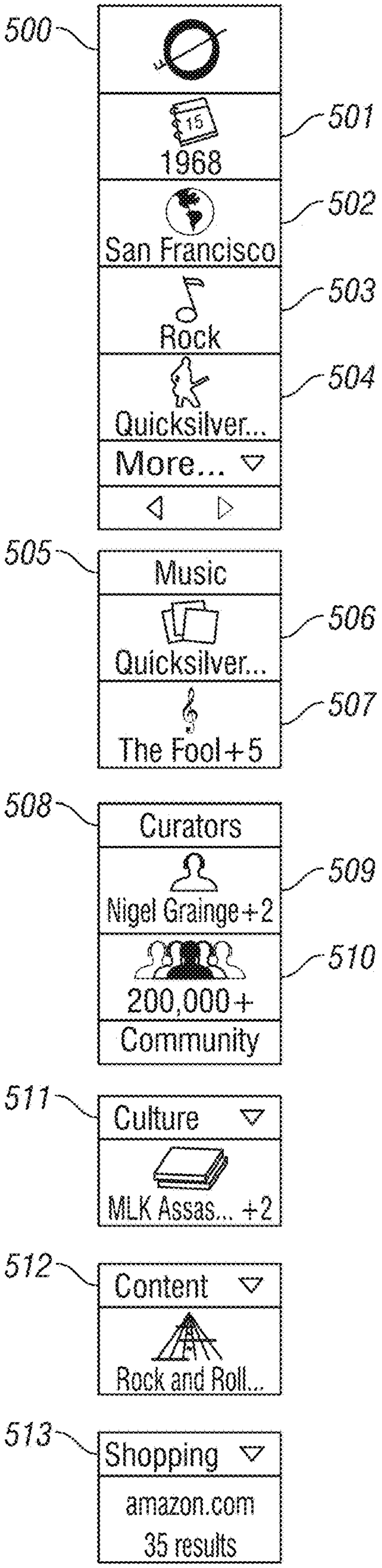
FIGS. 7A-7Q illustrate a preferred embodiment of a key filter mechanism and navigation device used to implement a user interface according to the invention.
Figure 7B:
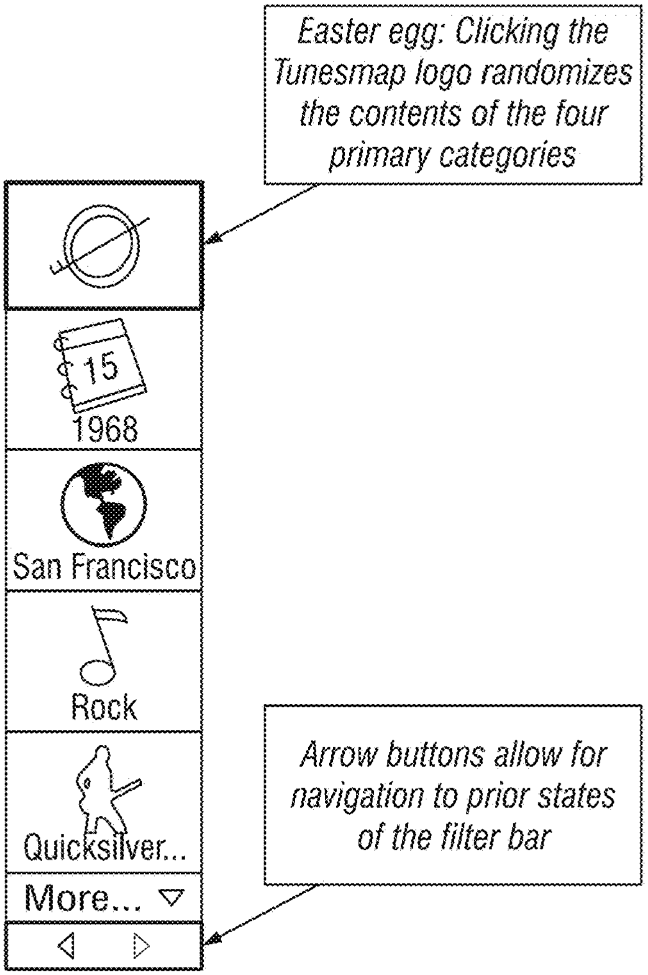
Figure 7C:
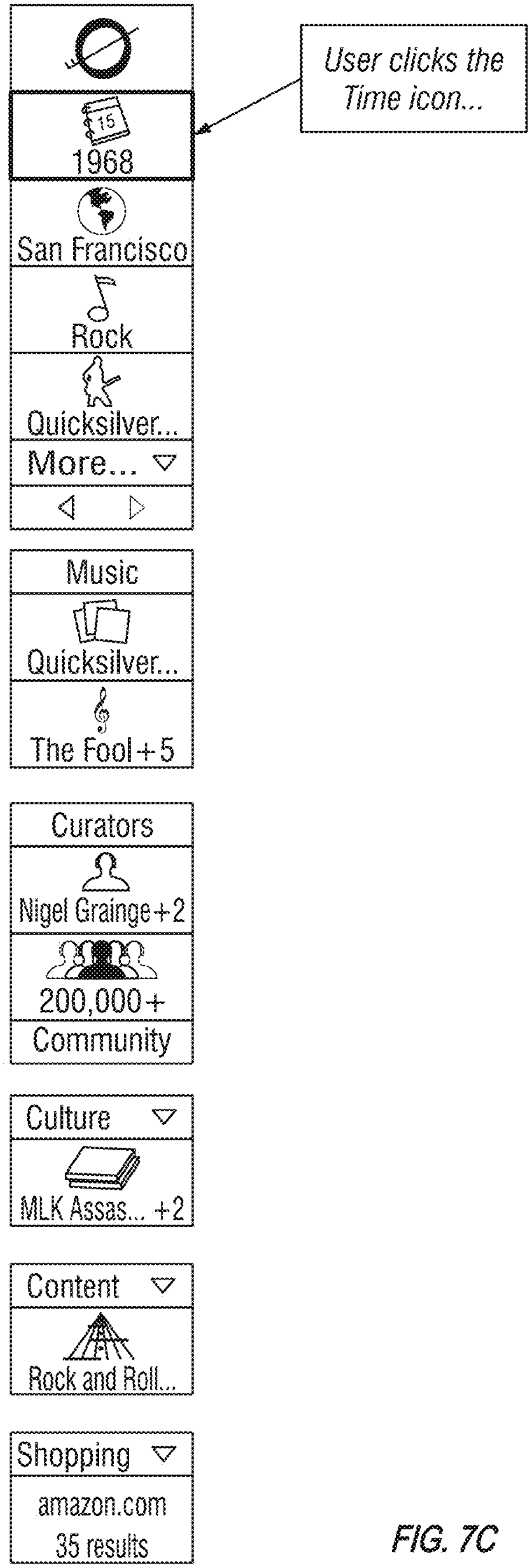
Figure 7D:
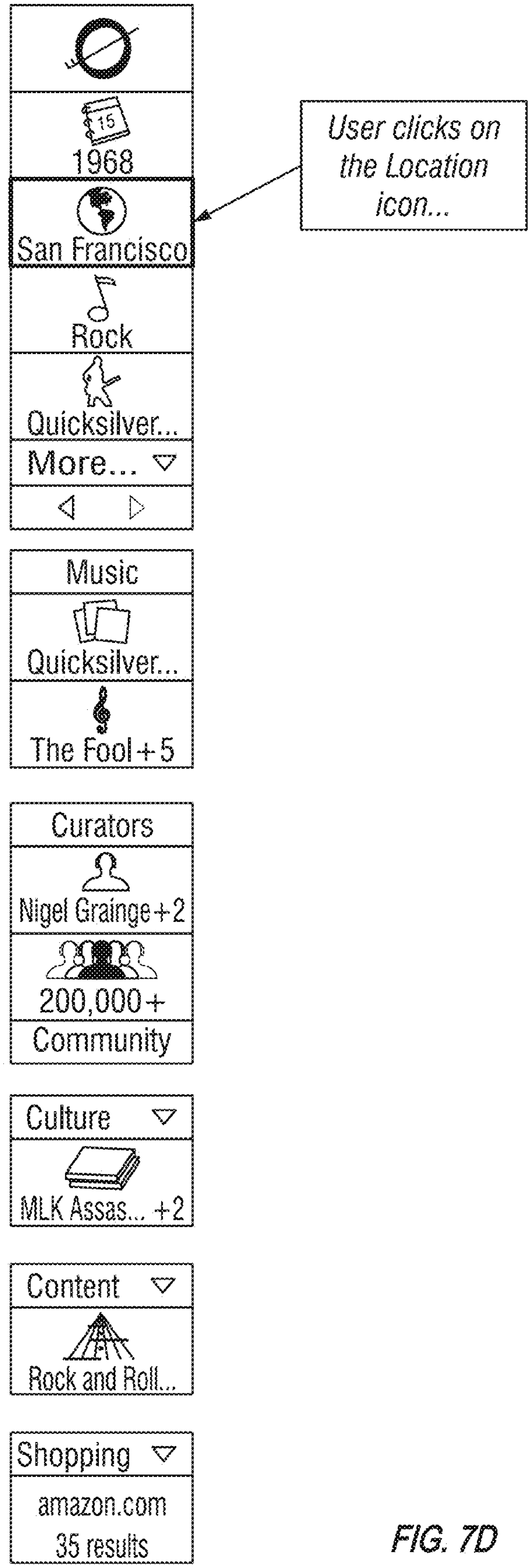
Figure 7D:
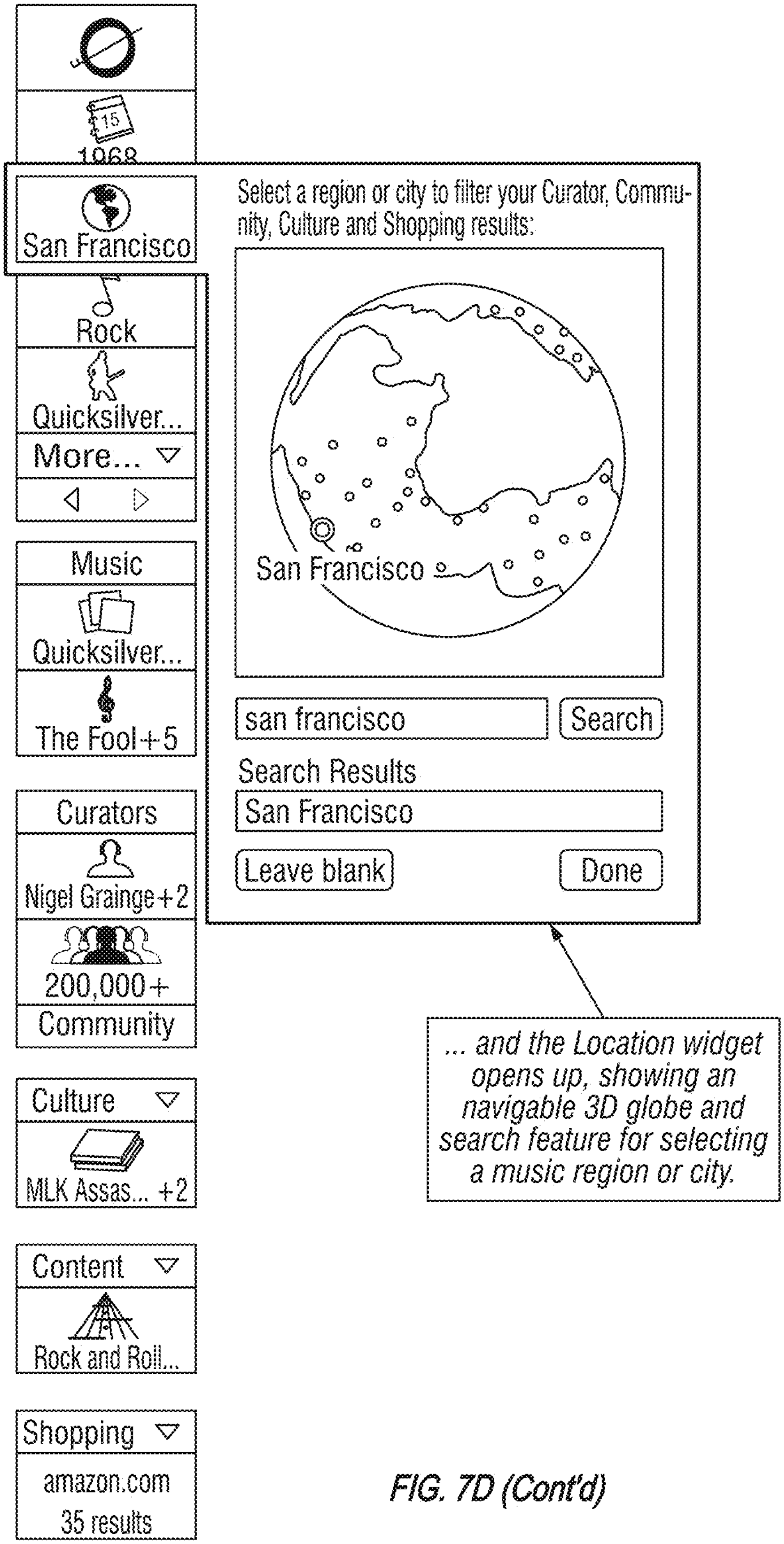
Figure 7E:
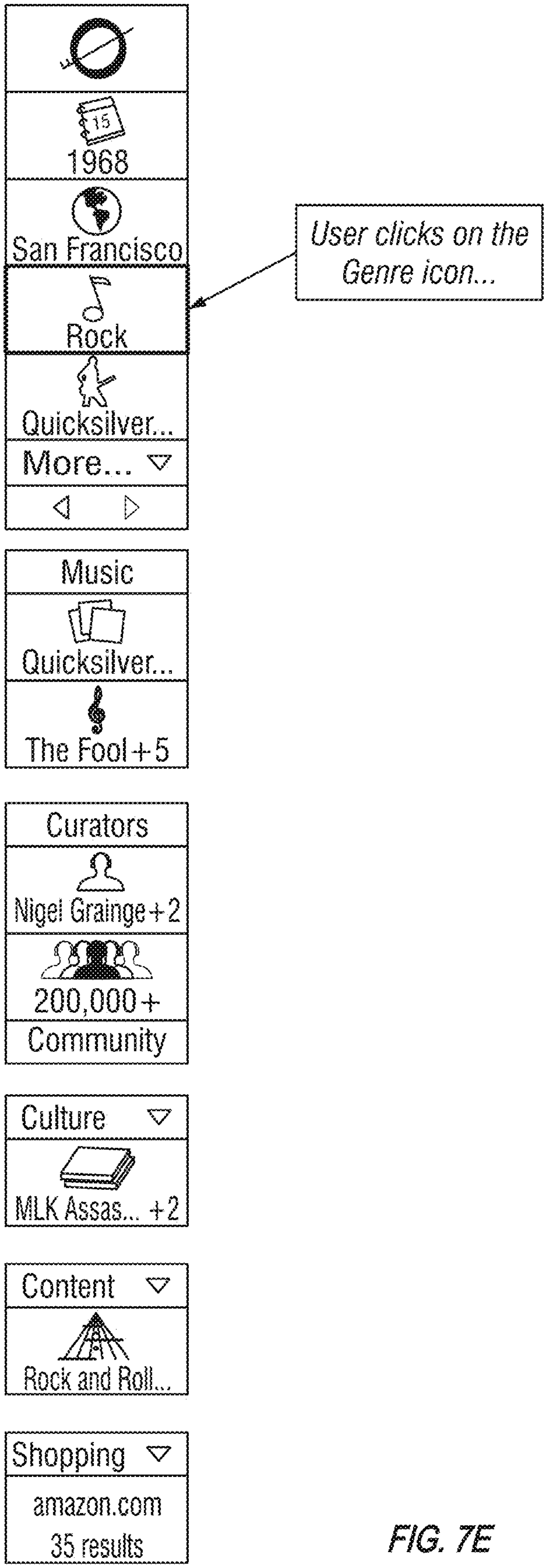
Figure 7E:
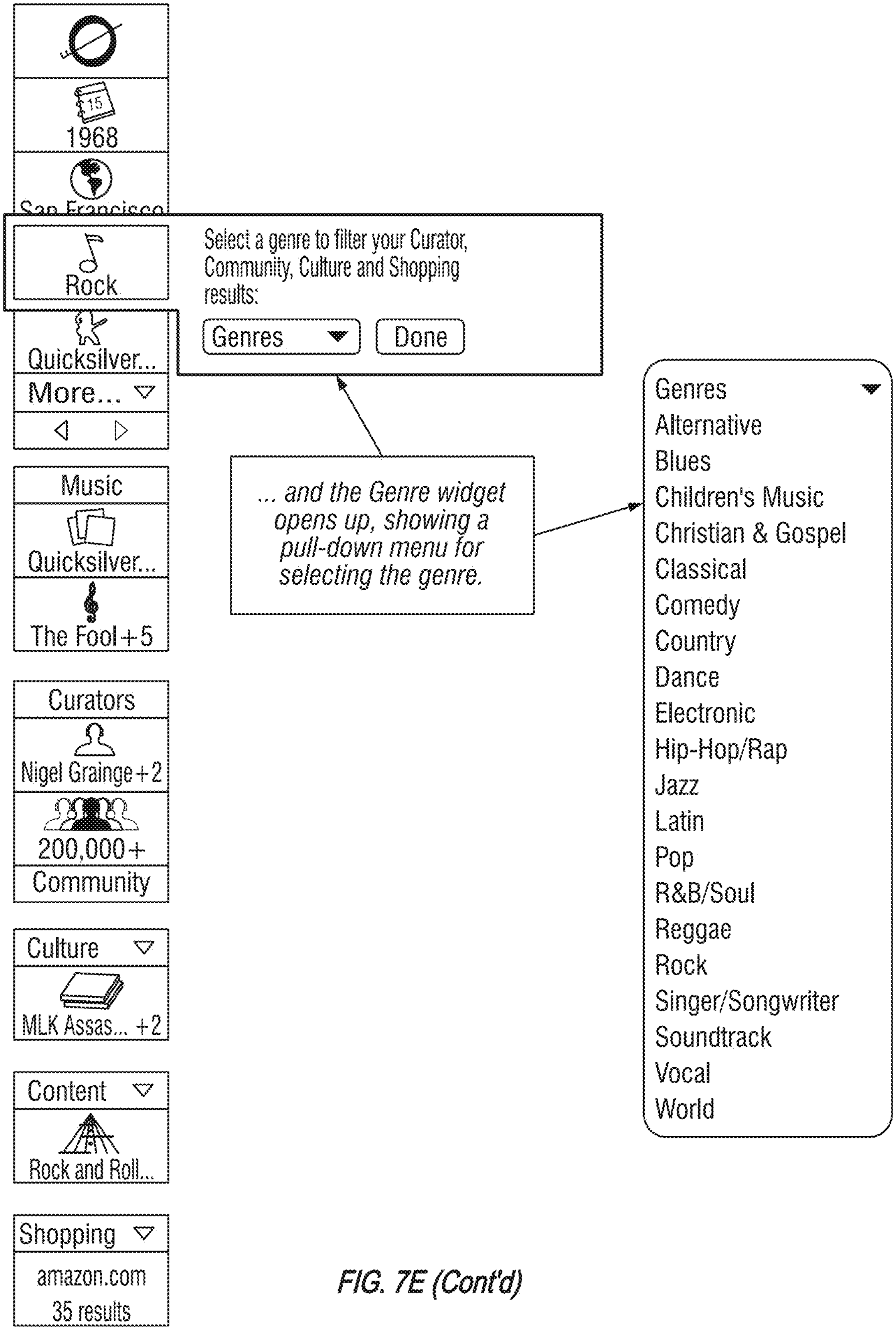
Figure 7F:
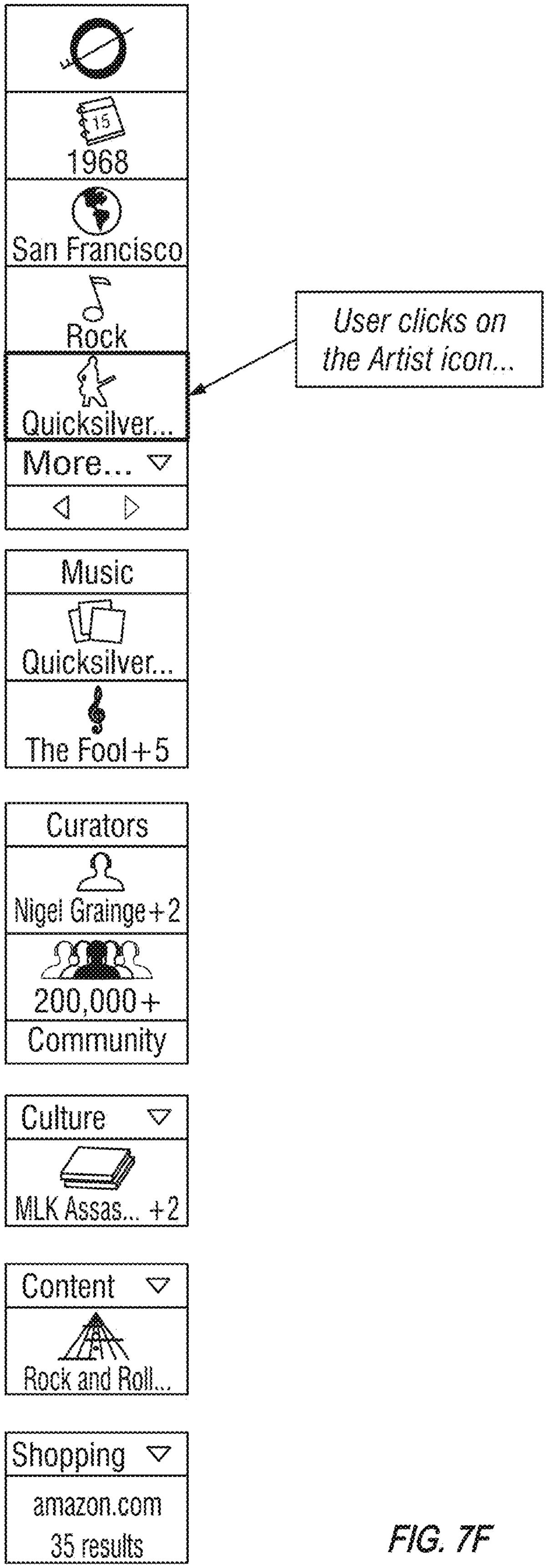
Figure 7F:
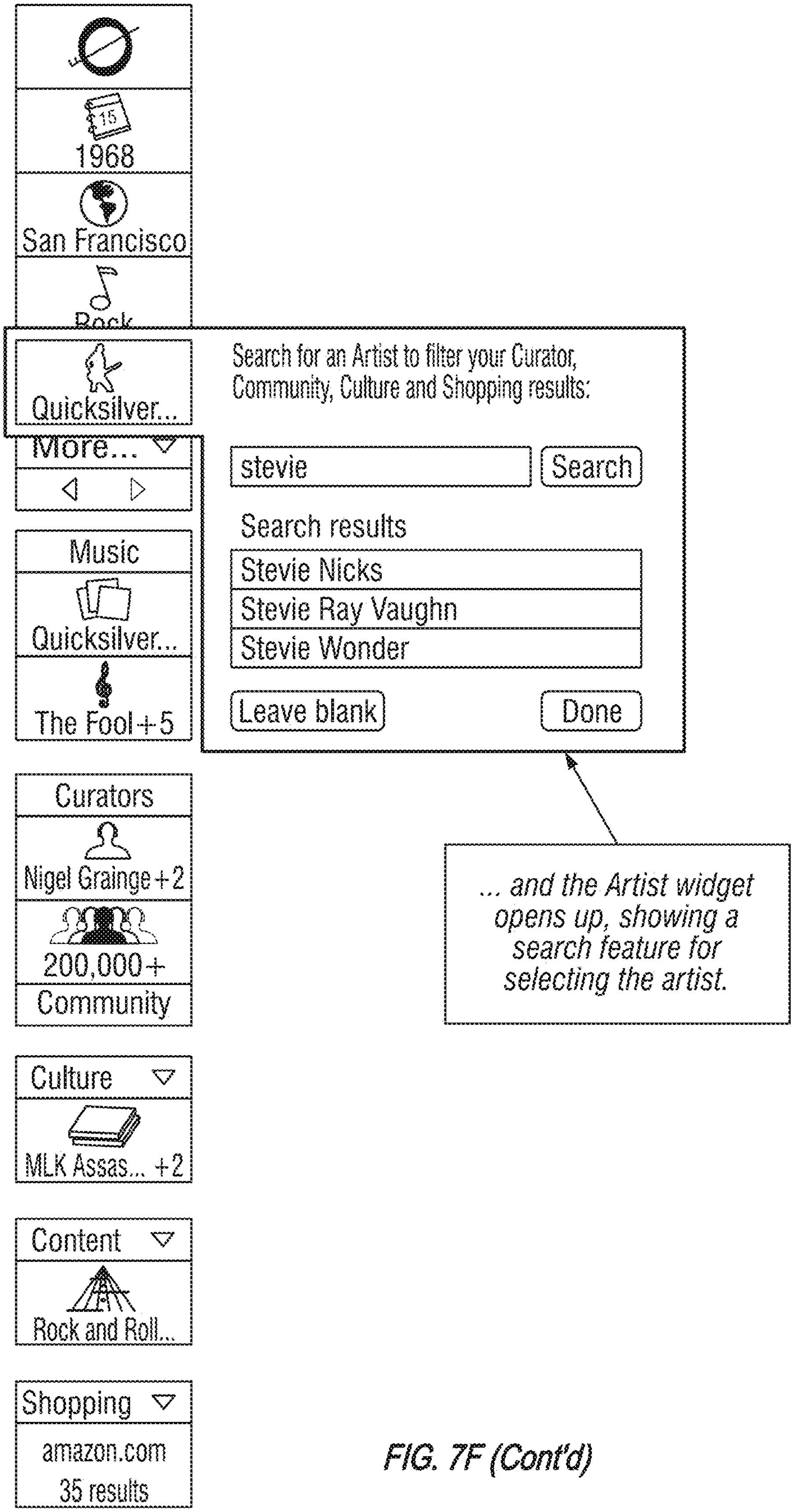
Figure 7G:
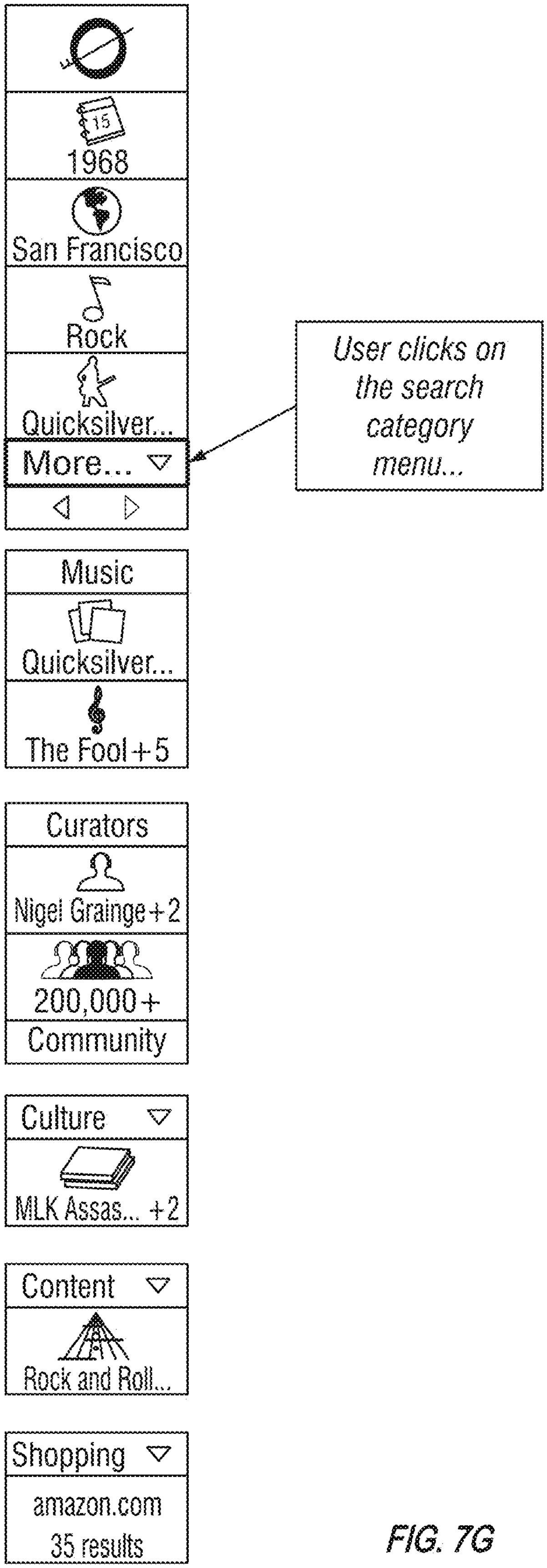
Figure 7G:
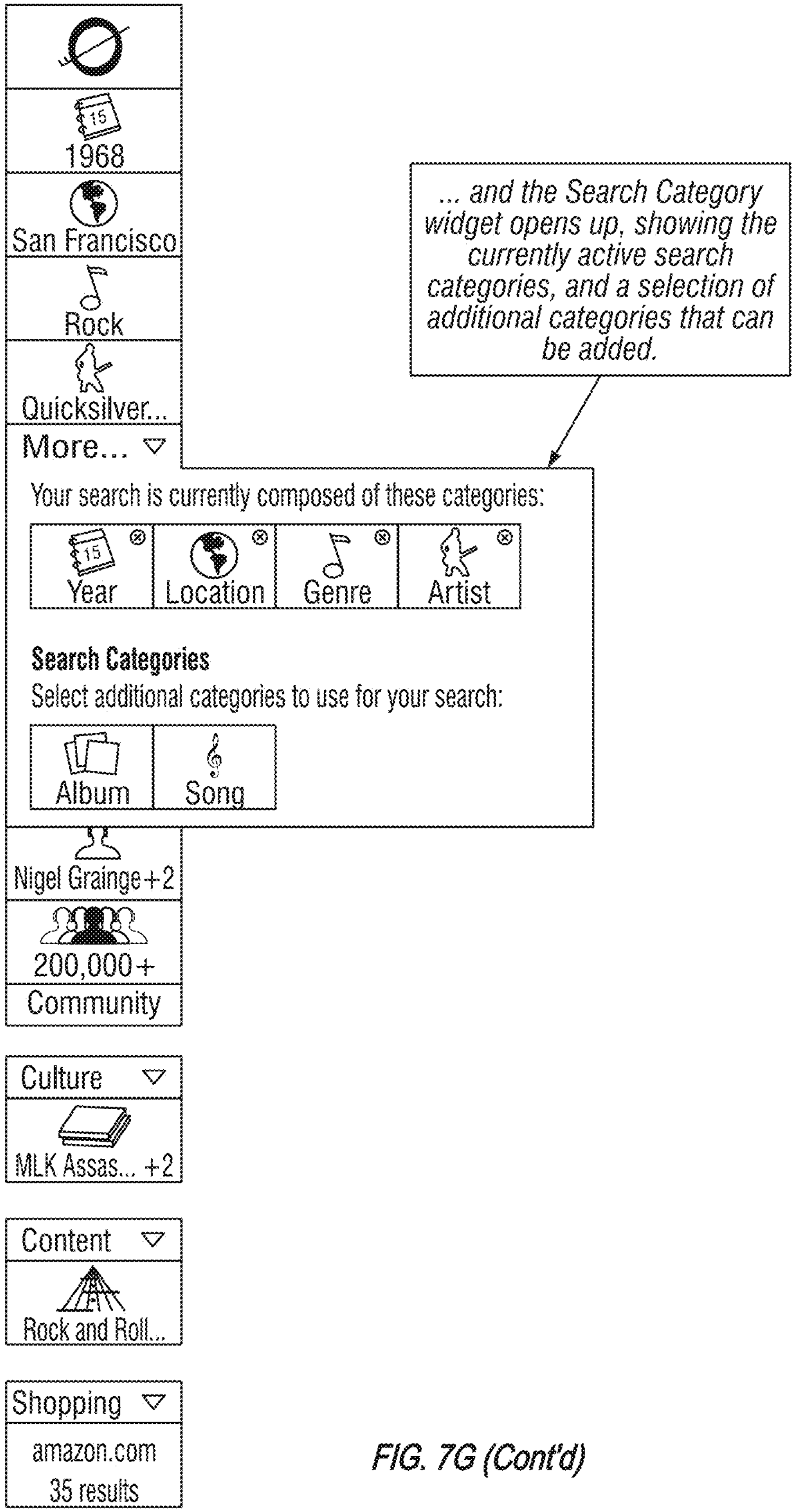
Figure 7H:
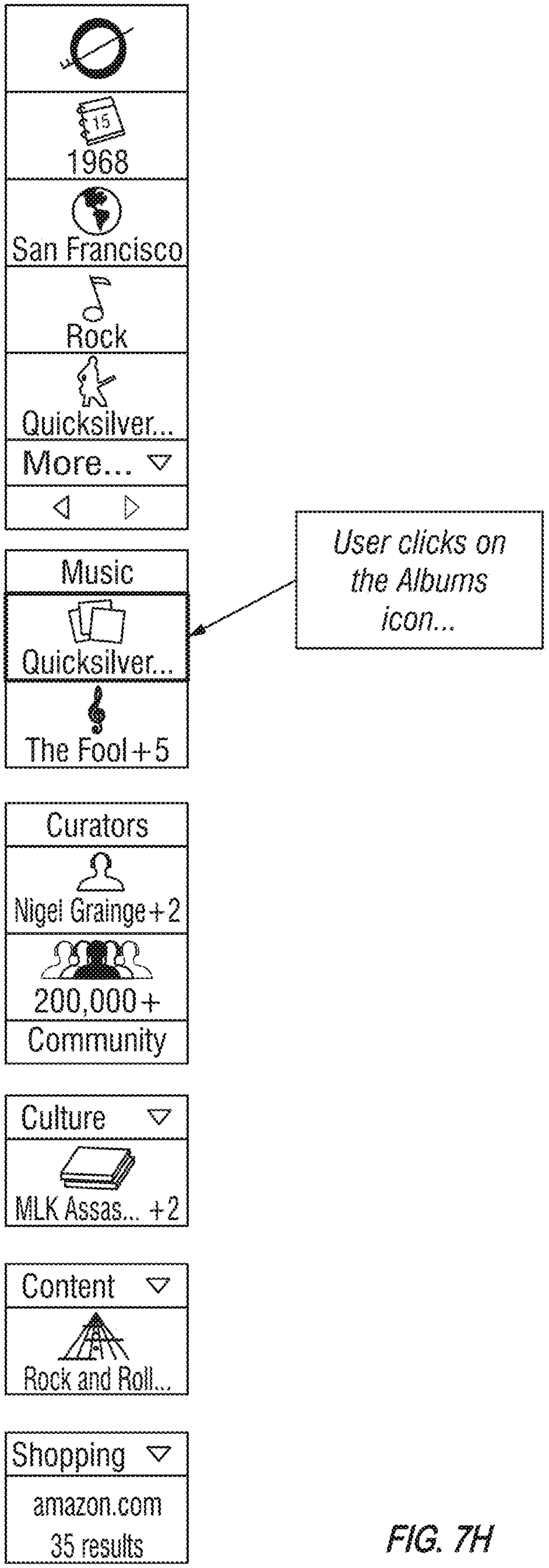
Figure 7H:
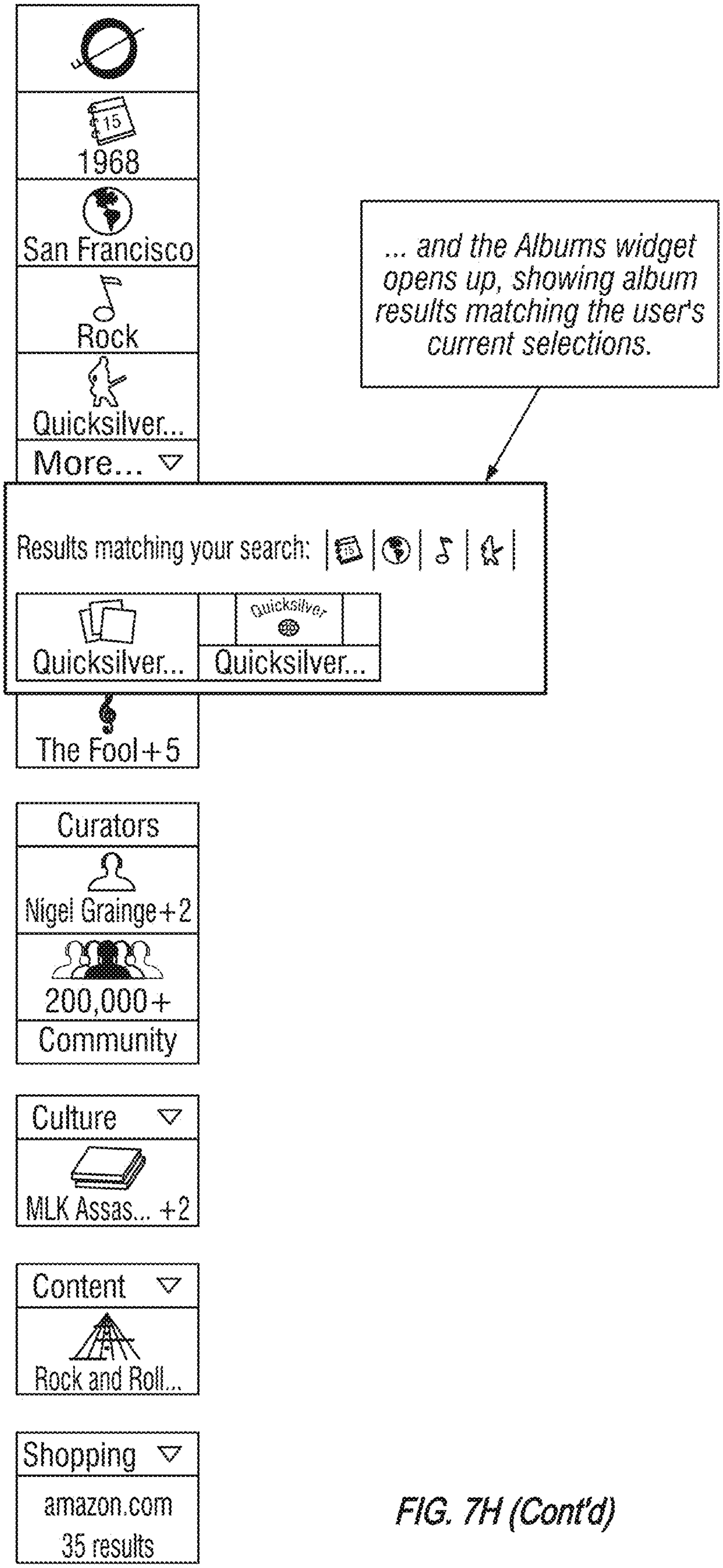
Figure 7I:
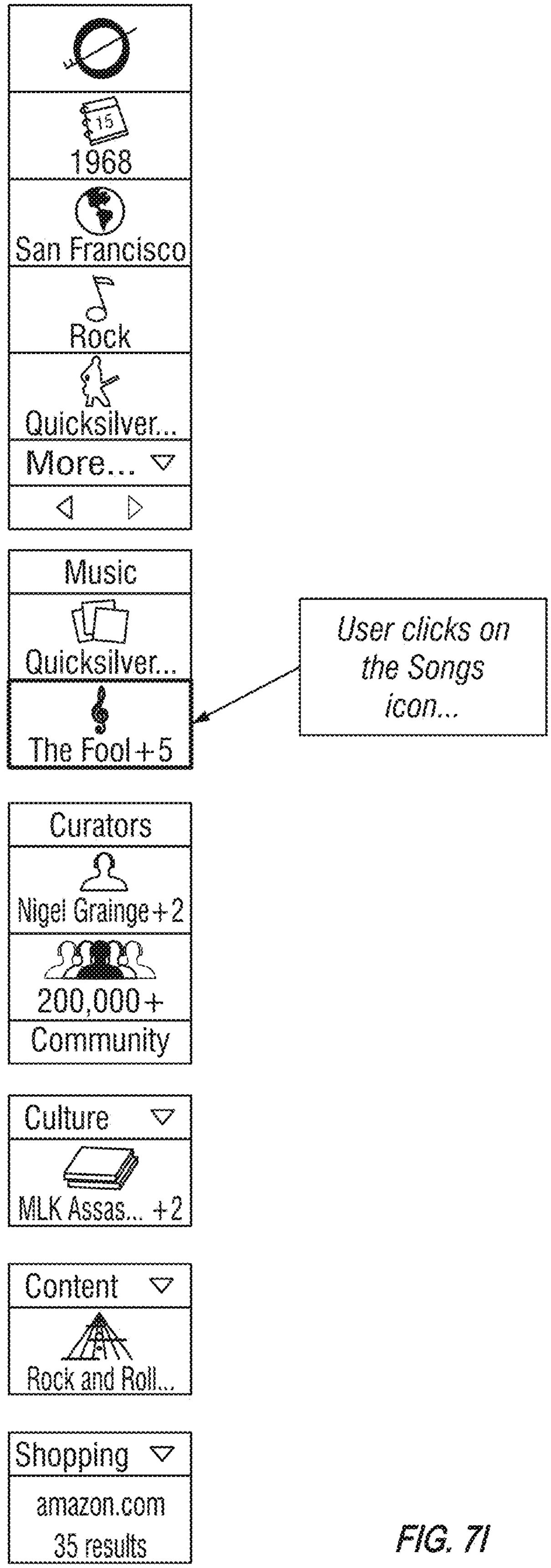
Figure 7I:
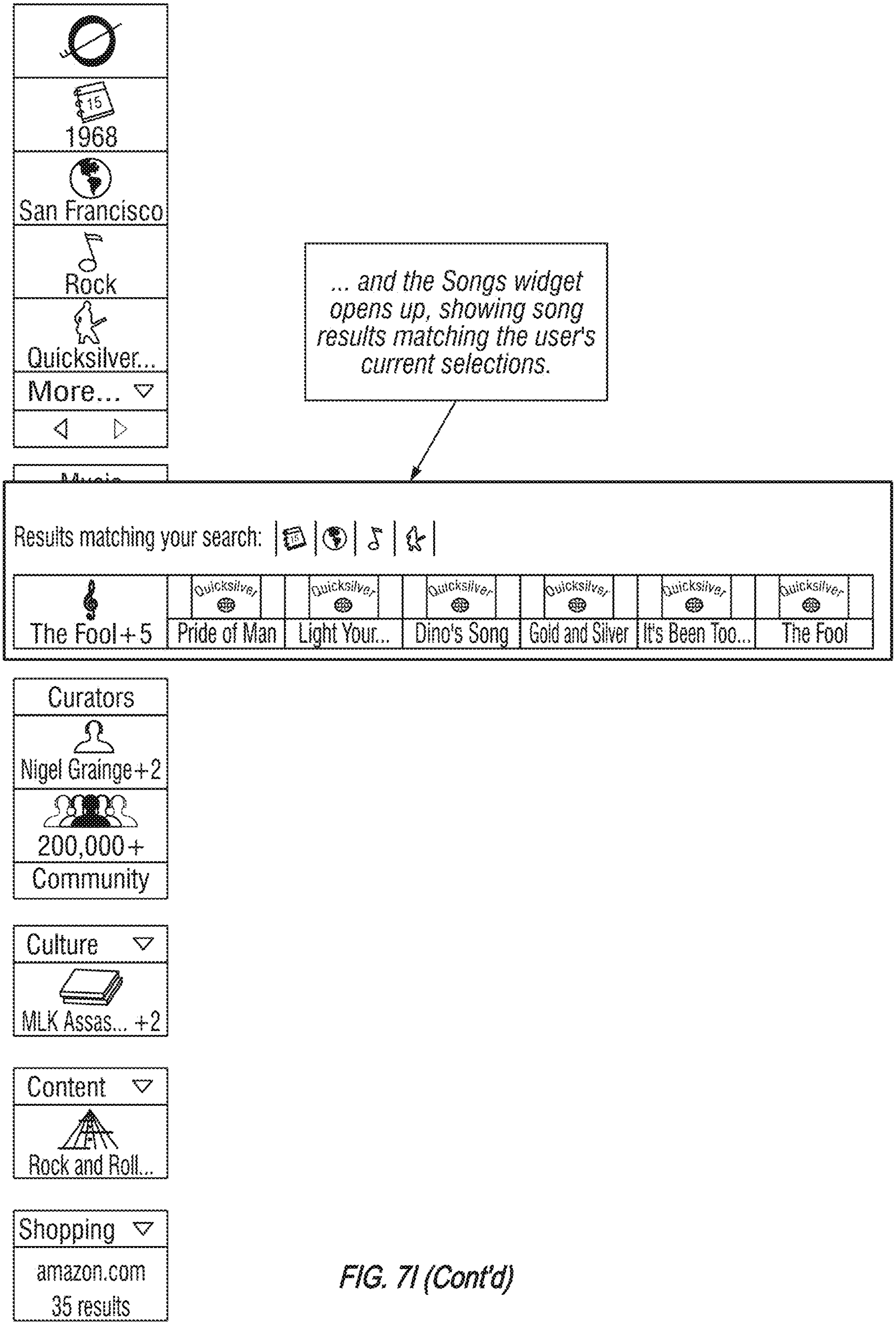
Figure 7J:
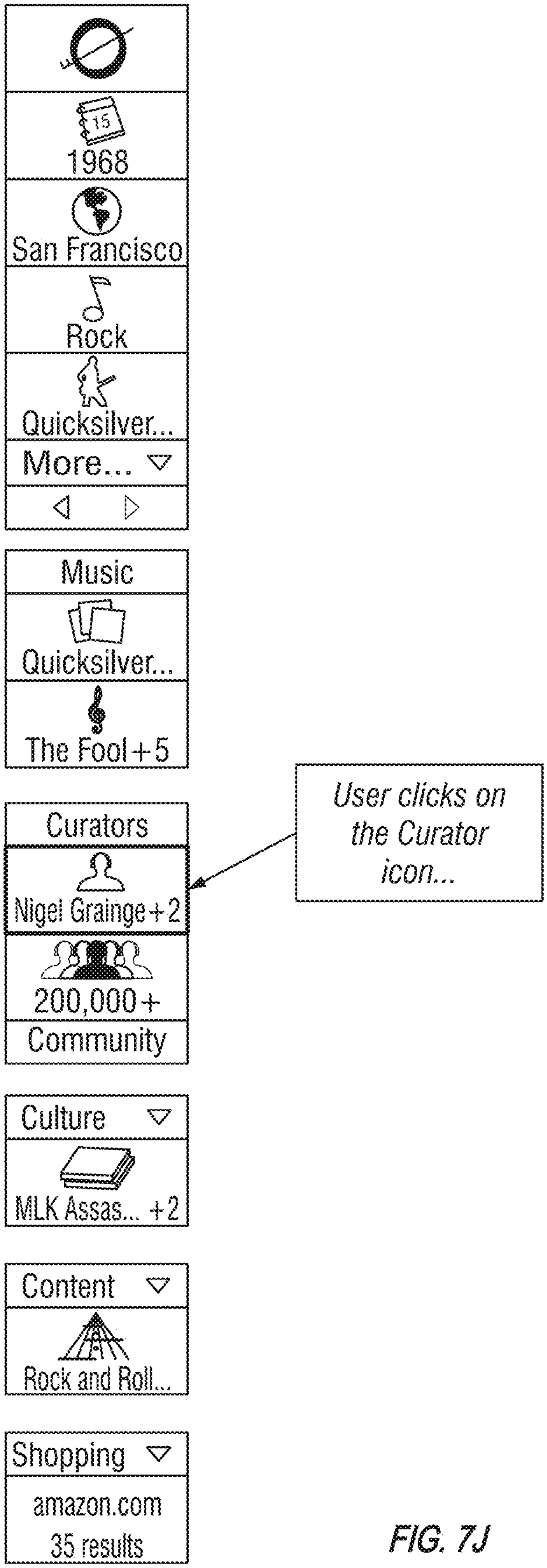
Figure 7J:
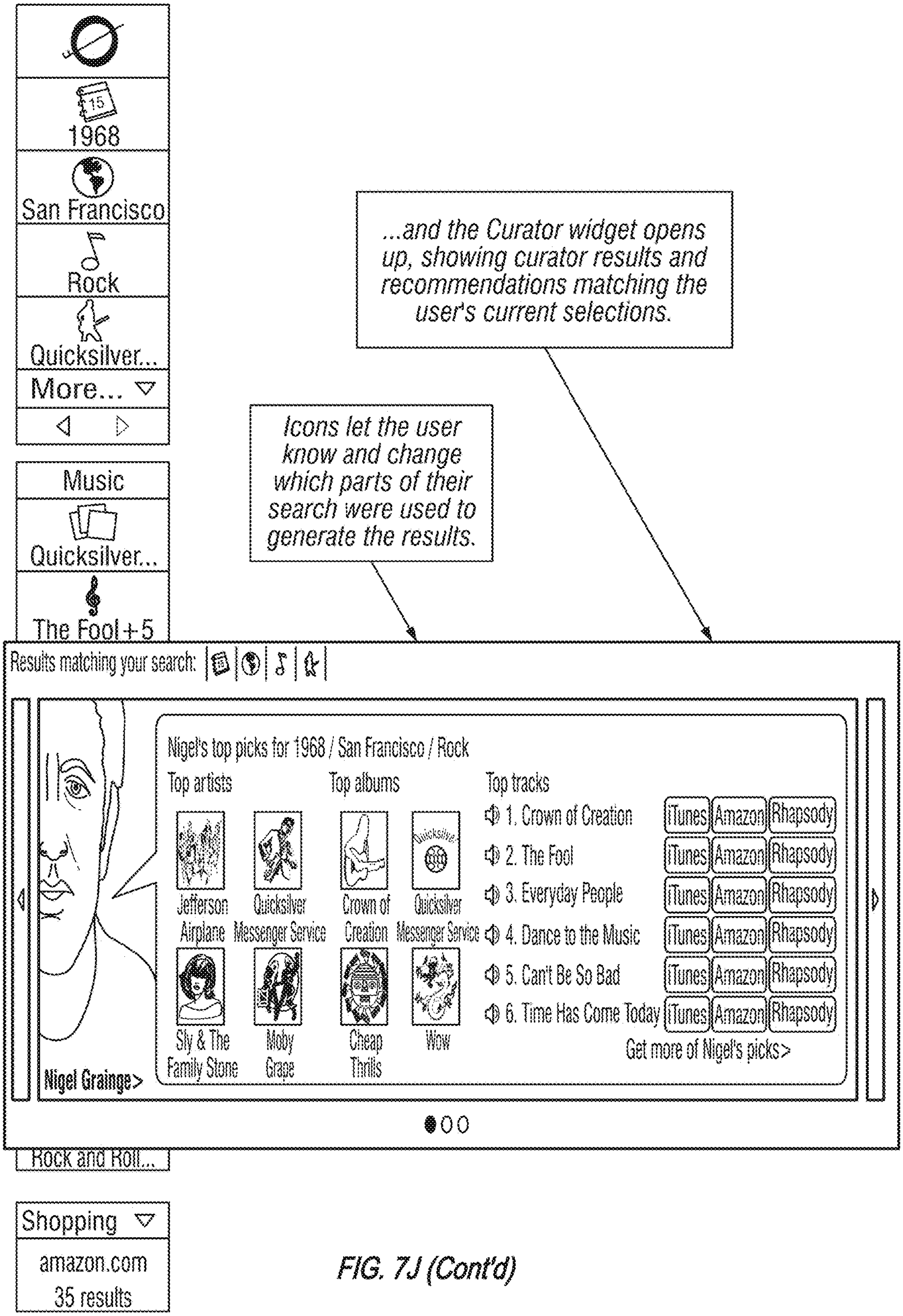
Figure 7K:
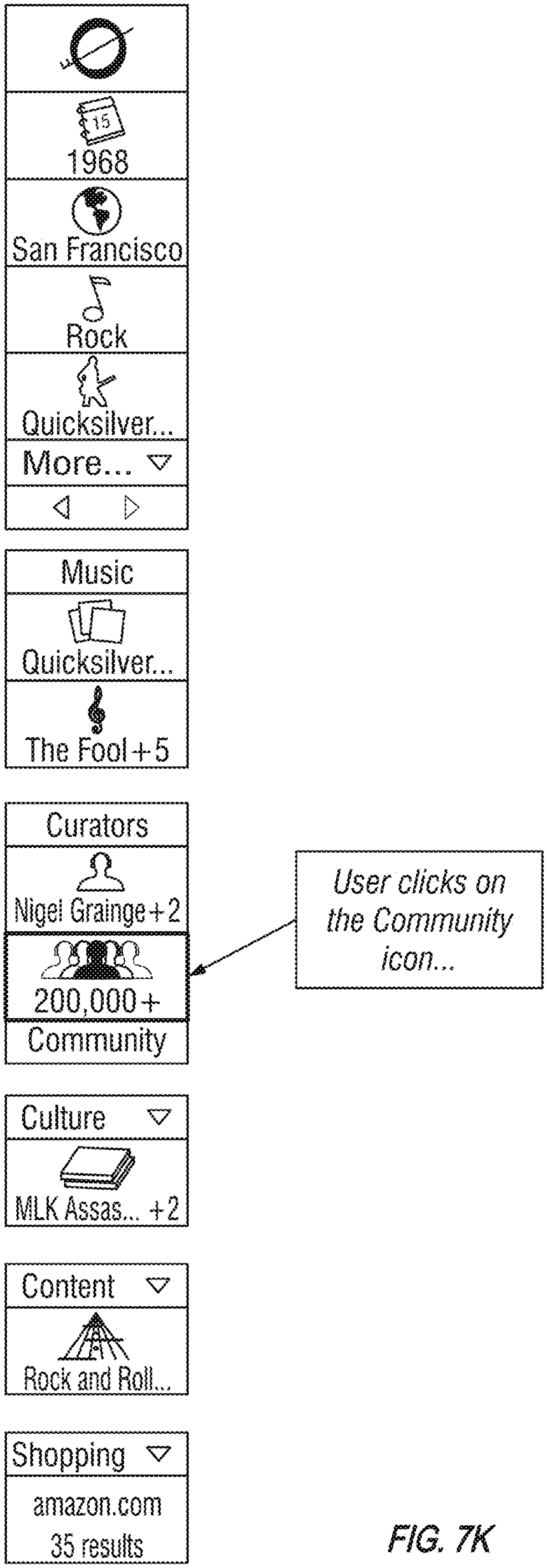
Figure 7K:
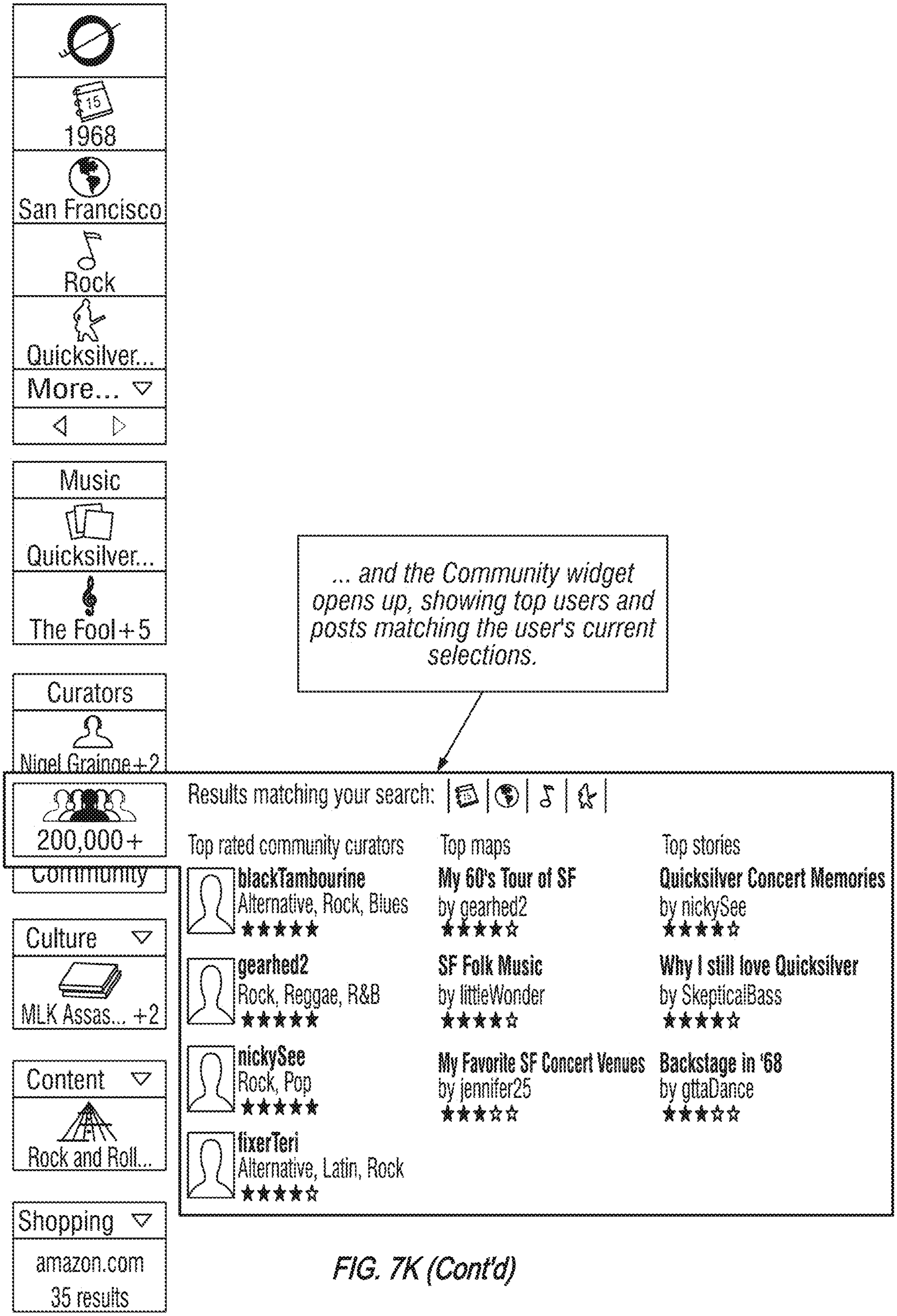
Figure 7L:
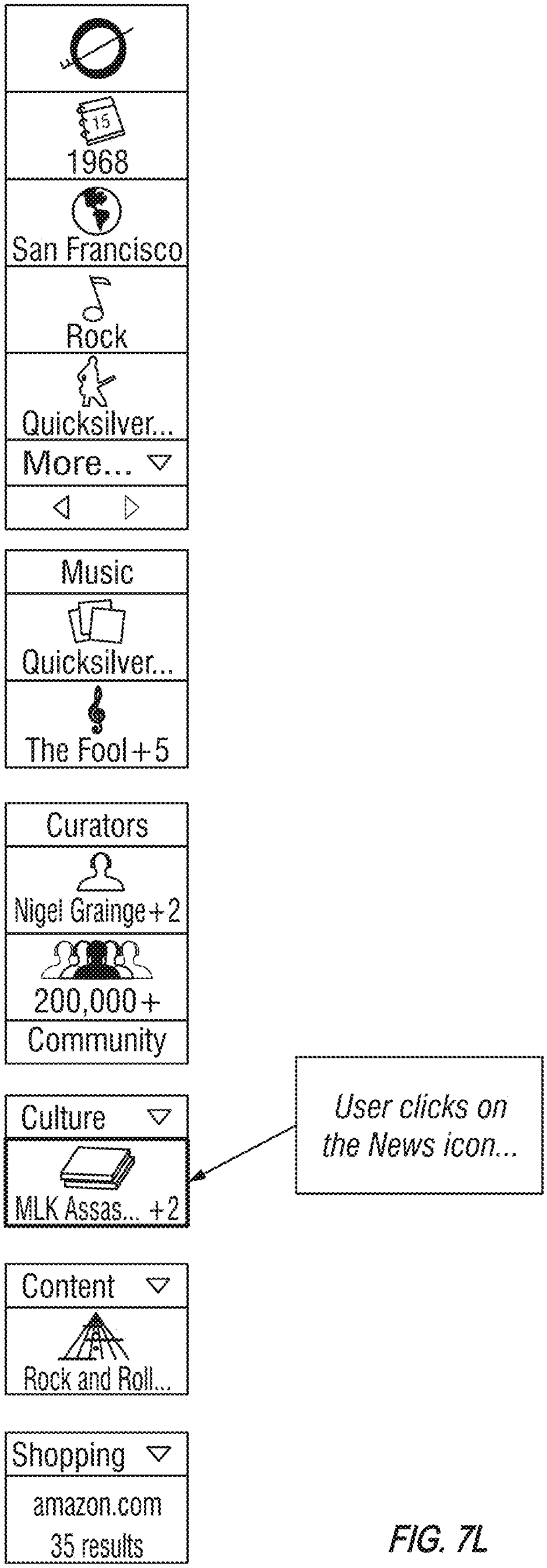
Figure 7L:
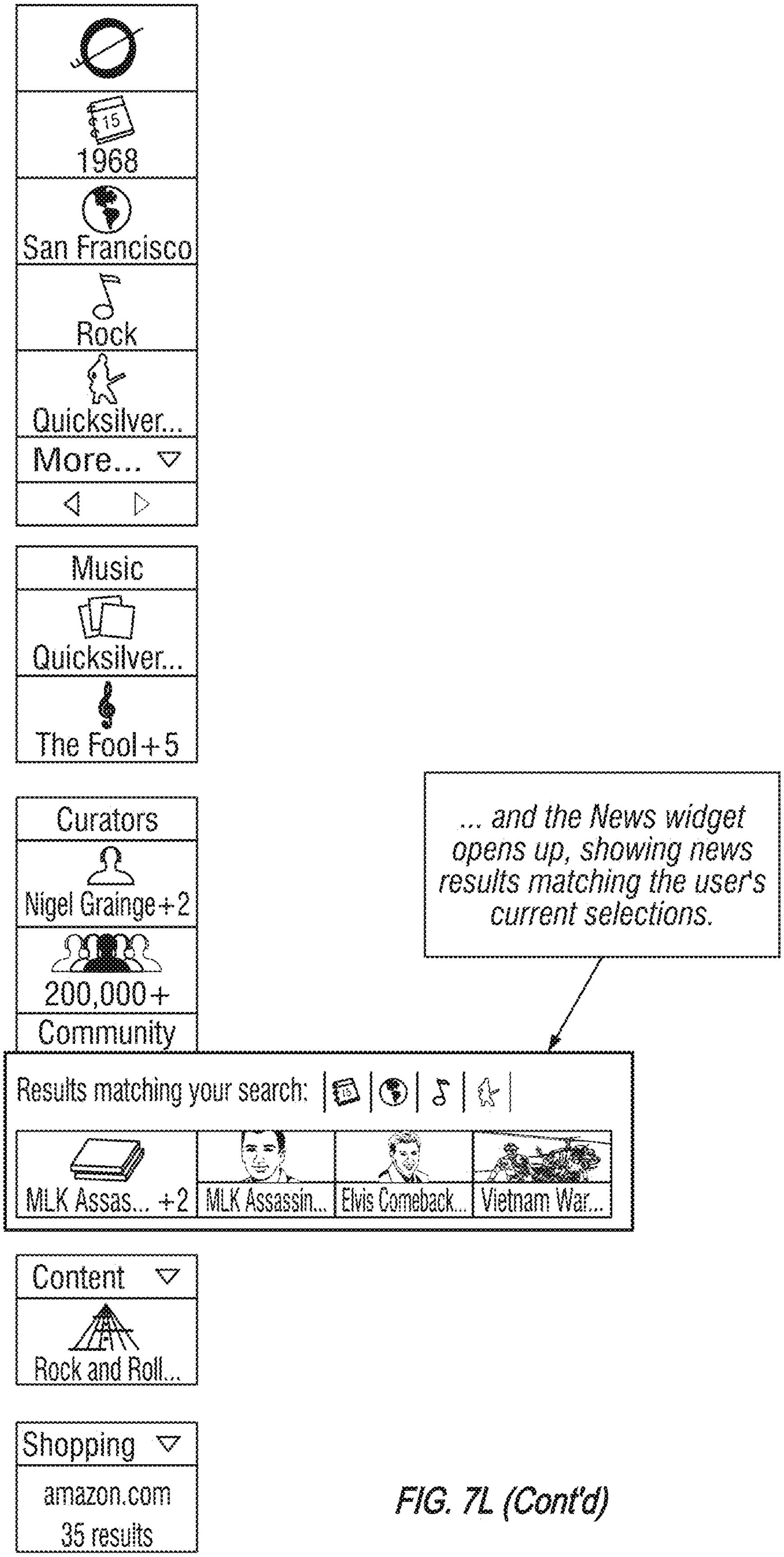
Figure 7M:
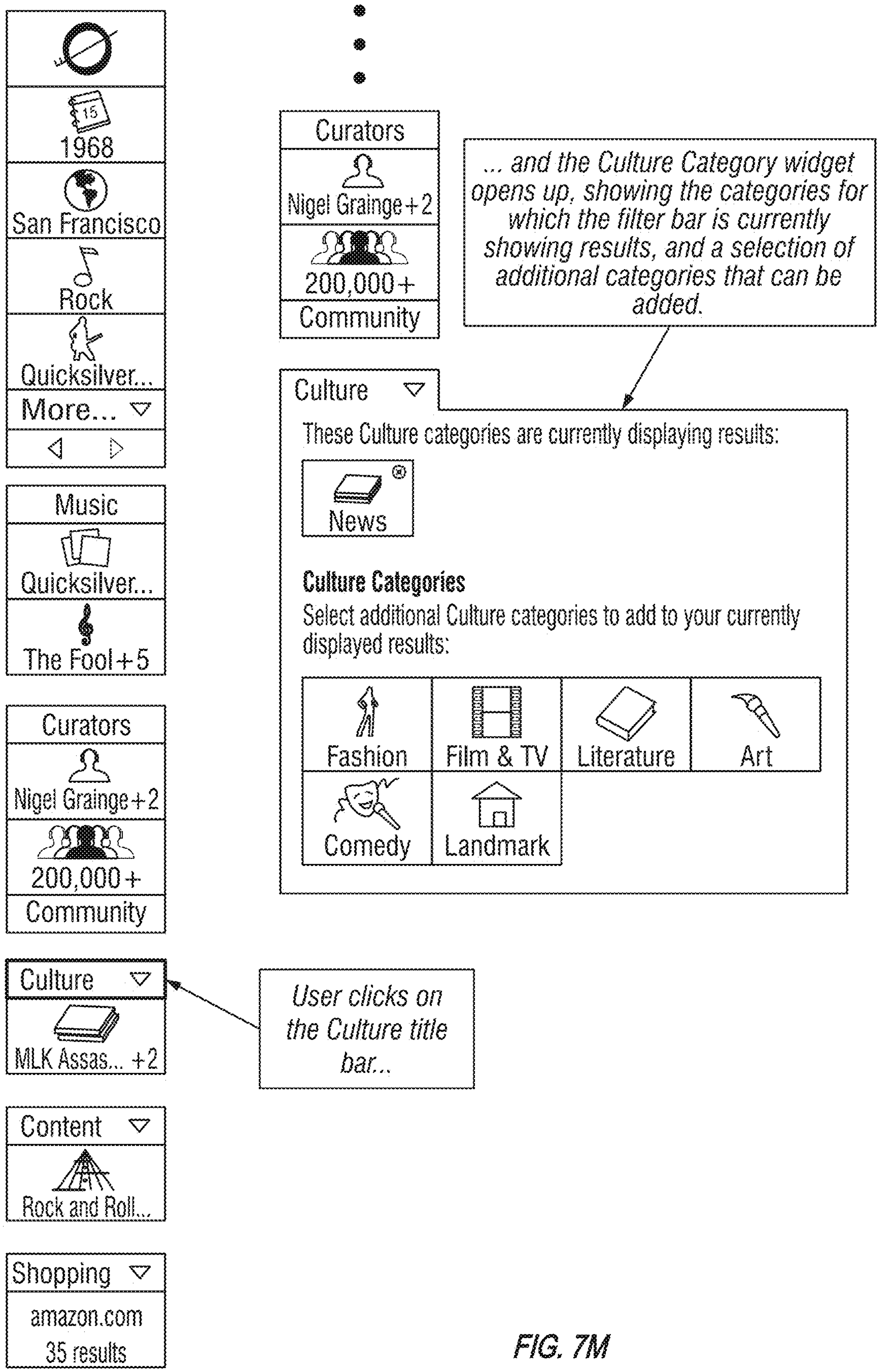
Figure 7N:
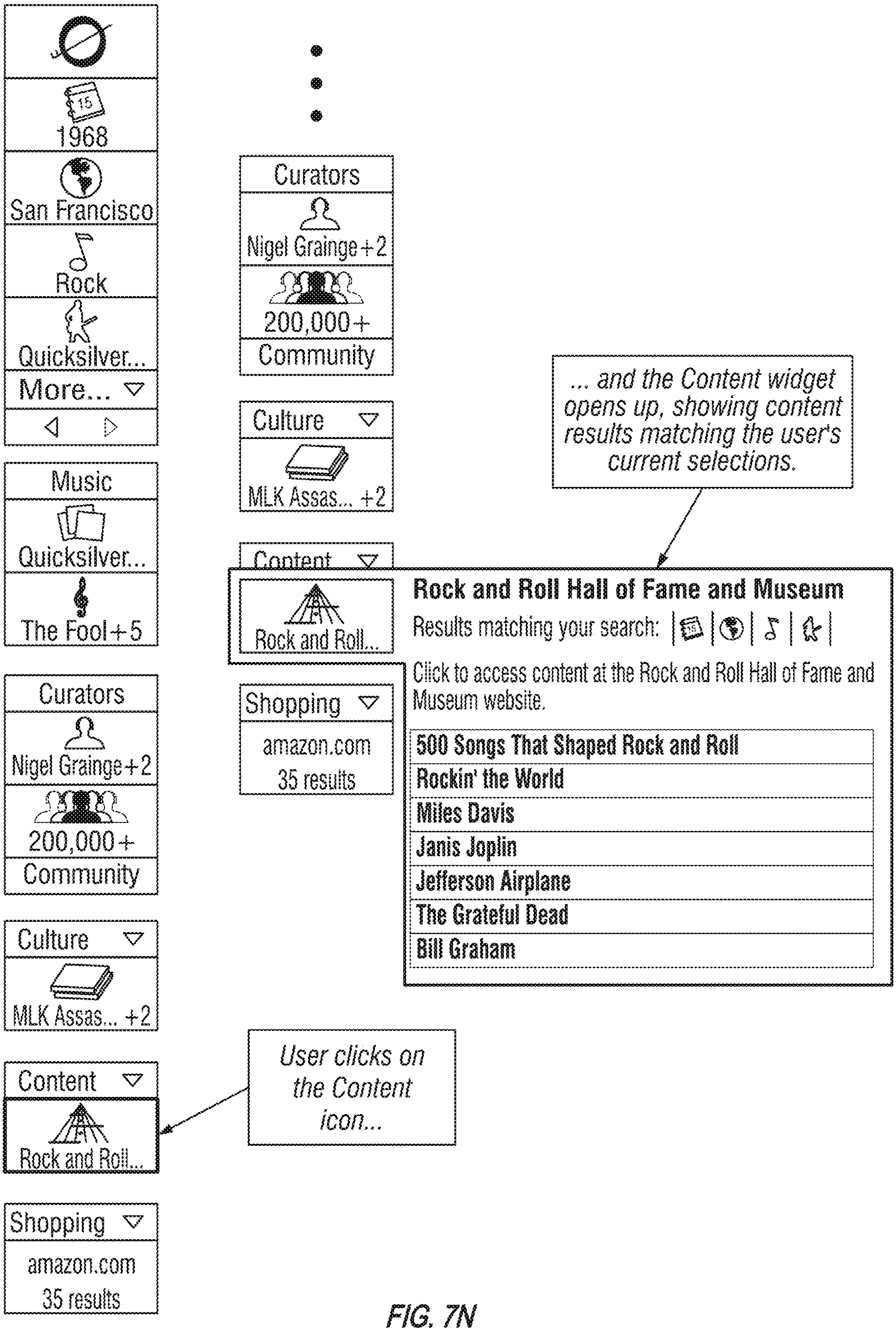
Figure 7O:
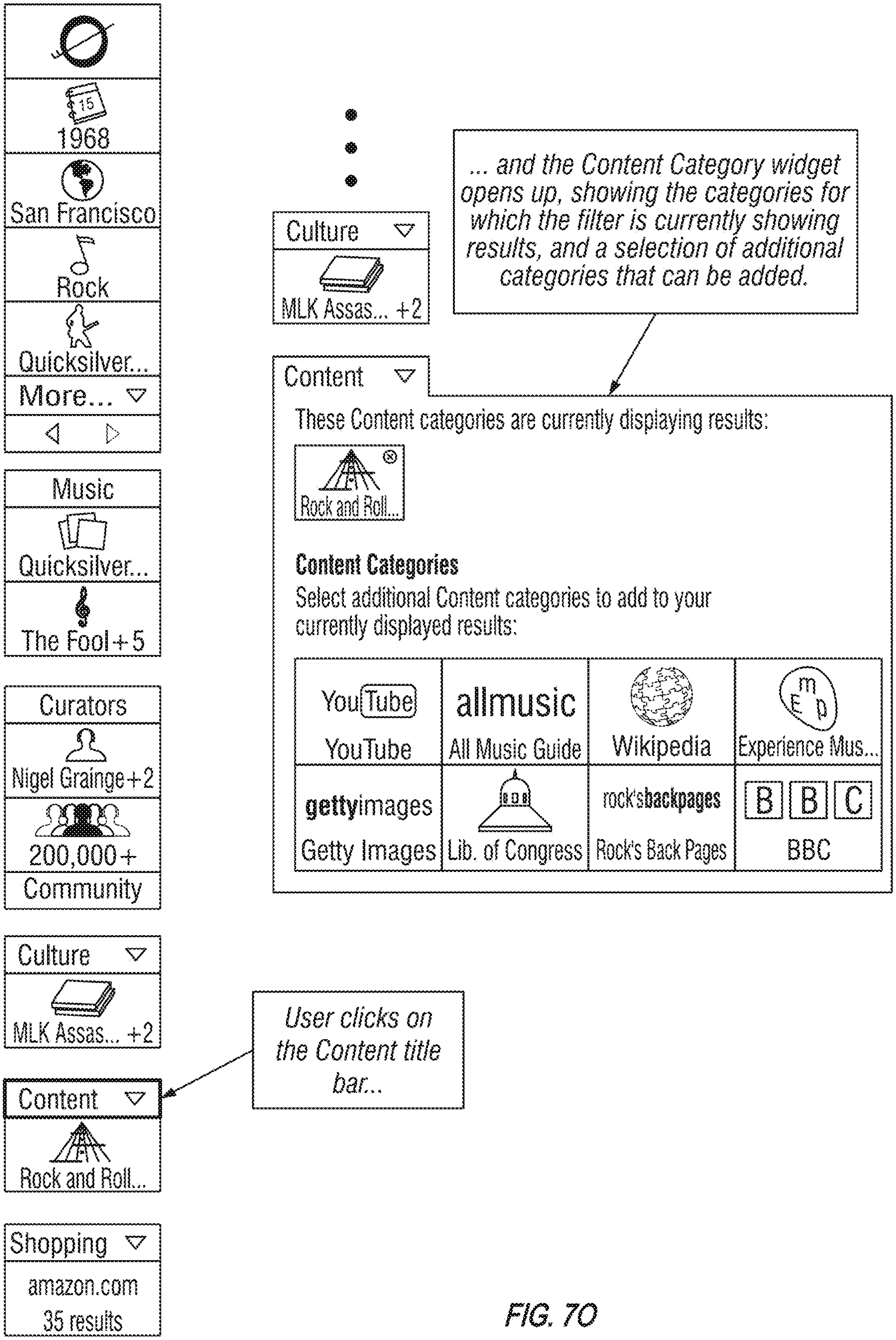
Figure 7P:
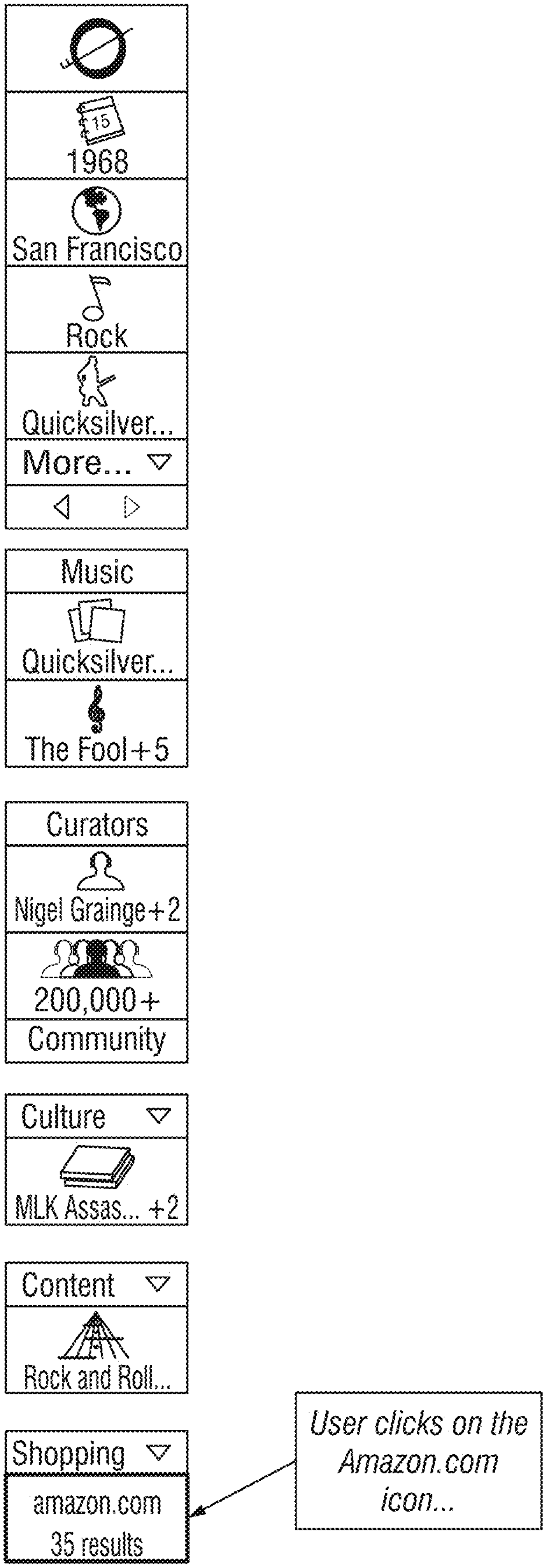
Figure 7P:
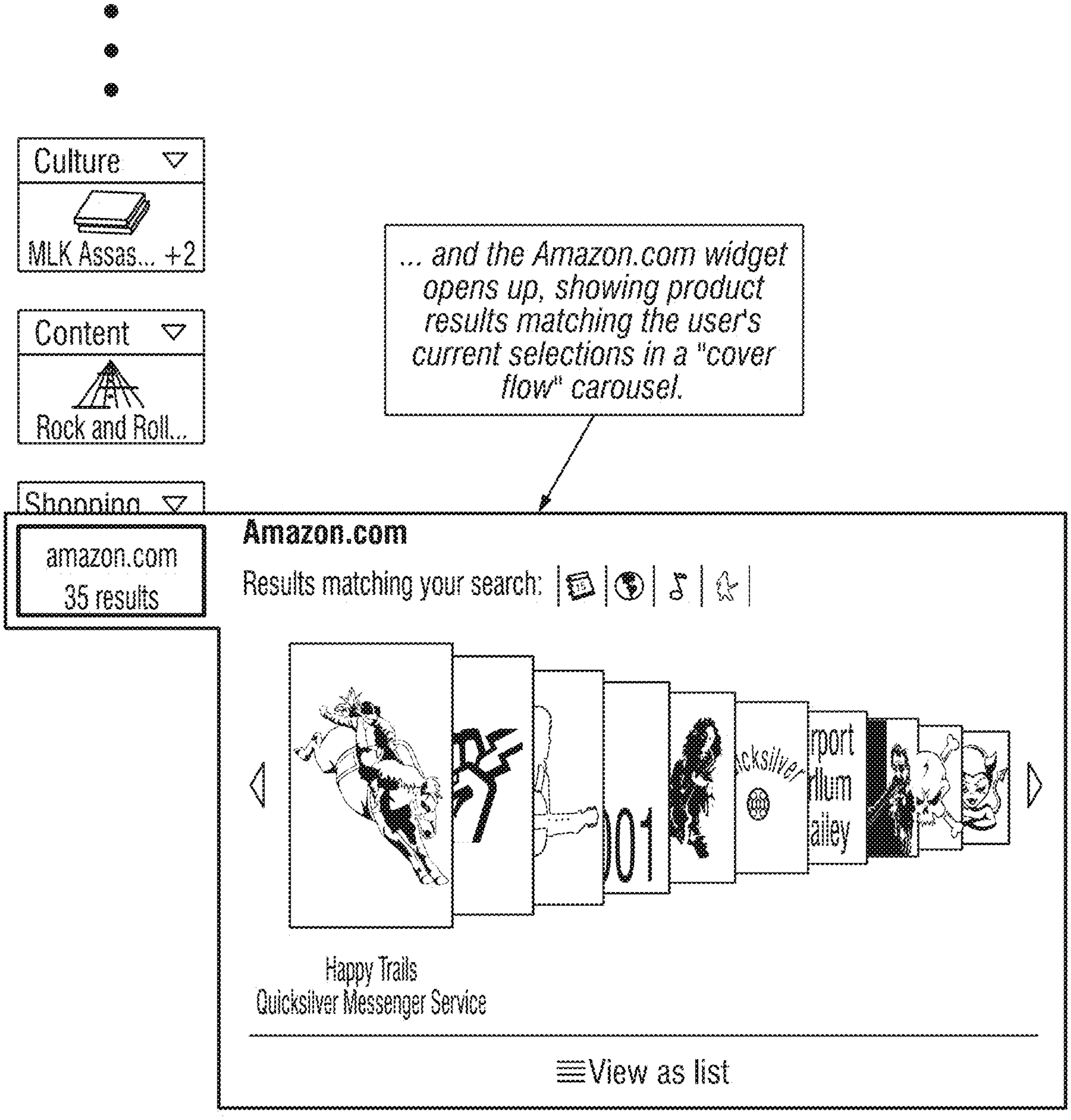
Figure 7Q:
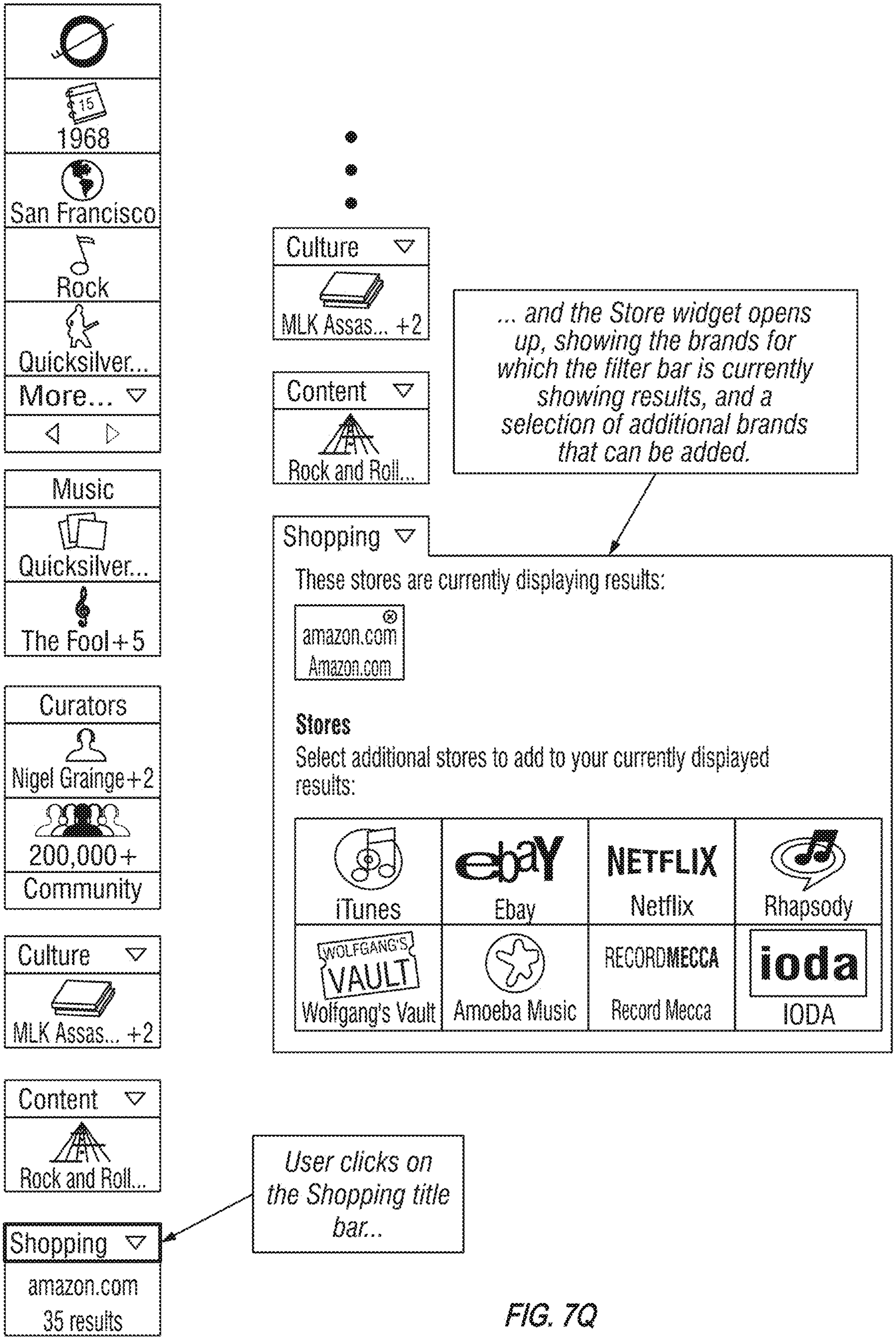

The core element relationship is exposed to the user through a filter bar abstraction 500, an embodiment of which is shown in FIGS. 7A-7Q as the results of a user's search for "1968 san francisco rock."

The filter bar presents a view with an interface to time 501, place 502, genre 503, and artist 504. These are respectively the input devices for the model elements 201-204 of FIG. 4. The user selects any or each of these items to focus their navigation accordingly. Any items that are not selected by the user are the subject of random selection by the system. The Map icon at the top of the filter bar 500 issues a re-randomization when selected. Works matching the core element relationship interface component 505, for example the medium of music is shown, from which matching results are selectable by artist 506 and song 507.

In FIGS. 7A-7Q, the core element relationship interface component 505 is a pop-up that allows a user to select from among various media, such as music, video, articles, etc. to display corresponding results by exposing the primary elements data model 300 to the user interface for navigation. The "Artist" is the currently selected artist in the map index and may be changed and traversed via the selector 505. Note that "Music" is a primary_id 300 which can occur with each primary element type 302-306. Supporting element 401 occurs in the context of a primary element 400 which, in turn, occurs in the context of a primary type and map index. Each of these elements has a navigable representation in the user interface. Note also that the namespace of the supporting elements with such entries as "Music" in the example of interface component 505 can, in general, be thought of as a W3C/RDF predicate in nature. Such data structure includes local terms, in addition to formal W3C vocabularies, such as the Dublin core, and additional industry standard ontology elements, which are important for such functions as naming and classification of external materials, indicating APIs, and defining protocols for commerce. An embodiment of the invention provides a translation of these formal semantic vocabularies into the vernacular of the user or community. For example, Blues, Jazz, Rap, and Classical music communities use very different terms to describe their art. An embodiment of the invention enables the curator to define and choose terms to describe music, its media, and culture and to use those terms to indicate qualified examples of resources that satisfy the predicate nature of the terms.

In summary, a significant feature of the invention includes the data model namespace of primary element names which define predicates in the semantic music ontology, which the map exposes, and which the user navigates. This aspect of the invention thus provides an extensible framework for the classification, curatorship, and navigation of music and its supporting media, history, and culture, The curatorship interface 508 allows both individual 509 and community curatorship 510. The Culture 511, Content 512, and Shopping 513 interfaces relate the selected music to curator and/or community defined items of interest for their respective primary categories. These user interfaces abstractions 509-513 expose the primary element relation categories 302-306 of the data model shown in FIG. 5. Use cases of the filter abstraction are depicted in FIGS. 7B-7Q.

The Map has four search categories with a dynamic extensible set of filters:

Time, Location, Genre, Artist

Note: as per the above discussion: Time, Place Genre, and Artist are each a unique numeric id that is used as the foreign key in referencing the Map Index 200. Album and Song are examples of supporting elements 401. The possible names include Video, Interview, Live Concert, etc.

Whenever the user performs a search, their search terms are analyzed and used to populate as many of the search categories as possible. In an embodiment of the invention, a search is initiated by capturing a fragment of a musical composition as it is performed, for example using a handheld device, such as an iPhone, to capture the music fragment. The music fragment is recognized, as described above, and input to the map generation system as one or more search terms. The search categories then persist throughout the site at the top of the filter bar interface, and their contents can be modified by the user at any time, either through subsequent searches or through individual controls, for example, a timeline slider to select the year.

The filters that are available to the user to navigate are the ones defined and/or chosen by the curator to describe the supporting data 401 and are applied concurrently.

The search categories act as filters which determine search results in a variety of results categories, organized into groups shown underneath the search categories in the filter bar:

Music—This group converts any unused search categories into results categories. In this example, the user has not specified an album or song in their search, so recommended albums and songs are shown here. As noted, there may be a variety of primary element types, such as Music available depending on what has been subject to curatorship.

Curators/Community—Recommended music experts from the Map and the user base at large.

Culture—Related results in Fashion, Film, Literature, Music, Comedy, and News.

Content—Related results from third-party information resources such as Gracenote, Grammy Museum, Rolling Stone, Rock Back Pages, Rock and Roll Hall of Fame, and YouTube.

Shopping—Recommended products from brands including Record Mecca, Wolfgang's Vault, Amazon, EBay, iTunes, and Netflix.

Whenever the user accesses search results in one of the results categories, the results are determined by the locked in search categories. The Curators group gets special prominence because of the overall importance of curator recommendations to the site, and top-rated community experts are also featured. All sets of material are a directly related to a curator at all times. In this embodiment, there is always a curator or group of curators behind the filter result at all times. Random selection is within the constraints of the map index and currently selected primary elements 400.

Unlike traditional discrete searches, however, the Map search is affected not only by explicit criteria input by the user in the form of a song fragment, but also by the user's path through the site. In effect, the user's initial search is smeared with their browse path to provide fresh results on each new page the user visits, while still maintaining some continuity with their original search.

How does this work?

Let's say the user search recognizes a song that returns "1968 rock san francisco quicksilver messenger service." The Map search engine parses those search terms and locks in the following as search categories:

Time: 1968

Location: San Francisco

Genre: Rock

Artist: Quicksilver Messenger Service

Clicking on the icons for any of the results categories returns items filtered by the search categories. For example, if the user clicks the Curators icon, they see a list of Map curators who are experts in San Francisco rock from 1968. If they click on the News icon, they see a list of key news items related to the San Francisco rock scene in 1968.

The Map's content management system allows curators and editors to tag certain results as more broadly relevant than their default categorization might imply. For example, the assassination of Martin Luther King Jr. in 1968 would clearly be associated with both 1968 and Memphis in the Map database. However, because the assassination was such a significant event, it. could be manually flagged in the Map database to appear in all searches for 1968, regardless of whether the specific city the user searched for was Memphis or not.

Note that the specific culture icon that appears in the filter bar changes randomly within the constrains of the current filters until the user makes a specific category selection in this widget. Each icon presents the user with results specific to their search (see, for example, FIG. 7M).

Note that also the specific content icon that appears in the filter bar changes randomly until the user makes a specific category selection in this widget. Each icon presents the user with results specific to their search (see, for example, FIG. 7O).

Further note that the specific store icon that appears in the filter bar changes randomly until the user makes a specific store selection in this widget. Each store icon presents the user with results specific to their search in a cover flow carousel (see, for example, FIG. 7Q).

Mural Abstraction

A unique feature of the invention, depicted in FIGS. 8A-8F, is the visual assembly and animation of a mural 600.

The mural displays the results of the user's current filter selection 601. Displayed are iconic representations of data items of interest such as albums, videos, books, interviews, news events, etc., with a back ground image representing the current location and presentation satisfying the current filters 601. The mural icons are hot links to corresponding representations and display descriptive text of the represented items on mouse over events. A set of selectors 602 enable/disable each of the four fundamental relationships filters 201-204 of FIG. 4 independently. Qualified representations of music, its history, and culture 605 are presented in the mural with the current time 604 indicated and selectable from a time line 603. The location of the current search is viewed either geophysically (Earth, shown) 607 or conceptually (Network) by a map selector 606. The Network view and Earth maps are described in greater detail below.

Figure 8A:
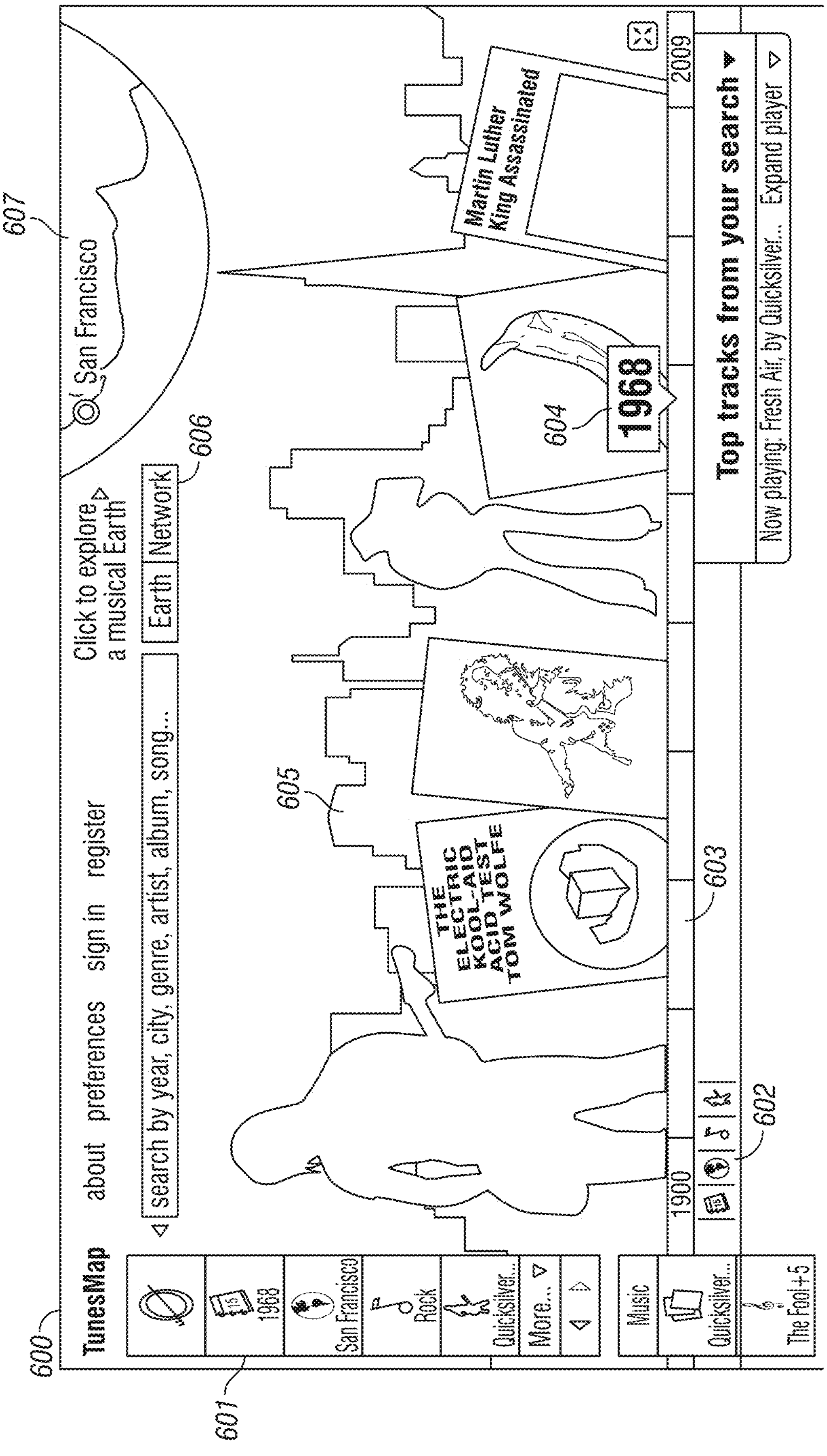
FIGS. 8A-8F illustrate a map mural depicting the fundamental relationship of music in an interactive animated user interface according to the invention.
Figure 8B:
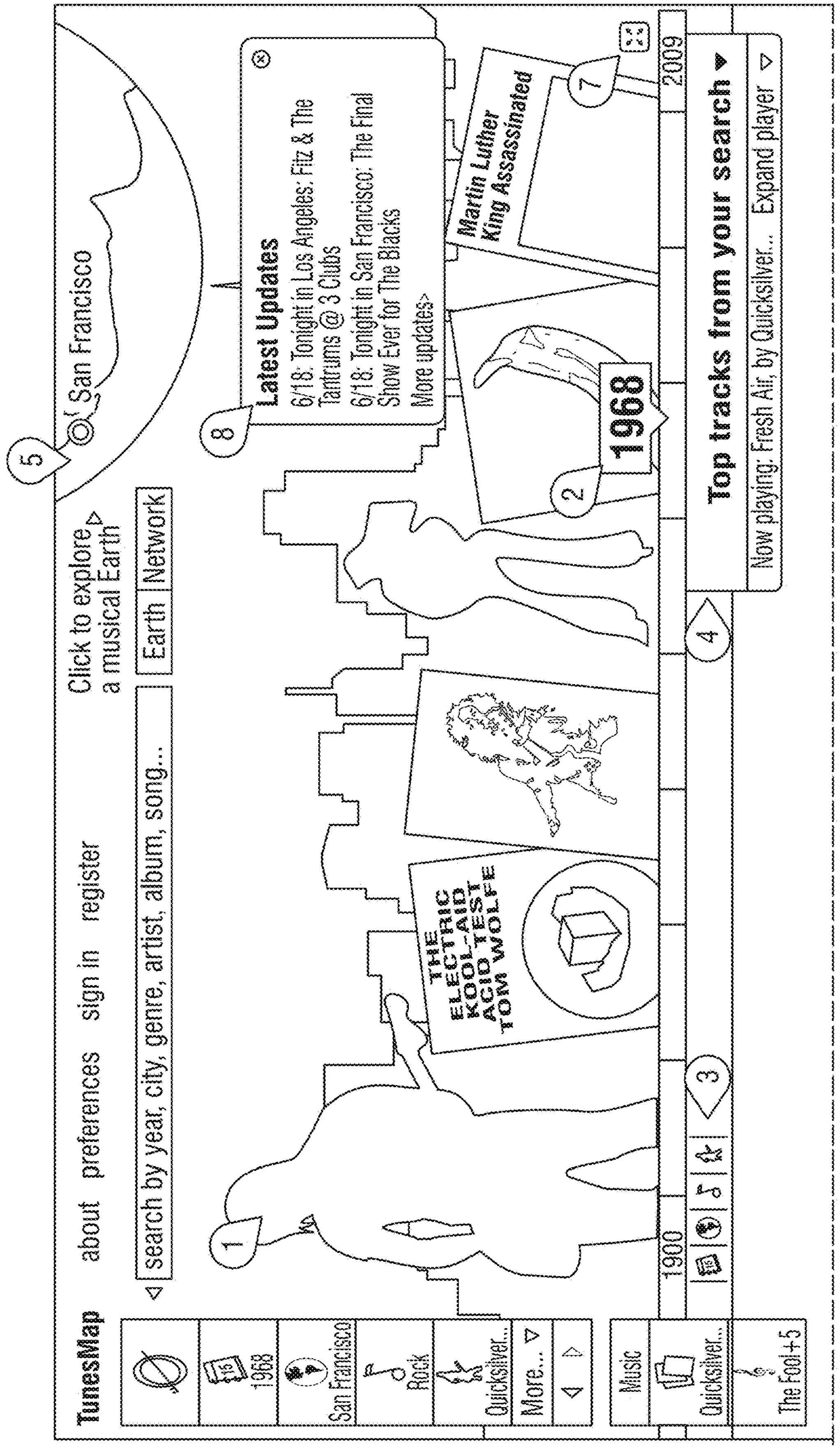

The Map home page as it appears after the user has done a search by capturing a fragment of music is shown in FIG. 8B, and presents to the user the following:

1. Mural. A dynamically animated selection of images derived from the user's current search. Images may represent regions, cities, artists, news items, comedy, fashion trends, movies, books, and genres of art. When rolled over, each image displays a pop-up that provides more information and options.

2. Interactive timeline. An interactive timeline allows the user to change the current year at will. Any changes are immediately reflected in the imagery and the Time icon.

3. Search status. This element, which appears throughout the site associated with various interactive modules, shows which of the four search components are being used to generate the content shown (here, the Mural imagery). Clicking on a given icon toggles it on and off, making the related results either broader or more refined.

4. Media selector. Plays a selection of tracks driven by the user's search. Clicking "Expand player" reveals transport controls and additional details about the current track; clicking "Top tracks . . . " opens a menu with additional playlist options, including a video playlist.

5. Mapping module—Earth mode. Displays the user's current location in the history of music, based on their most recent search, either as a point on a globe, or as a node in a diagram of pop culture referents. As the contents of the Location icon in the filter bar change, the globe rotates to center on the new location.

6. Welcome messaging. Introduces the user to the Map, and the major activities users perform on the site, e.g. exploring curator-recommended music and, optionally, building their own Map.

7. Full screen option. Toggles full-screen display of the Mural on and off.

8. Latest updates. This area displays the latest items of the Map music news. Clicking the "x" button closes the updates box.

Figure 8C:
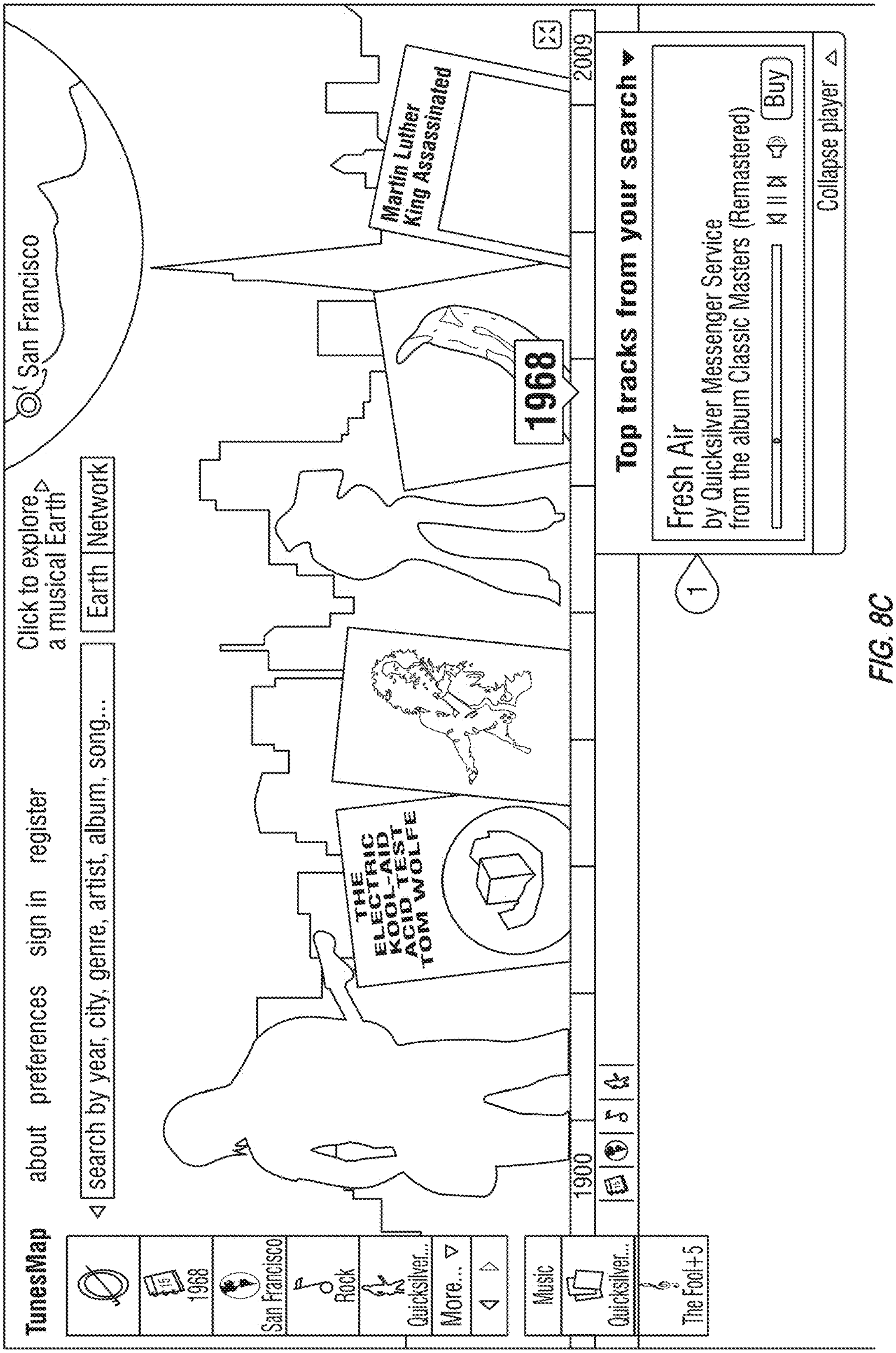
Figure 8C:
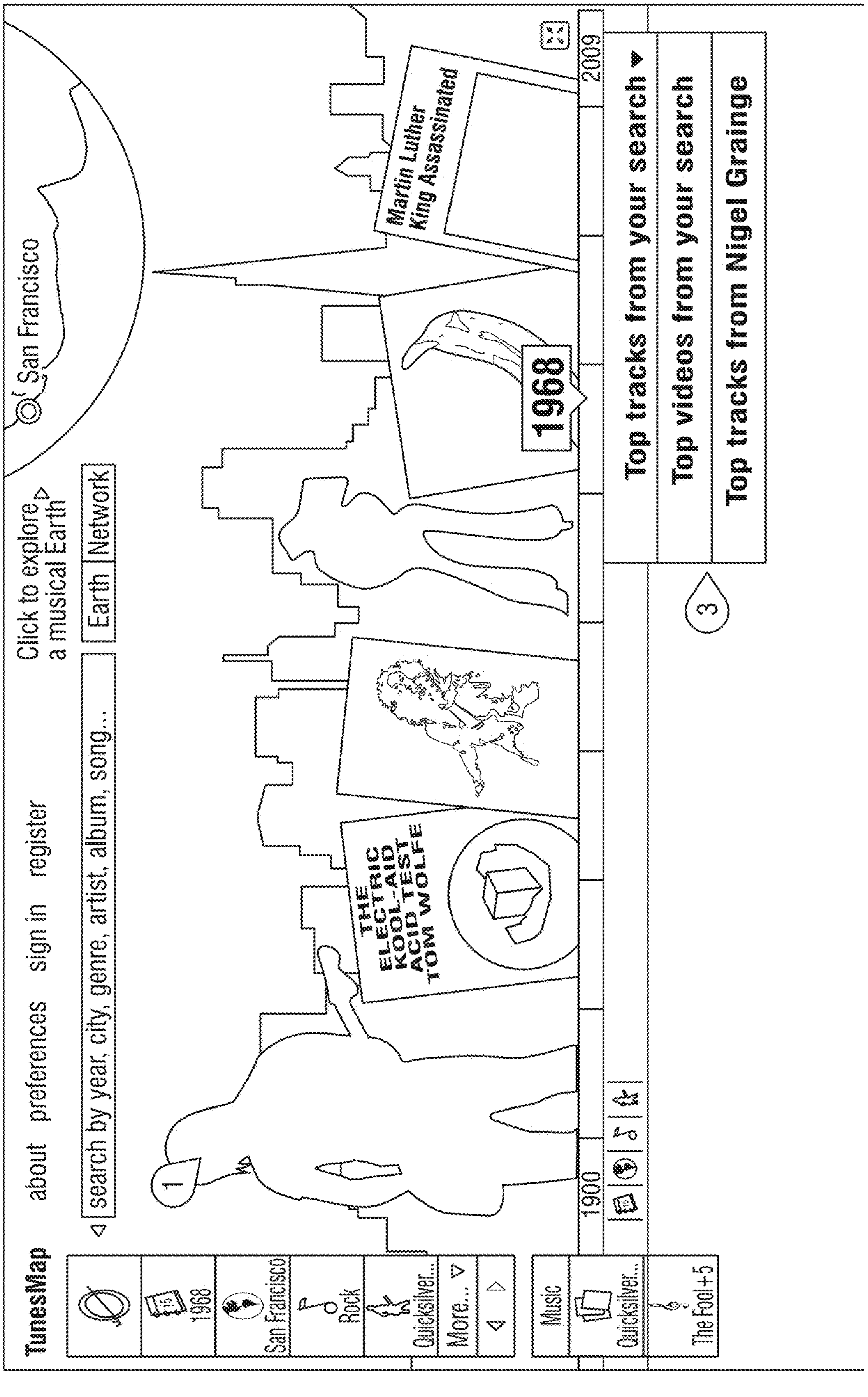
Figure 8C:
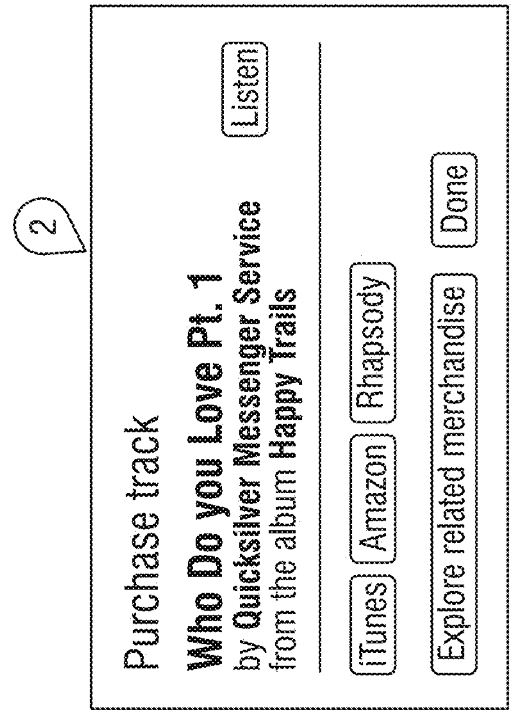
Figure 8C:
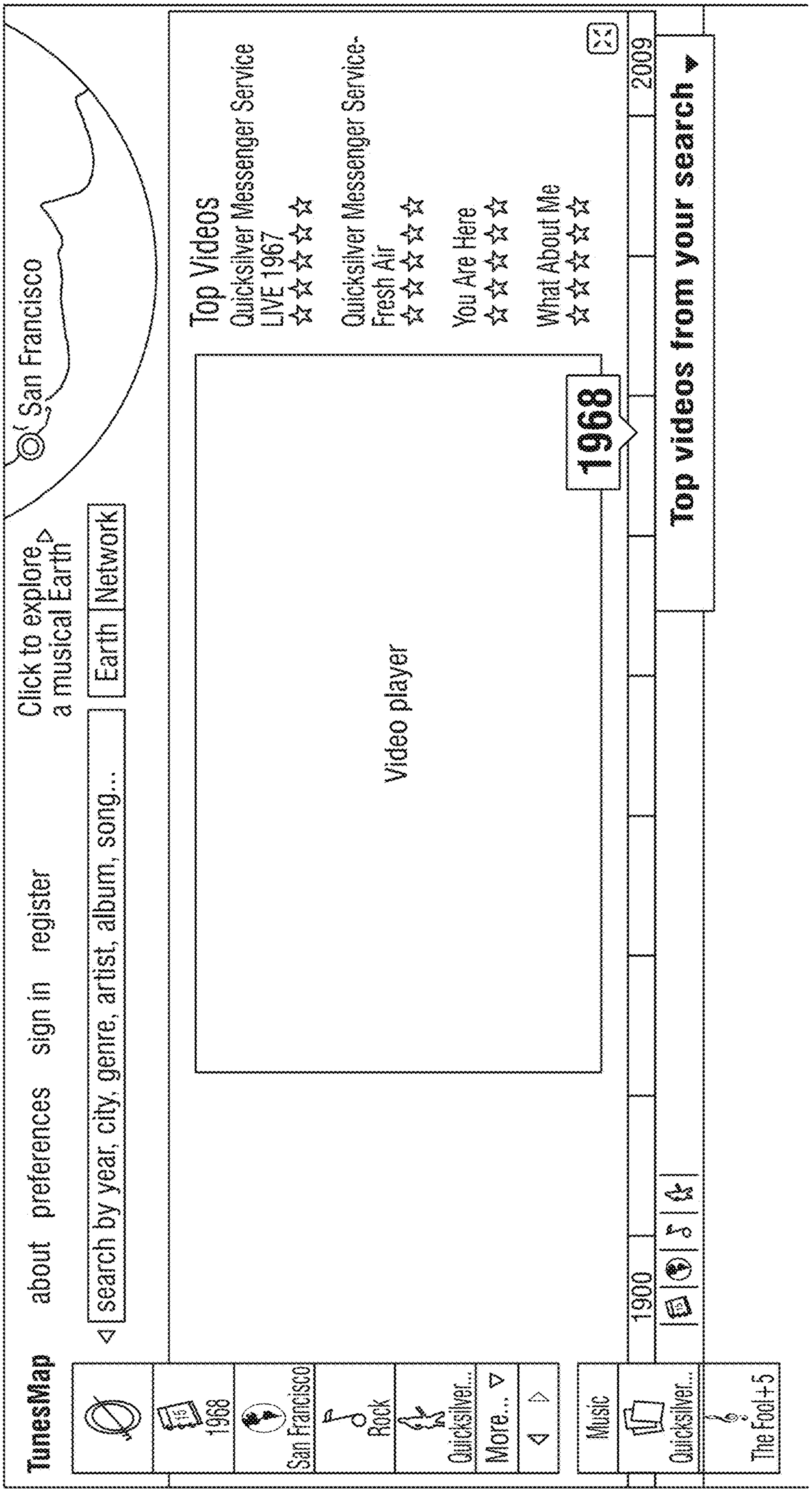

FIG. 8C depicts the following functionality:

1. Expanded media player. The expanded media player provides transport controls and additional details about the currently playing track.

2. Track purchase dialog box. Clicking the "Buy" button triggers the appearance of this dialog box which provides options to purchase the song from iTunes, Amazon.com, or Rhapsody. The user can also listen to the song or expand the dialog further to reveal other types of related products that can be browsed in a cover flow style carousel.

3. Playlist menu. Allows the user to select other playlists relevant to their search, including a video playlist that replaces the Mural with a video player.

Figure 8D:
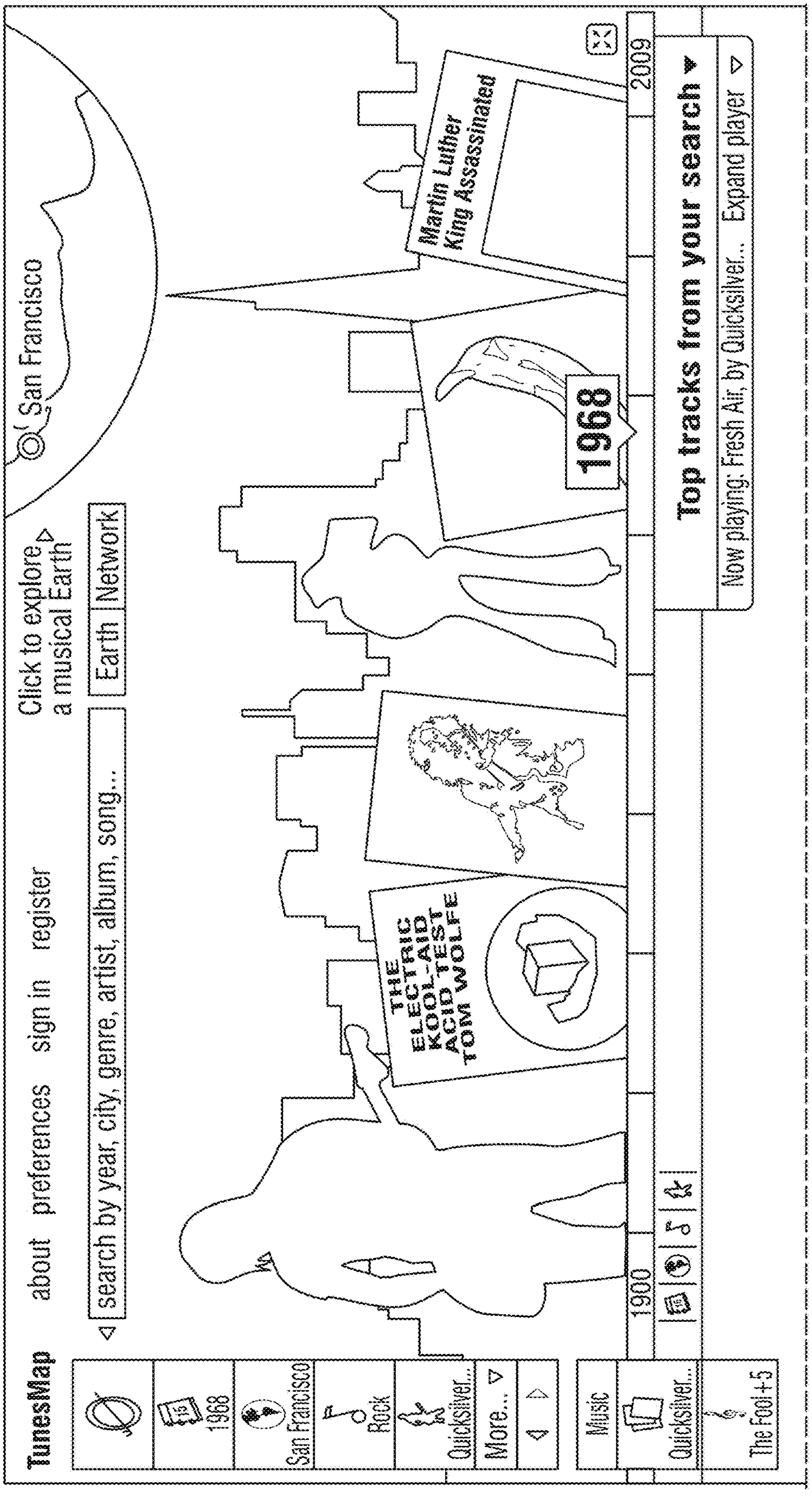
Figure 8D:
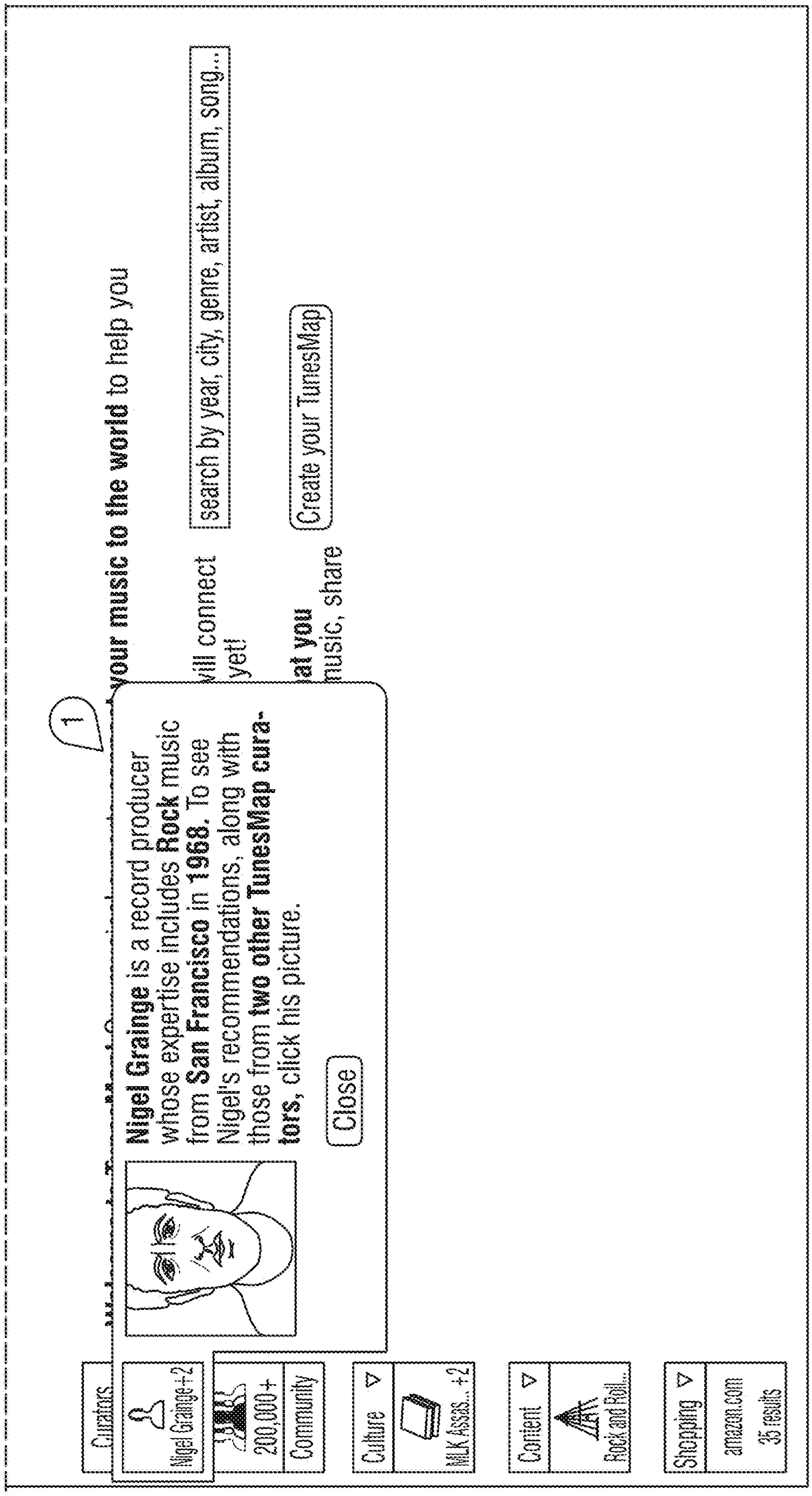

FIG. 8D depicts the following functionality:

1. Curator promotion. Whenever a user search returns a Map curator that has not been previously promoted, a pop-up promotion appears which introduces the user to the curator. Clicking on the curator photo or icon replaces the promotion with the full Curator widget and its results.

Figure 8E:
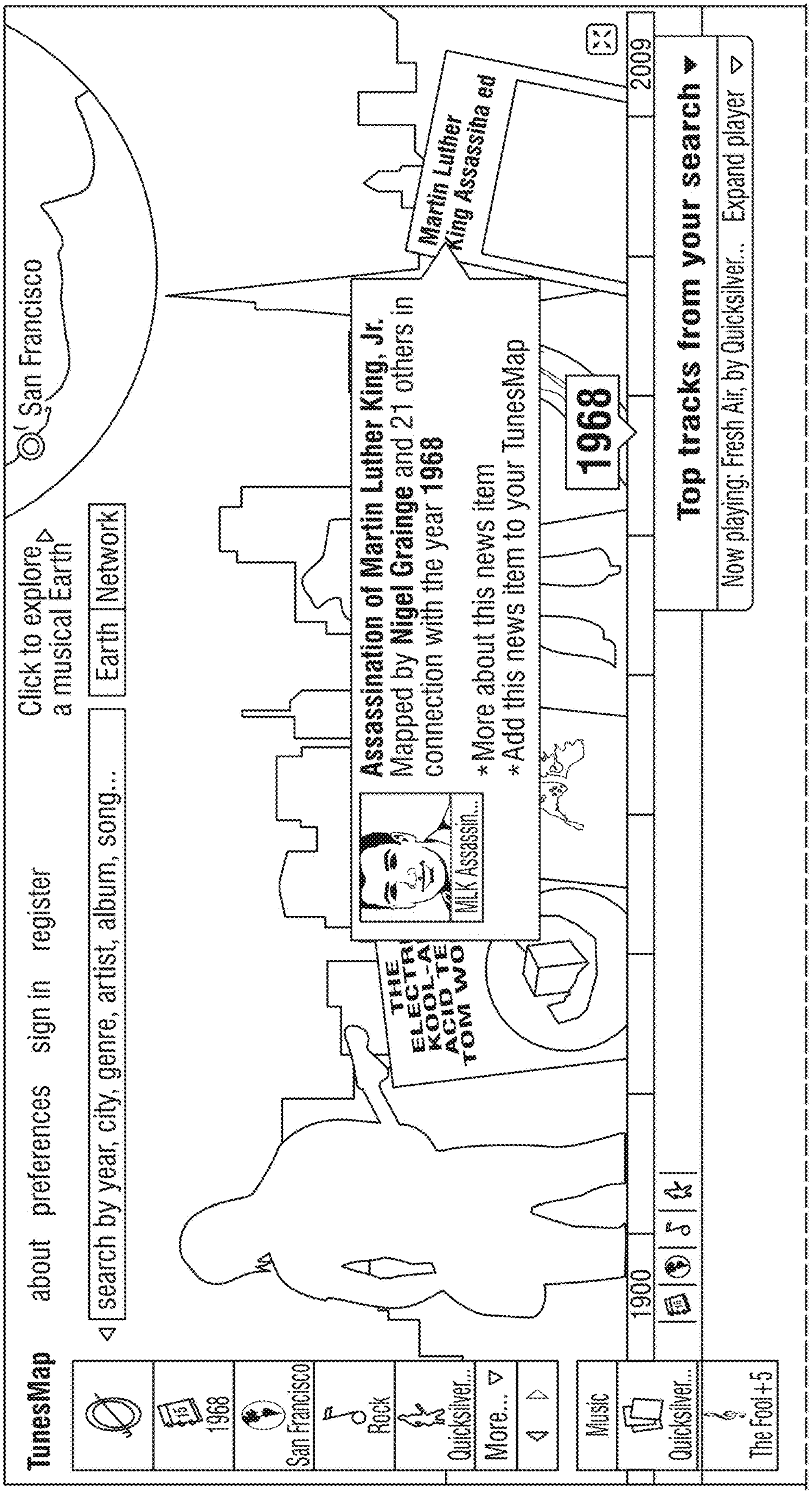

FIG. 8E depicts the following functionality:

1. Mural rollover. When the user rolls over an image in the Mural, a pop-up box appears offering further details, a link to the dedicated page for the item, and the opportunity to add the item to the user's Map.

Figure 8F:
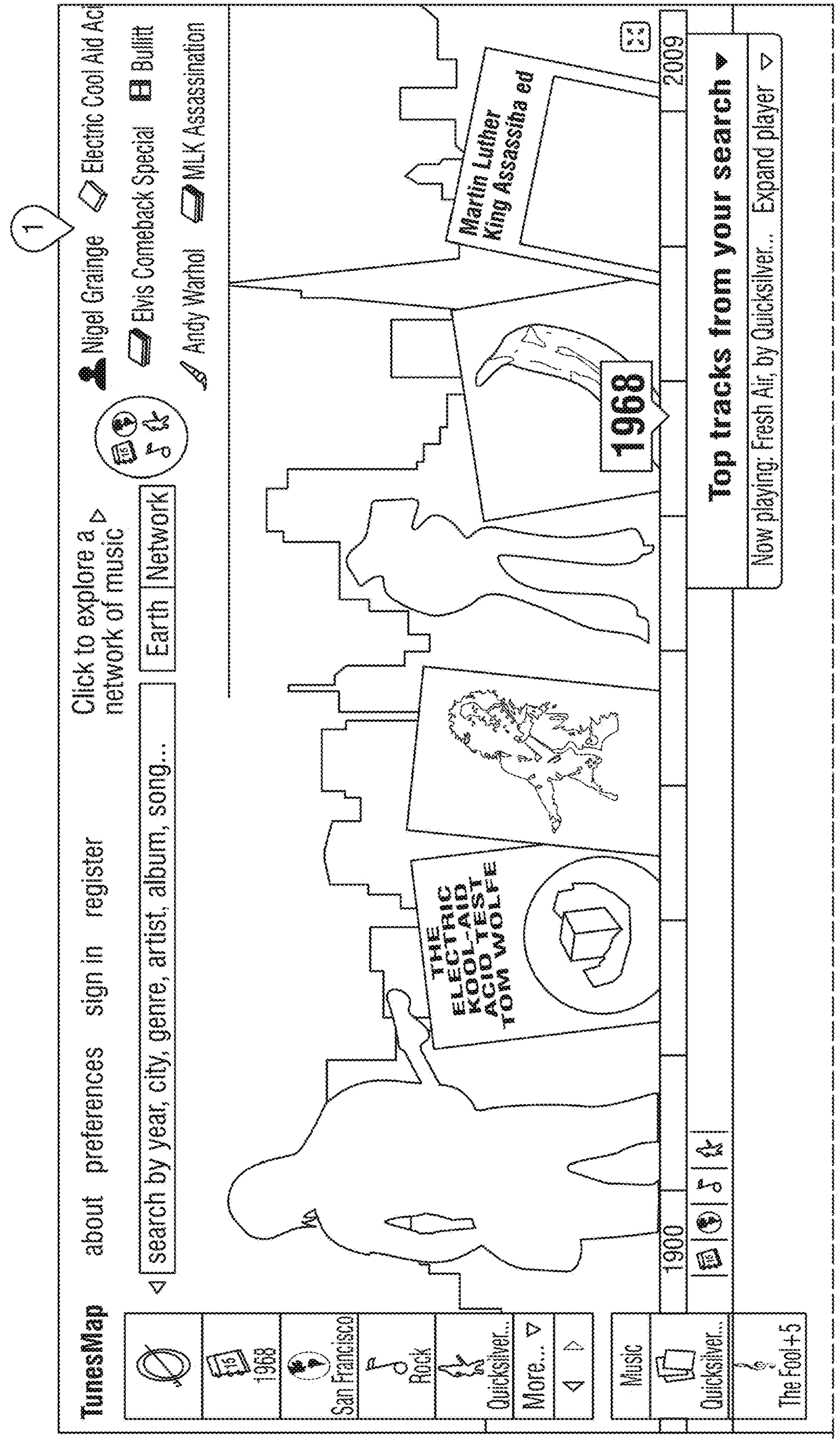

FIG. 8F depicts the following functionality:

1. Mapping module—Network mode. When this module is togged into Network mode, it shows the user's current search in icon form, with a multilayered ticker of related elements, including Map curators, arrayed to the right. Clicking a specific element takes the user to its dedicated page, clicking elsewhere in the module takes the user to the Network View page. Network View Abstraction The invention presents two kinds of maps to the user. The Earth map 605 is shown in the Mural 600 of FIGS. 11A-11I described below. The Network map is presented in FIGS. 9A-9L. This novel abstraction functions as an iconic filter construction device. The Network map user interface presents a pallet of available supporting elements 708 and curatorship facilities 709. The user adds elements to the map by drag and drop of icon items from the pallets 708 and 709 onto the mapping area 707. The map has a representation of the user's current filter selections and primary category data items with counts of the number of items satisfying each criterion. Selecting an icon, for example the icon representing the user 708, graphs the relationships 705 between the selected icon and other icons in the network map. A double click on an icon expands it. For example, the songs icon 706 has not been expanded while the Garth Trinidad icon 710 is the result of two expansions; the curator icon 711 was expanded from the Current search, and the Garth Trinidad icon 710 was expanded from the curator expansion 711. The current network map is saved by user selection 701. The map is made available to external Web sites, such as MySpace, Facebook, and Twitter, etc. through an embedded object tag, for example, a JavaScript object or integrated plug-in module, the semantics of which are provided to the user by selecting 702. Thus, an embodiment of the invention includes a social networking aspect as it relates to the user and their ability to share their music culture through Facebook, Twitter, or any other social networking sites.

Figure 9A:
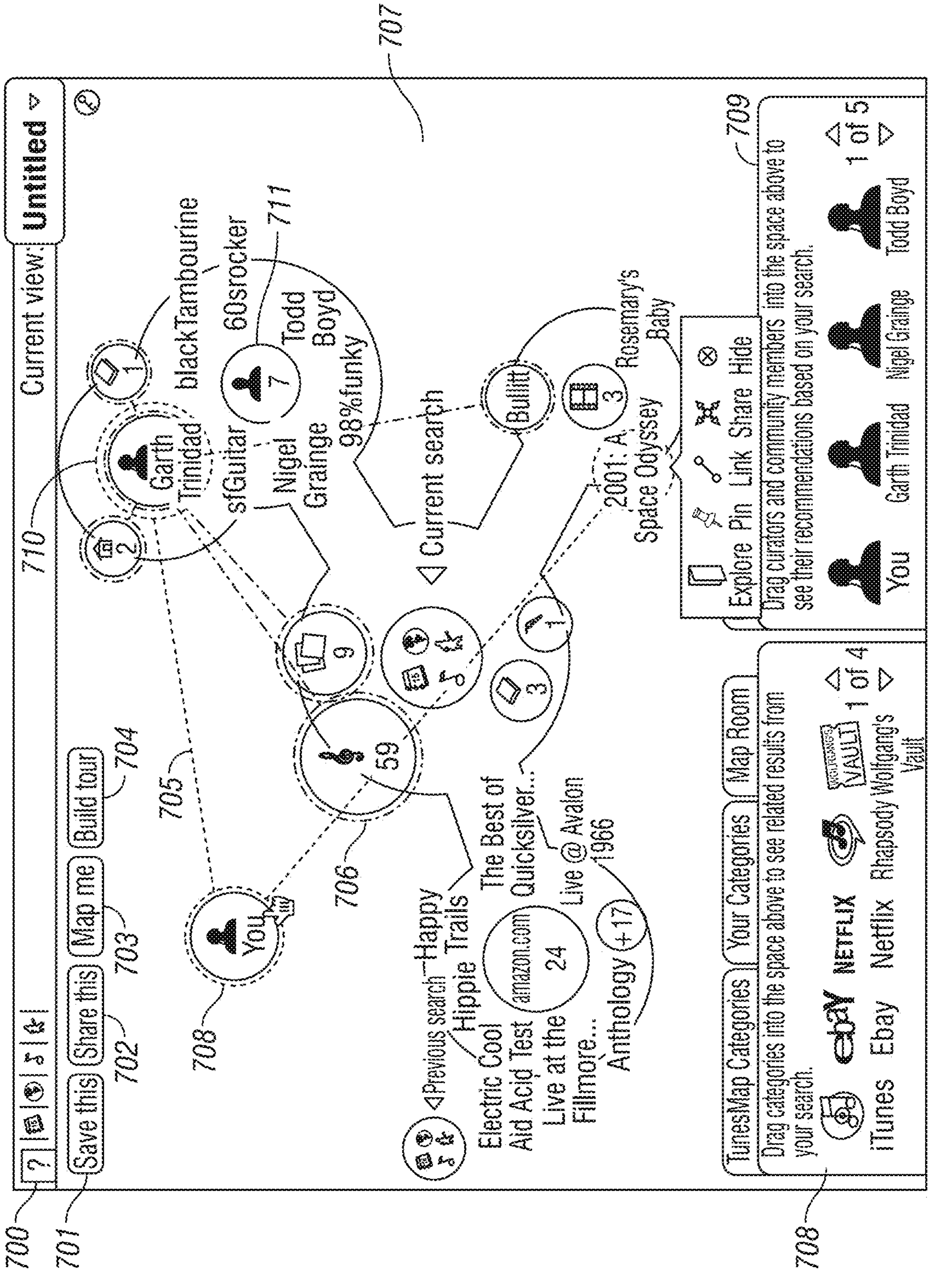
FIGS. 9A-9L illustrate a network relationships view of the primary representations of music, and its history, culture, and related items in the unique and personal perspective of a user according to the invention.
Figure 9B:
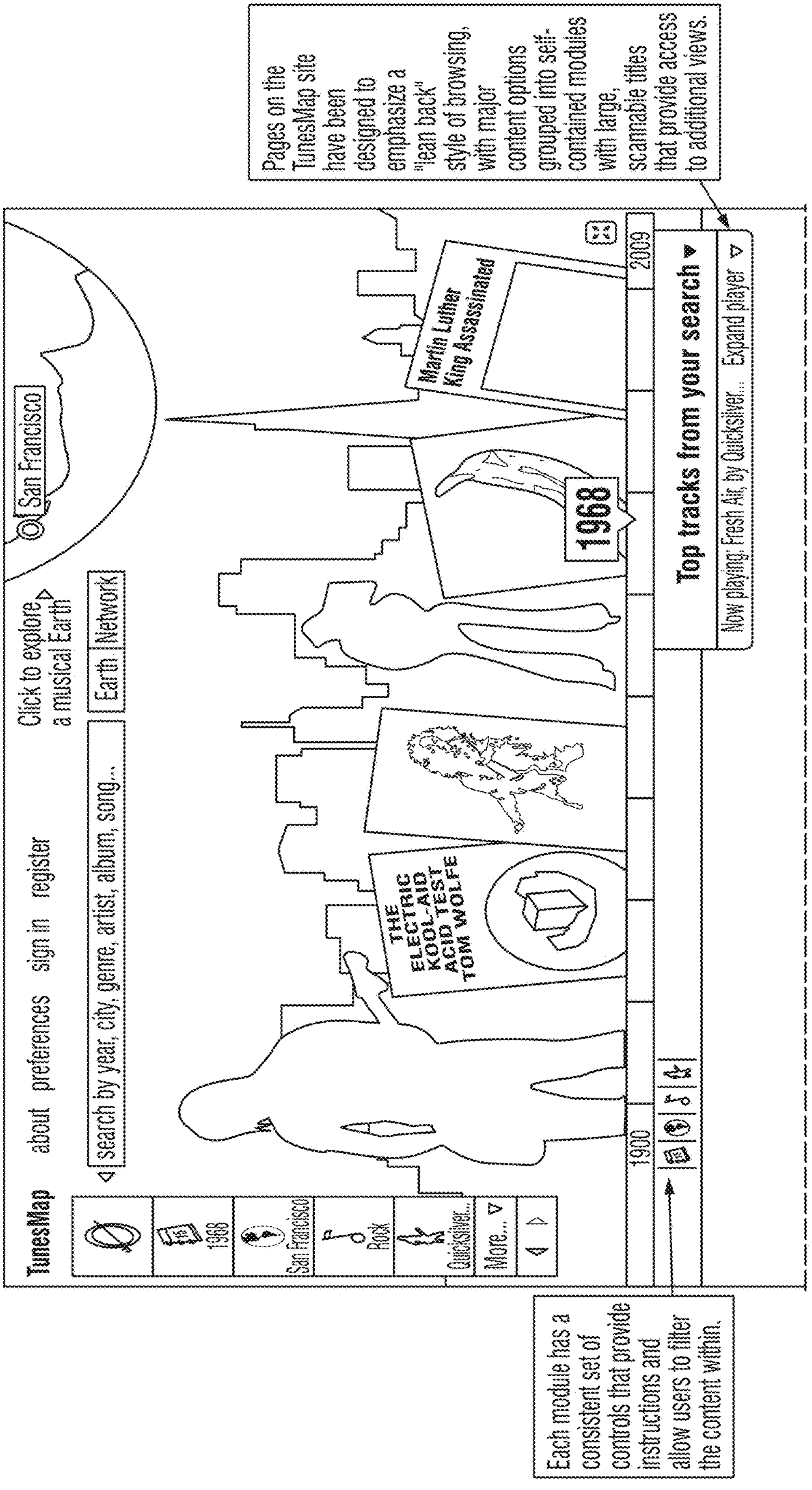
Figure 9B:
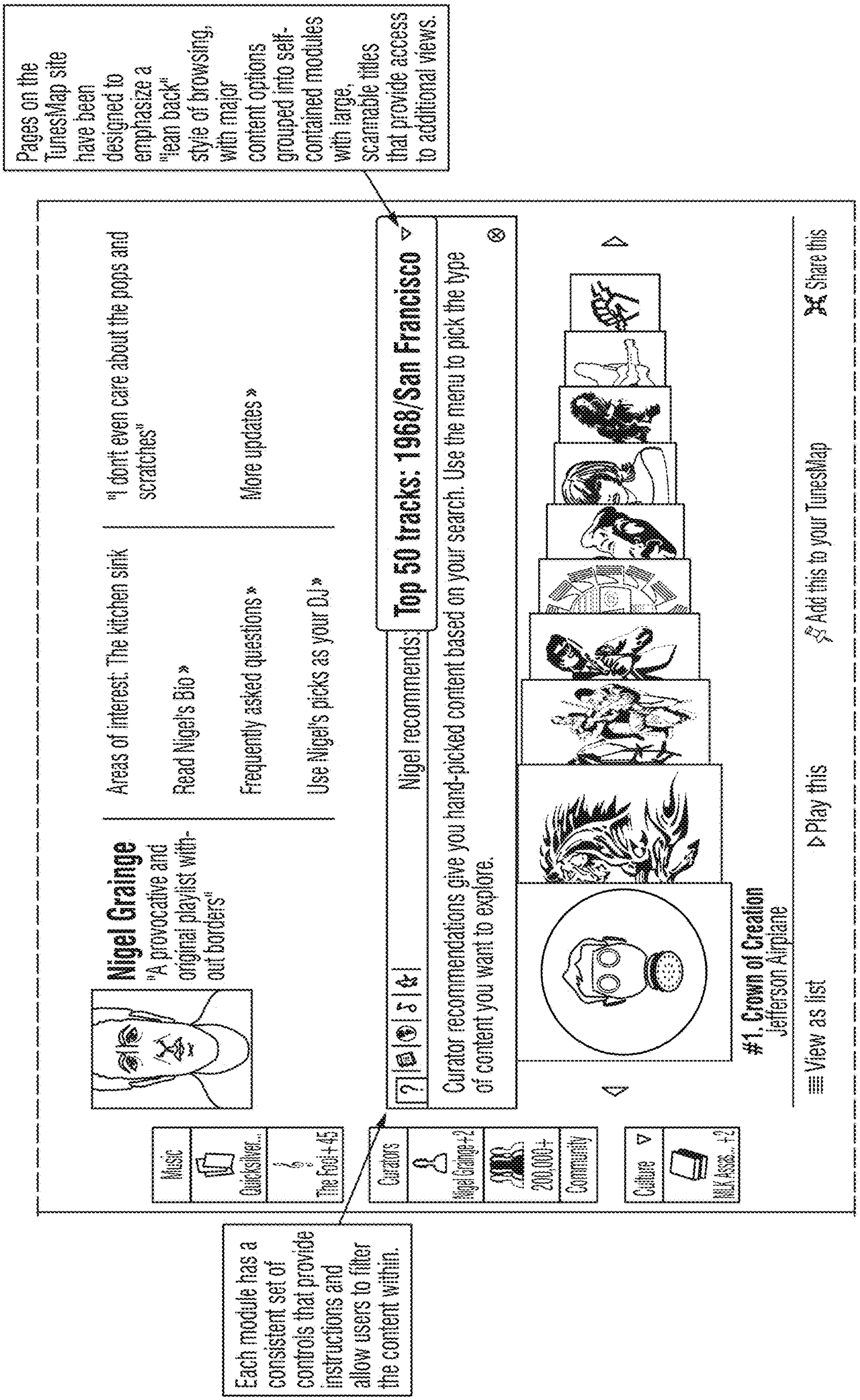
Figure 9B:
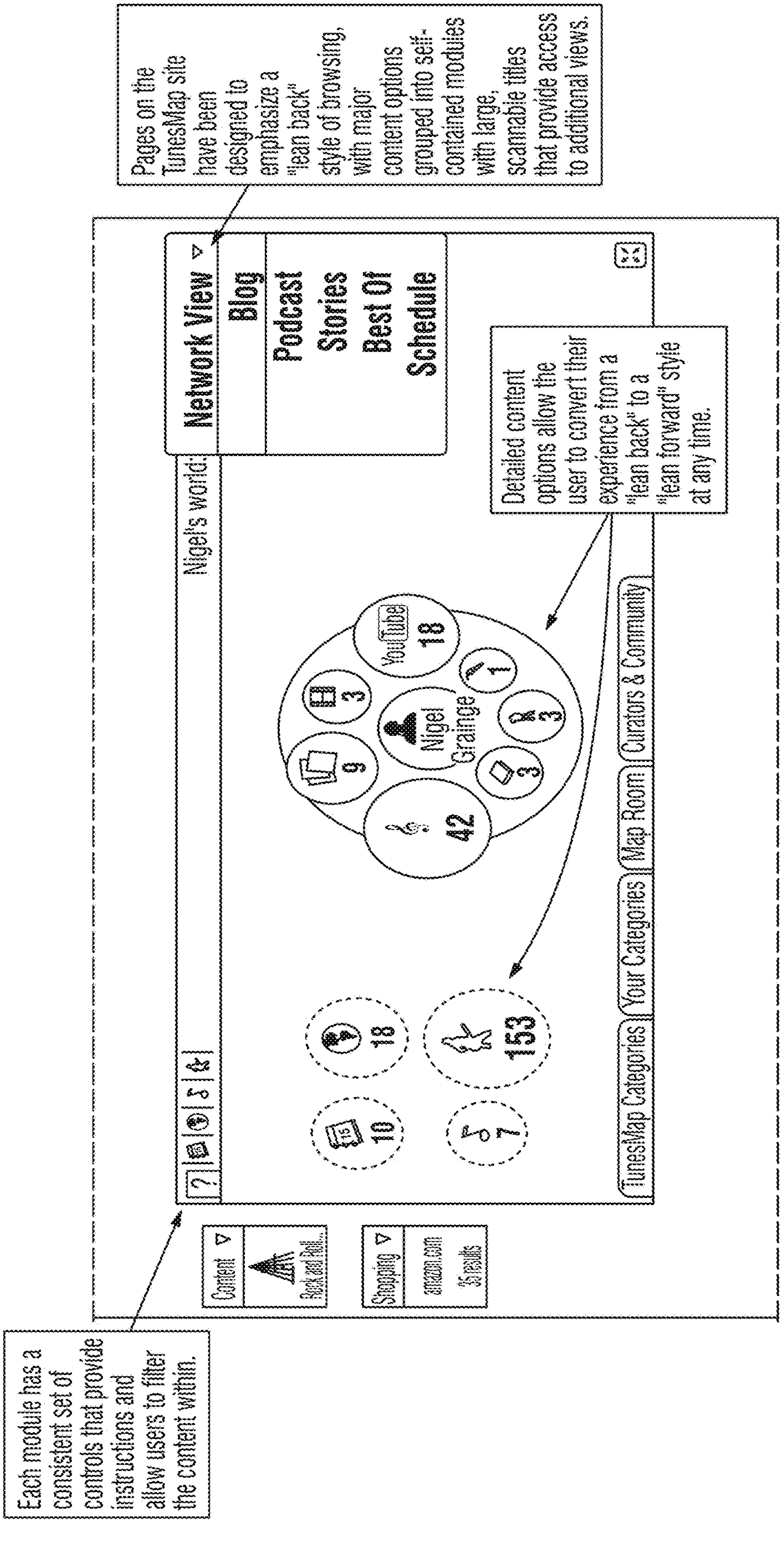
Figure 9B:
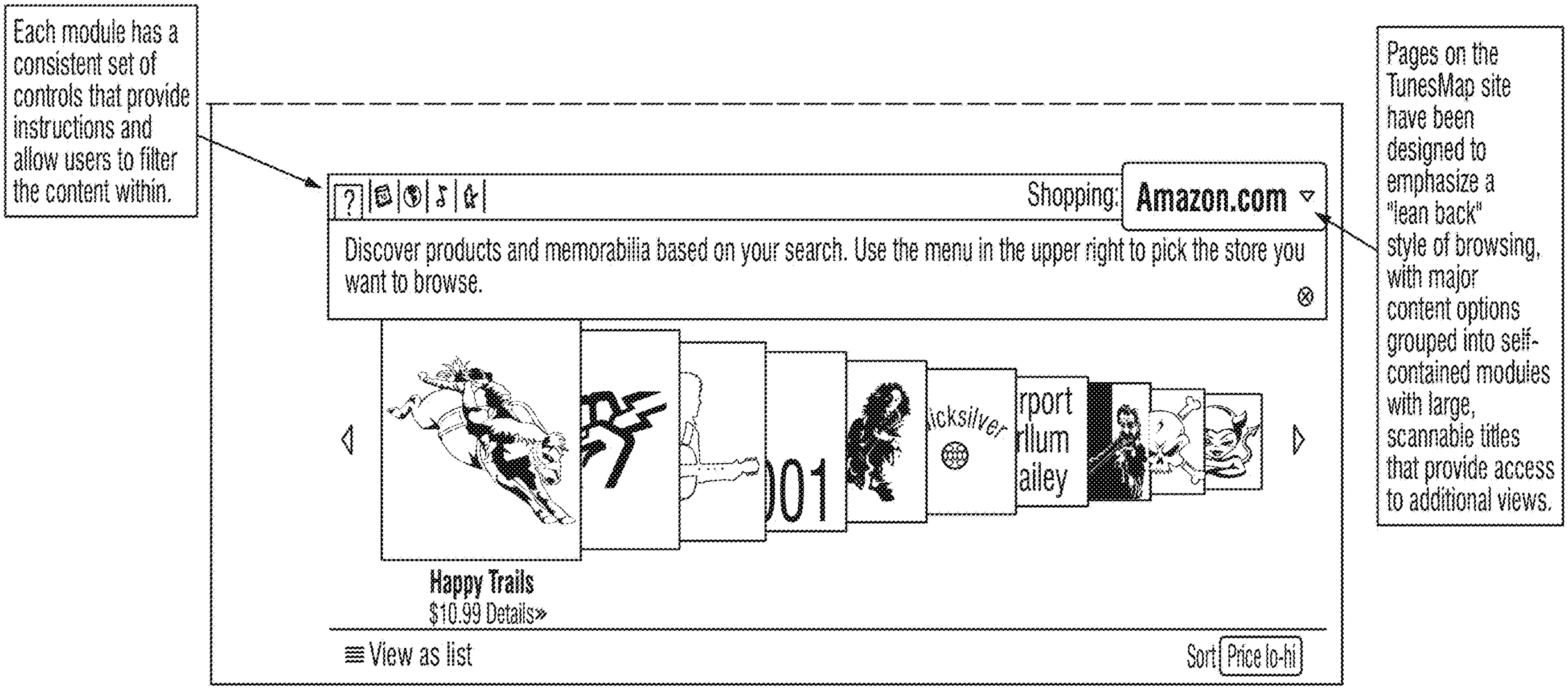
Figure 9C:
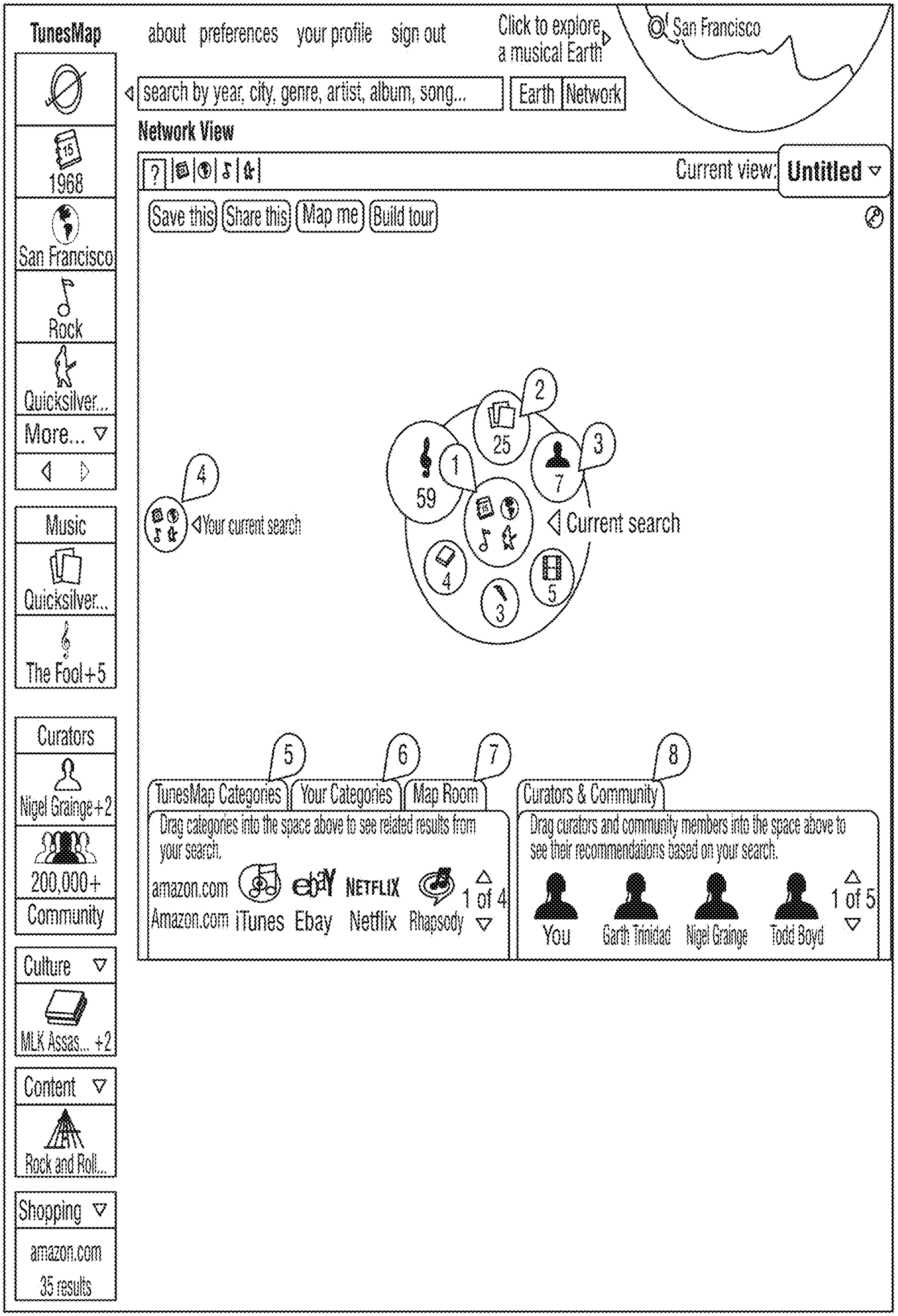

The Network View page presents the user with an interactive diagram of connections between elements in the Map database (see FIG. 9C).

1. Central focus. The diagram is always centered on a specific item; in this case, a cluster of icons representing the user's current search. The large circle behind the central item indicates relationships between the items it touches and the central focus. Double-clicking any item in the diagram makes that item the new central focus.

2. Category cluster. Because even links to a single element within the Map database quickly become too complex to be displayed all at once, category clusters are used to simplify the diagram by grouping related results. For example, this "Albums" cluster indicates that there are nine albums related to the user's current search. The more results a cluster contains, the larger it gets.

3. People cluster. Because Map curators and community members can create their own networks of linked items, their results appear as a special category of cluster with a different look.

4. Previous search. Users can step back through their search history by clicking here; doing so causes that search to move to the center and the category results to update accordingly.

5. Map categories. This tab is a repository of all the default Map categories which can be dragged into the Network View. Most of these correspond to icons in the filter bar.

6. Your categories. This tab contains custom categories specific to a particular user. With this feature, a user can organize their Map however they wish, by creating a category like "Stuff I need to listen to," dragging it to the browser, and adding specific items into it.

7. Map room. This tab contains map views which the user has stored using the "Save this" command above.

8. Curators and community. This tab contains recommended curators and community members relevant to the user's current search. Each can be dragged into the Network View. Note the first community member is "You"—this enables the user to add items in the view to their own Map.

9. Save this. Allows the user to save the current map view to their Map Room for later retrieval.

10. Share this. Allows the user to send the map to a friend.

Figure 9D:
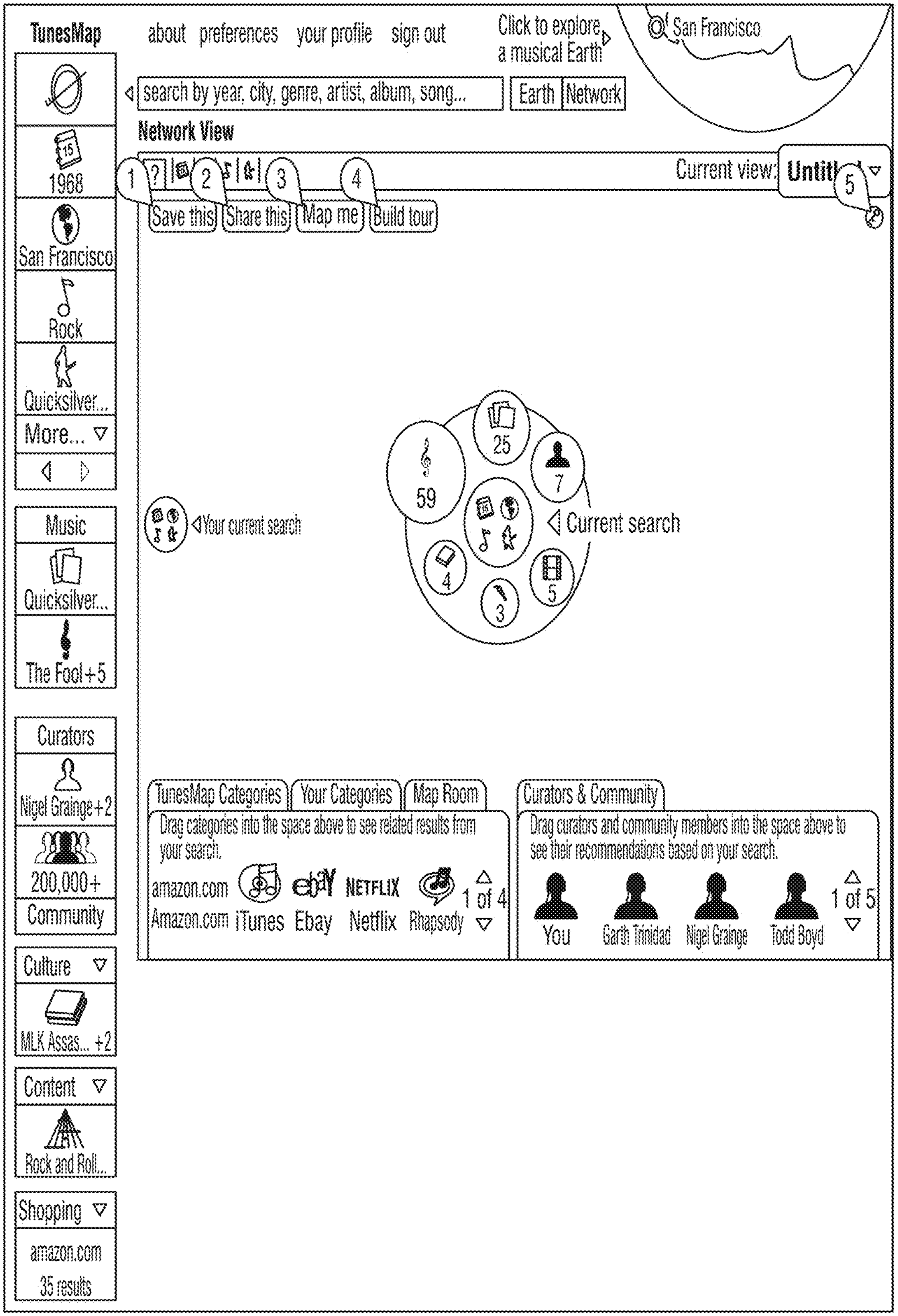

FIG. 9D depicts the following functionality:

1. Save this. Allows the user to save the current map view to their Map Room for later retrieval.

2. Share this. Allows the user to send the map to a friend. The friend does not have to be a Map user.

3. Map me. Shows the contents of the current view plotted on a map.

4. Build tour. Allows the user to construct a linear sequence of nodes as a tour which other users can play.

5. Key. Superimposes text labels that identify all icons in the diagram.

Figure 9E:
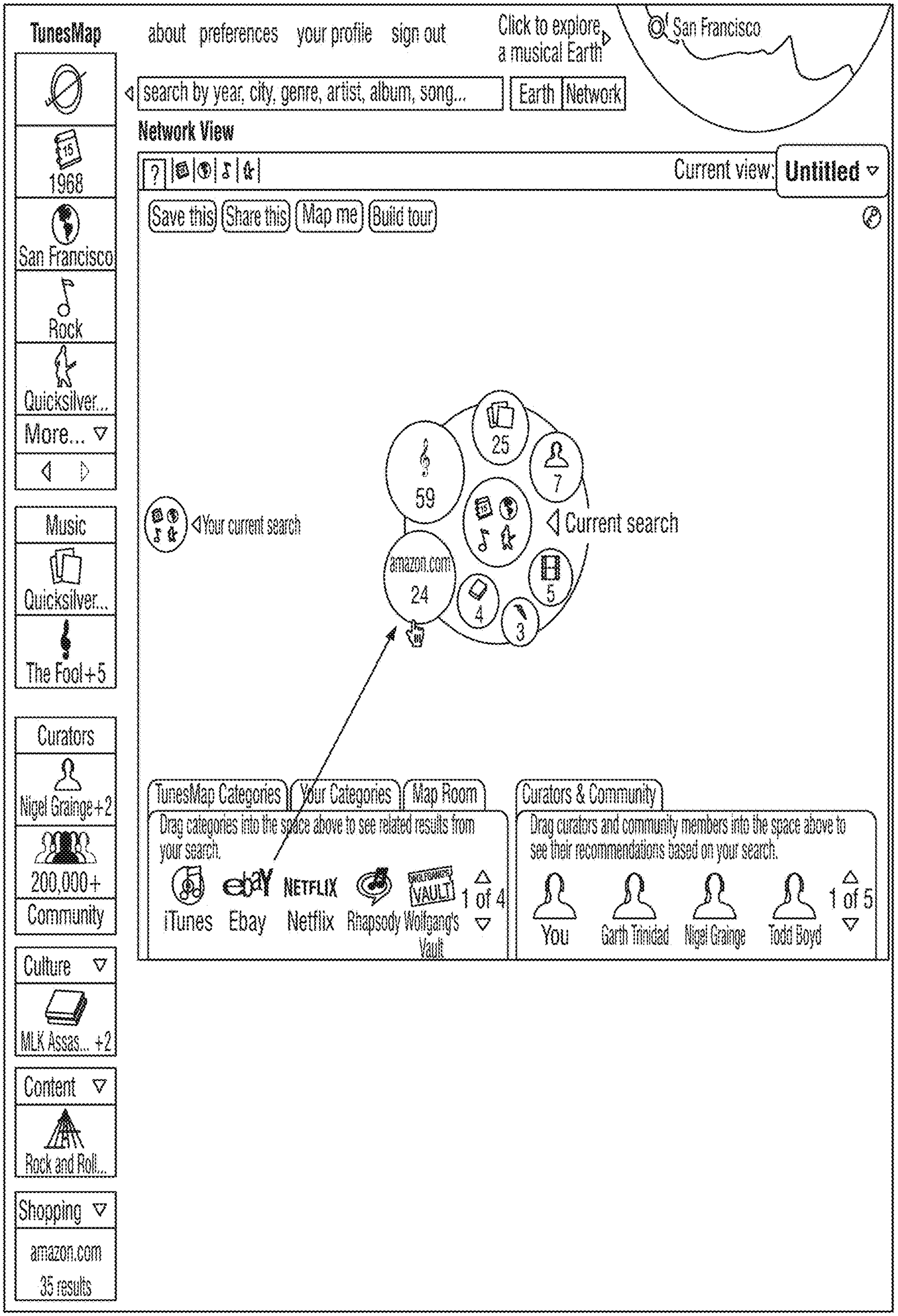

In FIG. 9E, the user is curious about Ebay.com products related to a current search, and so has dragged the Ebay.com icon out of the Map Categories tab and released it in the Network View, creating a new category cluster displaying results from the search.

Figure 9F:
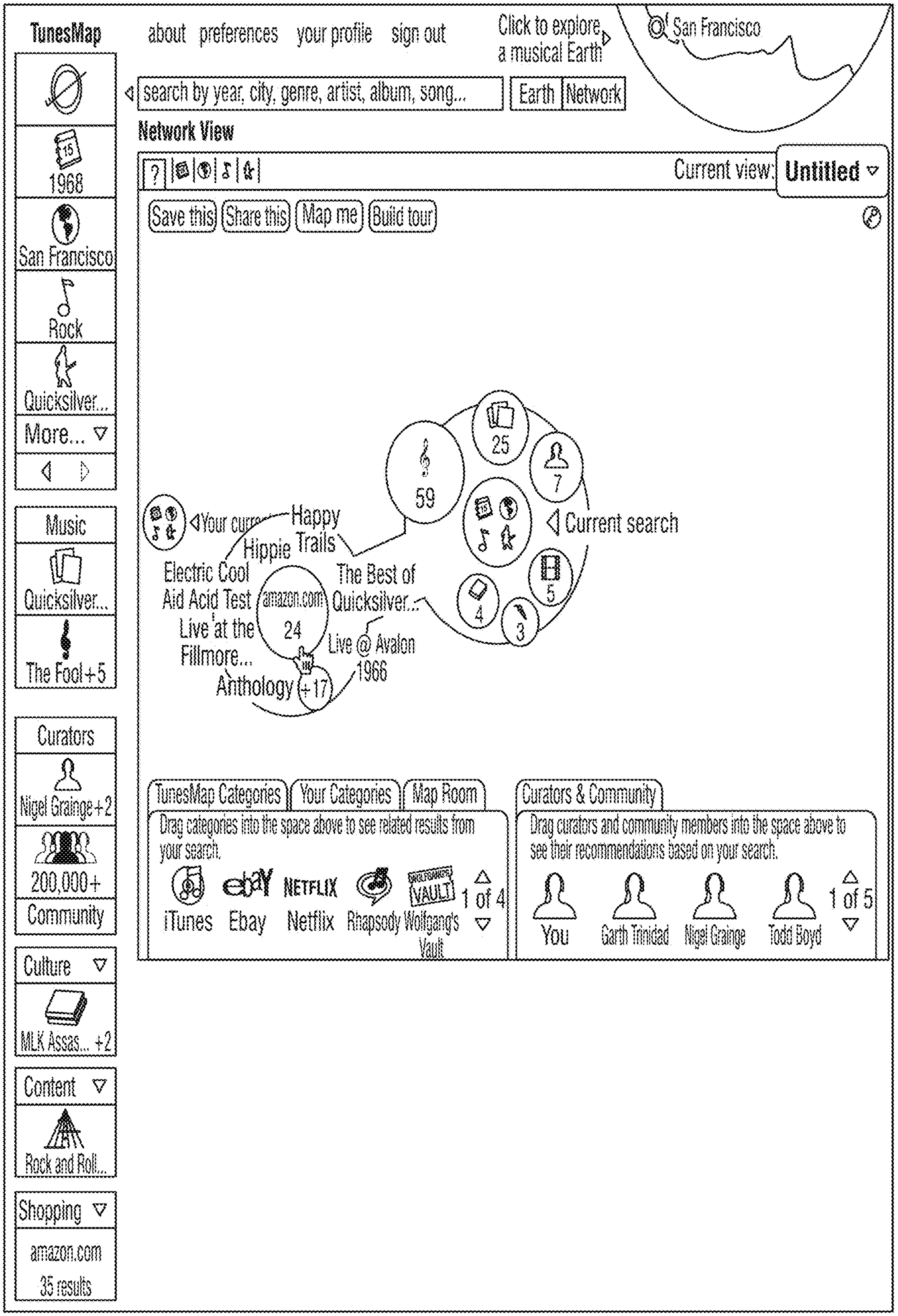

As shown in FIG. 9F, by clicking on the Ebay.com category cluster, the user has expanded it to reveal its contents: a set of related products available from the retailer. Note how the large background circles are connected to indicate that the items they contain are all related to the central focus (the user's current search). If the user wishes to see the complete set of results, he can click on the "+17" bubble to see the items arranged as a list.

Figure 9G:
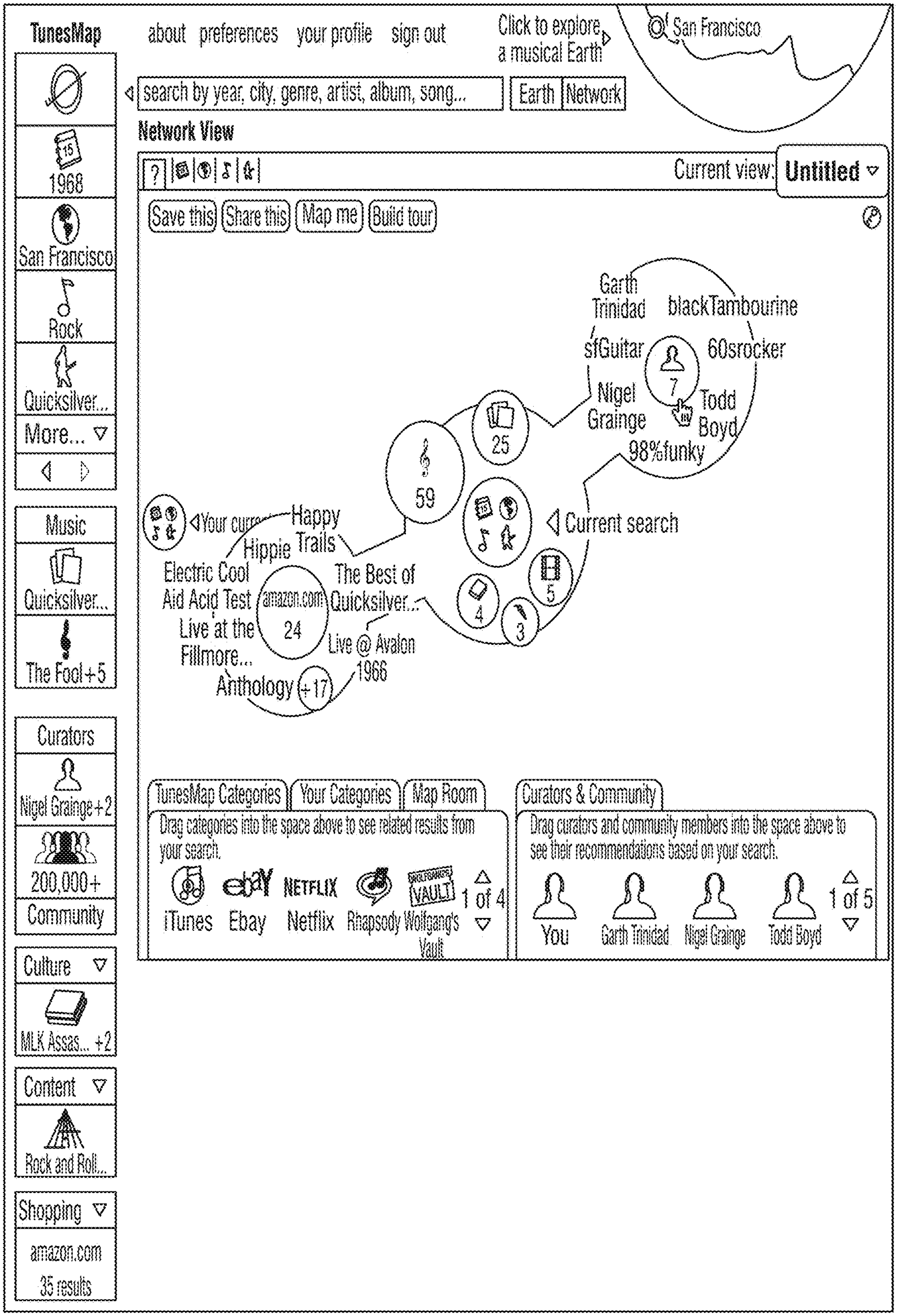
Figure 9H:
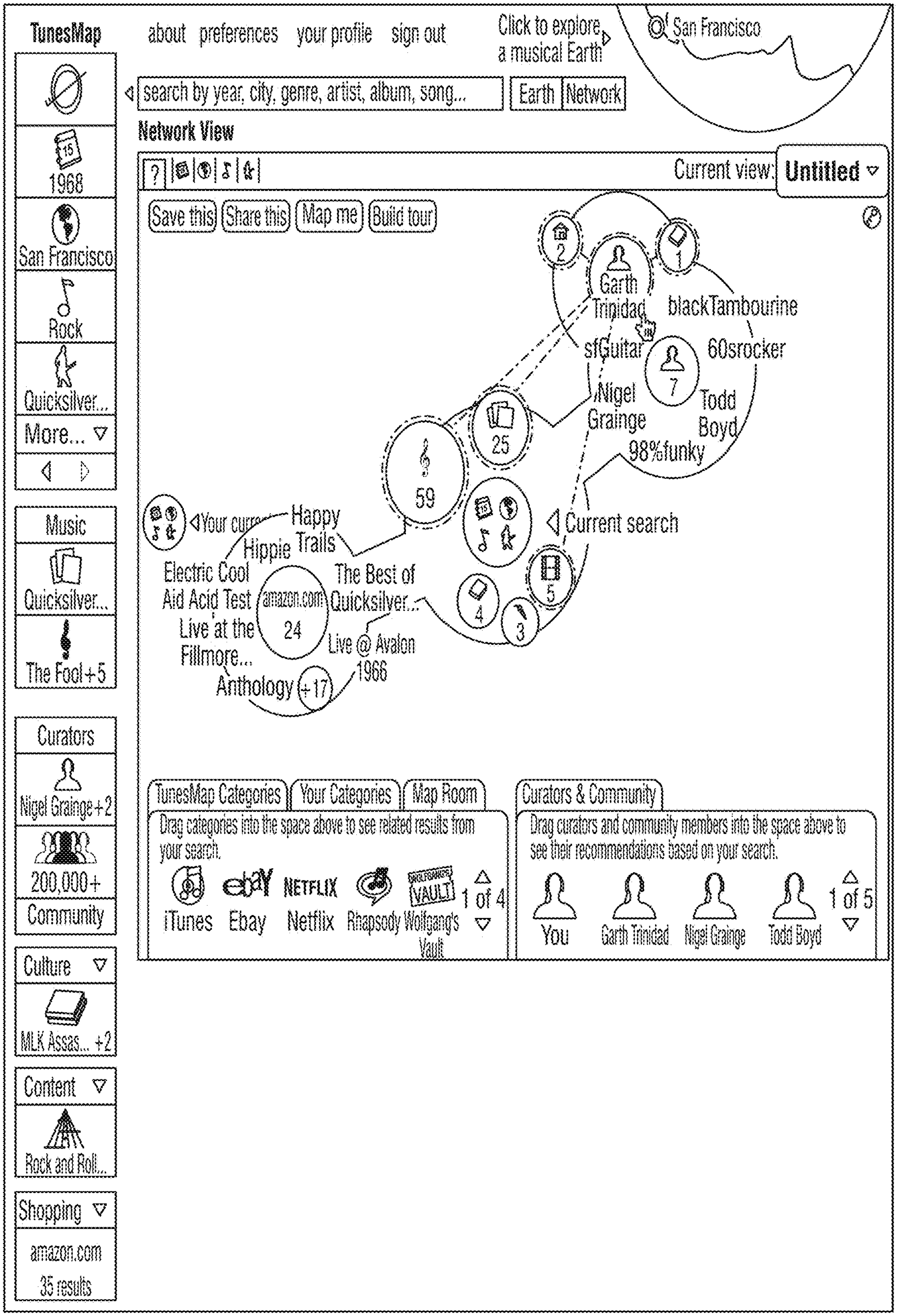

Similarly, the user has clicked on the People cluster to expand it and show curators and community members related to the current search (see FIG. 9G).

Curious about the preferences of a particular curator, the user clicks on his icon to show any of the curator's links that are relevant to the current search. Lines appear connecting the curator to related category clusters (see FIG. 9H).

Figure 9I:
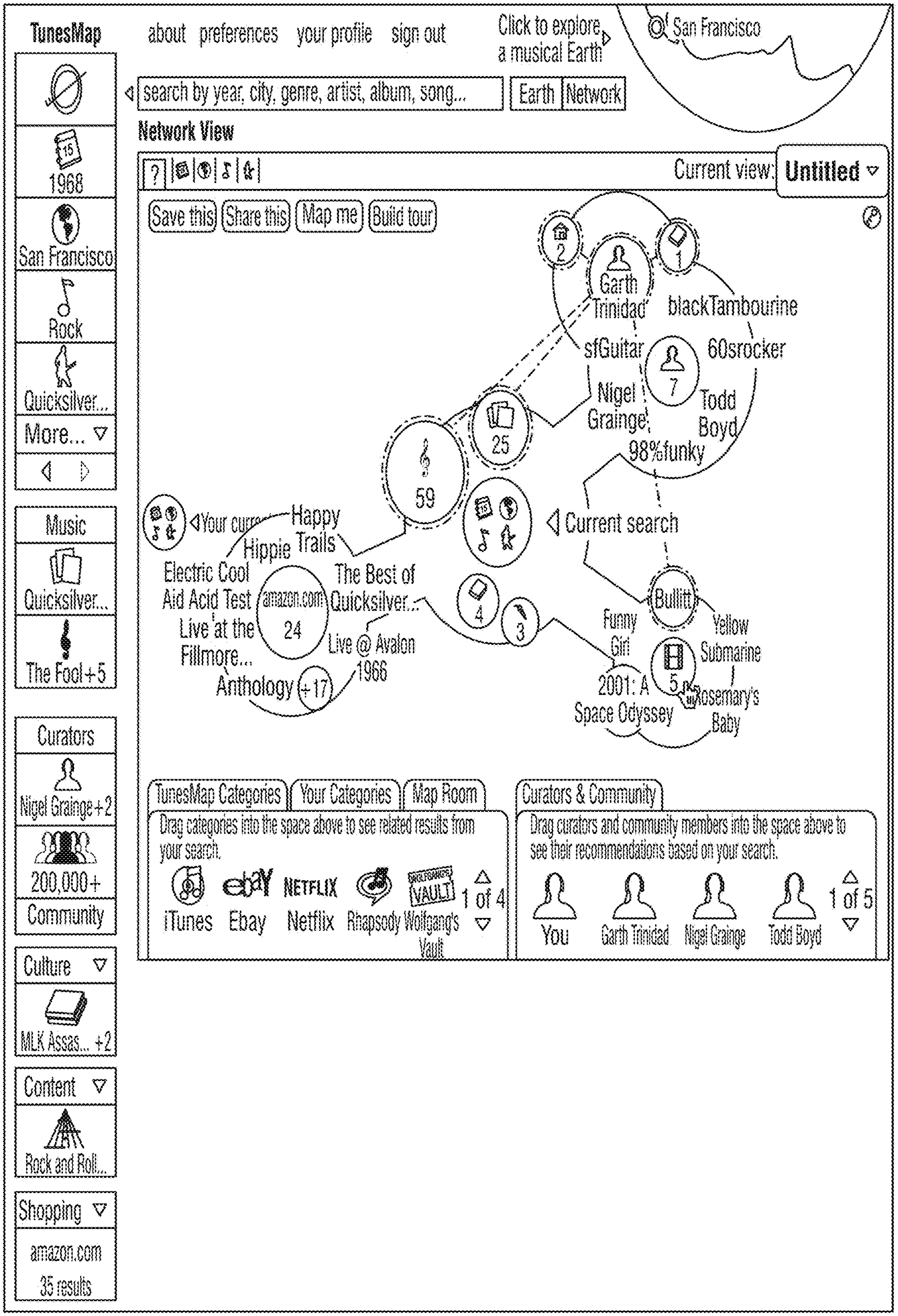
Figure 9J:
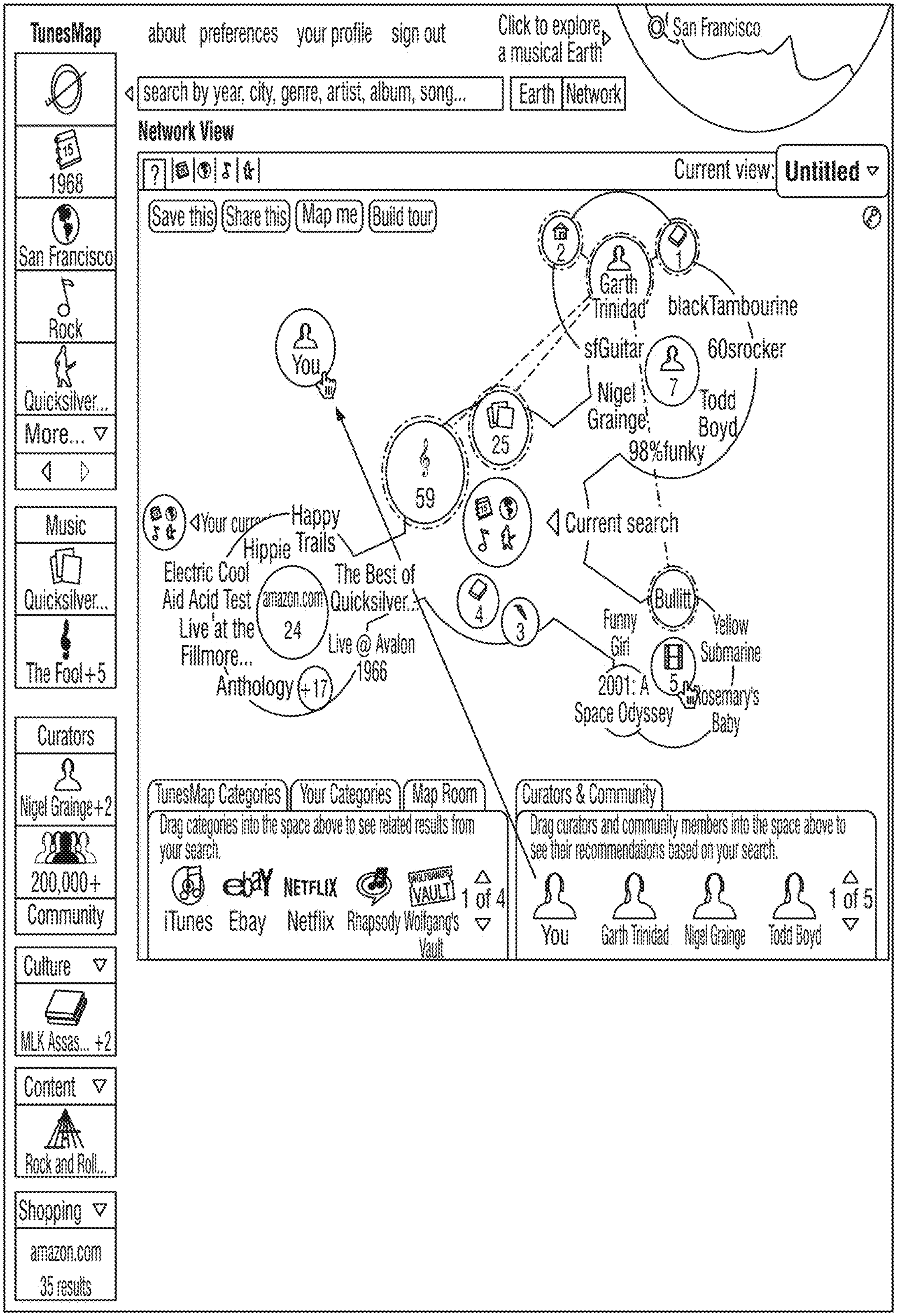
Figure 9K:
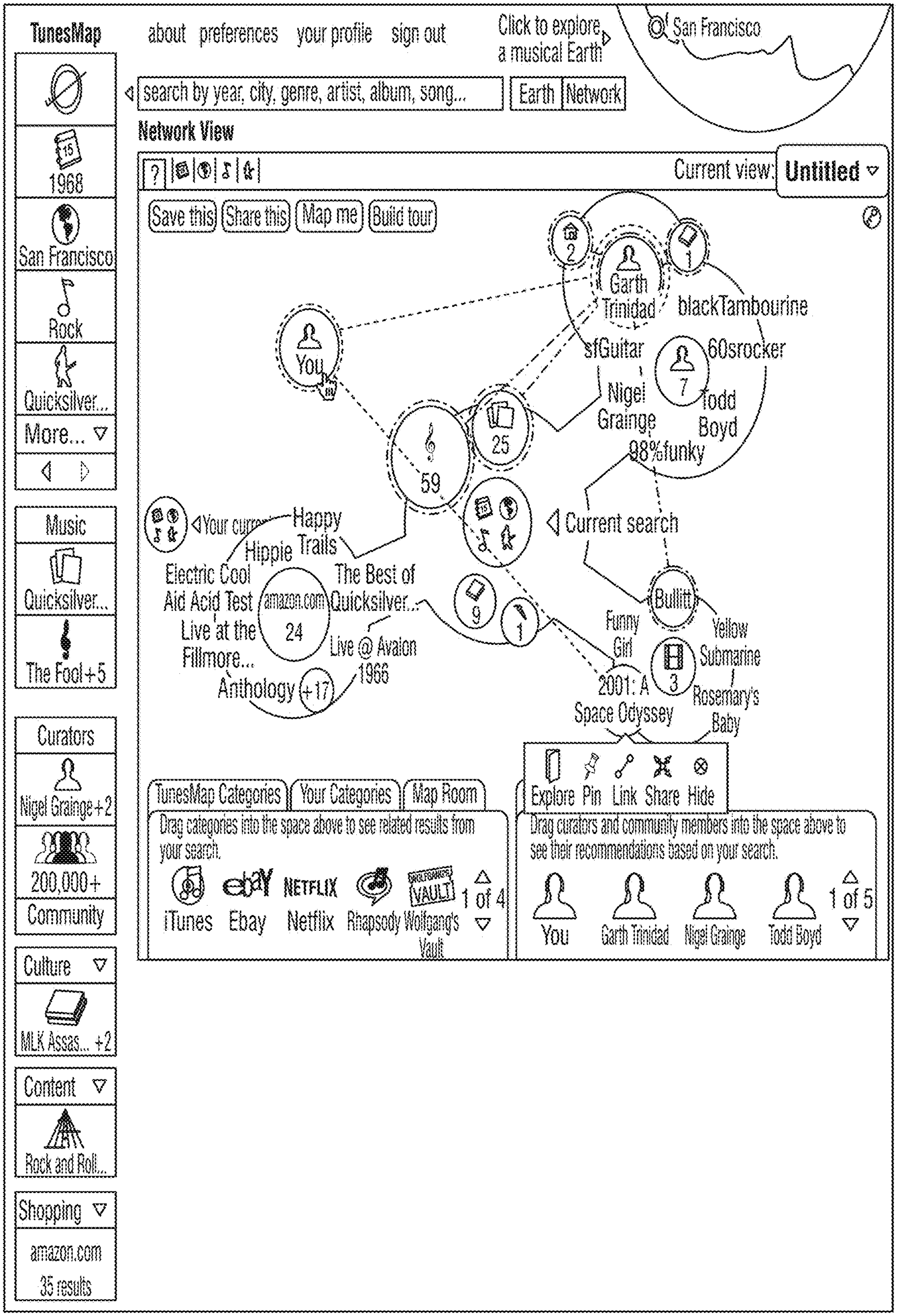

In FIG. 9*i*, the user has clicked on the Film and TV icon to expand it and reveal which of the three movies the curator has a special affinity for.

Now, the user is ready to make some additions to their own Map. To get started, he drags the "You" icon out from the Curators and Community tab and drops it in the Network View. Because the user has not yet created any links to any of the visible elements, no connecting lines are drawn (see FIG. 9J).

Making use of the pop-up options that appear when he rolls over an item, the user selects the "Link" option, clicking and dragging from the item back to the "You" icon to establish a link—and adding that item to his Map. The user thinks that Garth has good taste, so he adds him to his map, as well as one of his favorite films (see FIG. 9K).

The user wants to explore Garth's map further, so he double-clicks on Garth's icon to make him the central focus. Because the Network View is now no longer being filtered by the current search, the number of results shown expands greatly. From here, the user can expand specific categories at will, or return to the current search as the central focus by clicking the "Your current search" item on the left.

Figure 9L:
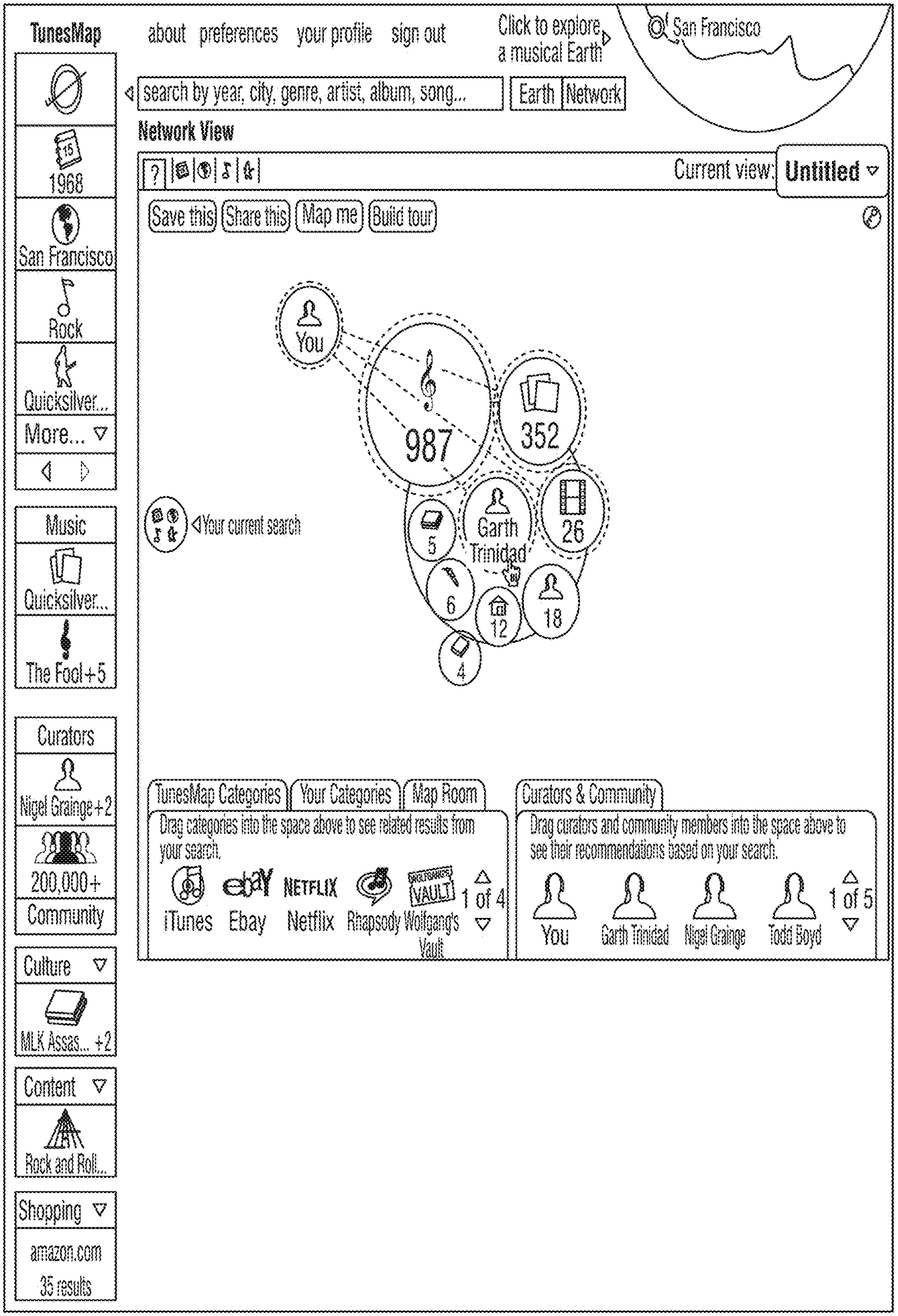

In this way, the user can explore the Maps of others while also constructing is own (see FIG. 9L).

Curator Abstraction

Figure 10A:
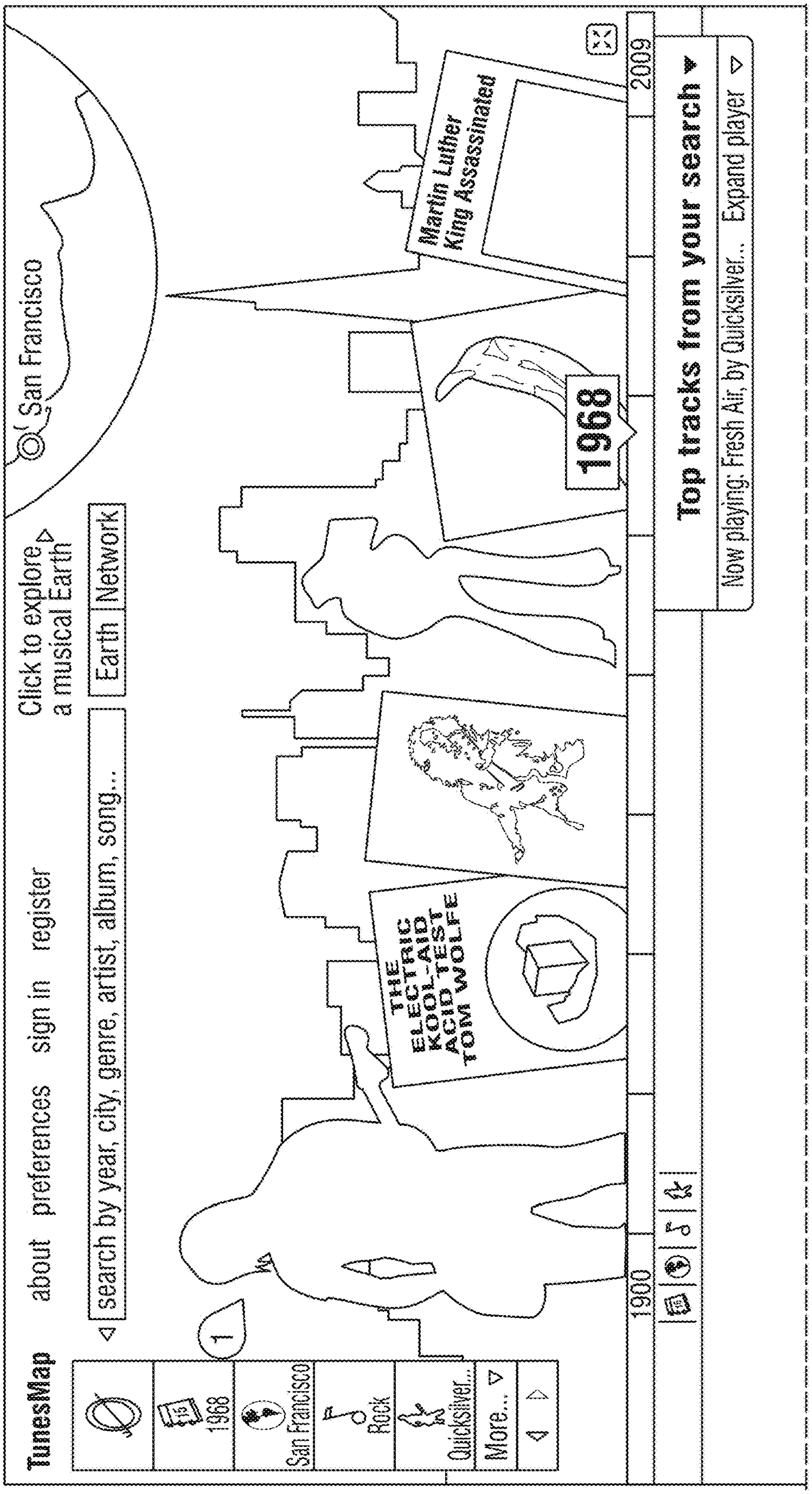
Figure 10A:
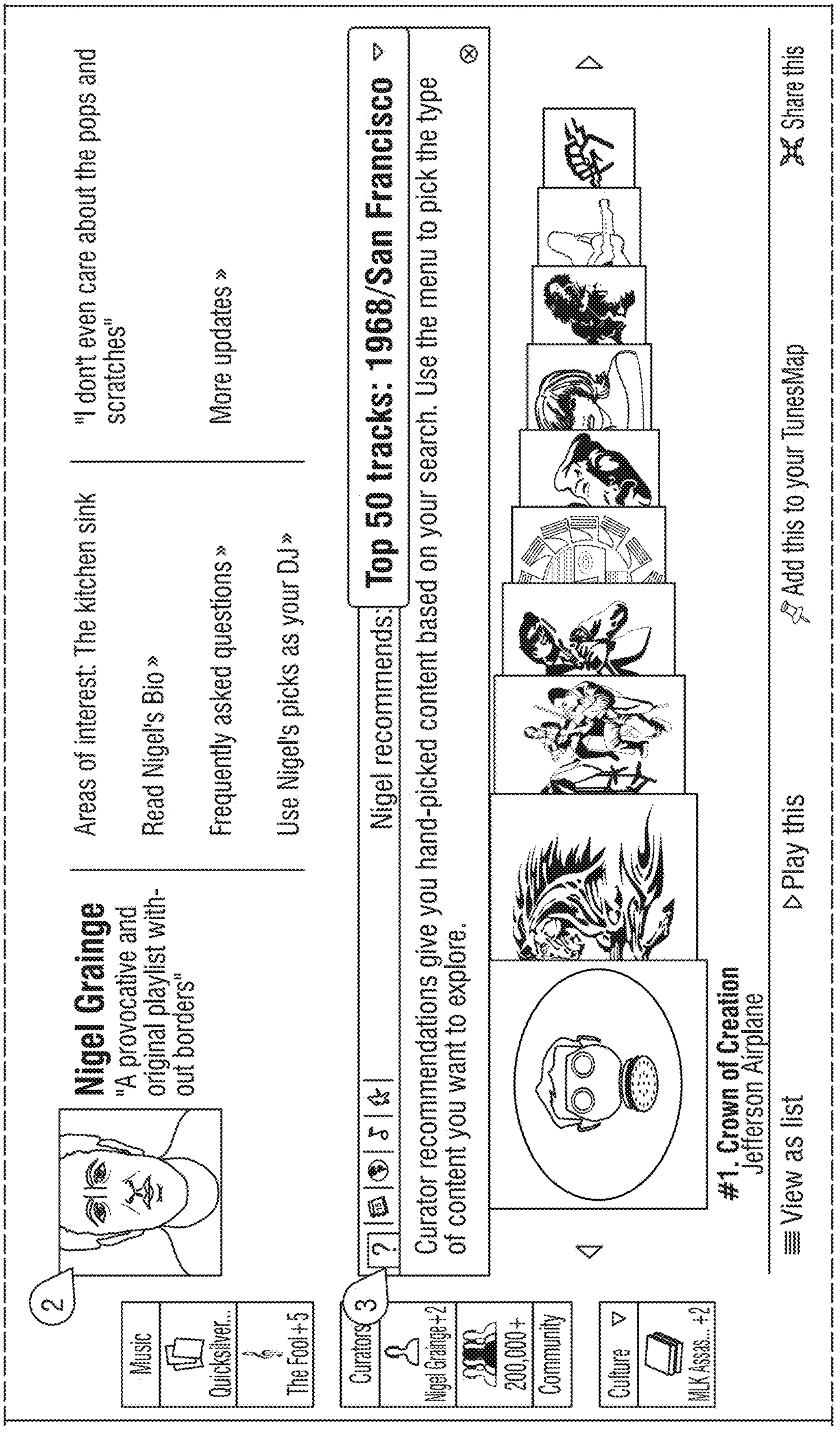
Figure 10A:
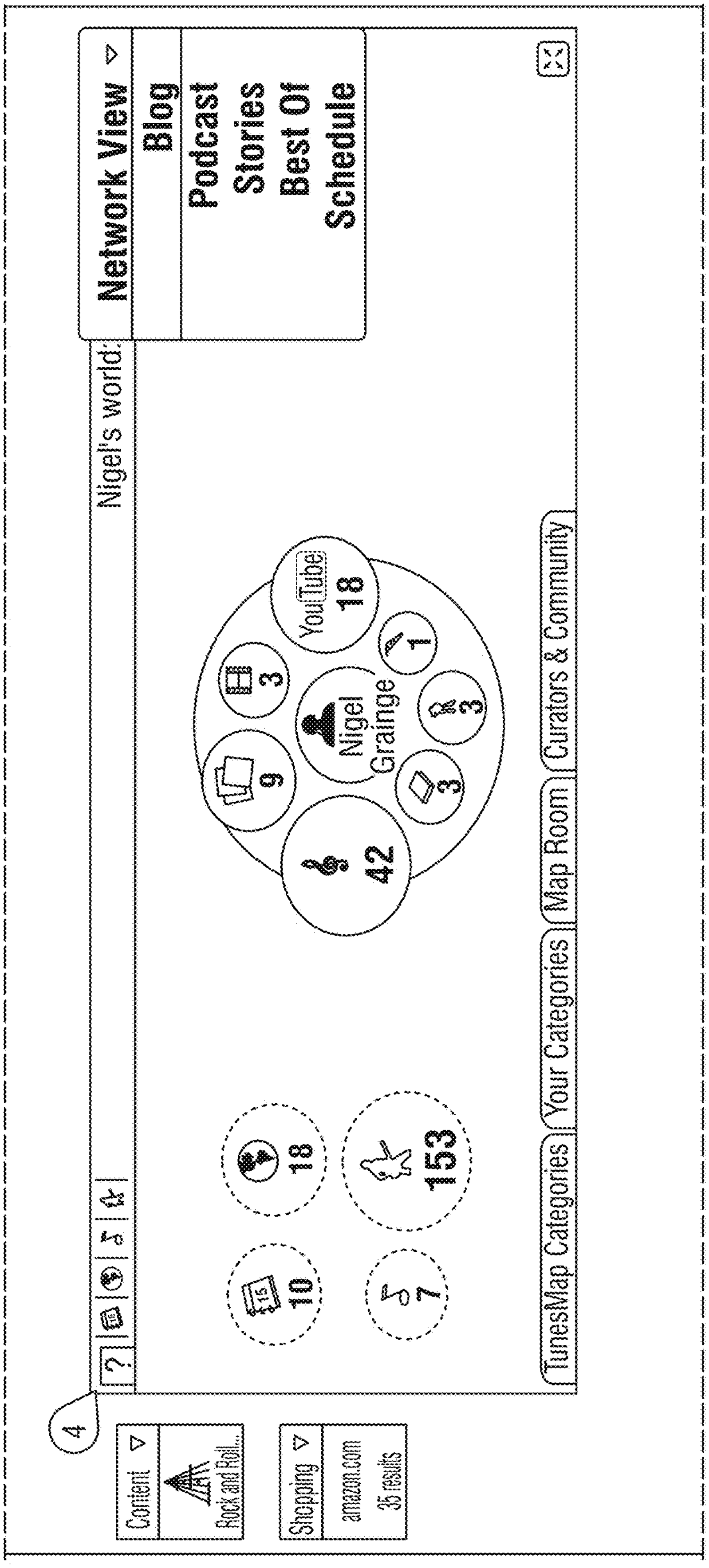
Figure 10A:
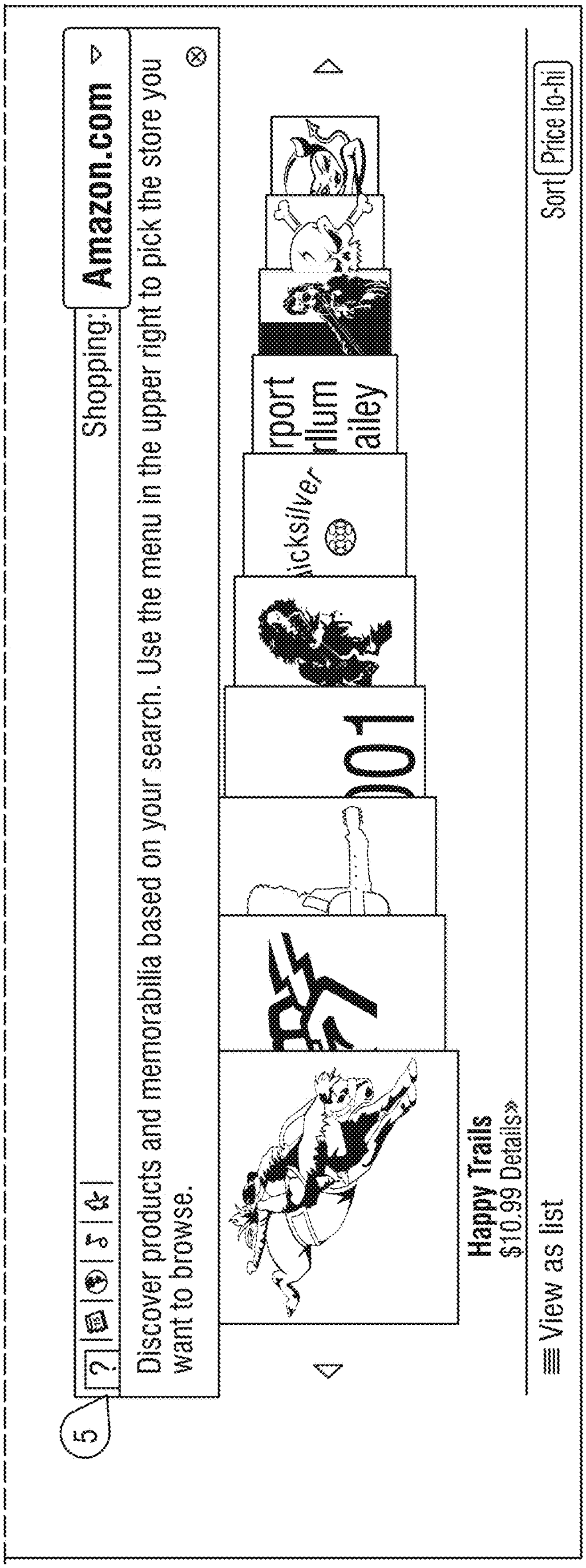

FIG. 10A depicts the following functionality:

1. Mini Mural. This compact version of the collage seen on the home page continues to update with images inspired by the user's current search. The search status and music player elements appear here as well.

2. Curator info. This comprises top-line information about the curator, including links to bio, manifesto, and an FAQ.

3. Curator's recommendations—Playlist carousel. Features a selection of curator-selected playlists related to the user's current search. A question mark icon toggles the display of help content for this module, and search status icons show which elements of the user's search have been used to generate the content shown. By clicking on the pull-down menu in the upper right, the user can change the content displayed to various music and video playlists, blog, podcast, and other curator-recommended content. The list is initially displayed in a carousel that shows items receding in space, but can be toggled to display as a standard text list as well. Most lists can be played in the Mural music player, added to the user's own Map, or shared using social networking services.

4. Curator's world—Network View. This interactive diagram shows content from Nigel's Map, i.e. songs, albums, bands, genres, news, art, literature, fashion, movies, etc.,) which is relevant to the user's current search. Specific elements can be explored, saved to the user's own Map, or shared with friends. By clicking on the pull-down menu in the upper right, the user can access other facets of the curator's world, including blog posts, podcasts, and a schedule of events.

5. Shopping. Similar in format to the Playlist module, this area shows products related to the user's current search. It can be viewed as a standard list and sorted by various criteria. Clicking the pull-down menu in the upper right allows access to the various vendors offering products through the system. Rolling over an item shows its details as well as an off-site link to purchase.

Figure 10B:
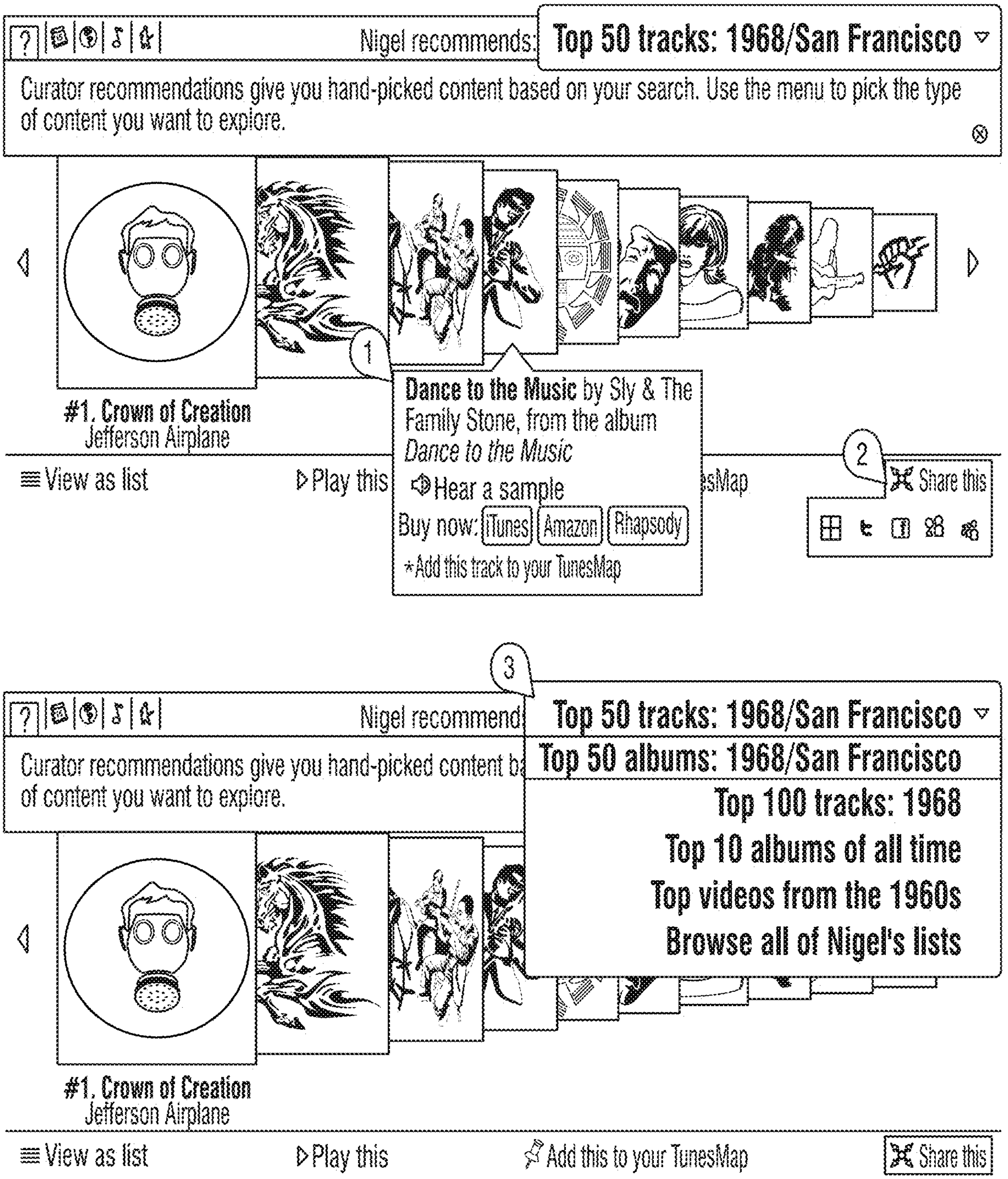

Additional options for the Curator recommendations module (#3 on the Curator page) are shown in FIG. 10B as follows:

1. Track rollover. Rolling over a track entry displays this box, with which the user can listen to a sample of the song, add it to his own Map, buy it, or visit the page for the album.

2. Share this. Clicking on this link brings up a pop-up collection of social networking services through which the user can publish a link to the current curator playlist.

3. Playlist selection. This pull-down menu contains a selection of curator playlists relevant to the user's current search. Note that the Search status icons currently show only Time and Location being used to generate these results; this is adjusted dynamically based upon the number of available matches.

Figure 10C:
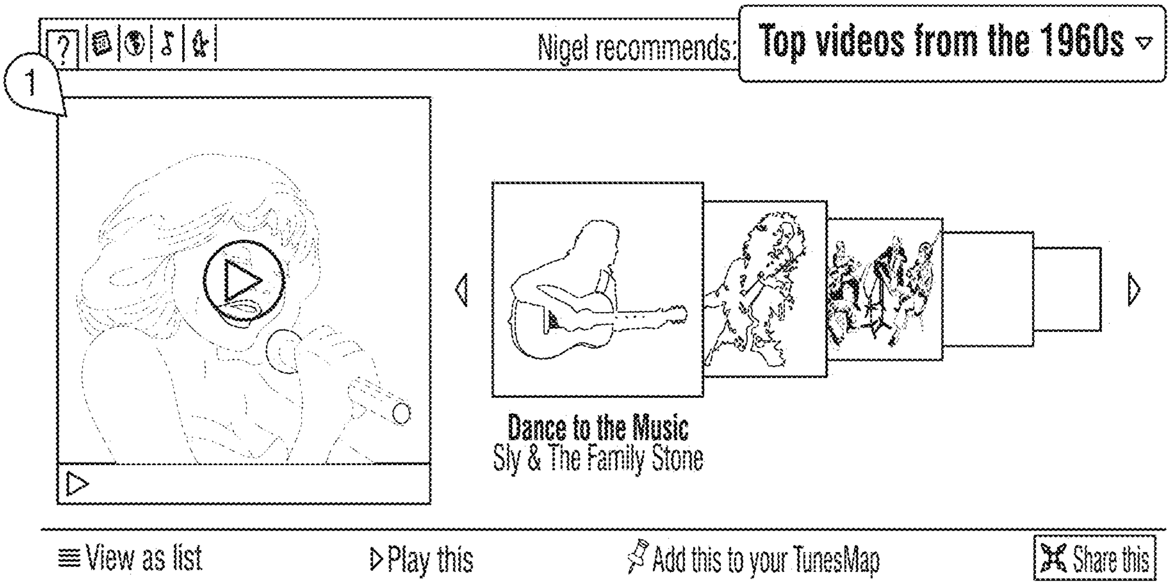

Additional options for the Curator recommendations module (#3 on the Curator page) are shown on FIG. 10C as follows:

1. Video playlist. Here, the module layout is altered to accommodate a video player. Clicking "Play this" here causes the entire playlist to run in its entirety.

Additional options for the Curator's world module (#4 on the Curator page) are shown on FIG. 10D as follows:

1. Content selection. This pull-down menu contains a selection of Curator-originated content the user can explore at will. Content is filtered according to the current state of the Search status icons.

2. Full screen option. Toggles full-screen display of the Network View on and off.

3. Filter bar categories. Because the contents of this view are filtered by the user's current search, as indicated by the icons for Year, Location, Genre, and Artist in the upper-left corner, these dotted-line categories are shown to give the user a sense of the larger scope of the curator's interests. The user is currently searching on 1968-San Francisco-Rock-Quicksilver Messenger Service, but if he were to remove Quicksilver from that search, he would find that Nigel has a total of 153 artists to recommend that are relevant to 1968-San Francisco-Rock. That is why the number 153 appears within the artist category—to indicate that if the user clicks on that category, the Artist filter is "muted" and those results become available.

4. Blog updates. Shows the most recent blog posts by this curator.

Additional options for the Curator's world module (#4 on the Curator page) are shown on FIG. 10E as follows:

1. Podcast. Shows the complete catalog of podcasts by this curator, including links to listen and subscribe.

2. Best Of. Shows featured and/or popular blog posts by this curator.

Additional options for the Curator's world module (#4 on the Curator page) are shown on FIG. 10F as follows:

1. Schedule. Shows the curator's upcoming events.

Figure 10G:
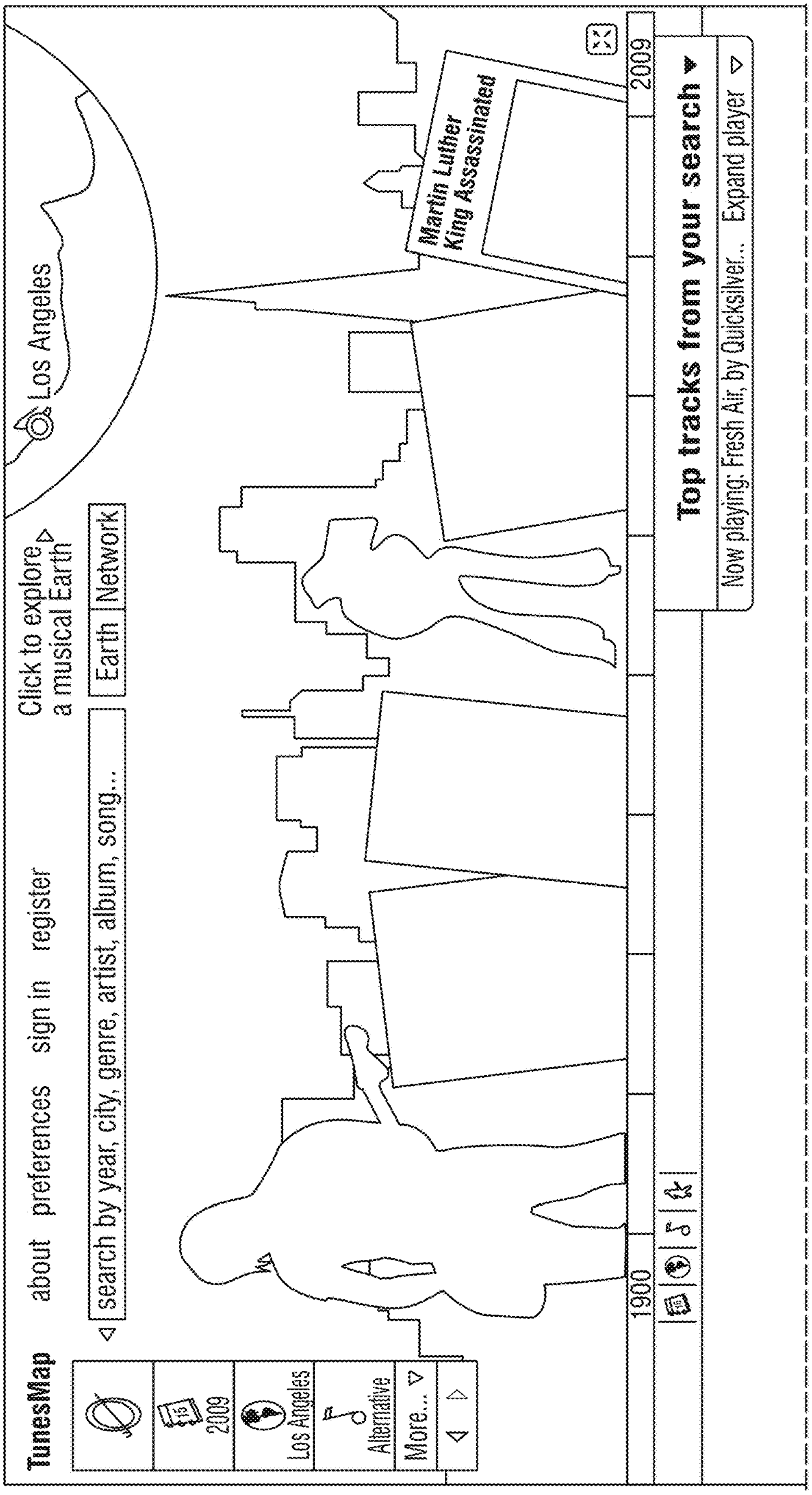
Figure 10G:
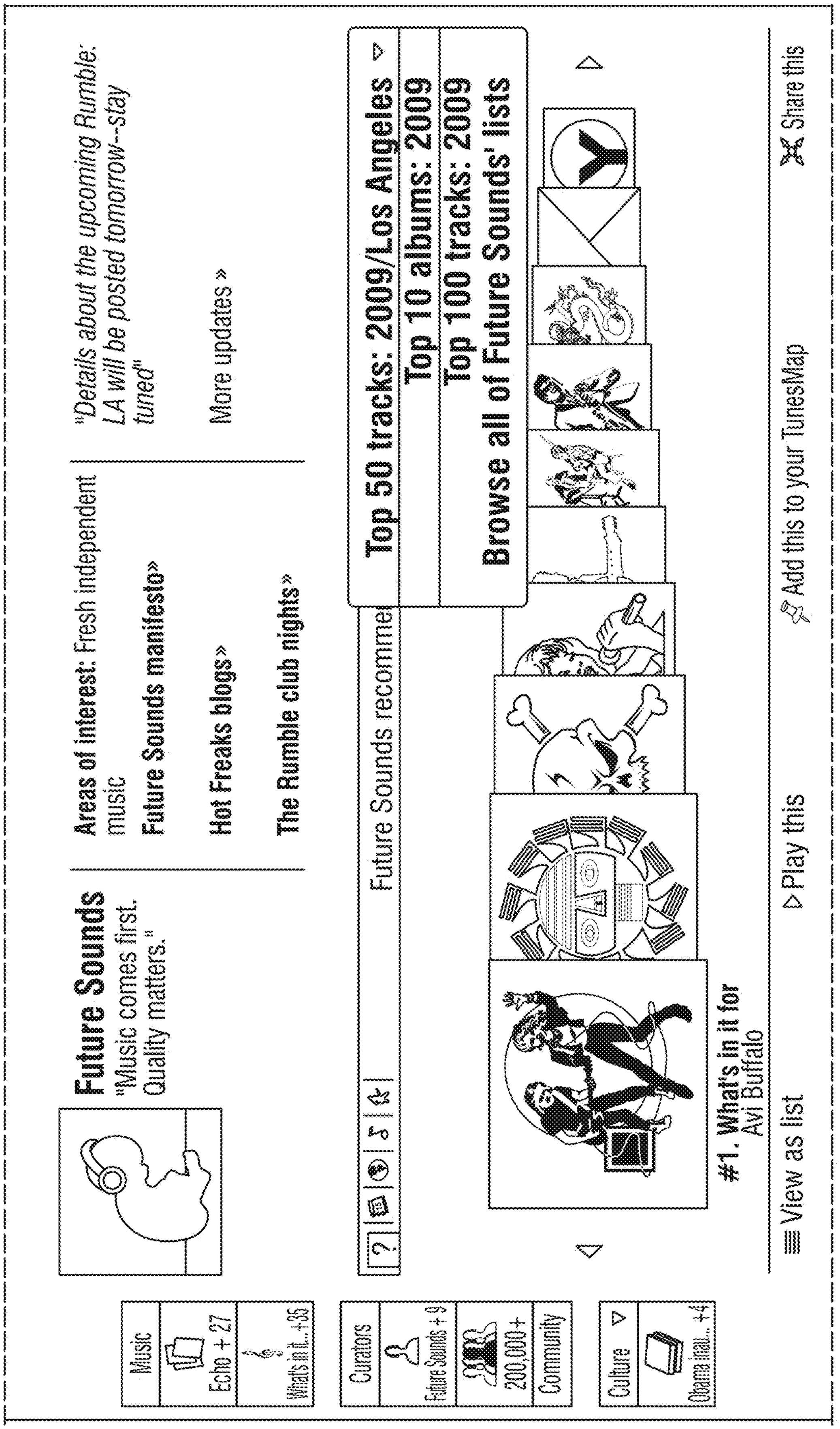
Figure 10G:
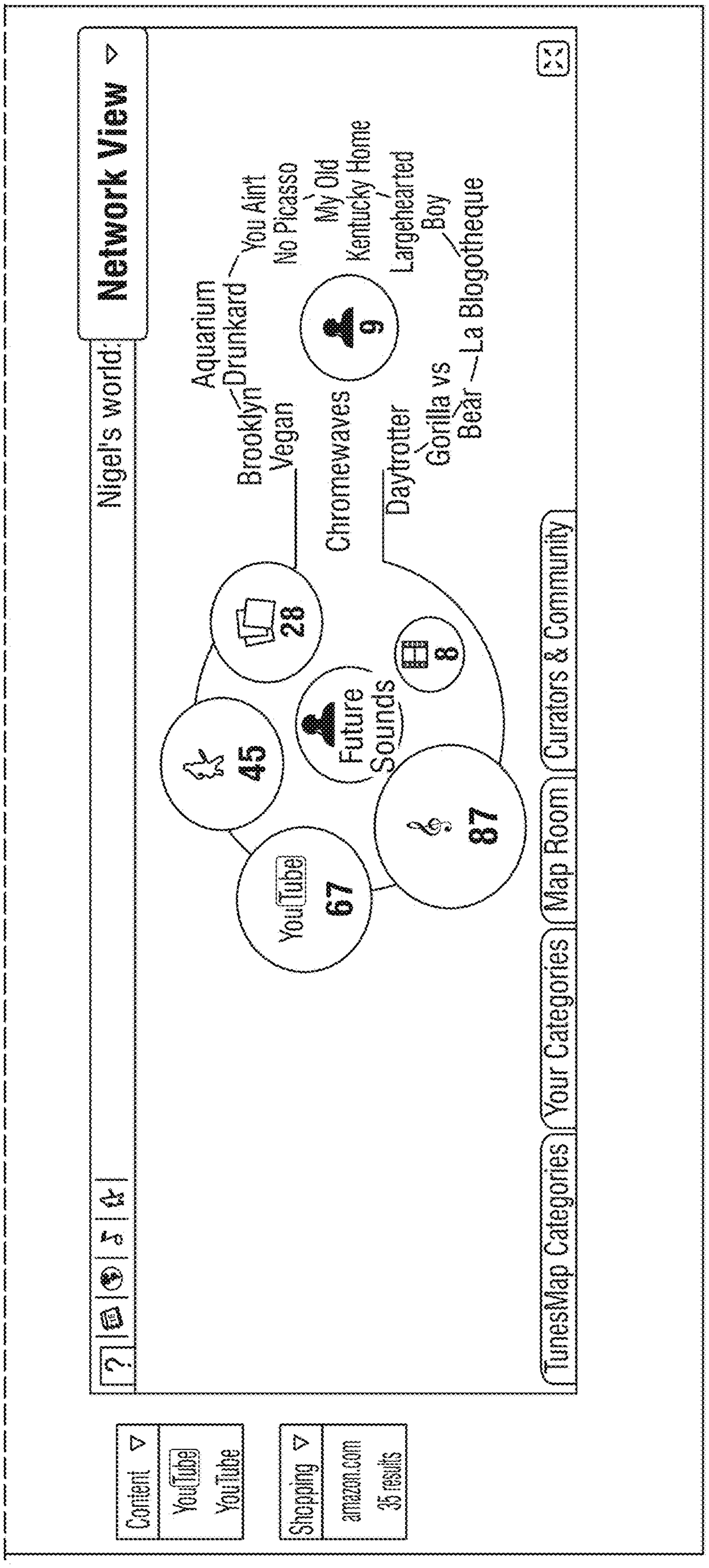

On FIG. 10G, we see a Curator page for the Future Sounds collective of music bloggers, focused on the rising stars of 2009.

Figure 10H:
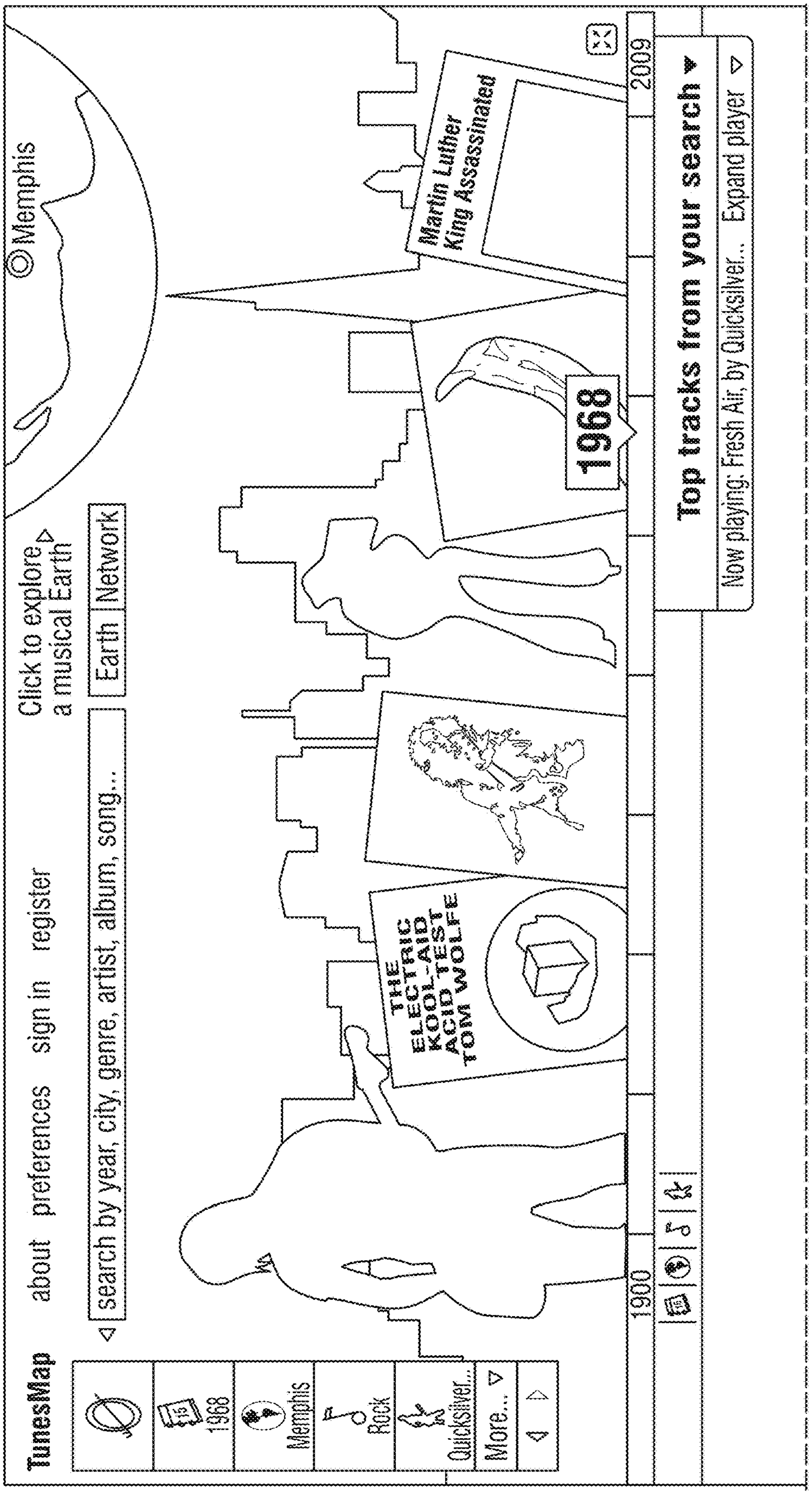
Figure 10H:
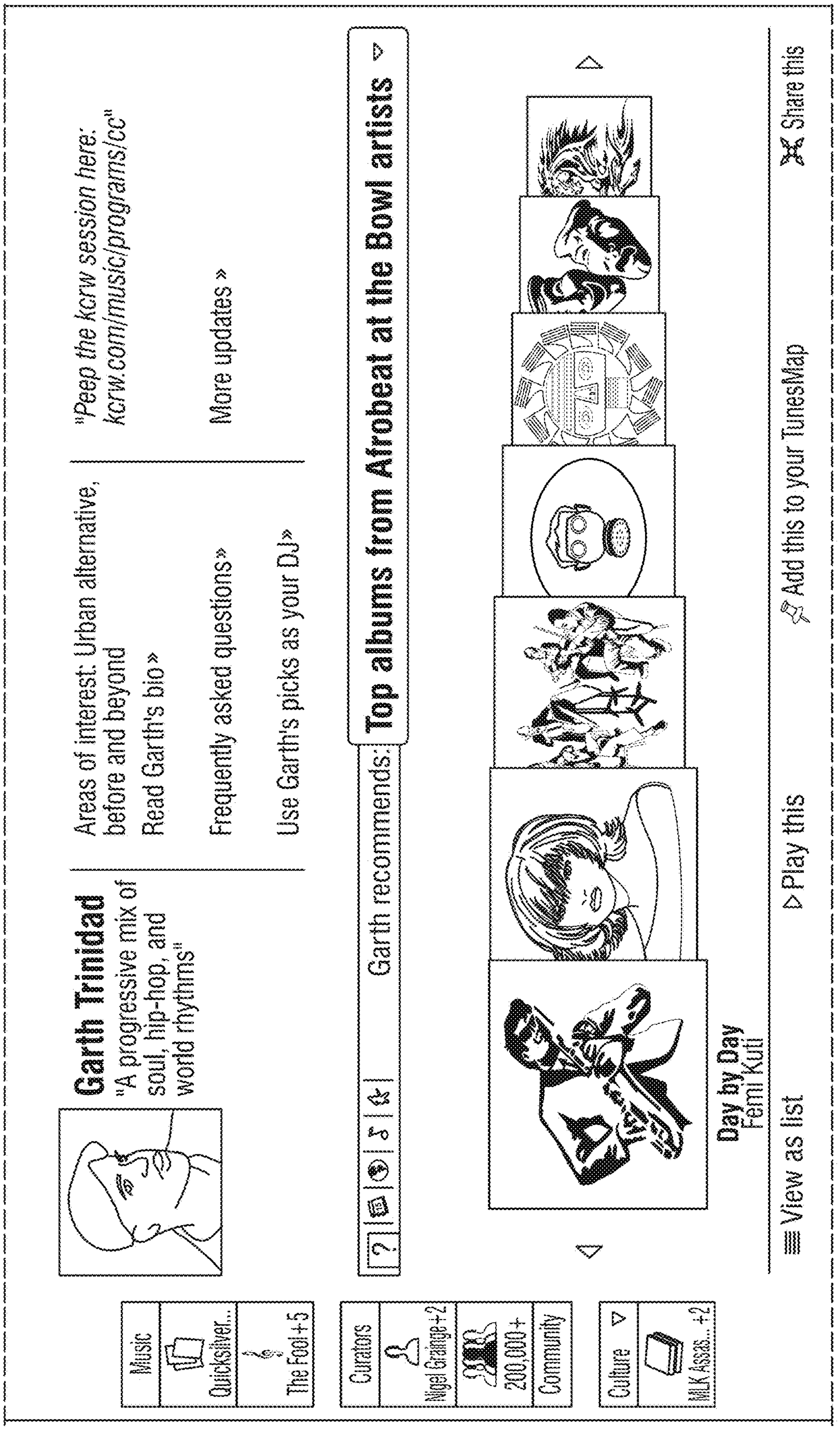
Figure 10H:
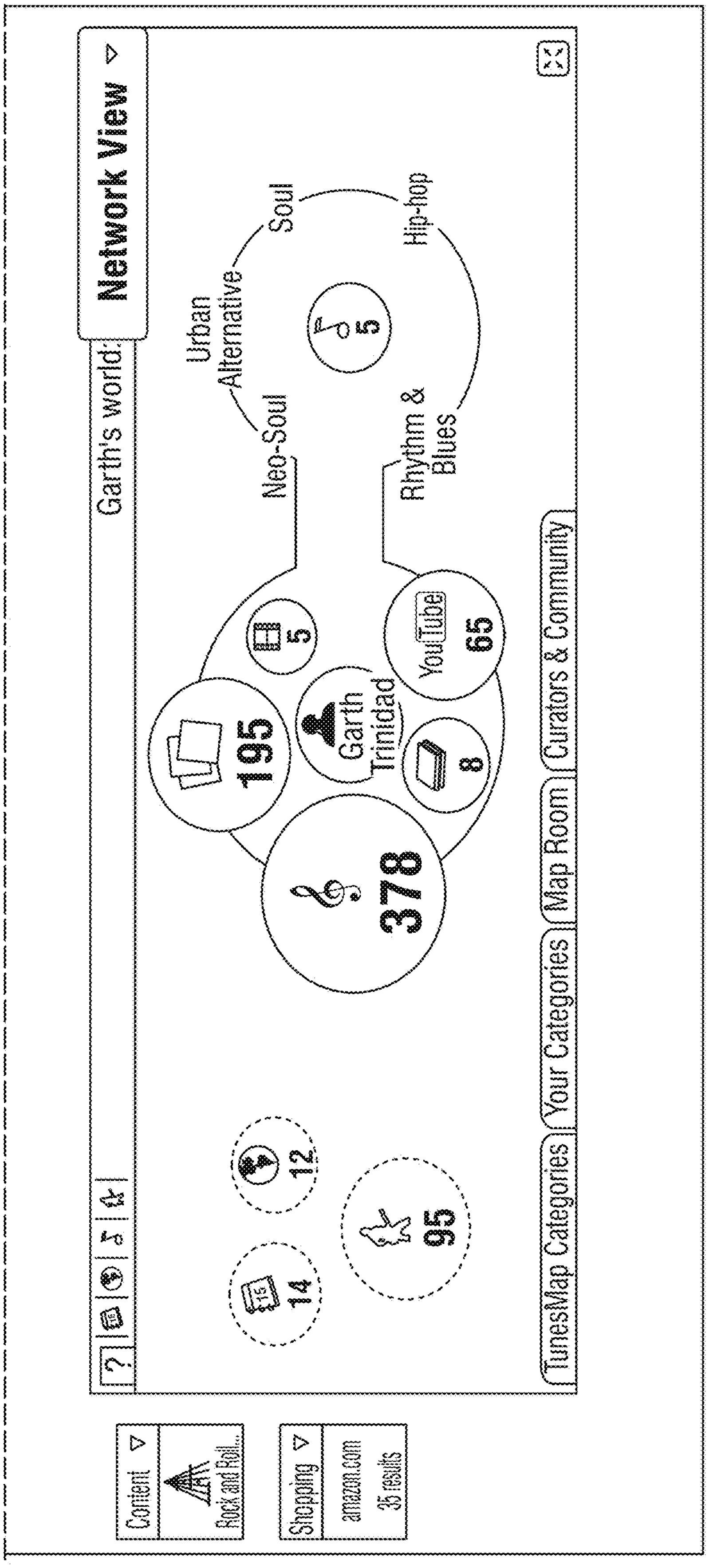

On FIG. 10H, we see a Curator page for KCRW DJ Garth Trinidad, featuring top albums from artists appearing at an upcoming Hollywood Bowl event as well as a Network View that has been expanded to reveal Garth's top genres.

Earth Map Music Overlay

The location element 202 of the fundamental relationship of music 200 from FIG. 4 has a natural representation through standard mapping facilities 802, such as Google Earth, an embodiment of which is depicted in FIGS. 11A-11I. The standard map interface is annotated with music related items of interest 801 according to a selection category 800. The items displayed are subject to the users current filter settings. Selecting an item presents a corresponding representation.

Figure 11A:
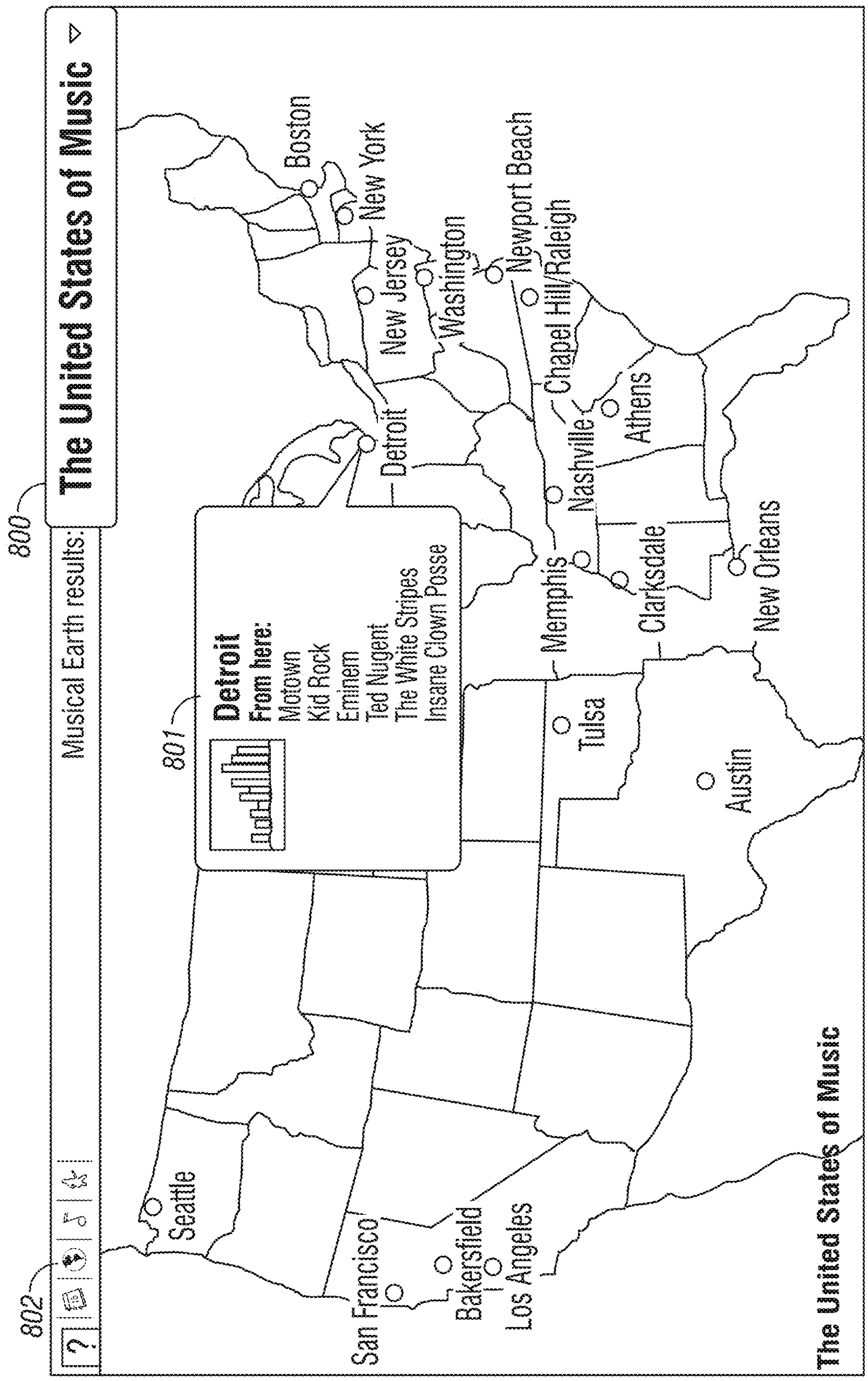
FIG. 11A-11I illustrate a music view of the world, where available interfaces for satellite images of the earth are augmented with specific music related points of interest according to the invention.
Figure 11B:
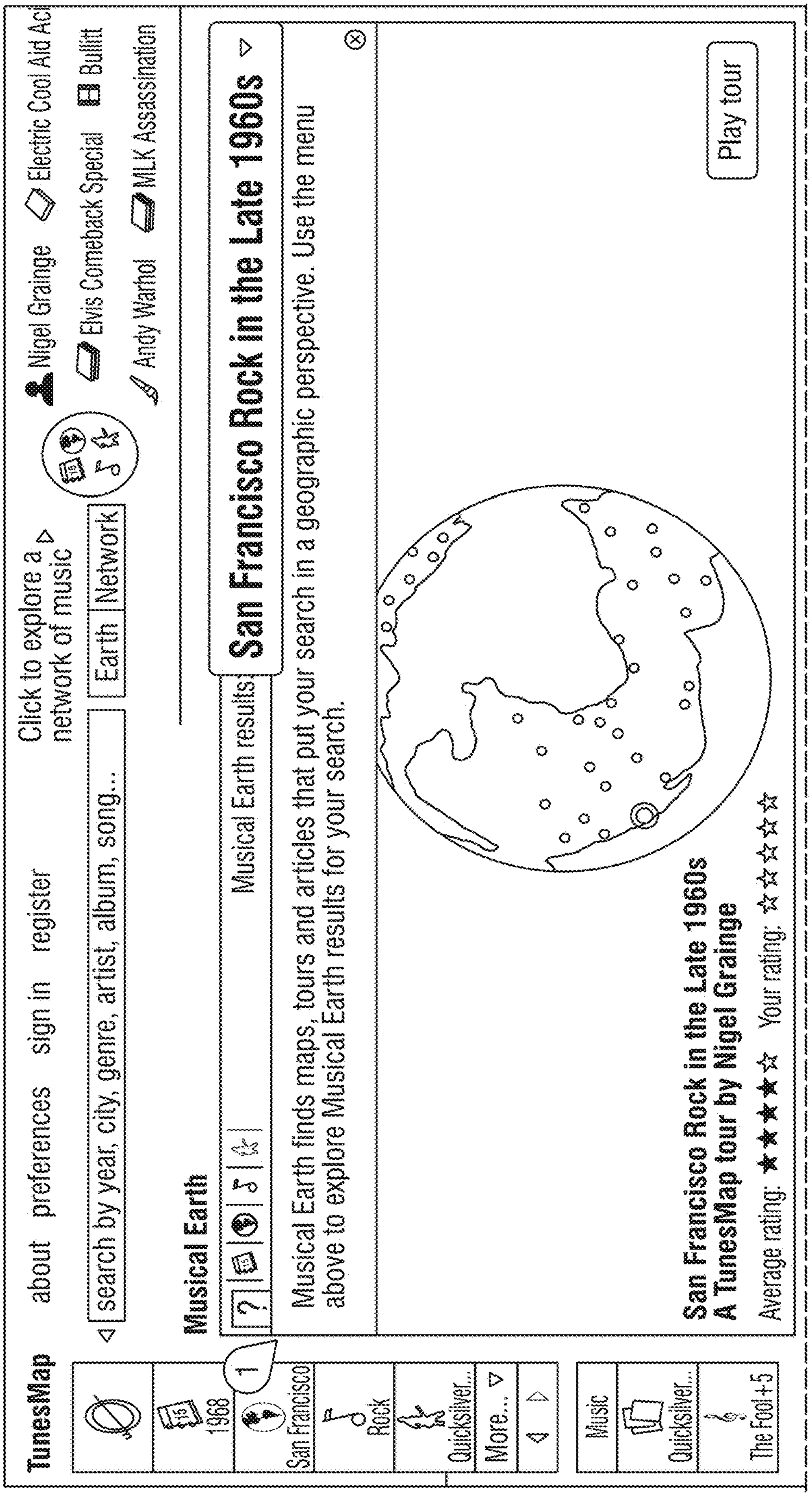
Figure 11B:
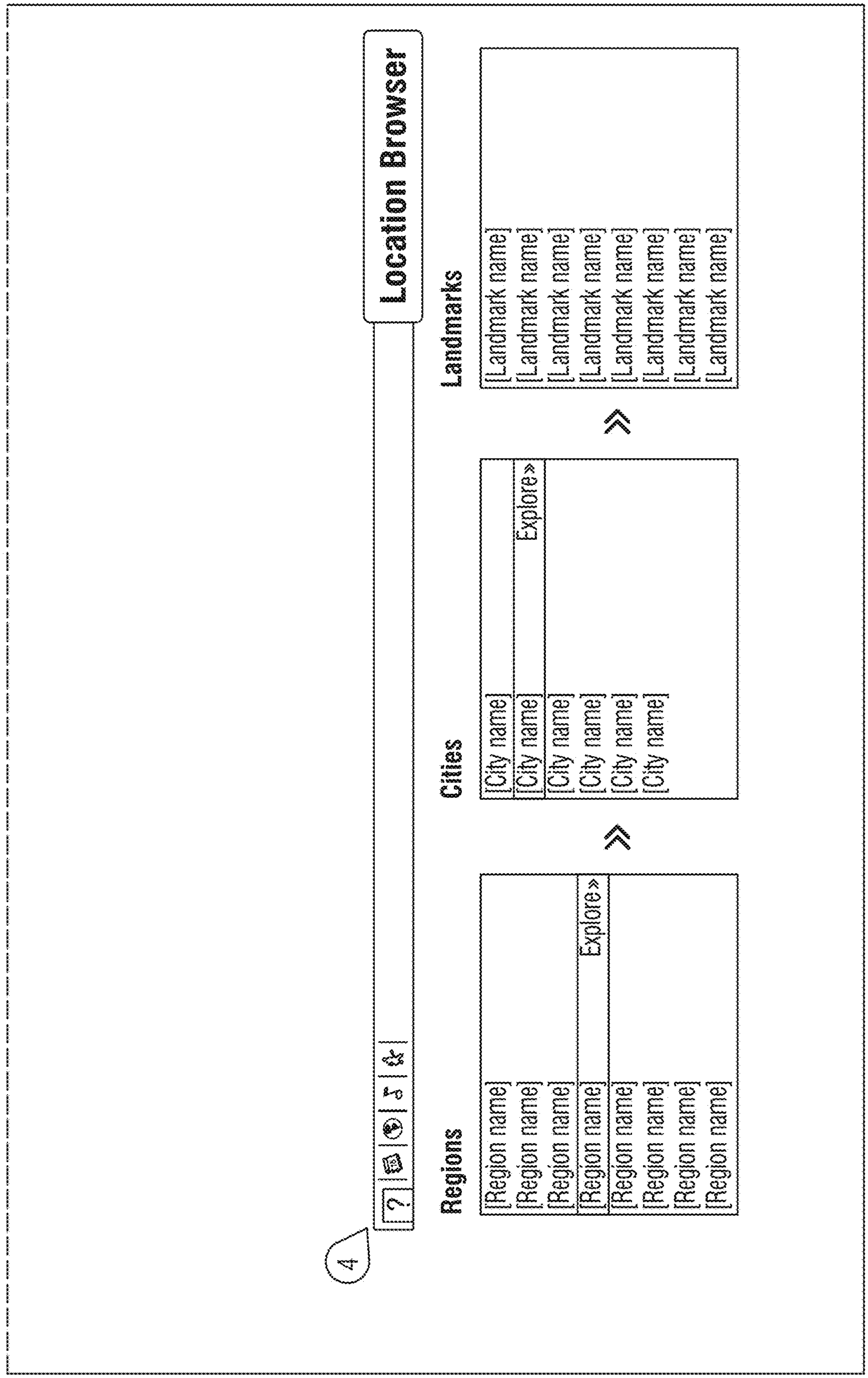

FIG. 11B shows a page that is dedicated to geographical music searches:

1. Interactive globe. Displays geographic content based upon the user's search on a navigable 3D globe, including a variety of map layers and tours.

2. Search and timeline controls. Allows the user to quickly search for a location. The selected result is shown both on the globe and in the Location icon in the filter bar. The user can also update the current year search criterion and updates are reflected in the globe pull-down menu content in the upper-right and in the Time icon in the filter bar.

3. Geographical media browser. Delivers media by type that matches the specified Location in the user's current search. Note that the Search status icons show that Location is the only element being used to determine the content that appears in the browser.

4. Location browser. Three hierarchically filtered lists of Regions, Cities, and Landmarks. Each item in each of the lists has its own dedicated page on the site that the user can visit.

Figure 11C:
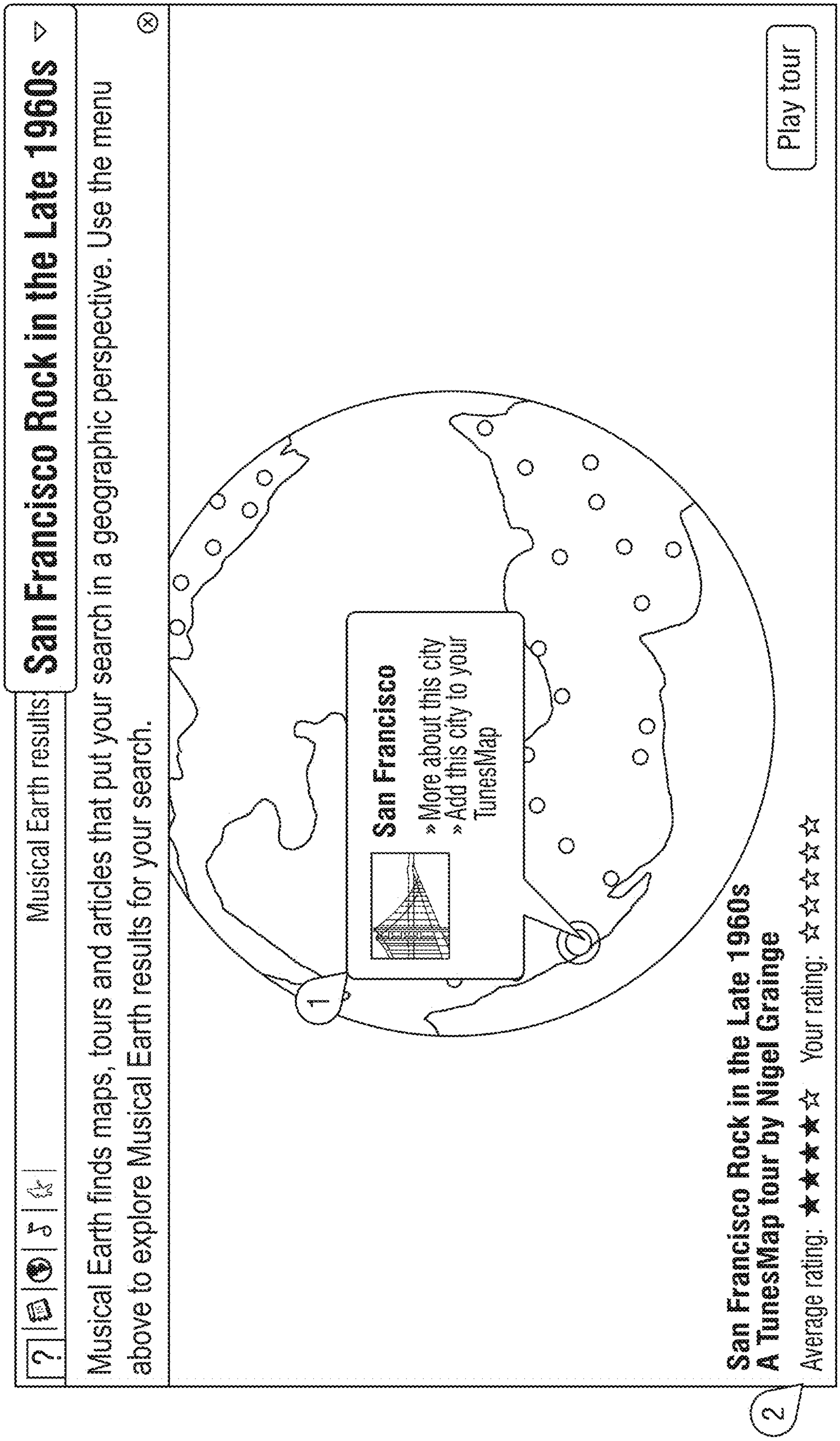

Additional options for the Interactive globe module (#1 on the Musical Earth page) are shown on FIG. 11C as follows:

1. Location pop-up. Provides links to the dedicated page for the location and to add the location to the user's Map.

2. User ratings. Displays the average rating for the currently displayed content among all users, as well as a control for the user to add their own rating.

Figure 11D:
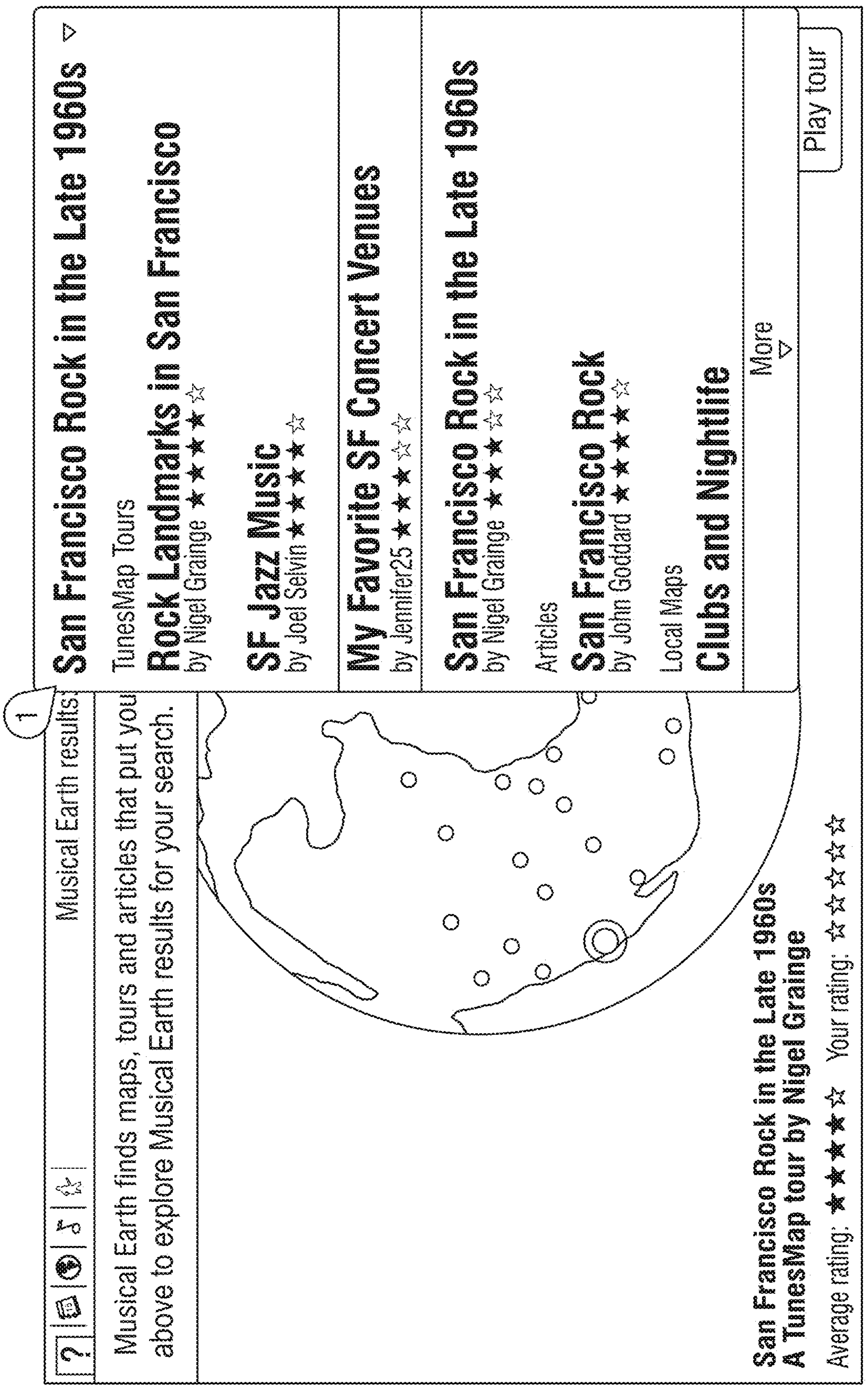

Additional options for the Interactive globe module (#1 on the Musical Earth page) are shown on FIG. 11D as follows:

1. Content selection. Enables the user to select from a variety of search-filtered maps and tours that can be overlaid on the 3D globe.

Figure 11E:
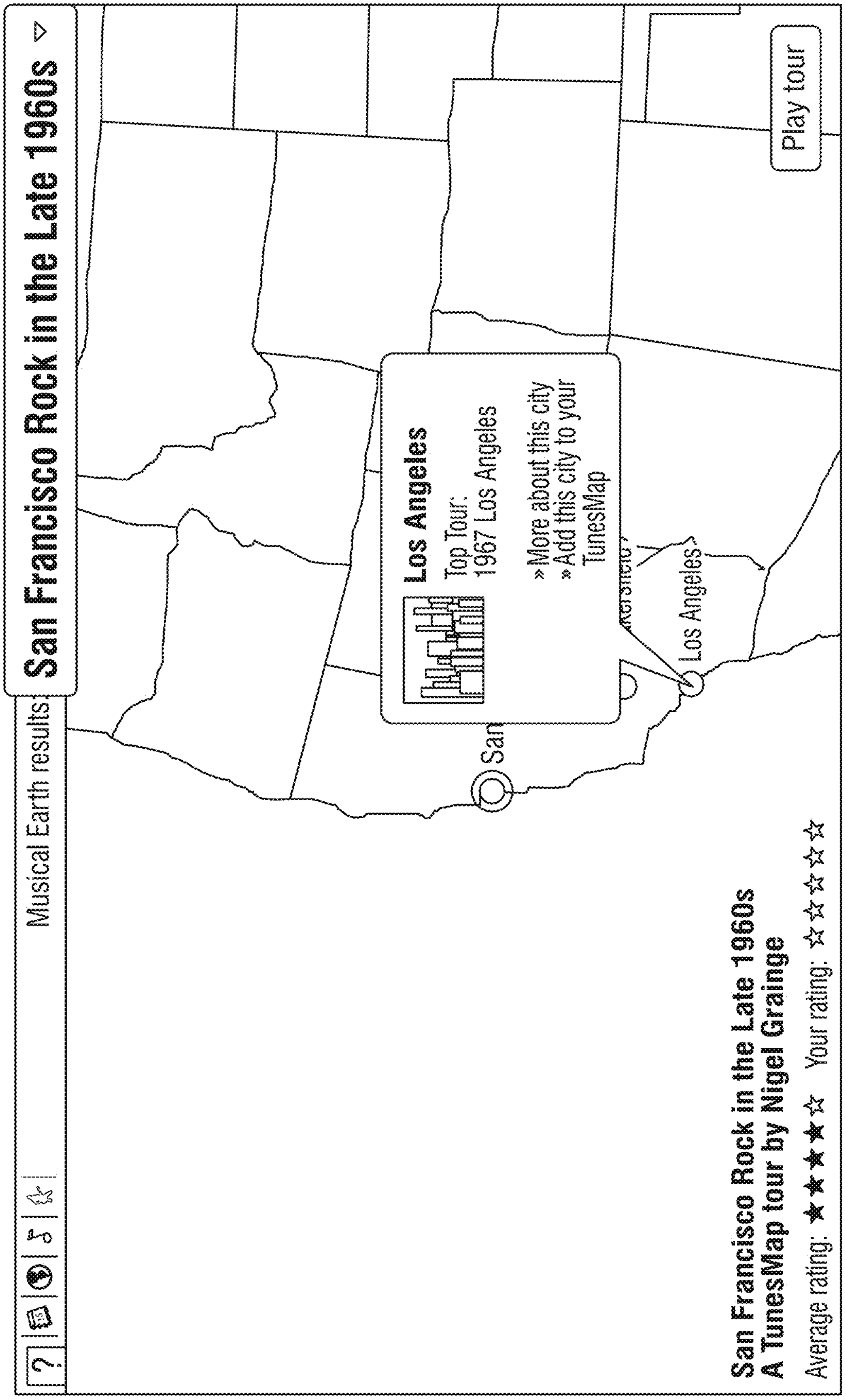

FIG. 11E depicts a version of the module that shows a close-up view of the west coast.

Figure 11F:
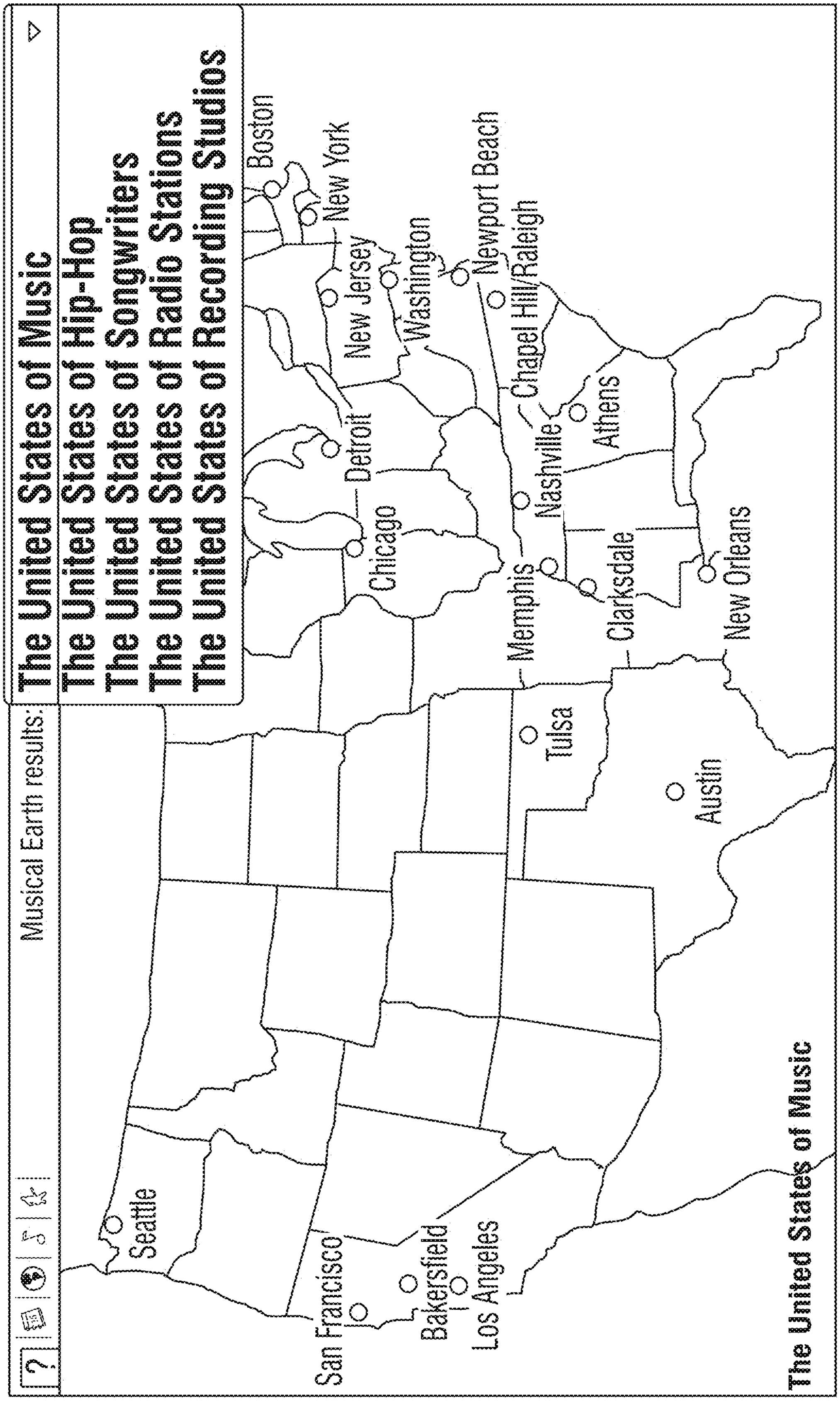
Figure 11F:
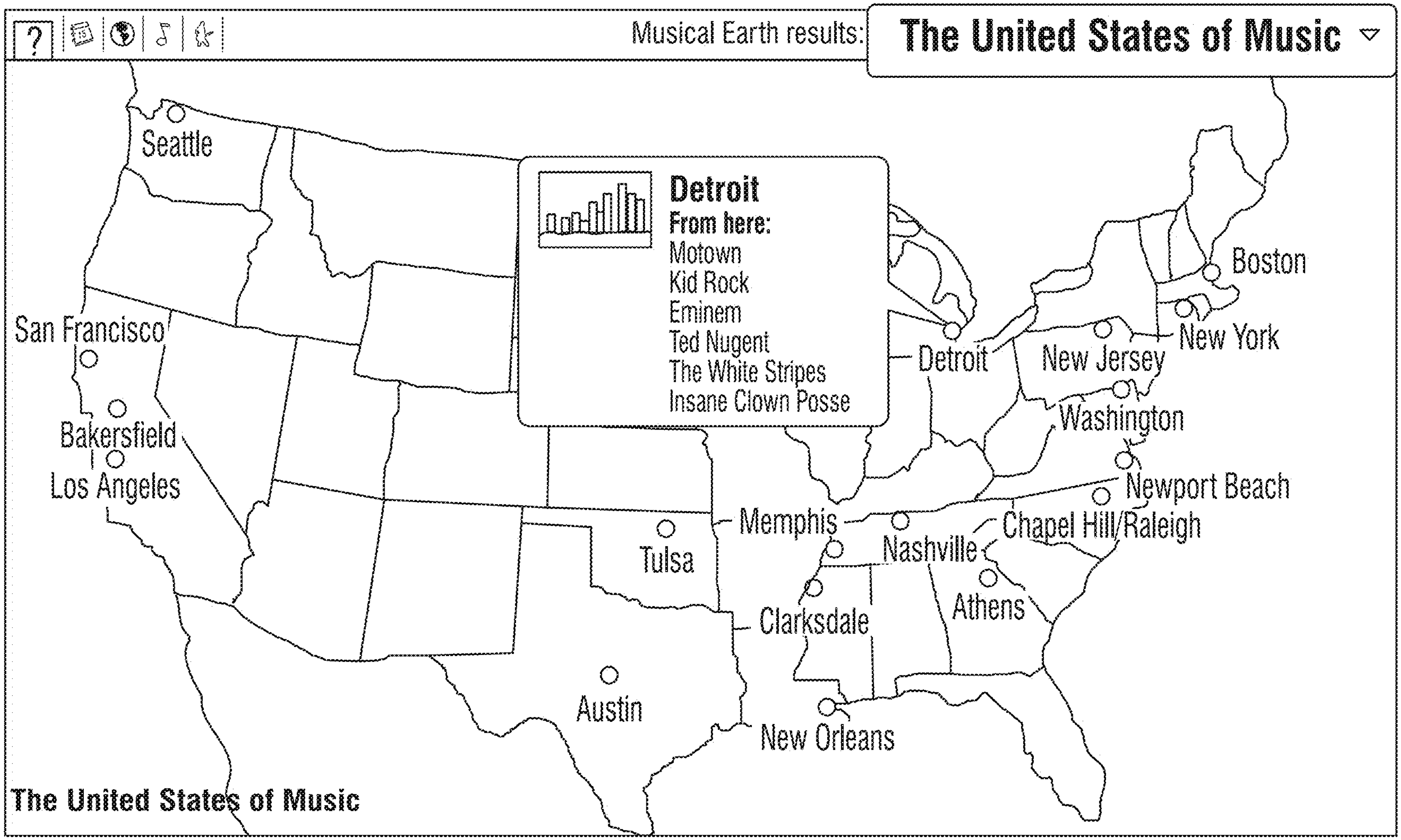
Figure 11F:
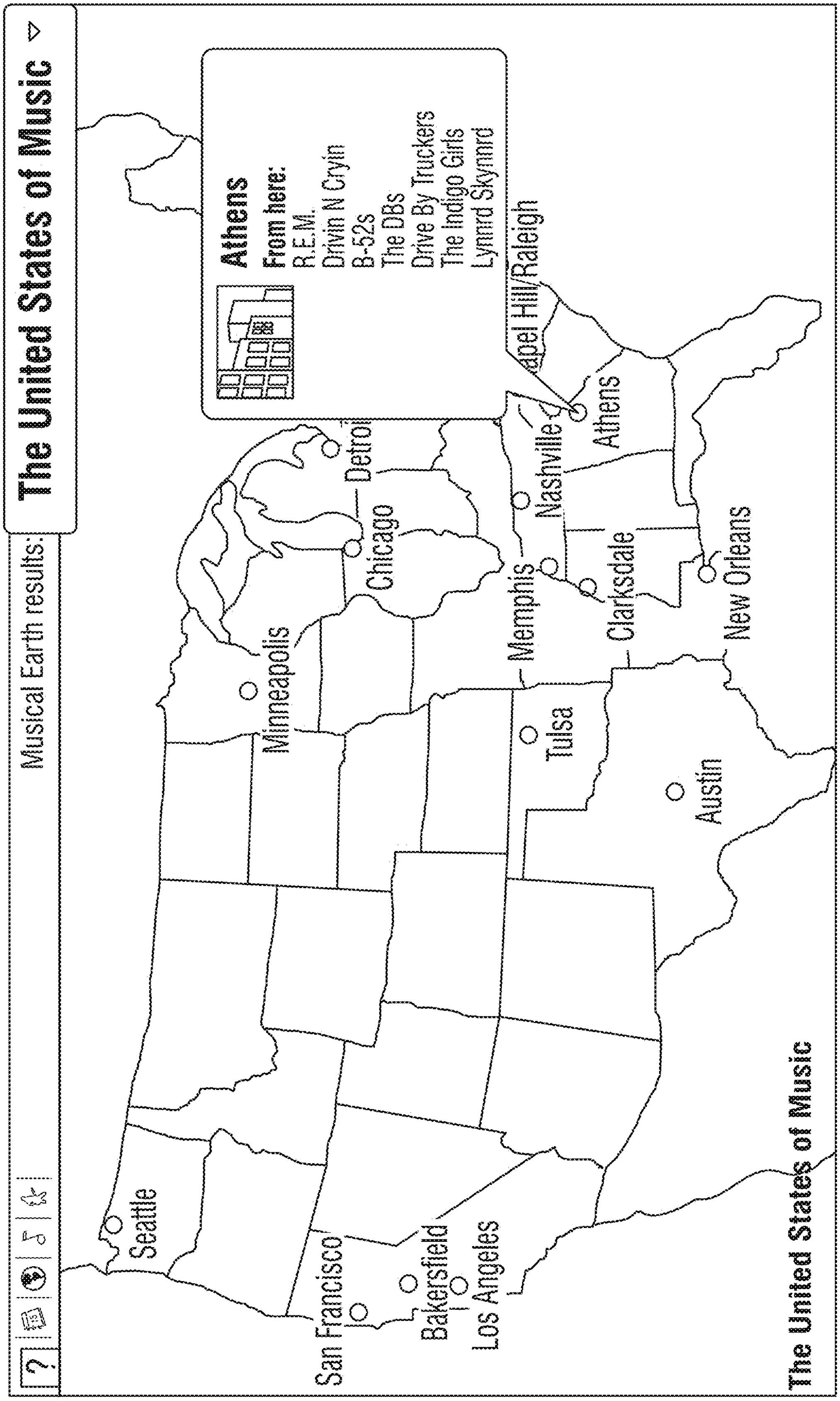

In FIG. 11F, the user is browsing a set of music maps of the United States. Each map highlights geographic locations in the US along a particular musical theme: music in general, hip-hop, songwriters, radio stations, etc. Clicking on a city brings up a pop-up with related links the user can explore. Clicking on a link takes the user to the related page, while also updating their current search to reflect the relevant artist, genre, location, and year.

Figure 11G:
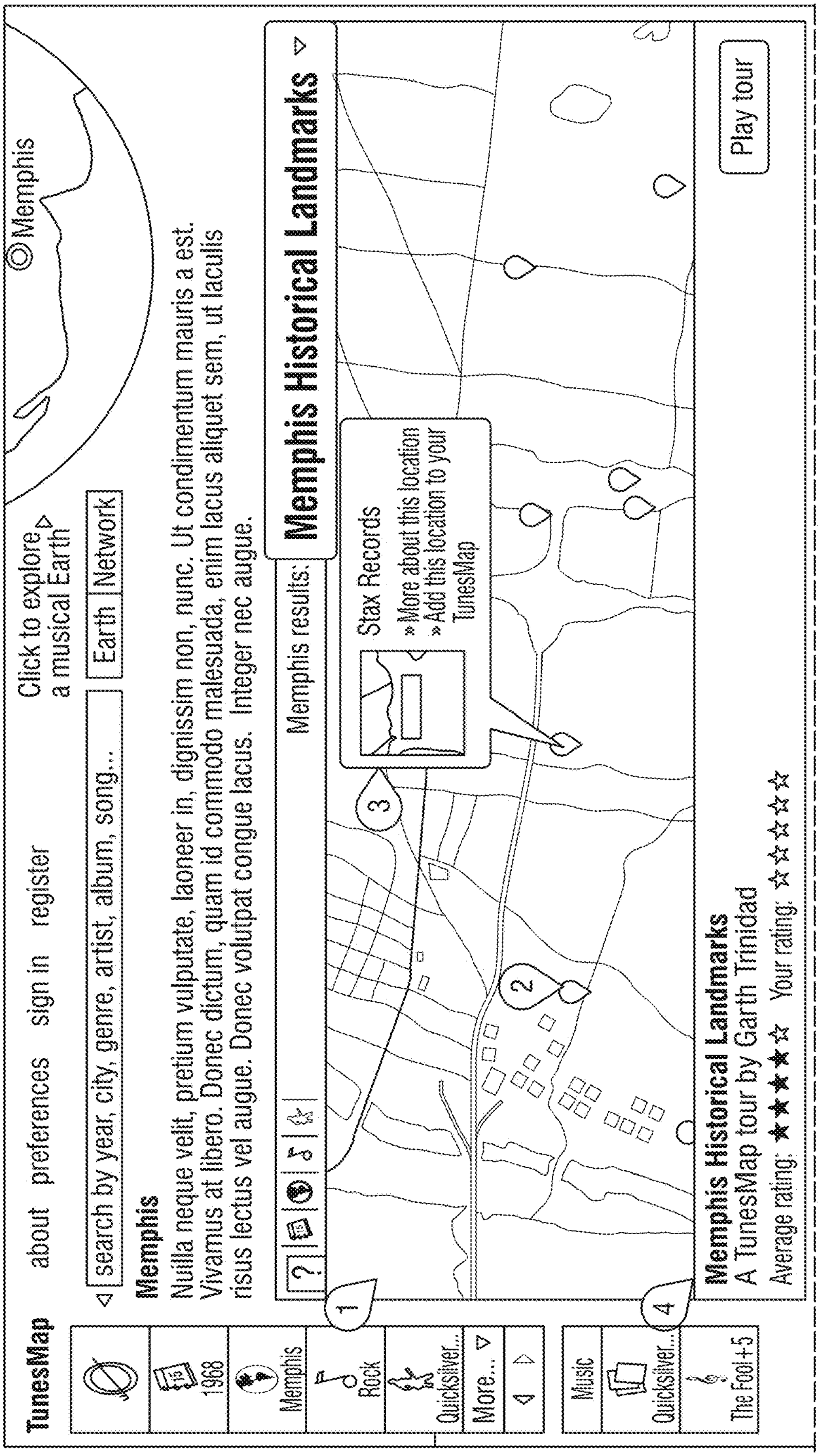
Figure 11G:
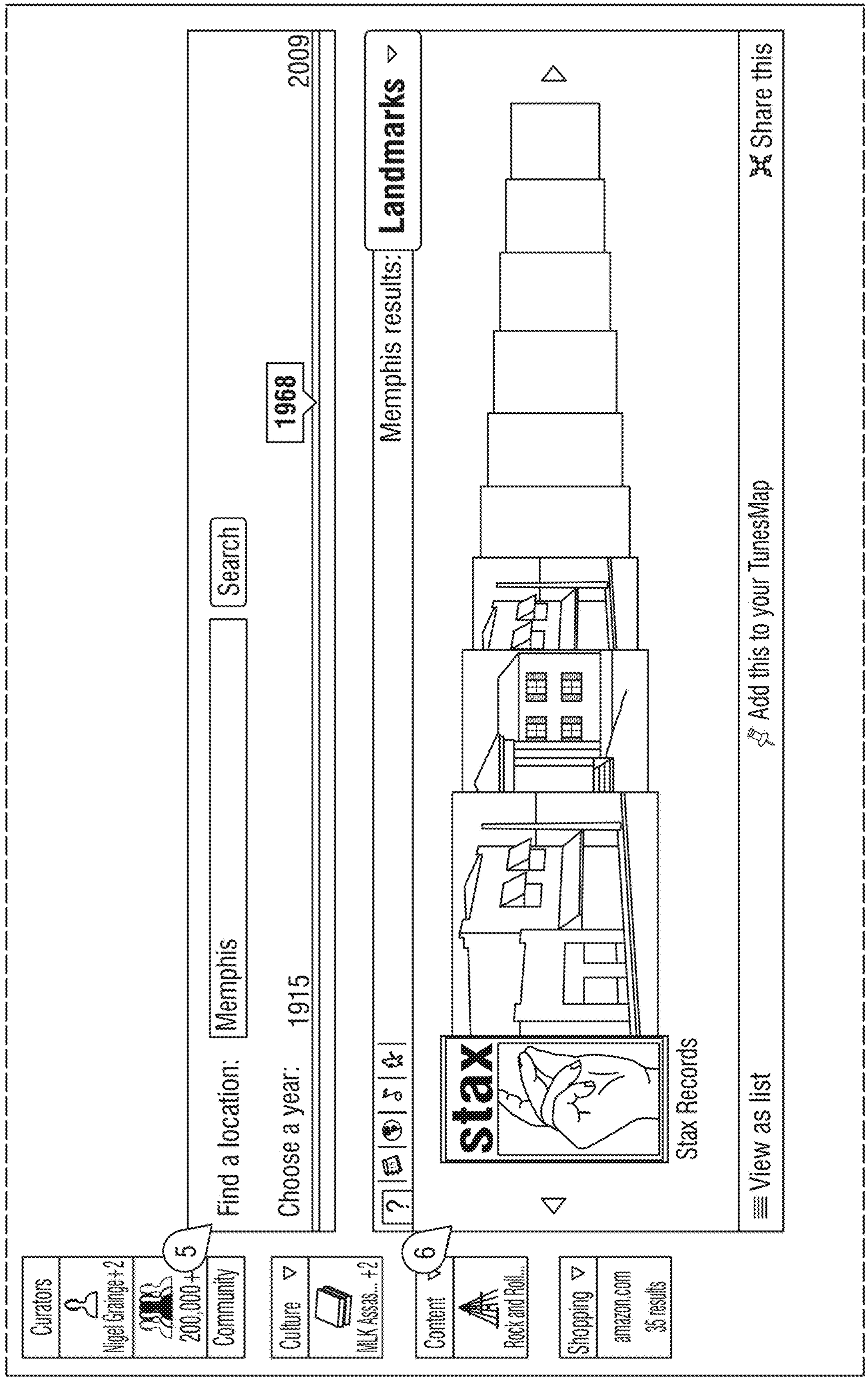

FIG. 11G depicts a dedicated page for a single city as follows:

1. Map. An interactive map shows a satellite view of Memphis.

2. Markers. Markers call attention to important music-related locations in the city.

3. Marker pop-up. Clicking on a marker brings up the related info window, with options to visit the landmark's dedicated page or add the landmark to the user's Map.

4. Map content. Using the pull-down menu in the upper right, the user can select from a variety of search-filtered geographic content, such as clubs, venues, recording studios, residences, and hotels for the city, details of which are shown here.

5. Search and timeline controls. Allows the user to quickly search for a location. The selected result is shown both on the globe and in the Location icon in the filter bar. The user can also update the current year search criterion and updates are reflected in the globe pull-down menu content in the upper-right and in the Time icon in the filter bar.

6. City content browser. This area allows the user to browse content related to the city. Here, the user is browsing curator-recommended Memphis albums.

Figure 11H:
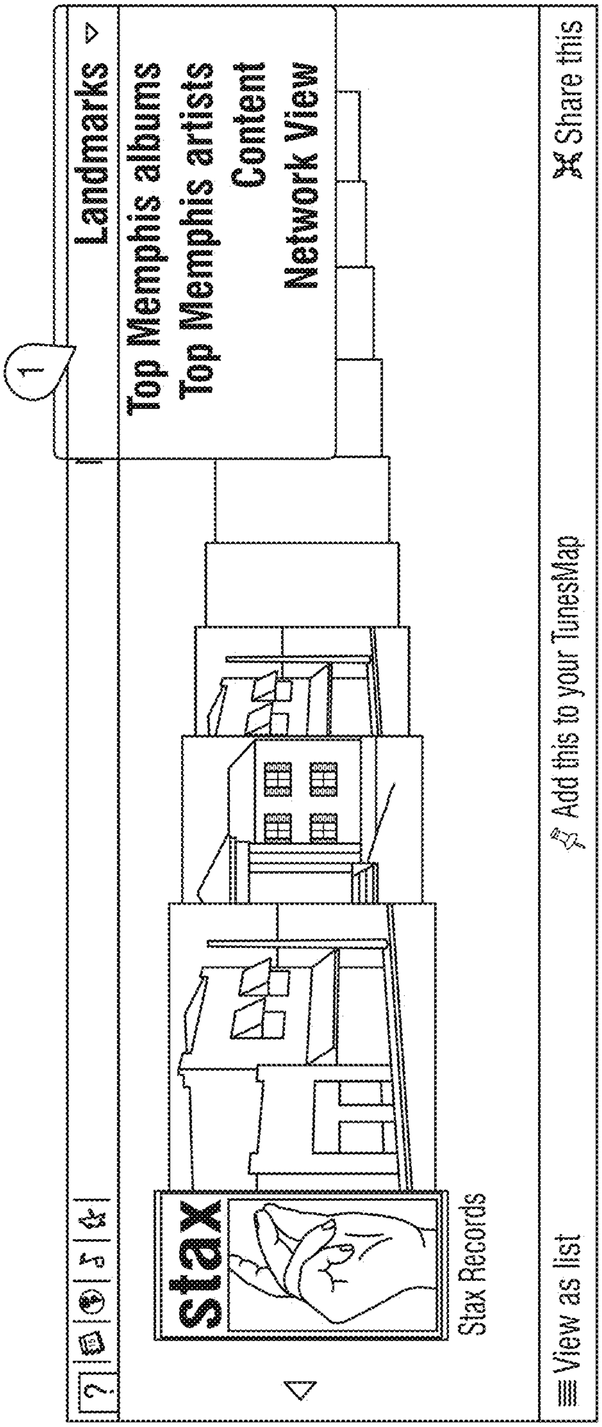

Additional options for the City content browser module (#6 on the City page) are shown on FIG. 11H as follows:

1. Content selection. Enables the user to select from a variety of Memphis-related content carousels, plus a Network View centered on the city.

Figure 11I:
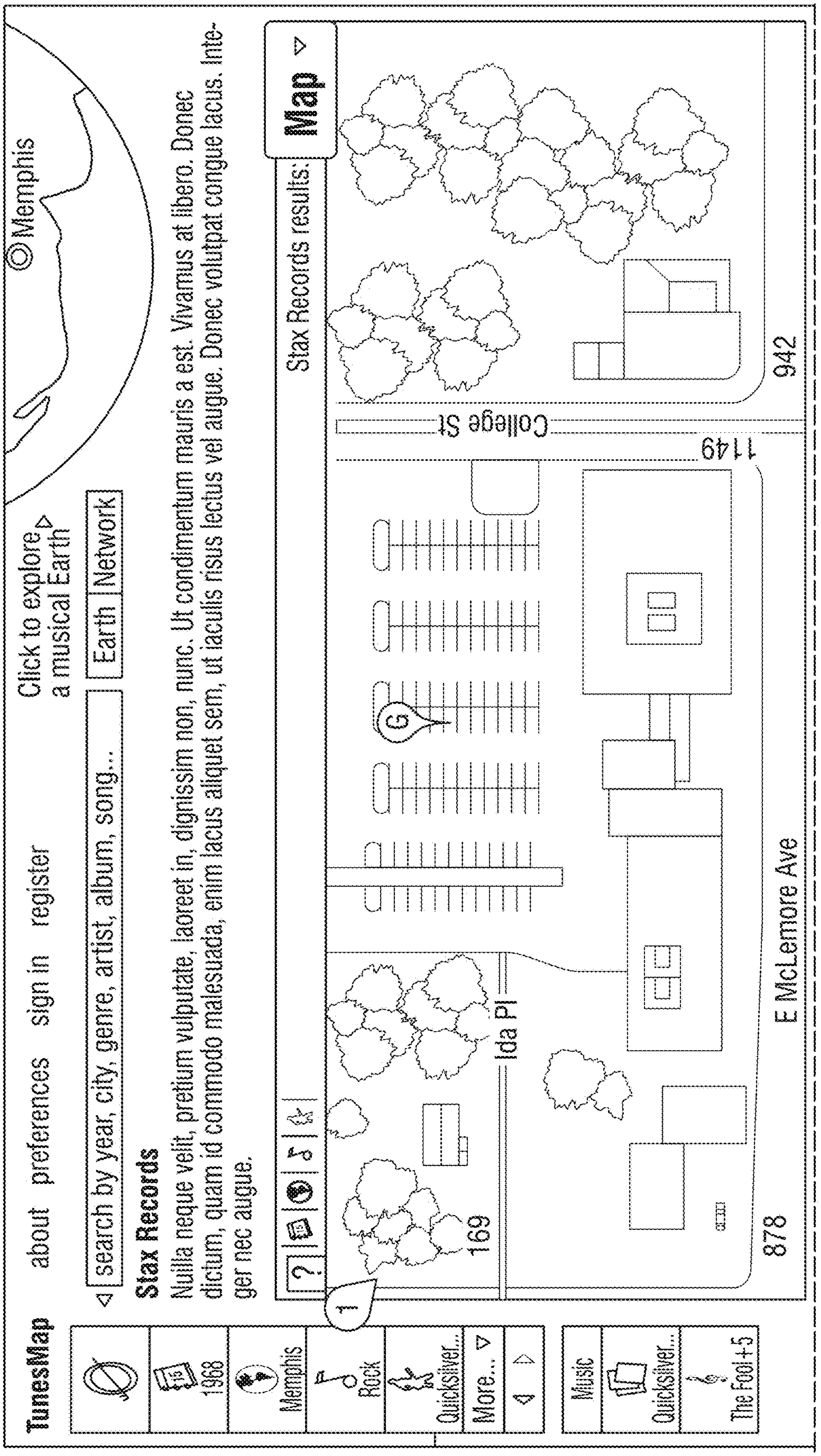
Figure 11I:
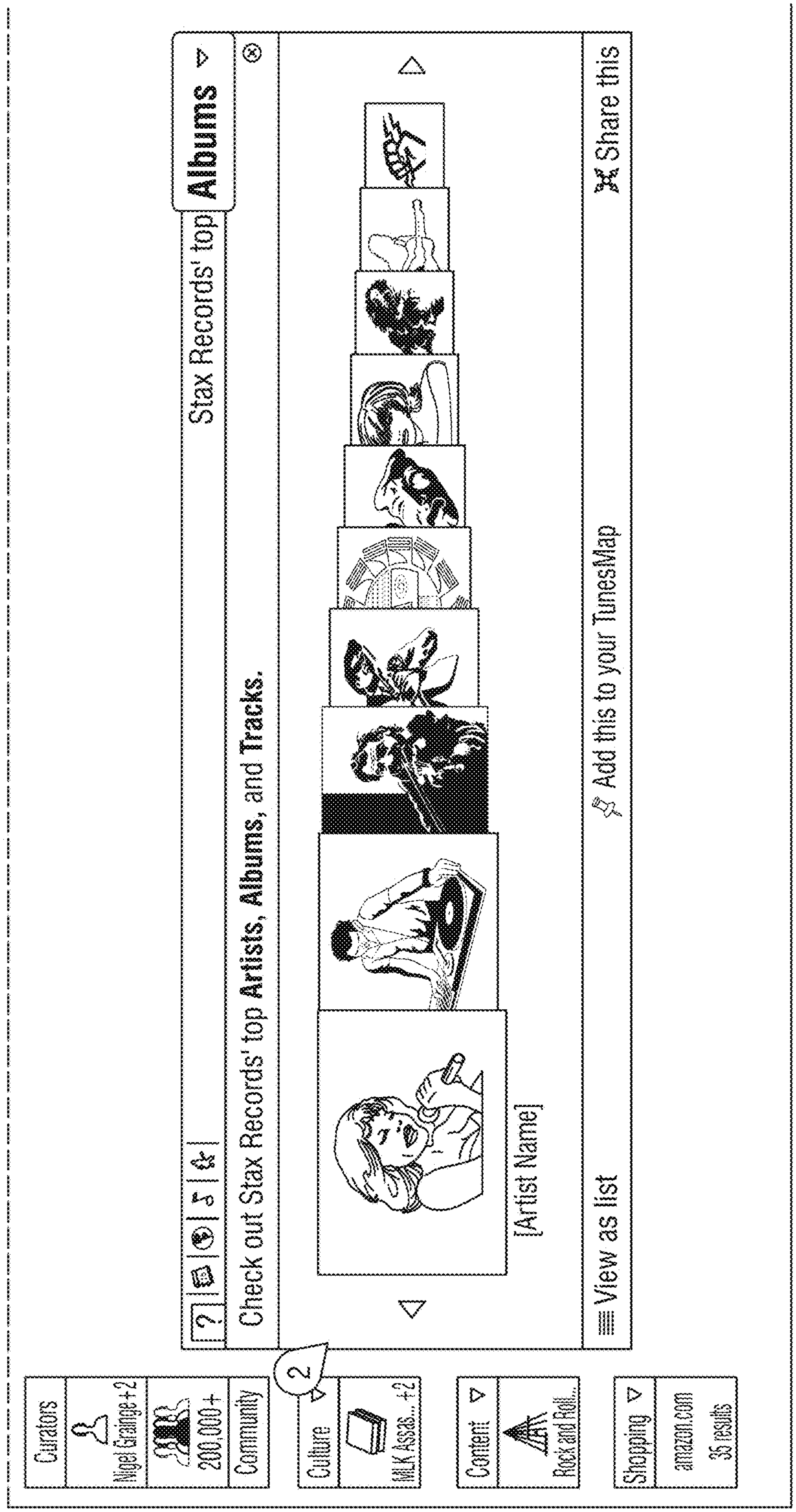

FIG. 11*i* depicts the following:

1. Location content browser—Map. An interactive map/street view image of the location is shown. By clicking the pull-down menu in the upper right corner, the user can access other Stax-related content, including photos, video, and user-created content.

2. Recommendations browser—Artists. This module contains a selection of curator-recommended and dynamically chosen content relating both to the user's search and to this location. The various content types (artists, tracks, albums, etc.) are accessible via the pull-down menu. Mobile Device Integration with GPS A mobile device enabled with a Global Positioning System (GPS) 900, such as the Apple iPhone for example, is shown in FIGS. 12A-12D. Illustrated for example is the Network map interface 901 displaying the user current search 903, the fundamental relationship of music filters 900 and search button 901. A unique and novel service of the current invention is to inform the user of music related items of interest near their current physical location 904.

Figure 12A:
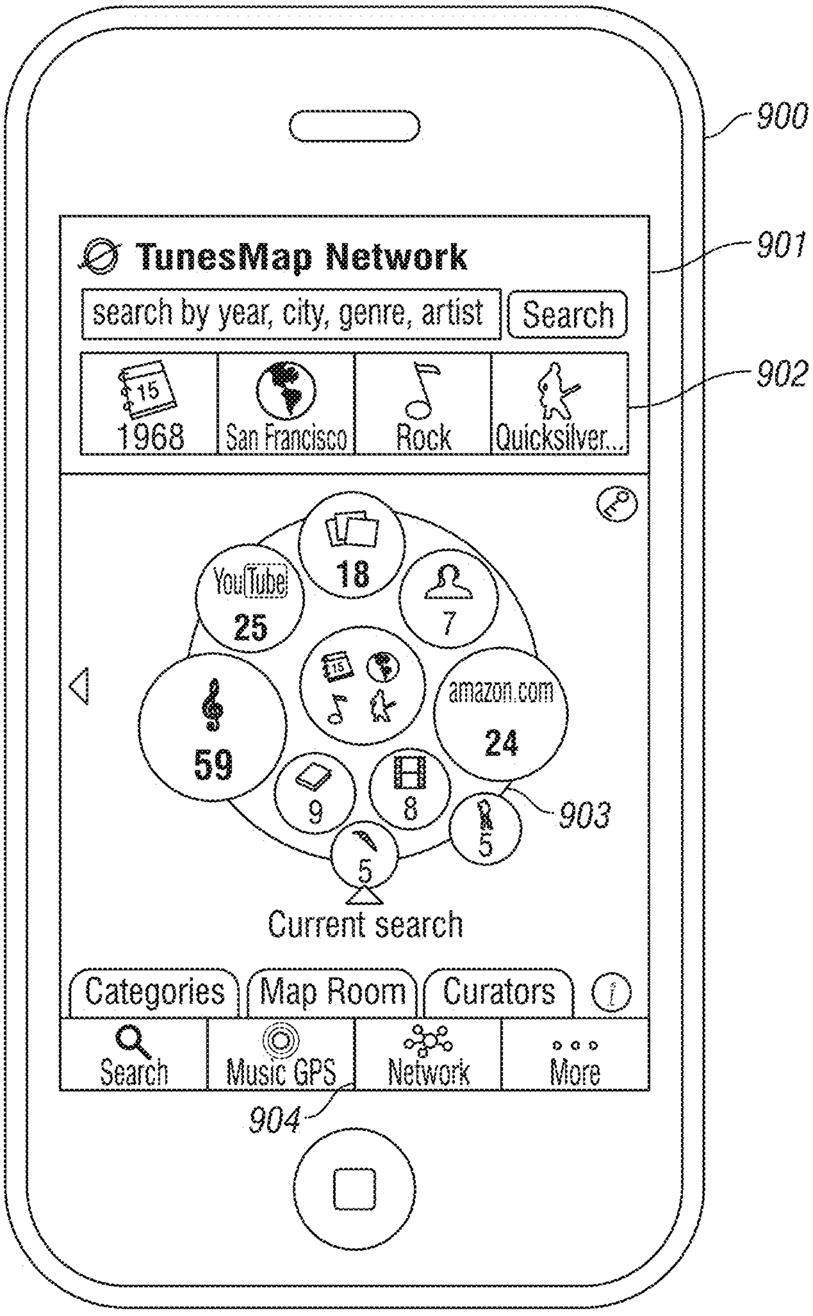
FIGS. 12A-12D illustrate the integration of a user interface with a hand held Internet-enabled telecommunications computing device with GPS according to the invention.
Figure 12B:
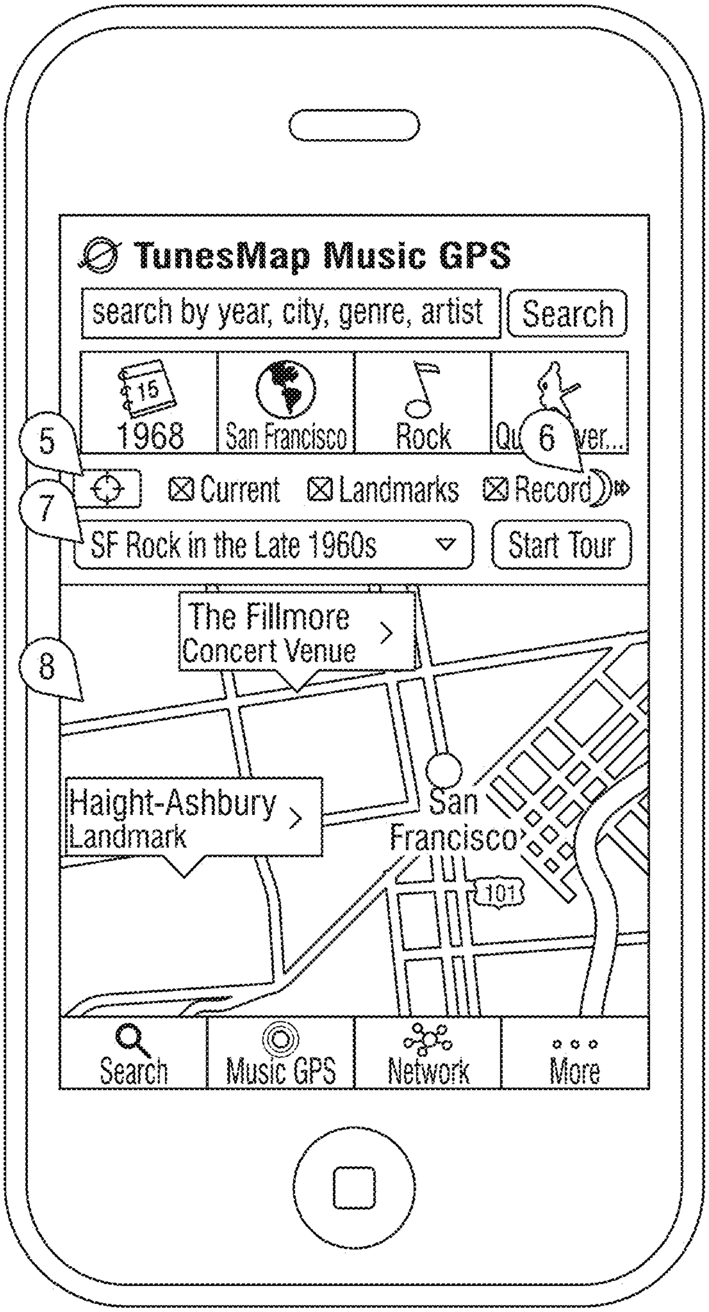
Figure 12C:
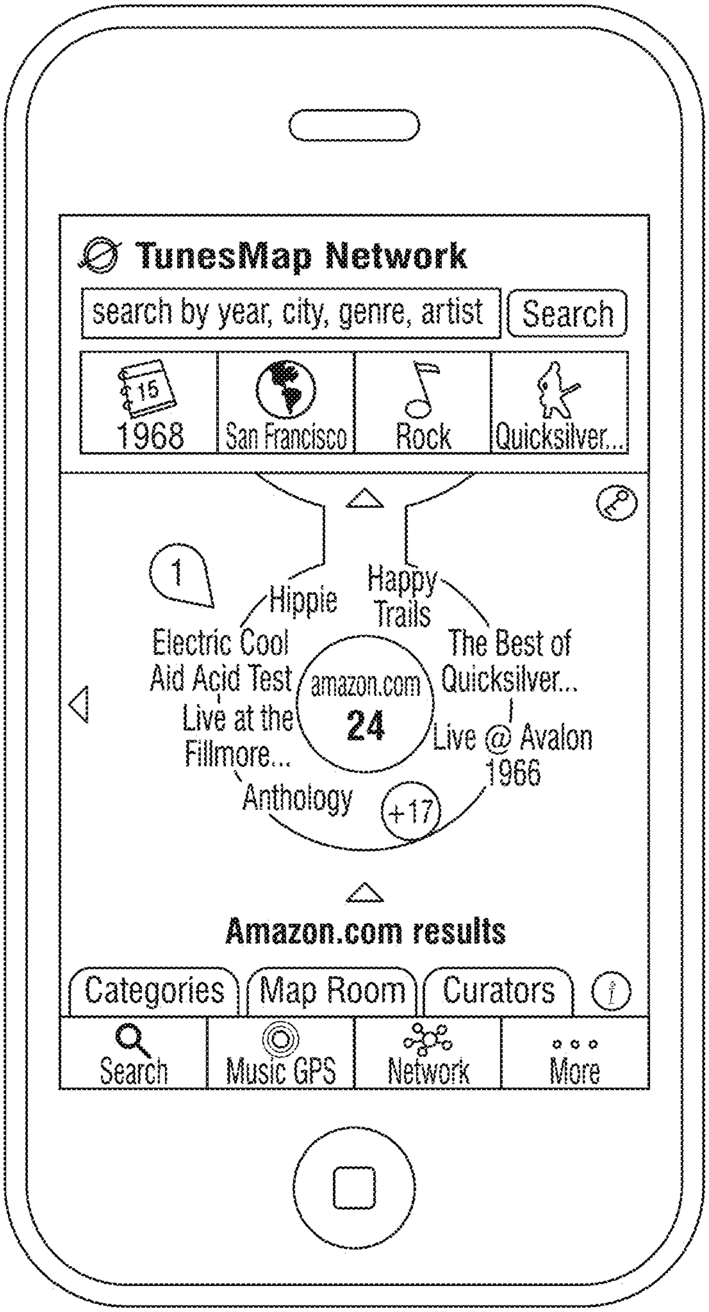

In FIG. 12A, the Search mode of the Map iPhone application allows the user to perform searches and retrieve the same results that would appear in the filter bar on the main website.

1. Search field. Allows the user to perform searches and retrieve the same results that would appear in the filter bar on the main website 2. Search components. These icons are populated with elements derived from the user's text searches, just as on the Map website. Clicking on an icon displays a pop-up widget for changing its contents similar to those found on the site, i.e. timeline, location search, genre pull-down, artist search. Note that the location search pop-up widget has a current location option that makes use of GPS to identify the user's position and add it to the search.

3. Search results. Results of the most recent search are shown here in a scrollable list. Entries correspond to the various results categories in the Web site filter bar. Touching a category causes the list to scroll to the left, displaying related results.

4. Tab bar. Allows the user to switch between application modes. The Local mode of the Map iPhone application shows geographic results derived from the user's search (see FIG. 12B).

5. GPS locator. Uses GPS to center the map on the user's current location, updating the Location search component to match.

6. Map layer selector. This selection of map layers can be scrolled left and right by touching and dragging, and individual layers can be turned on and off by tapping.

7. Tour selector. By choosing a tour and clicking "Start tour," the user can browse through a curator-authored step-by-step guide to a particular location from a musical perspective.

8. Interactive map. Shows results matching the user's search criteria in the chosen location. Users can toggle the display of specific map layers on and off.

The Network mode of the Map mobile device application (see FIG. 12C) allows the user to browse an interactive diagram of the Map database, including links created by curators, community, and the user.

1. Network View. Interactive diagram of items in the Map database. Touch gestures including "pinch in" and "pinch out" allow the user to scale the map up and down and navigate from node to node.

2. Key. Tapping this button superimposes text labels that identify all icons in the diagram.

3. Preferences option. Allows the user to customize the display of the diagram.

4. Categories tab. Here, the user has opened the Categories tab, which includes a toggle between the standard Map categories and user-created categories, and is about to drag the Amazon.com icon into the Network view to display related results.

Having dragged the Amazon.com category in to the Network view, related results are now shown.

Amazon.com results. Tapping on the Amazon.com bubble has centered and expanded it to display its results. The original search is still available by tapping the up arrow at the top of the view.

Result pop-up. Tapping on a result brings up a pop-up that provides a brief description of the item, and relevant links. Because this is an Amazon product, the user is shown a purchase button that opens Amazon.com in the Safari browser when clicked.

Below the product information is a panel of Network View options that allow the user to manipulate how the item appears in the Network View.

Figure 12D:
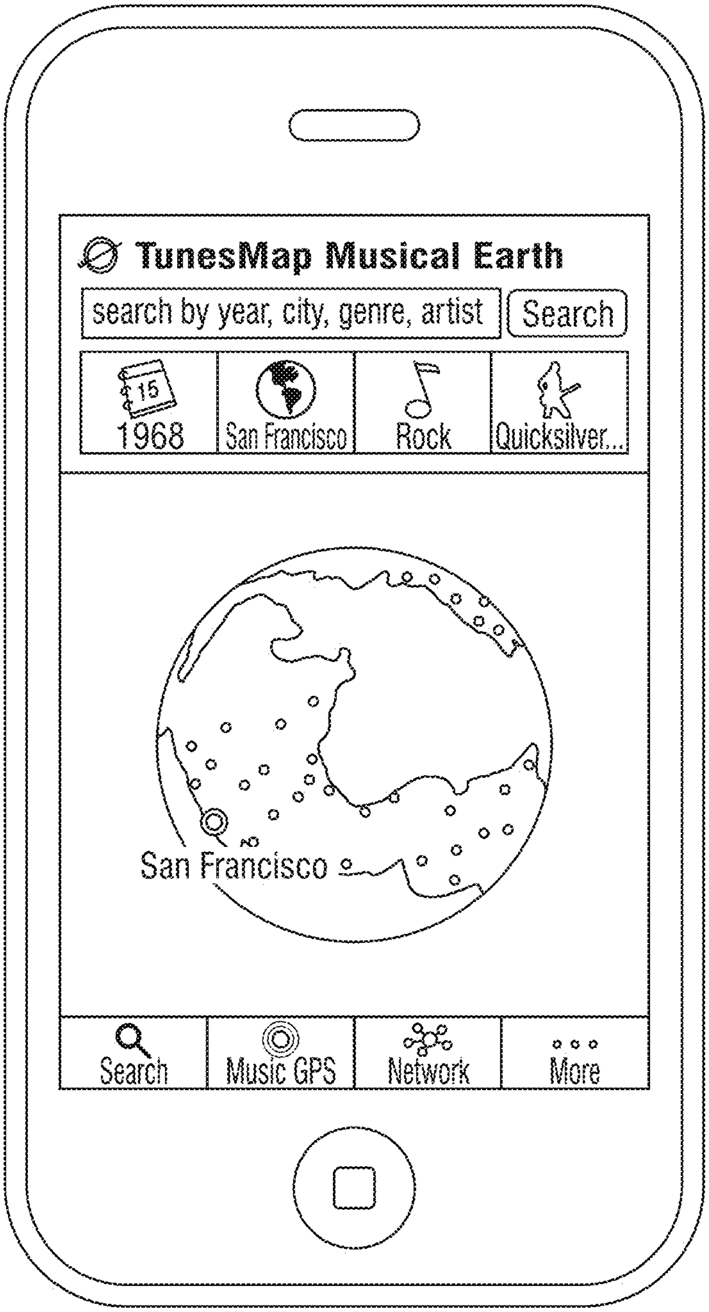

The Musical Earth mode of the Map mobile device application allows the user to browse an interactive 3D globe dotted with geographic markers relevant to the current search (see FIG. 12D).

Game Console Integration

Figure 13:
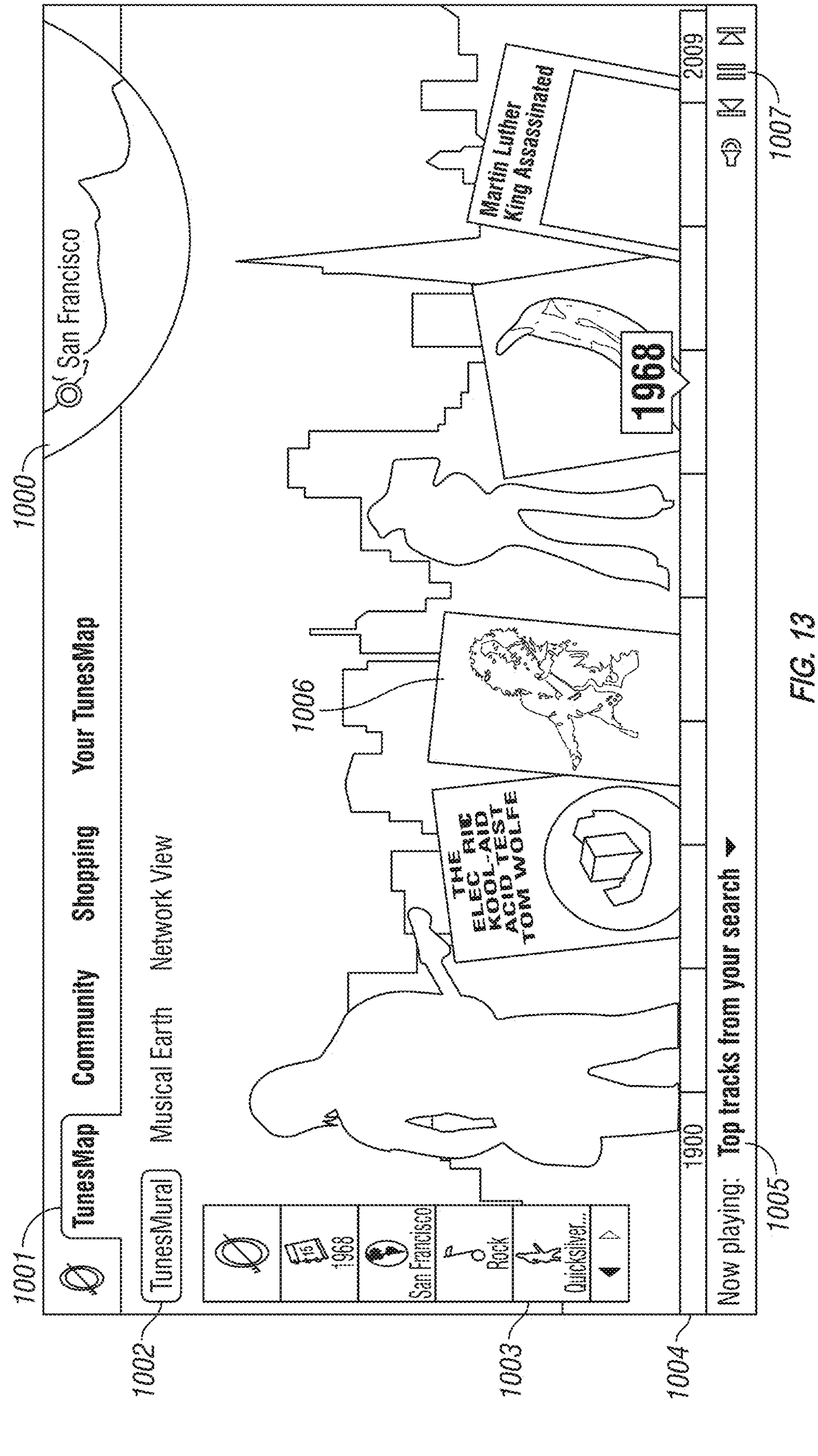
FIG. 13 illustrates the integration of a user interface with a general purpose Internet-enabled gamming console computing device according to the invention.

Access through other popular web enabled graphic interfaces, such as Sony Xbox 300 for example, is shown in FIG. 13. Illustrated are user interface abstractions and facilities of the invention including a filter bar 1003, media player 1007, time line interface 1004, media selection 1005, and the Mural 1006.

Game console application. This implementation of the Map on a game console such as the PlayStation 3 or Xbox 360 shows the interface reformatted for an HD television screen, including tabs at the top for accessing the primary page and content types.

Game Play Element

The user may be provided with various music-related games on such a game console or any other device. The user plays such game in real time with other users or solo using the tools herein disclosed to make a media culture map, gaining points and rewards along the way. Such games can be based upon the user's knowledge of music and music-related culture or can be skill based, such as a demonstration of musical ability. The users who are successful at such games can also gain in status to become a curator who is recognized and regarded by the community.

While the interface primarily makes use of layers of two-dimensional elements, embodiments of the invention comprise a three-dimensional interface that provide much more of an exploratory, game-like feel to the experience.

The user begins by selecting an avatar for themselves, which is then dropped as a 3D character into a surreal desert landscape. If the user begins playing a song, or performs a search, the environment around them transforms as the music begins to play. For example, if the user selected a song from a contemporary Los Angeles-based artist, the desert sand is replaced by asphalt, ghostly freeways sprout from the ground, and notable LA music landmarks pop up, all flickering and fading in and out of view.

This is not a literal geography of LA. Rather, it is a musical geography, one that brings together clubs and recording studios, concert venues and garages in a visual mash-up of the musical culture of the city. Other characters, similarly ethereal in appearance, but dressed in the fashions of the day, appear in the world, some controlled by the computer, and others representing networked players who are currently exploring the same time and place in the history of music.

The player's current search is visualized beneath the feet of their avatar as a glowing disc, labeled with their current location, e.g. "Los Angeles Rock 2014." Everything in the world appears somewhat ghostly, flickering in and out of view, until the player steps off of this disc, signifying their entry into the world proper. Now everything becomes solid, and the player can walk their character around the environment, talking to the other characters and getting a sense of the local flavor. The things the other characters in the world say and the places they go help to evoke the scene. As the player walks towards a particular club, a menu of videos might appear over the view, offering clips of great performances from the venue. This embodiment of the invention conjures the time and place impressionistically through strategic use of stylized 3D models as an interface to cultural artifacts and media, without having to model endless assets.

Stepping back on the disc allows the user to pivot on the time, place, genre, or artist of their current search and arrive at a new destination. This new destination is visualized as a second glowing disc, connected to the first by a thin line. To retrace their steps of exploration through TunesMap, the user need only hop from one disc to another and then step off into the 3D world conjured by each.

There is no way to "win" this experience, instead the goal is to explore and enjoy the feeling of being a time traveler in a world spinning around the axis of music.

EXAMPLE

Imagine you are Columbus, or Magellan—exploring the world, charting new routes, making new discoveries; but instead of charting geography, imagine your objective is to explore, chart, and discover the world of music and to share your findings with a community.

An embodiment of the invention gives each user interactive curatorial tools, and access to myriad multimedia assets through content/archive partnerships. In this way, the user can share music knowledge with the community at large. In this example, users have two goals:

1. Chart the musical world; and
2. Rise in rank based on the number of followers and/or other users who like the user's page.

Initially, the music GPS feature of the invention, also referred to as the digital music atlas, serves as the playing board and is seeded by a board of editors with particular knowledge of a certain genre, time, or place in music history. This gives the playing board a baseline of areas to explore. Thereafter, it is up to the community to seed the rest of the playing board, i.e. the digital music atlas or music GPS, with knowledge of certain genres, times, or places in music history, i.e. no curator has yet introduced a page on Madagascar, but someone then starts to curate a page associated with that geographical location. Eventually someone else comes and stakes a claim to that area of world music, and the two curators are then in competition with one another for curator control of that portion of the world. The community decides who is a more trusted source on the subject by ranking the more trusted curator higher than the other curator.

How are they ranked?

Users, who are also referred to as Curators or Explorers, are judged by the community based on several different factors, including but not limited to:

a.) Their community approval rating and/or number of followers;
b.) Their depth of knowledge;
c.) Their diversity of knowledge;
d.) Their curatorial skills;
e.) The number and diversity of multimedia assets they incorporate into their pages, and maps;
f.) The number of pages or maps that are repurposed or quoted by other users;
g.) The number of recommends they receive;
h.) The number of intellectual contributions they make;
i.) The number of archive materials they contribute to the community;
j.) The number of articles published;
k.) The amount of commerce driven from their page, etc.

In the same way that Foursquare users are ranked based on their frequency of visits to a particular place or number of places in a neighborhood by being made mayor of that place, users of this embodiment of the invention are ranked based on their intellectual knowledge and contributions to the community, and the community's approval or disapproval of those contributions.

Figure 14:
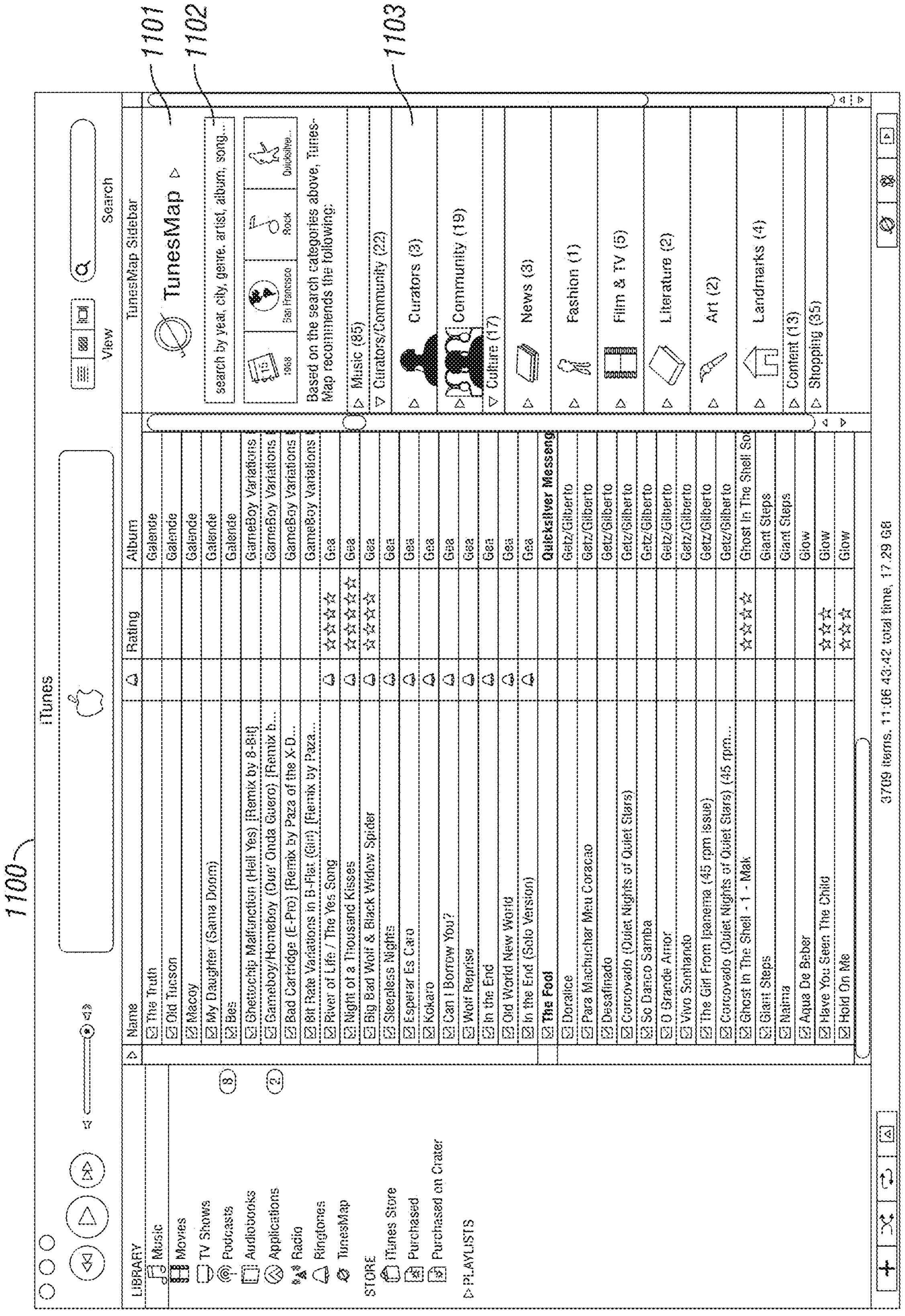
FIG. 14 illustrates integration of a user interface with a general purpose Internet-based music service according to the invention.

A game challenge can take the following form when presented to the community: Tunesmap: charting the Music World and changing the way we experience music online, at home, and on-the-go. WANTED: anyone who thinks that they know something about music history, and who wants to compete in a race to chart the Music World. Tunesmap gives you the tools to share your knowledge and match-up against the experts. The community decides who rules the Music World. External Application Integration Integration of the invention with a popular procurement service, such as Apple iTunes is shown in FIG. 14. The unique experience provided by the presently preferred embodiment of the invention proposes to inspire and motivate the user though the synergistic effect of combining artist, time, location, and genre in the presentation of related items of culture, many of which are or can be made available for purchase. To encourage this inspired and motivated behavior on the part of the user the procurement service user interface is extended with the Map interface 1101. The fundamental relationship of music 1102 provides a search filter, with items of interest available under their respective primary categories and supporting elements 1103.

A profound result of this synergy is to increase the probability of procurement of music and music related items available through both the external and internal services, such as the external service shown in FIG. 14, as well as the primary category internal shopping element 306 of FIG. 5 that provides access to additional external procurement services.

Audio interaction with the media database

Figure 15:
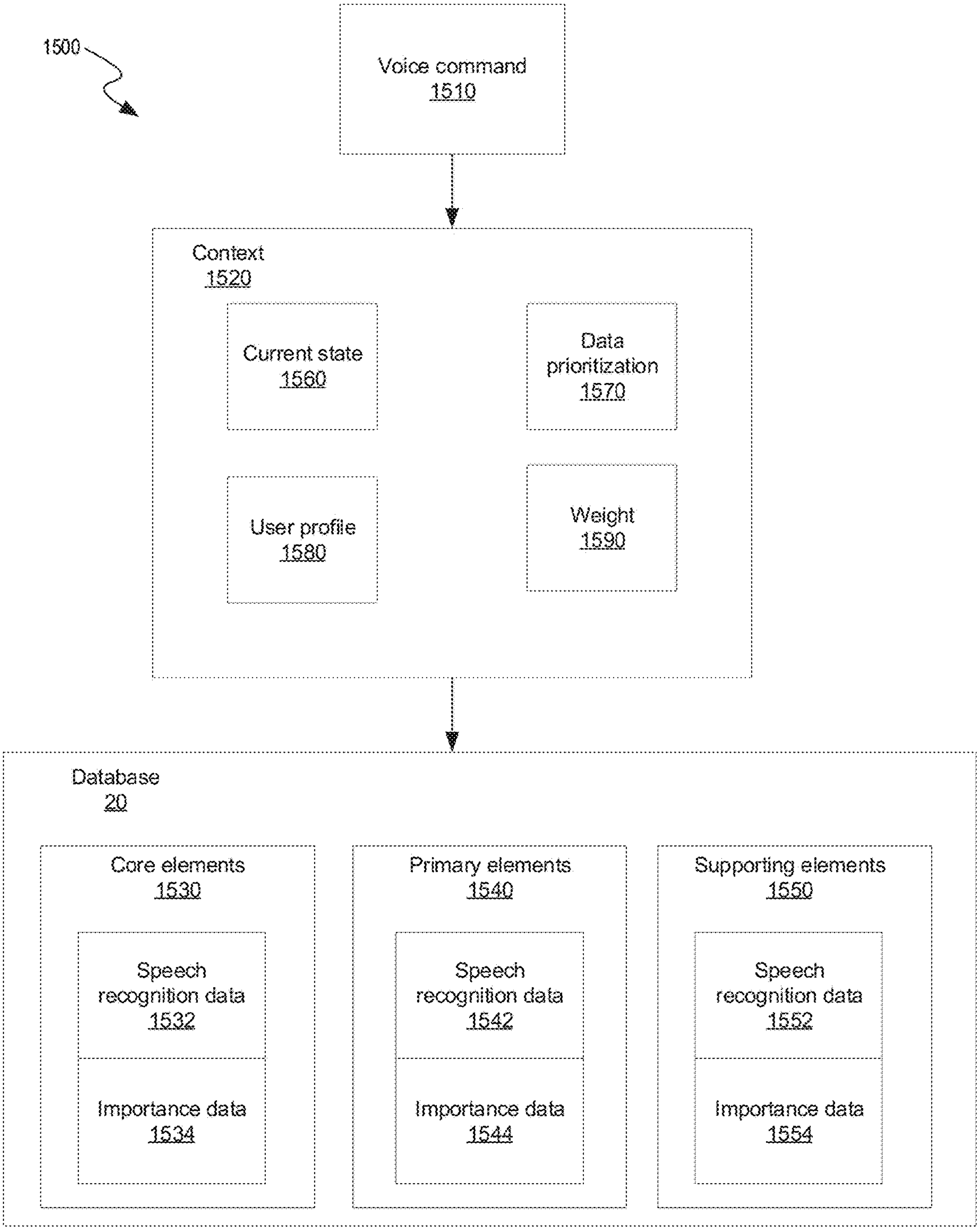
FIG. 15 shows a system for voice interaction with the media database.

FIG. 15 shows a system for voice interaction with the media database 20 in FIG. 1. The system 1500 can receive a voice command 1510 issued by a user and can interpret the voice command 1510 using a context 1520 before accessing the media database 20.

The media database 20 can include the core elements 1530, primary elements 1540, and supporting elements 1550, comments, details, curator media type, etc. as described in this application. In addition, each element 1530, 1540, 1550 can include speech recognition data 1532, 1542, 1552, and importance data 1534, 1544, 1554, such as priority and rating data. The speech recognition data 1532, 1542, 1552 can include phonemes associated with the elements 1530, 1540, 1550 as well as alternate pronunciation and short names. For example, if the core element 1530 includes an artist name "Sade", the speech recognition data 1532 can include the phoneme pronunciation/ʃaː'deɪ/, as well as alternate phoneme pronunciations such as /saːde/, /seɪd/. The priority and rating data can be curated by a curator/editor, as explained in this application, or can be automatically generated based on popularity of the corresponding item, as discussed below.

The context 1520 can be obtained from several sources such as the current state of the system 1560, data prioritization 1570, user profile 1580, or weight 1590 of an item provided by a curator/editor, etc. The current state of the system 1560 can include the song currently played or a user interface item with which the user is currently interacting such as scrolling clusters.

For example, if the user is currently listening to a song by the Beatles such as "Hey Jude," data associated with the Beatles will be prioritized over data not associated with the Beatles. If the user says "Mary," information about the song "Let It Be" can be shown to the user.

Scrolling clusters can move across a screen and can represent popular items, most recent items, items most likely to be interesting to the user in the database 20, and/or data prioritized by the system based on data prioritization 1570. A scrolling cluster can be an image and/or video, or a collection of images and/or videos representing an item in the database. The scrolling cluster can be selectable. When the user selects the scrolling cluster, more information relevant to the scrolling cluster can be displayed. For example, if the user is listening to the song "Let It Be," and a scrolling cluster representing the cover of the album "Let It Be" can be shown to the user. Once the user selects the "Let It Be" cluster, the system can display more information about the album.

The scrolling clusters can be prioritized as relevant to the current user, or the current song, current artist, current time, current genre, current place, current events or anything the system knows about the current moment. The scrolling clusters can be created by editors, curators, artists, etc. from the database 20. The editors, curators, artists, etc. can also add their own materials to the database 20 and put together a narrative that is a sequence of the media items interspersed with text commentary that tells a story of a particular scene, particular artist or a moment that was captured by a photographer or an album, etc. The scrolling cluster can be selected by a user and can define the current context. For example, if the system is playing a song that is related to San Francisco in 1967, and the media database 20 contains scrolling cluster content related to San Francisco in 1967, the scrolling cluster content can be considered part of the current context and rated higher than some other related items in the database.

The user can use voice commands to select a scrolling cluster. For example, the user can read a text contained in a scrolling cluster to make a selection, or another user can issue a command such as "select scrolling cluster San Francisco."

The data prioritization 1570 can be a measure of popularity of a particular item in the database, such as a particular artist, a particular song, a genre, etc. For example, data prioritization can be obtained from an external popularity database such as a Billboard chart. Data can also be prioritized according to a number of visits to an artist's web page over a period of time, such as daily, monthly, or annual visits. Data can also be prioritized according to a number of webpages referencing a webpage dedicated to an artist or a song. In addition, data prioritization 1570 can be obtained from the database 20. For example, data prioritization 1570 can be based on most popular items in the database 20, such as most popular artists, songs, genres, time periods, average amount of time users spend engaging with the content, etc. For example, if certain content presented to the users is skipped immediately, such as the average time spent with the content is less than 20 seconds, the system can conclude that the content is not popular. However, if users spend a considerable amount of time, such as half an hour or more interacting with the content, the system can conclude that the content is popular. The popular content can be prioritized over the unpopular content.

The user profile 1580 can include a history of a user's interaction with the database 20; a user's demographic information such as age, gender, location, race, etc.; or a user's musical preferences such as favorite artists, favorite songs, frequently listened to music, playlists, etc. Data prioritization 1570 can be based on the user profile 1580. For example, if the user is a fan of Taylor Swift and the user says "play a song," the system 1500 can prioritize a Taylor Swift song to play.

The weights 1590 can be provided by the curator/editor. The curator/editor can assign weights to the data available in the database 20 such as core elements 1530 of time, place, genre, and artist; primary elements 1540; and supporting elements 1550; etc. The weights assigned by the curator/editor can be in turn modified by the rank of the curator/editor. For example, two curators can assign weights to the same artist, and the weights will be modified by the relative rankings of the curators. Curator 1 can assign a weight to the artist Kanye West as 0.9 on a 0 to 1 scale, while curator 2 can assign a weight of 0.5 on the 0 to 1 scale. The rank of the curator 1 is 163 out of 1057, while the rank of the curator 2 is 5 out of 1057. The weight of the curator 2 would be given more importance, and the resulting weight assigned to the artist Kanye West can be computed to be 0.56, closer to the weight assigned by curator 2.

FIG. 16 shows example voice commands that can be used in the system. Voice commands 1600 can take in various parameters. For example, voice commands 1610 can take as a parameter: core elements, primary elements, supporting elements, comments, details, curator media type, and other data types available in the database 20 in FIG. 15. Other commands 1620 such as "context" can tell you the current context 1520 in FIG. 5, through which the voice command is being interpreted. Command 1630, "zoom," can take two parameters: 1) "in"/"out" to specify the direction of the zoom, and 2) an identification (ID) specifying an object in the photo to which to zoom. Other commands 1640 can be interpreted without a specified parameter.

FIG. 17 shows an example of the context. As explained in FIG. 15, the context 1700 can be obtained from the current state of the system or current song that is playing. The current state of the system can include a current search performed by the user. The context 1700 can include the core elements 1530 in FIG. 15, such as time 1710, place and location 1720, artist 1730. The context can include cluster 1740, which can represent genre, or a cluster of related database items such as songs, albums, artists, etc. The context 1700 can also include additional information such as song 1750, album 1760, and user identification (ID) 1770. User ID 1770 can be used to create and utilize the user profile as described in FIG. 15.

The context 1700 containing multiple elements 1710, 1720, 1730, 1740, 1750, 1760, 1770 can be used to disambiguate a search. For example, the database 20 can contain multiple items that are related to each other, such as a news article about a man who is arrested in Golden Gate Park dressed as a white rabbit, and a picture of a person dressed as a white rabbit at a Jefferson Airplane concert. If the context 1700 is the current context, the picture of the person at the Jefferson airplane concert will be prioritized higher than the news article, because the picture of the person will be related to the artist 1730 part of the context 1700, and possibly to album 1760, cluster 1740, and user 1770 part of the context 1700, as opposed to the news article which would likely have no relation to the artist 1730.

Figure 18A:
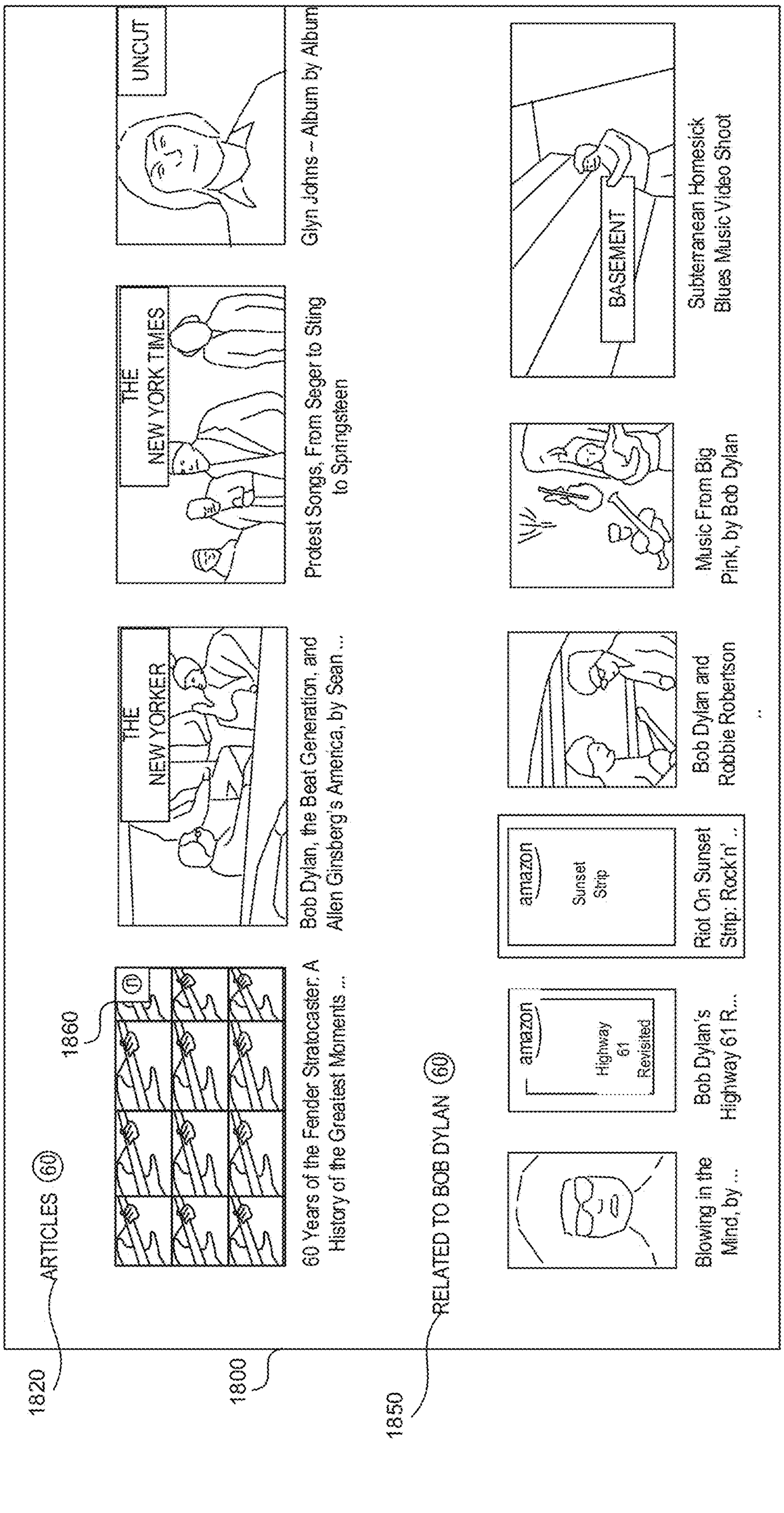
FIGS. 18A-18B show a visual representation of information contained in the database.
Figure 18B:
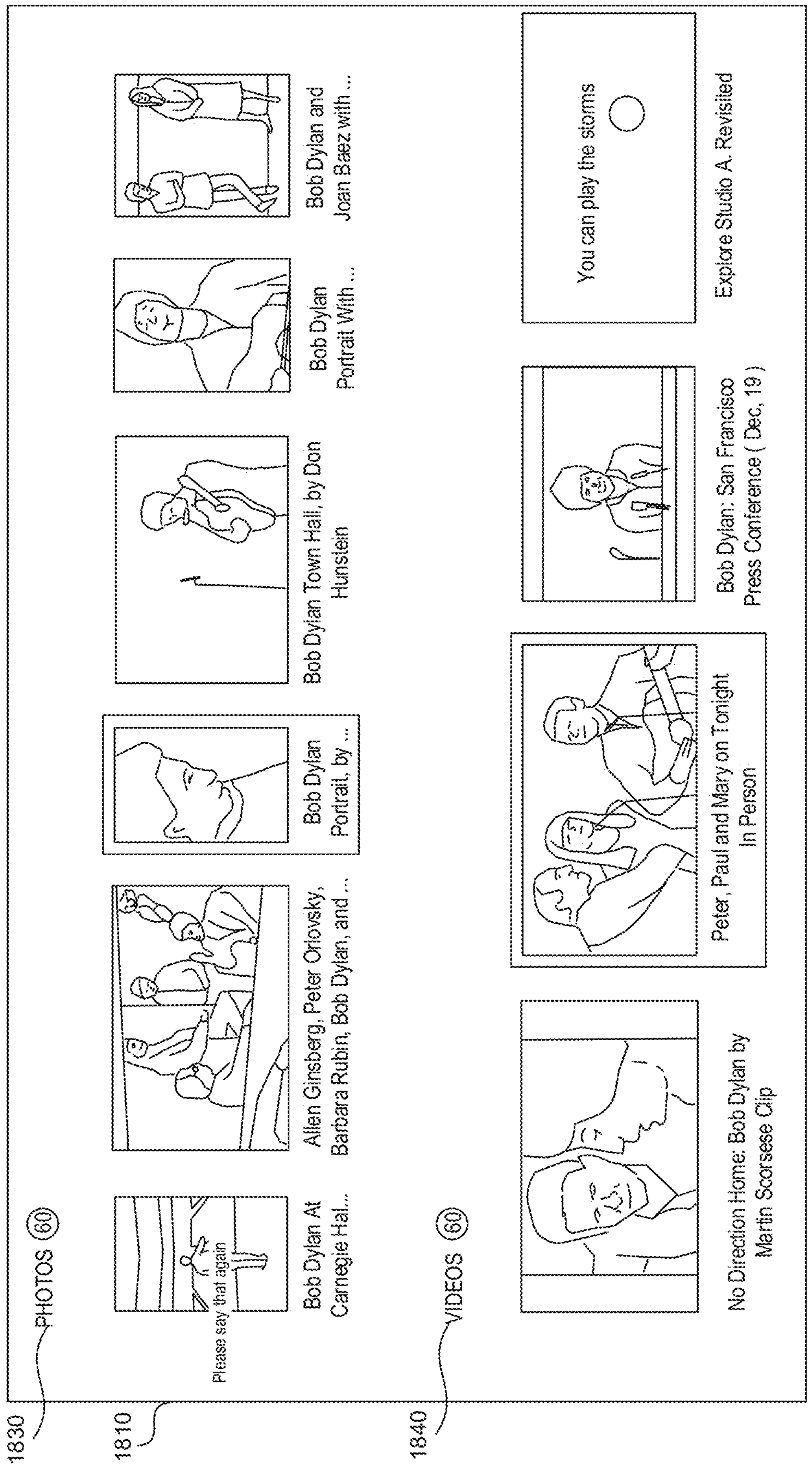

FIGS. 18A-18B show a visual representation of information contained in the database 20 in FIG. 15. The visual information can include scrolling clusters as described in this application. For example, while the system is playing the song "Like a Rolling Stone" by Bob Dylan, visual representation 1800, 1810 can be presented to the user. The visual representation 1800, 1810 can be animated by, for example, scrolling across the screen.

The visual representation 1800, 1810 can represent one or more of the core elements 1530 in FIG. 15, primary elements 1540 in FIG. 15, and supporting elements 1550 in FIG. 15 including comments, details, media type, etc. Visual representation 1800, 1810 can be categorized according to the core elements 1530, primary elements 1540, and/or supporting elements 1550.

For example, visual representation 1800, 1810 is categorized according to the supporting elements 1550 and the primary elements 1540. The categorization using supporting elements 1550 includes categorization based on media type, such as articles 1820, photos 1830, or videos 1840. The categorization using the primary elements 1540 includes categorization based on the artist, specifically, "related to Bob Dylan" 1850.

The user can select using a graphical user interface or a voice user interface a category 1820, 1830, 1840, 1850 to explore further. Alternatively, the user can select a specific item 1860 (only one labeled for brevity) to explore further.

Figure 19:
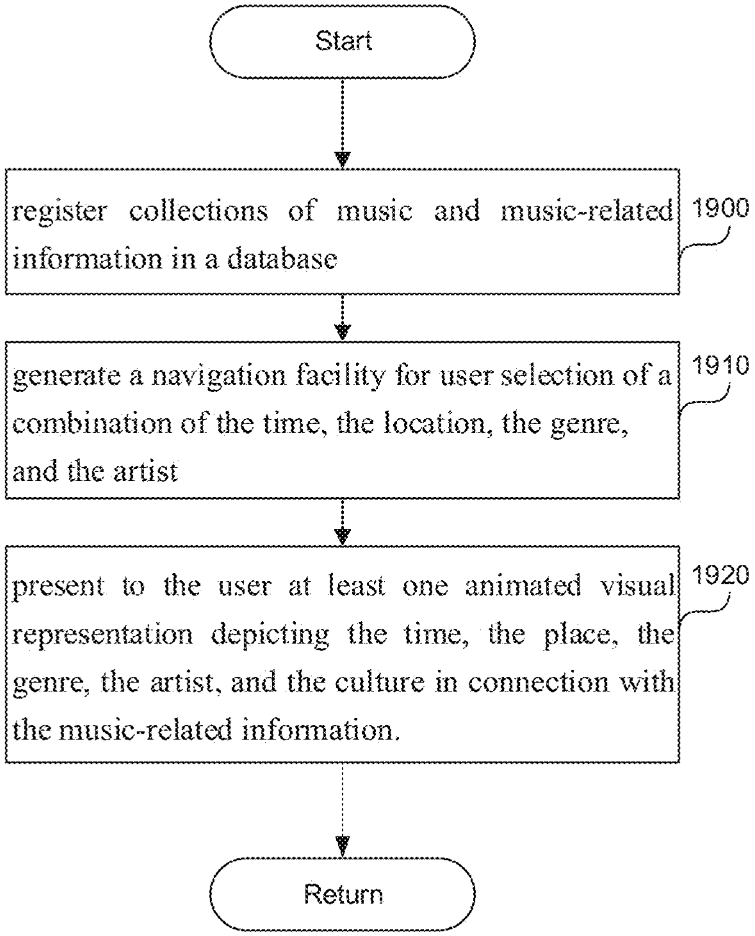
FIG. 19 is a flowchart of a method to present to the user and to enable the user to navigate temporal and geographic information relevant to an audio being played.

FIG. 19 is a flowchart of a method to present to the user and to enable the user to navigate temporal and geographic information relevant to an audio being played. In step 1900, a processor can register collections of music and music-related information in a database and make the collections of music and music-related information available to users. The collections of music and music-related information can be classified in the database by time, location, genre, and artist.

In step 1910, the processor can generate a navigation facility, as shown in FIGS. 7A-14, for user selection of a combination of the time, the location, the genre, and the artist in connection with the collections of music and the music-related information. The navigation facility can include an audio interface, or a graphical user interface.

In step 1920, the processor can present to the user at least one animated visual representation depicting the time, the place, the genre, the artist, and the culture in connection with the music-related information. In addition, the processor can present to the user, in response to the user selection, a map that includes images of music, history, and culture, wherein the culture presented on the map includes images of fashion, film, literature, music, and news.

The processor can receive an audio input, such as speech, recorded speech, podcasts, etc. and can convert the audio to text to obtain an audio with subtitles. Based on the text, the processor can create tags and add them to the audio with subtitles. The tags can correspond to the core elements 1530 in FIG. 15, primary elements 1540 in FIG. 15, and supporting elements 1550 in FIG. 15. For example, a recorded interview with Bob Dylan can be tagged with core element "artist," specifically "Bob Dylan," and/or a core element "time", specifically "1965." The interview can also be tagged with a primary element "shopping," specifically a link to a website selling Bob Dylan's music.

Based on the audio with subtitles and/or tags, the processor can find the other elements in the database, such as core elements 1530, primary elements 1540, and/or supporting elements 1550, that have the same or similar tags, and the processor can create connections in the database. The processor can store the received audio input in the database and the connections between the audio input and other elements in the database. Next time the processor plays the audio input, the processor can provide the elements related to the audio input as the visual representation accompanying the reproduced audio input.

The processor can receive an audio input such as speech, recorded speech, podcasts, etc. and can interpret the audio input using speech recognition data 1532, 1542, 1552 in FIG. 15, such as a phoneme pronunciation stored in the database 20, and a context 1520 in FIG. 15.

The processor can also receive an audio input including music, such as vocal music, instrumental music, and/or a hummed tune, etc. The processor can identify an element in the database related to the audio input. The element can be a core element, such as 1850 in FIG. 18A, a primary element 1540 in FIG. 15, or a supplemental element, such as 1820, 1830, 1840 in FIGS. 18A, 18B. Upon retrieving the element, the processor can present an animated visual representation of the element to the user, such as shown in FIGS. 18A, 18B. The animation can be scrolling, fading, morphing, etc.

The presentation of the visual representation including the animation of the visual presentation can be based on ranking of the elements related to the audio input. The processor can rank information presented to the user including time, place, genre, and/or artist, based on a user profile, and importance provided by a curator or popularity. The popularity can be measured based on popularity within the database 20, or based on popularity from an external database and/or the Internet. The processor can animate the visual representation based on said ranking. For example, the processor can display the most popular information first, the processor can display the most popular information for a longer period of time than less popular information, the processor can repeat display of the more popular information, etc.

The processor can determine a mode of operation of a dual-mode system associated with the processor. A first mode of the dual-mode system includes receiving an audio extrinsic to the dual-mode system as an input to the dual-mode system. A second mode of the dual-mode system includes receiving an audio emitted by the dual-mode system as the input to the dual-mode system. The second mode is a self-referential mode, where the audio output by the system is used as an input to the system. The audio can be speech, humming, podcasts, music, etc. To determine the mode of the system, the processor can receive an input from the user indicating the mode of operation. For example, the processor can receive a button press, menu selection, or a voice command from the user indicating the mode of operation. Alternatively, the processor can automatically determine the mode of operation, as described below.

When the processor determines that the mode of operation is the second mode, the processor can receive the audio emitted by the dual-mode system as the input to the dual-mode system. The processor can identify in the database multiple elements providing additional information about the received audio. The elements can include the time, the location, the genre, or the artist. Elements can be core elements 1530 in FIG. 15, primary elements 1540 in FIG. 15, and/or supporting elements 1550 in FIG. 15. The processor can provide a visual representation of the elements, such as an image or an animation.

When the processor determines that the mode of operation is the first mode, the processor can receive the audio extrinsic to the dual-mode system as the input. The audio extrinsic to the dual-mode system can be speech (such as recorded speech), humming, vocal music, instrumental music, etc. The processor can identify whether the input is a command or a search query.

The processor can selectively perform the command or identify in the database the multiple elements providing additional information about the audio extrinsic to the dual-mode system. In other words, when the input is categorized as the command, the processor can perform the command, and when the input is categorized as the search query, the processor can perform the search query.

After performing the search query, the processor can generate the visual representation of the multiple elements.

The processor can determine whether the audio emitted by the dual-mode system is represented within the database associated with the dual-mode system. For example, the processor can check whether the audio emitted by the dual-mode system is stored in the database 20, or whether the audio emitted by the dual-mode system has an identification (ID) in the system. When the audio emitted by the dual-mode system is not represented within the database, the processor can determine to operate in the second mode because there are no core, primary, or supporting elements connected to the emitted audio, and by operating a second mode, the processor can perform the search within the database to create the core, primary and/or supporting elements associated with the emitted audio.

When the audio emitted by the dual-mode is represented within the database, the processor can determine whether the database contains one or more elements associated with the audio. When the database does not contain an element associated with the audio, the processor can determine to operate in the second mode, because, again there are no core, primary, or supporting elements connected to the emitted audio, and by operating a second mode, the processor can perform the search within the database to create the core, primary and/or supporting elements associated with the emitted audio. Even when the database contains one or more elements associated with the audio, the processor can compare the number of elements found to a criterion, and, based on the comparison, the processor can determine to operate in the second mode.

For example, the criterion can include a threshold number of elements. In other words, if the number of elements associated with the emitted audio is below a predetermined number, such as 10, the processor can perform a search within the database to establish additional connections between the emitted audio and other elements in the database.

In another example, the criterion can include a threshold number of elements associated with a category. The category can correspond to a core element 1530, a primary element 1540 or a supporting element 1550. For example, the criterion can require having five elements in each of the core categories of the time, the location, the genre or the artist. If, for example, the genre and the location each have 7 and 8 elements respectively, but the time and the artist have less than 5 elements, the processor can determine that the criterion is not satisfied and perform a search within the database to establish additional connections in the time and the artist categories.

Computer Implementation

Figure 20:
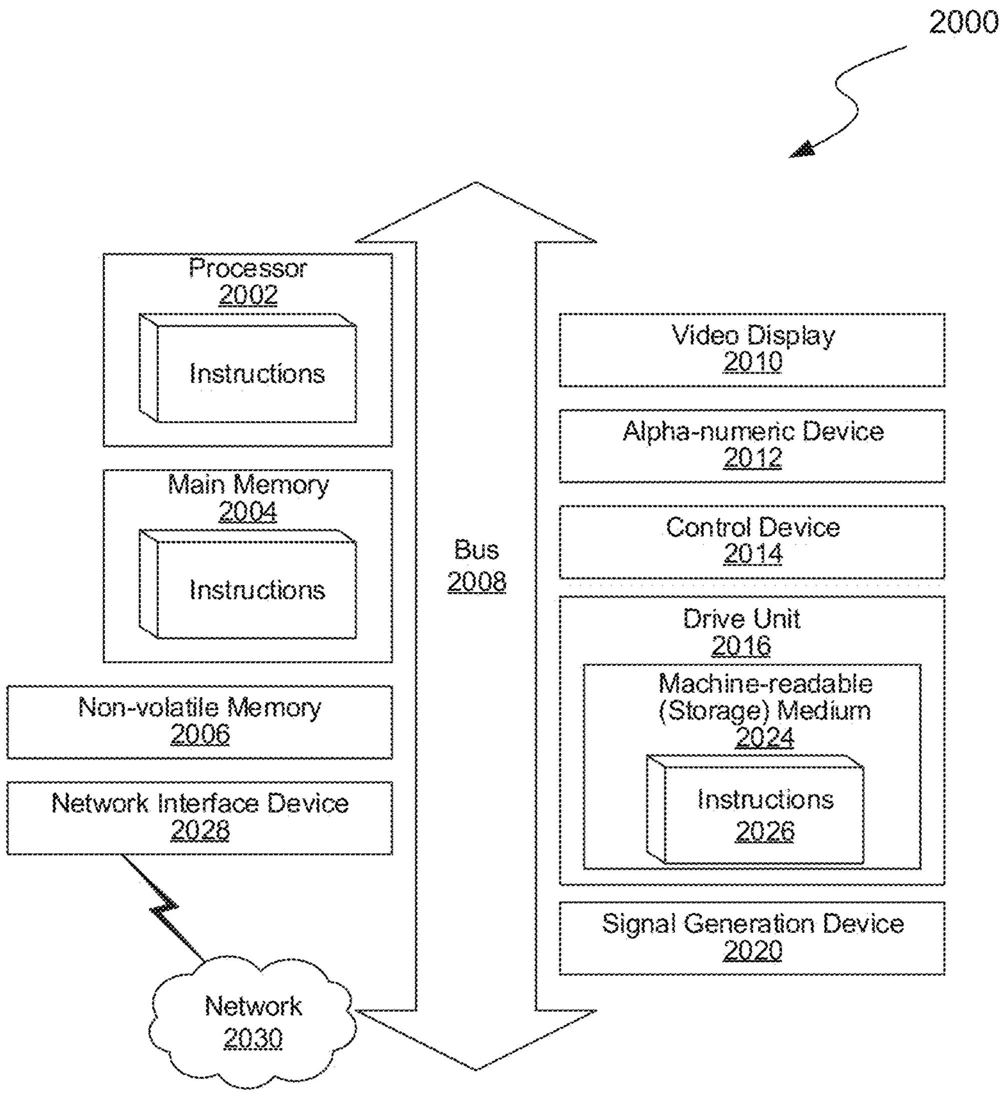
FIG. 20 is a block schematic diagram of a machine in the exemplary form of a computer system within which a set of instructions for causing the machine to perform any one of the herein disclosed methodologies may be executed.

FIG. 20 is a block schematic diagram of a machine in the exemplary form of a computer system 2000 within which a set of instructions for causing the machine to perform any one of the foregoing methodologies may be executed. In alternative embodiments, the machine may include a network router, a network switch, a network bridge, personal digital assistant (PDA), a cellular telephone, a Web appliance or any machine capable of executing or transmitting a sequence of instructions that specify actions to be taken.

The computer system 2000 includes a processor 2002, a main memory 2004 and a static memory 2006, which communicate with each other via a bus 2008. The computer system 2000 may further include a display unit 2010, for example, a liquid crystal display (LCD) or a cathode ray tube (CRT). The computer system 2000 also includes an alphanumeric input device 2012, for example, a keyboard; a cursor control device 2014, for example, a mouse; a disk drive unit 2016, a signal generation device 2018, for example, a speaker, and a network interface device 2028.

The disk drive unit 2016 includes a machine-readable medium 2024 on which is stored a set of executable instructions, i.e. software, 2026 embodying any one, or all, of the methodologies described herein below. The software 2026 is also shown to reside, completely or at least partially, within the main memory 2004 and/or within the processor 2002. The software 2026 may further be transmitted or received over a network 2030 by means of a network interface device 2028.

In contrast to the system 2000 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with complementary metal oxide semiconductor (CMOS), transistor-transistor logic (TTL), very large systems integration (VLSI), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention is described herein with reference to the preferred embodiment, one skilled in the art will readily appreciate that other applications may be substituted for those set forth herein without departing from the spirit and scope of the present invention. For example, although an embodiment of the invention disclosed herein is concerned with music, those skilled in the art will appreciate that the invention is readily applicable to, for example, but not by way of limitation, fashion, film, art, news, comedy, books, healthcare, politics, government, corporate and other human enterprises, and the environment.

The invention claimed is:

1. A computer-implemented method for temporal and geographic presentation and navigation of linked cultural, artistic, and historic content, comprising:

providing a processor configured to register collections of music and music-related information in a database and to make the collections of music and the music-related information available to users, wherein the collections of music and the music-related information are classified in the database by all of time, location, genre, and artist;

the processor configured to provide a navigation facility for user selection of a combination of all of the time, the location, the genre, and the artist in connection with the collections of music and the music-related information, and for generating and presenting to a user in response to the user selection a corresponding map that includes independent images of all of music, its history, and culture with regard to the collections of music and the music-related information, wherein the navigation facility comprises an audio interface;

wherein the culture presented on the map in response to the user selection comprises results that include independent images of all of fashion, film, literature, music, and news;

wherein the processor is configured to generate and present to the user at least one animated mural comprising the images that depict a fundamental combination of the time, the location, the genre, the artist, and the culture in connection with the music-related information;

wherein the animated mural comprises a dynamically animated selection of the images derived from the user selection; and wherein the images further comprise any of regions, cities, artists, news items, fashion trends, movies, books, and genres of art.

2. A system comprising a processor configured to:

register a collection of music and music-related information in a database and make the collection of music and the music-related information available to users, wherein the collection of music and the music-related information are classified in the database by time, location, genre, and artist; and generate a navigation facility for user selection of a combination of the time, the location, the genre, and the artist in connection with the collection of music and the music-related information, and to present to a user in response to the user selection a map that includes images of music, history, and culture, wherein the culture presented on the map comprises images of fashion, film, literature, music, and news, wherein the navigation facility comprises an audio interface;

present to the user at least one visual representation depicting the time, the location, the genre, the artist, and the culture in connection with the music-related information;

wherein the visual representation comprises a dynamically animated selection of images derived from the user selection; and wherein the images further comprise any of regions, cities, artists, news items, fashion trends, movies, books, and genres of art.

3. The system of claim 2, comprising the processor configured to:

receive an audio input;

convert the audio input to text to obtain an audio with subtitles; and based on the audio with subtitles, find the collection of music or the music-related information associated with the text in the database.

4. The system of claim 3, wherein the audio input comprises a podcast.

5. The system of claim 2, comprising the processor configured to:

receive an audio input;

interpret the audio input using a phoneme pronunciation stored in the database and a context.

6. The system of claim 2, comprising the processor configured to:

receive an audio input comprising music;

identify an element in the database related to the audio input; and present an animated visual representation of the element to the user.

7. The system of claim 2, said processor configured to present to the user at least one animated visual representation comprising the processor configured to:

rank information presented to the user comprising the location, the time, the genre and the artist, based on an importance provided by a curator, a popularity of the information presented to the user or a user profile;

animate the visual representation based on said ranking.

8. The system of claim 2, comprising:

determining a mode of operation of a dual-mode system, wherein a first mode of the dual-mode system comprises receiving an audio extrinsic to the dual-mode system as an input to the dual-mode system, and a second mode of the dual-mode system comprises receiving an audio emitted by the dual-mode system as the input to the dual-mode system;

upon determining that the mode of operation is the second mode, receiving the audio emitted by the dual-mode system as the input to the dual-mode system;

identifying in the database a plurality of elements providing additional information about the received audio, the plurality of elements including the time, the location, the genre, or the artist; and providing the visual representation of the plurality of elements.

* * * * *